United States Patent [19]

Holland et al.

[11] Patent Number: 5,120,942

[45] Date of Patent: Jun. 9, 1992

[54] PORTABLE TOUR MONITOR DEVICE, REPORT GENERATING SYSTEM AND PROGRAMMING DEVICE THEREFOR

[75] Inventors: Richard F. Holland, Evanston; Jeffrey P. Coney, Chicago, both of Ill.

[73] Assignee: Computer Systems Design Inc., Chicago, Ill.

[21] Appl. No.: 305,963

[22] Filed: Feb. 2, 1989

[51] Int. Cl.⁵ ...................... G06F 15/21; G06F 15/40
[52] U.S. Cl. .................................... 235/376; 235/375; 235/385; 340/572; 364/402
[58] Field of Search ............... 235/375, 376, 377, 385, 235/472, 462; 340/825.30, 825.31, 572; 364/409, 401, 402

[56] References Cited

U.S. PATENT DOCUMENTS

| | | | |
|---|---|---|---|
| 3,736,561 | 5/1973 | Rumpel | 340/825.22 |
| 3,791,945 | 12/1973 | Ellul | 204/59 AM |
| 3,990,067 | 11/1976 | Van Dusen et al. | 340/825.49 |
| 4,296,408 | 10/1981 | Neuringer | 340/539 |
| 4,628,193 | 12/1986 | Blum | 235/375 |
| 4,688,026 | 8/1987 | Scribner et al. | 340/572 |
| 4,801,786 | 1/1989 | Stobbe | 235/377 |
| 4,850,009 | 7/1989 | Zook et al. | 235/375 |

FOREIGN PATENT DOCUMENTS 2156128 10/1985 United Kingdom .
2161967 1/1986 United Kingdom .

OTHER PUBLICATIONS

Hasler Personnel Protection Systems by R. Petersen, No Date Known.
"Cappa Newsletter" Issue 40 (Nov. 1987).
"Diester Electronics U.S.A., System Specifications WK-1000 & WK-1100", No Date Known.
"New Detex CompuTour 2000 Electronic Watchtour System", No Date Known.
"Computour Electronic Watchtour System" No Date Known.
"Patrol Manager" No Date Known.
"Guard Control System (PC Version)" No Date Known.
"The Morse Watchman" No Date Known.
"The Morse Watchman's #50-5 Data Recorder with Built in Touch Pad" No Date Known.
"Morse Guard Tour Tour Report" No Date Known.
"Morse Watchman Inc. Feature List" No Date Known.
"Security Business Sep. 1, 1988".
"Patrol Command Systems" No Date Known.
"SIS-Fireguard" No Data Known.
"Guard Card Instructions" No Date Known.
"SIS-Tourguard" No Date Known.
"Guard Card Specifications" No Date Known.
"Guard Card Instructions SIS Patrol": No Date Known.
"SIS-SIS Patrol" No Date Known.
"Now Available Easy-to-Use, Credit-Card Sized Asset Protection Systems" No Date Known.
"Protrac-System" No Date Known.
"GAS Protrac System" No Date Known.
"Computerized Patrol Recorder-Amano" No Date Known.
"Sector Technology Guarded Tour Management" No Date Known.

Primary Examiner—Robert Weinhardt

[57] ABSTRACT

A tour monitor system includes a portable tour monitor and a central programming/report generating computer. The tour monitor includes a bar code reader, an alphanumeric display, and an alphanumeric keyboard. The tour is organized into zones, each including a set of checkpoints, wherein each checkpoint is labeled by a bar code. The tour monitor is programmed to prompt the guard through the tour by displaying the names of successive zones. In addition, individual checkpoints can be designated as higher or lower priority checkpoints, and the tour monitor is programmed to alert the guard if higher priority checkpoints are missed, and to require the guard either to scan the missed higher priority checkpoint or to provided an override signal. The tour monitor also allows the guard to enter alphanumeric messages which are stored in combination with the scanned checkpoint codes in a log. This log is then transmitted to the programming/report generating computer for analysis. Preferably, reports are organized in terms of zones, and reports specifically highlight higher priority checkpoints which were missed. By organizing the tour into zones and checkpoints, the tour monitor can be programmed more efficiently.

7 Claims, 13 Drawing Sheets

STARTUP

DATA MENU

MAIN MENU

MISC MENU

DISPLAY ZONES

REQUEST ADVANCE

PROCESS SCANNED CHECKPOINT

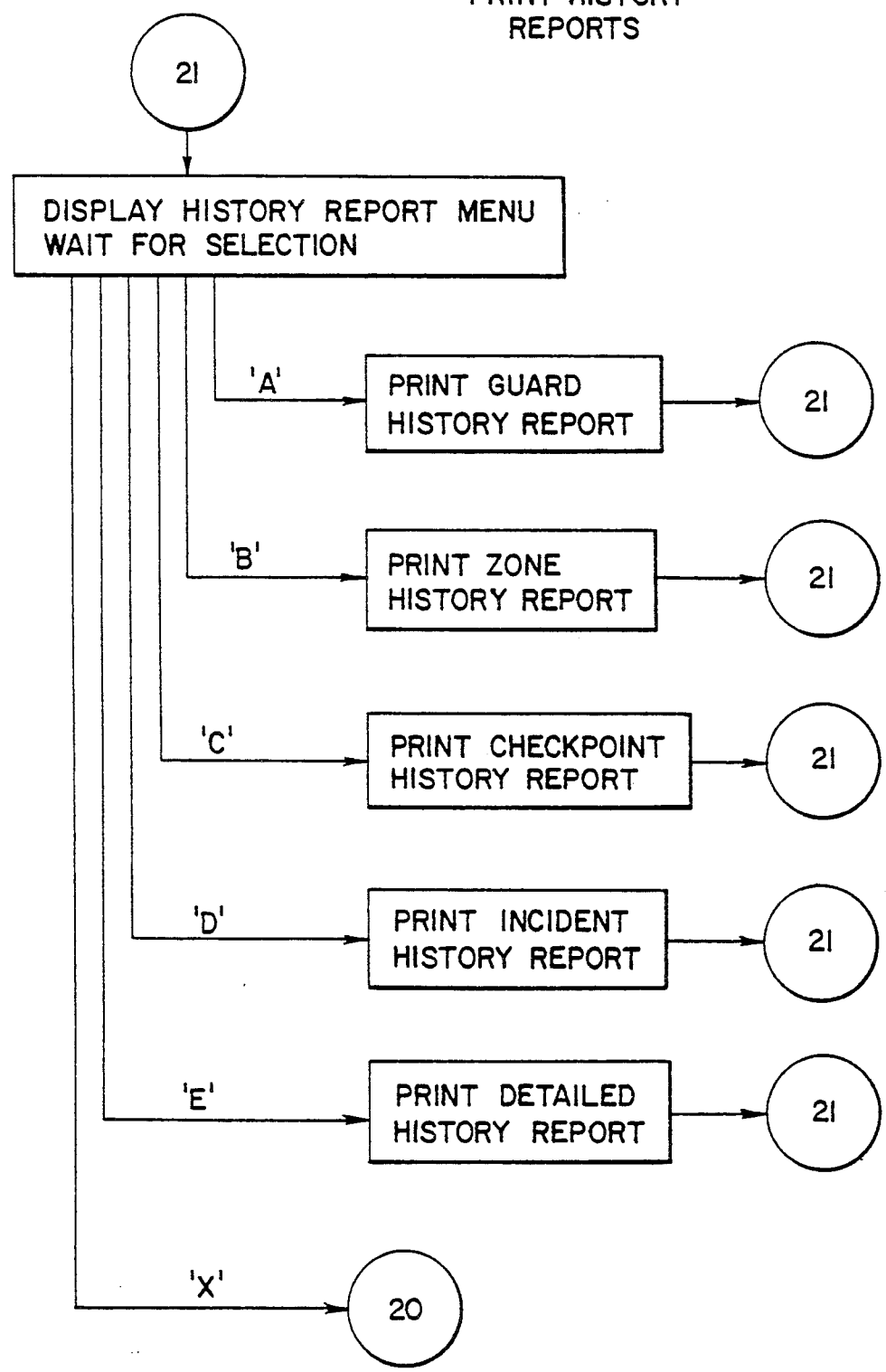

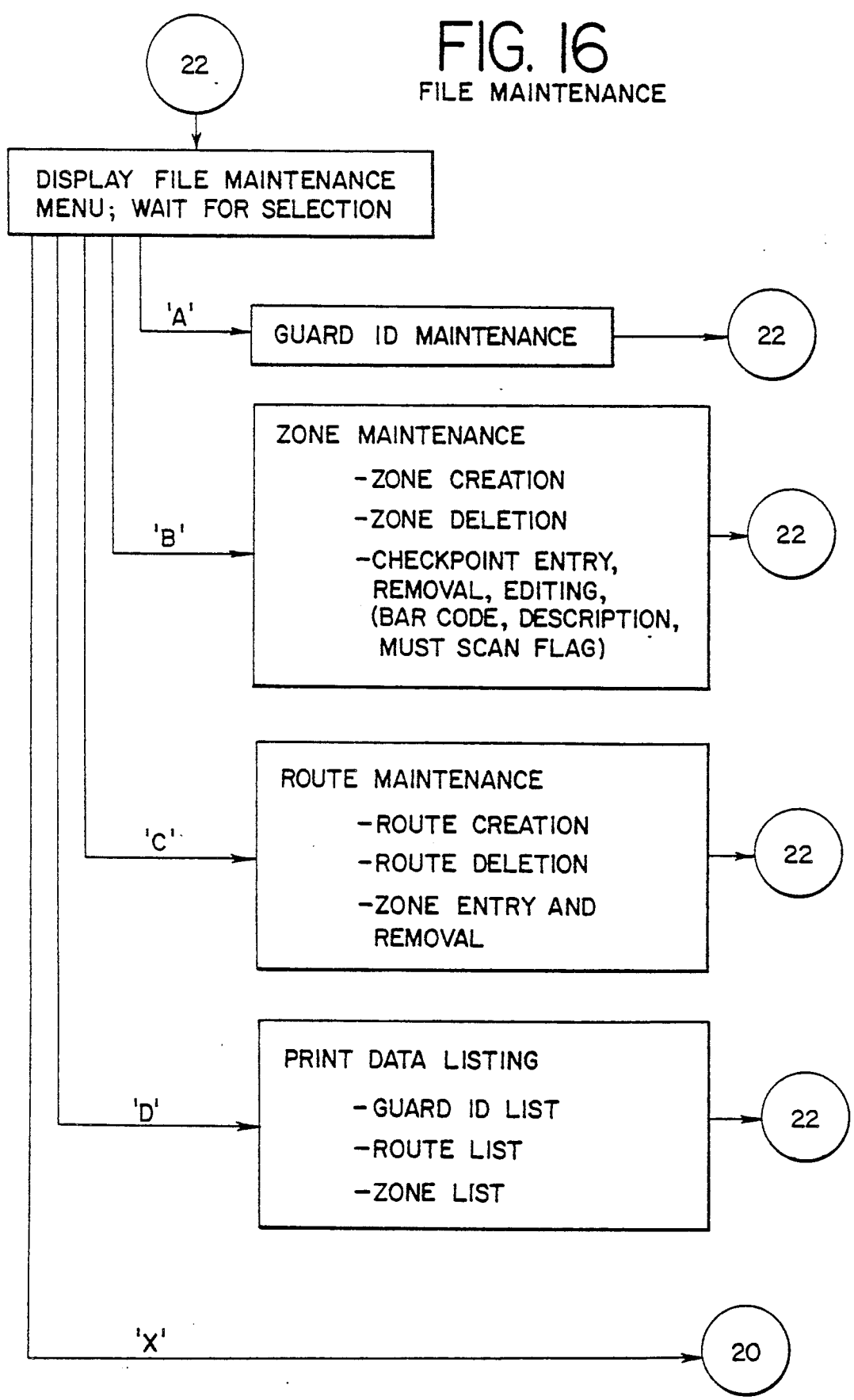

PORTABLE TOUR MONITOR DEVICE, REPORT GENERATING SYSTEM AND PROGRAMMING DEVICE THEREFOR

BACKGROUND OF THE INVENTION

This invention relates to an improved tour monitor system that can be used for example by a guard or night watchman to record the time at which various checkpoints on a tour are checked by the guard.

Tour monitors have advanced significantly since the early mechanical clocks which used paper tape recording systems to time stamp events of a tour. One class of modern tour monitors includes a bar code reader in a portable, hand-held device. Bar code labels are attached to each checkpoint along the tour, and the tour monitor includes means for recording consecutive bar code readings along with a time stamp for each reading. At the end of the tour, the recorded list of bar code readings and time stamps can then be transmitted to a report generating computer.

Such tour monitors offer certain advantages, particularly in that the checkpoint labels can be made inconspicuous and inexpensive to attach and the associated reports can be generated in a flexible format that is easy to use. However, tour monitors of the type described above provide few additional operational features for the guard beyond those provided by the original mechanical clock systems.

The present invention is directed to an improved tour monitor and associated programming and report generating system that improve the efficiency with which the tour monitor can be programmed, the efficiency with which the guard or other service individual can use the tour monitor, and the usefulness of reports generated to summarize the monitored tours.

SUMMARY OF THE INVENTION

The tour monitor system described below provides a number of important new features which cooperate to provide a particularly efficient system. Of course, it is not necessary in all applications that all of these features be used together, and selected ones of the features can be used alone or in various subcombinations in some applications.

The tour monitor of this invention includes a modular, portable device which is adapted to be carried through a tour which comprises a plurality of checkpoints, each labelled with a respective checkpoint code. This portable device includes sensor means for reading the checkpoint codes during the tour and for generating time stamped sensor signals in response to these codes. The device also includes memory means for storing the time stamped sensor signals.

A first feature of this invention relates to a system for prompting the user of the tour monitor to move through the tour. According to this first feature, a tour monitor of the type described above is provided with means for storing a plurality of messages, each associated with a respective one of a plurality of successive zones included in the tour, wherein each of the zones is associated with a set of the checkpoints of the tour. The portable device includes display means operative when the sensor means has read selected checkpoint codes associated with a selected zone for displaying the message associated with the next successive zone. In this way, the guard or other user of the tour monitor is prompted to move from one zone to the next. This makes it easier for a new guard or other user of the tour monitor to conduct an unfamiliar tour, and it reduces inefficiencies associated with the need for an experienced guard to learn a new tour.

According to a second feature of this invention, a portable tour monitor of the general type described above is provided with means for designating first ones of the checkpoints of the tour as higher priority checkpoints and second ones of the checkpoints of the tour as lower priority checkpoints. A sequence of sets of checkpoint signals is stored, preferably in the portable tour monitor itself, along with means for comparing the sensor signals with the checkpoint signals and for displaying a warning message when the sensor signals indicate that one of the higher priority checkpoints has been missed in the sequence.

This feature of the invention alerts the guard or other user of the tour monitor when a higher priority checkpoint has been missed. In the preferred embodiment described below, the guard has the choice of either scanning the missed checkpoint or commanding an override of the warning message. This allows a supervisor reviewing the tour monitor log to be certain that a higher priority checkpoint was not inadvertently missed or forgotten. Furthermore, this feature allows checkpoints to be divided into higher and lower priority checkpoints, thereby increasing flexibility to the guard in conducting the tour.

According to a third feature of this invention, a tour monitor of the general type described above is provided with an alphanumeric keyboard which generates alphanumeric key signals. Means are provided for storing the alphanumeric key signals in association with selected time stamped sensor signals. This feature of the invention allows the guard or other user of the tour monitor to write alphanumeric messages into the log maintained by the tour monitor. For example, the guard can record the name of an unexpected person found at one of the checkpoints during the tour. In this way, the need for hand written notes or other supplements to the log can be largely eliminated.

The tour monitor described in detail below is programmable, and a computer system is provided for programming the tour monitor for a tour According to a fourth feature, this programming device includes means for storing a plurality of user definable zone records. Each zone record comprises a set of checkpoint entries, and one or more of these sets comprise a plurality of checkpoint entries. Each checkpoint entry in turn comprises a checkpoint code associated with a respective checkpoint. The programming device of this invention includes means for creating a tour defining record comprising a user selectable plurality of zone records, and means for transmitting the tour defining record to a programmable tour monitor.

Because the programming device organizes the checkpoint entries into zone records, the tour defining record can be assembled quickly and efficiently by a user who simply selects the desired zone records to make up a tour. Once the zone records have been defined, the user often does not need to enter individual checkpoint entries when a tour defining record is to be modified, as, for example, when one zone is substituted for another.

Once a tour has been completed and a tour monitor of the type described above has generated a tour log, the tour monitor report generating system of this invention can be used to generate reports for later analysis. According to a fifth feature of the invention, such a tour monitor report generating system includes means for receiving a log from a tour monitor, wherein the log comprises a plurality of time stamped sensor signals, at least some of the sensor signals associated with respective checkpoint codes associated with respective checkpoints. The report generating system also includes means for generating a report comparing the received sensor signals with a plurality of desired checkpoint signals intended to be included in a predefined tour, wherein some of the checkpoint signals in the predefined tour are designated as higher priority checkpoints and others are designated as lower priority checkpoints. The report generating means also includes means for indicating in the report when the received sensor signals indicate that one of the higher priority checkpoints was missed. By dividing the checkpoints of the tour into higher and lower priority checkpoints and specifically flagging missed higher priority checkpoints, the report generating system of this invention allows supervisory personnel to monitor the performance of the guard or other user of the tour monitor more effectively.

The invention itself, together with further objects and attendant advantages, will best be understood by reference to the following detailed description, taken in conjunction with the accompanying drawings.

BRIEF DESCRIPTION OF THE DRAWINGS

FIG. 15 is a flow chart of the Print History Reports Routine of FIG. 14.

FIG. 16 is a flow chart of the File Maintenance Routine of FIG. 14.

DETAILED DESCRIPTION OF THE PRESENTLY PREFERRED EMBODIMENTS

Figure 1:
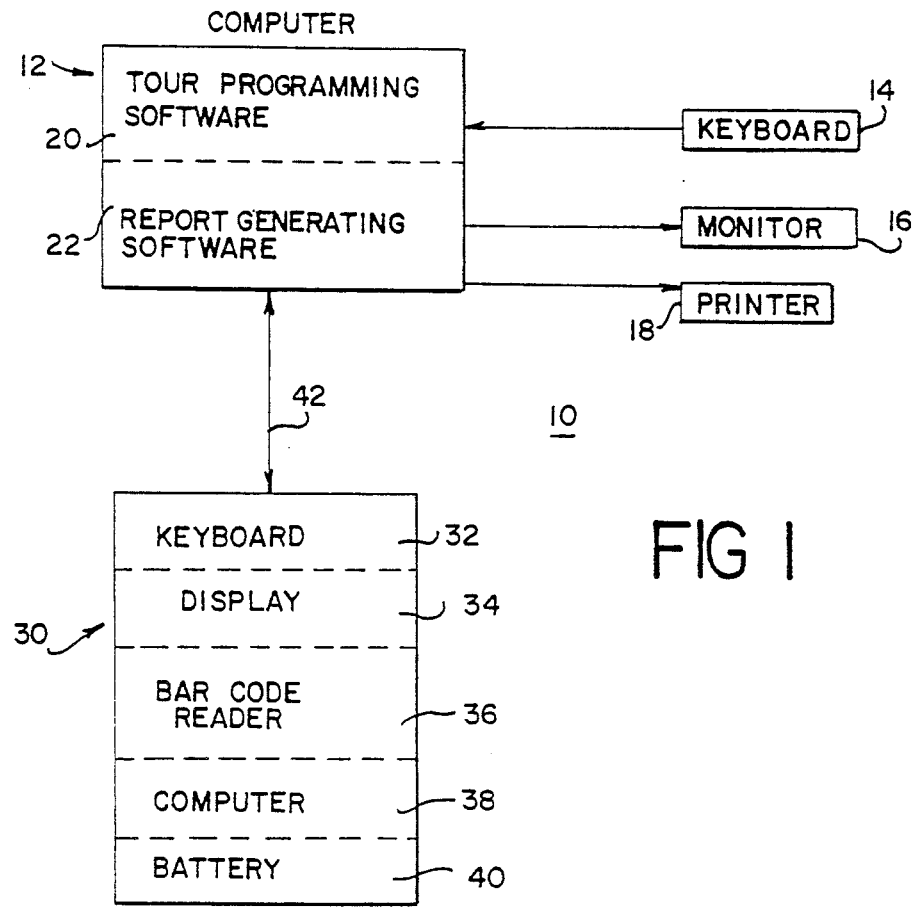
FIG. 1 is a block diagram of a tour monitor system that incorporates the presently preferred embodiment of this invention.

Turning now to the drawings, FIG. 1 shows a block diagram of a tour monitor system 10 that incorporates each of the five features of the invention outlined above.

This system 10 includes a computer 12 which may for example be a conventional IBM compatible PC. The computer 12 is coupled to a conventional keyboard 14, monitor 16 and printer 18. As described in detail below in conjunction with FIGS. 14–16, the computer 10 incorporates both tour programming software 20 and report generating software 22.

The system 10 also includes at least one portable tour monitor 30. Each monitor 30 is a hand-held device which includes a keyboard 32, a display 34, a sensor such as a bar code reader 36, a computer 38 and a battery 40. A cable 42 can be used to interconnect the monitor 30 with the computer 12 when desired to transfer programming information from the computer 12 to the monitor 30, or to transmit a tour log back from the monitor 30 to the computer 12. When the tour monitor 30 is actually being carried through a tour, it is of course disconnected from a computer 12 and used as a stand alone unit.

Figure 2:
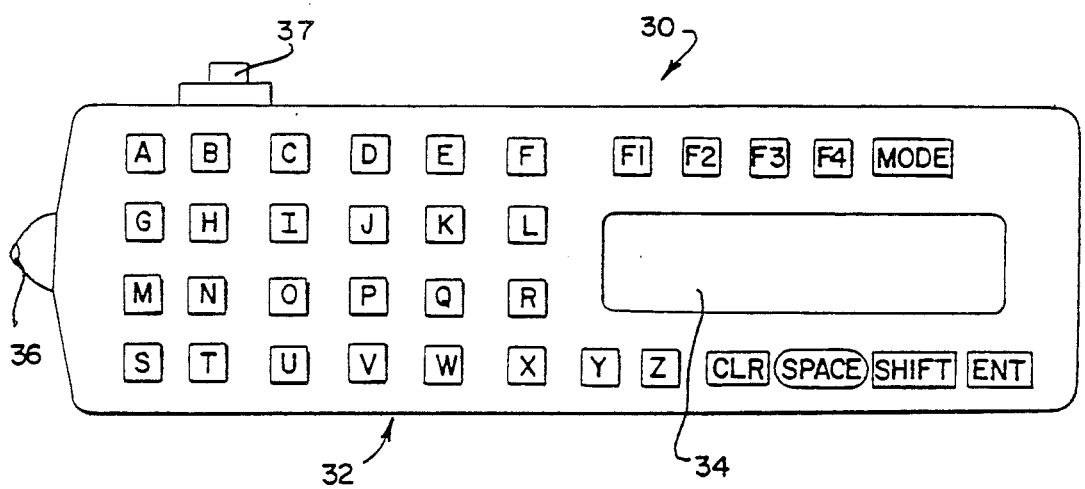
FIG. 2 is a plan view of the portable tour monitor of FIG. 1.

A wide variety of portable computers can be used for the tour monitor 30, but the hand-held computer marketed under the tradename MICRO-WAND III by Hand Held Products, Inc. of Charlotte, N.C. has been found suitable. FIG. 2 shows a plan view of the preferred tour monitor 30. In this embodiment, the keyboard 32 is a full alphanumeric keyboard and the display 34 includes two sixteen-character lines, wherein each of the characters is formed of a respective dot matrix that allows any desired alphanumeric character to be displayed. A control button 37 is mounted on the side of the monitor 30 to activate the bar code reader 36.

Figure 3:
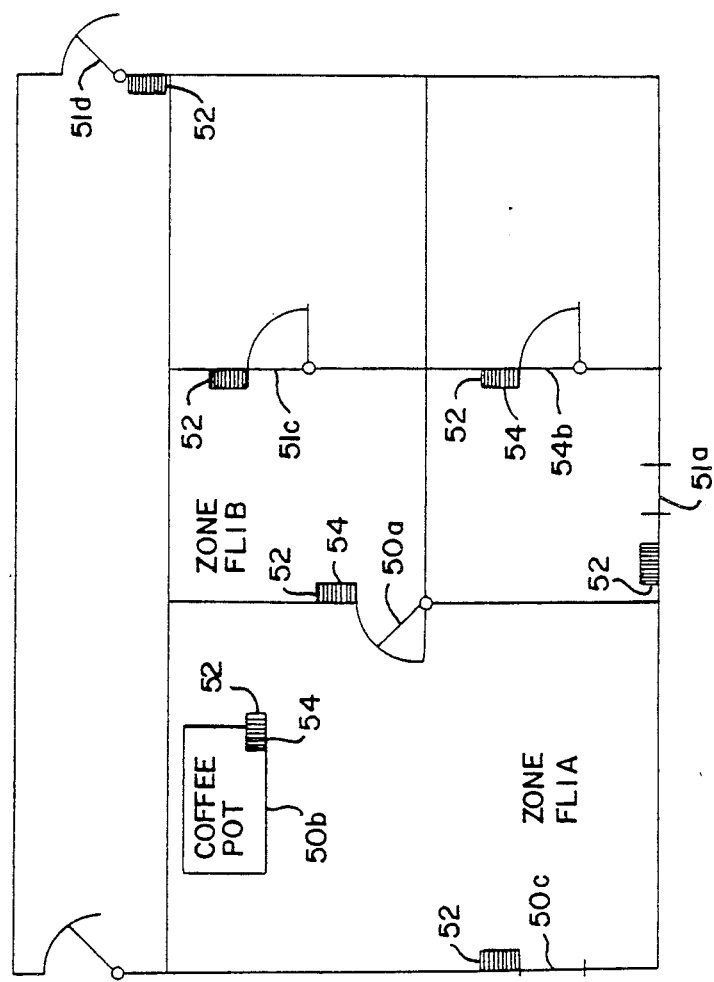
FIG. 3 is a plan view of a sample tour used for illustrative purposes.

The tour monitor 30 is used to record progress of an individual such as a guard through a tour such as a security guard tour. FIG. 3 shows a plan view of a building and will be used to outline the basic features of a highly simplified tour. The tour in this example is made up of two zones. Zone FL1A includes three separate checkpoints: entry door 50A, coffee pot 50B and window 50C. Zone FL1B includes four separate checkpoints: window 51A and doors 51B, 51C, 51D. Each of the checkpoints 50, 51 is marked with a respective checkpoint label, shown in a highly schematic form at 52. Each of the checkpoint labels 52 encodes a respective checkpoint code 54, which in this embodiment is a bar code. In actual use, the checkpoint labels 52 can be inconspicuous, adhesively secured strips. Preferably, the labels 52 are uniform in visual appearance. They can for example be conventional bar code labels that appear unfeatured to the naked eye so that they are not readily apparent as bar code labels.

Within the tour shown in FIG. 3, selected ones of the checkpoints 50, 51 are designated as higher priority checkpoints. For example, the coffee pot 50B and the doors 51C and 51D can be designated as higher priority checkpoints and the remaining checkpoints can be designated as lower priority checkpoints. As pointed out below, the tour monitor 30 is programmed to process these two different priorities of checkpoints differently.

In this preferred embodiment the zones of the tour are ordered. That is, the guard is intended to check Zone FL1A before he checks Zone FL1B. However, within any one zone, the individual checkpoints are unordered, and the guard is free to check them in any order that he desires. This increases flexibility and efficiency, because it may not always be convenient for a guard to check the checkpoints within a given zone in the same order. For example, a tour may be interrupted and it may be more convenient and efficient to resume the tour at some point within a zone other than that at which the tour was interrupted.

FIGS. 4-13 will be used to describe the operation of the tour monitor 30. The detailed discussion will then turn to the operation of the tour programming software 20 and the report generating software 22.

Prior to the start of any tour, the tour monitor 30 is programmed with a tour defining record that includes the following information:
1. The system date and time;
2. A password that can be used by a supervisor for various functions including programming the tour monitor 30 and transmitting a recorded log from the tour monitor 30 to the computer 12;
3. The number of the route defined by the tour defining record;
4. An ordered list of zone records, each zone record made up of a zone number and a zone name;
5. A list of checkpoint entries, each checkpoint entry including the zone number and the bar code of the respective checkpoint;
6. A list of higher priority checkpoint entries, each including the zone number, the bar code and the name of the respective checkpoint; and
7. A list of guard identification numbers.

Figure 4:
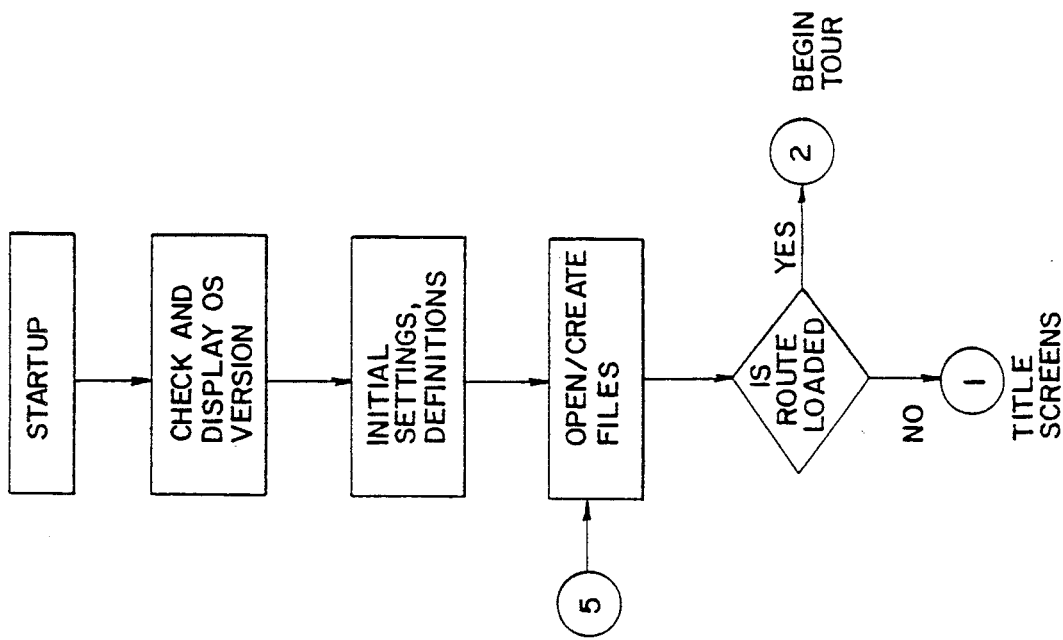
FIG. 4 is a flow chart of the Start-up Routine executed by the tour monitor 30.
Figure 6:
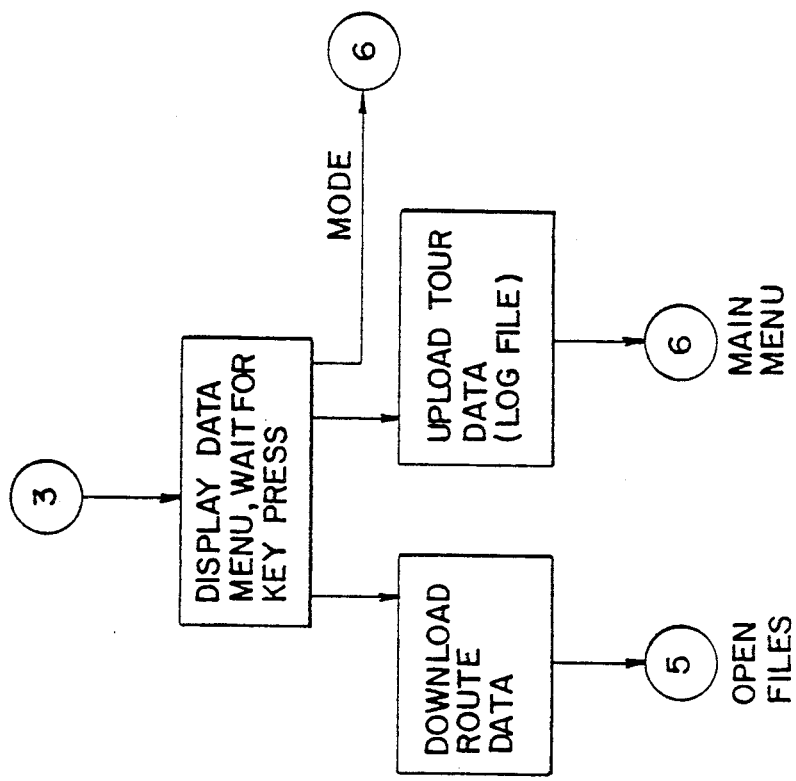
FIG. 6 is a flow chart of the Data Menu Routine executed by the tour monitor 30.

As shown in FIG. 4, on start up the monitor 30 displays an initial operating system screen and then initializes various settings and functions and opens or creates appropriate files. The monitor 30 then checks to determine whether a route has been loaded. If not, control branches to the main menu routine of FIG. 5, where title screens are displayed on the display 34 and the routine waits for an appropriate key press. The key F3 causes execution of the Data Menu routine as shown in FIG. 6. Once the data menu has been displayed in the Data Menu routine, the routine then waits for appropriate key presses either to initiate the down loading of a tour defining record from the computer 12 to the monitor 30 or up loading of a log of tour data recorded by the monitor 30 from the monitor 30 to the computer 12.

Figure 5:
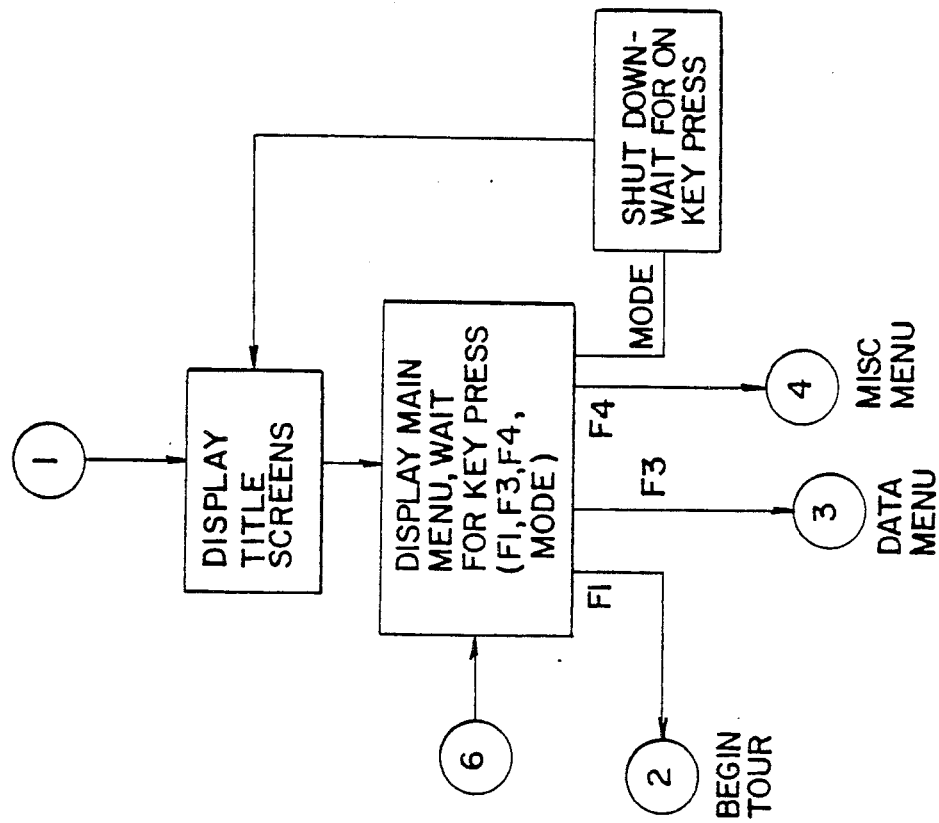
FIG. 5 is a flow chart of the Main Menu Routine executed by the tour monitor 30.
Figure 7:
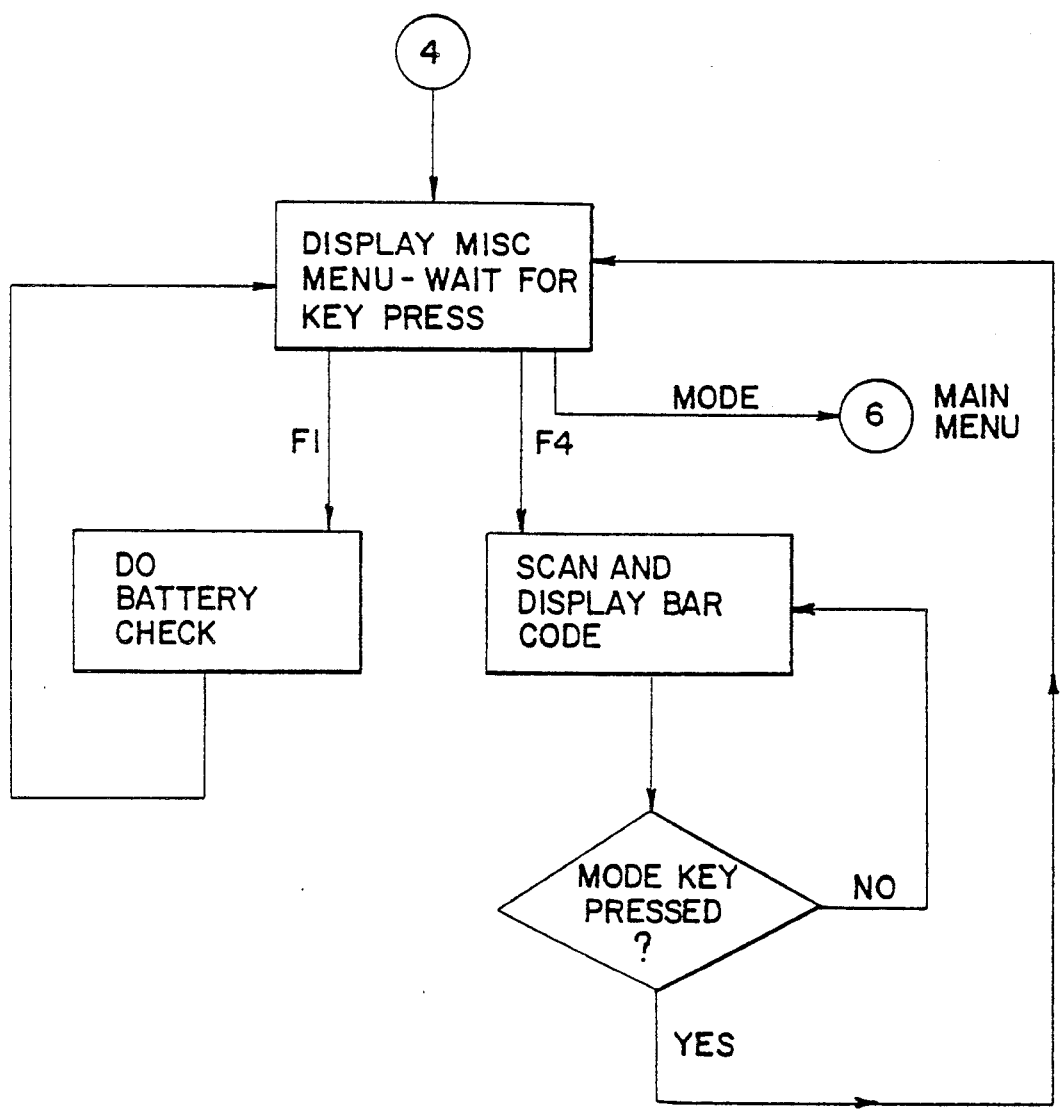
FIG. 7 is a flow chart of the Miscellaneous Menu Routine executed by the tour monitor 30.

When the F4 key is pressed in the main menu of FIG. 5, the monitor 30 executes the Miscellaneous Menu routine of FIG. 7. In the Miscellaneous Menu routine, a miscellaneous menu is displayed and the routine then waits for appropriate keys. In response to the F1 key, a battery check routine is executed. In response to the F4 key the monitor 30 will display bar codes scanned by the user to check operation of the bar code reader. The mode key can be used to return to the main menu of FIG. 5.

Figure 8:
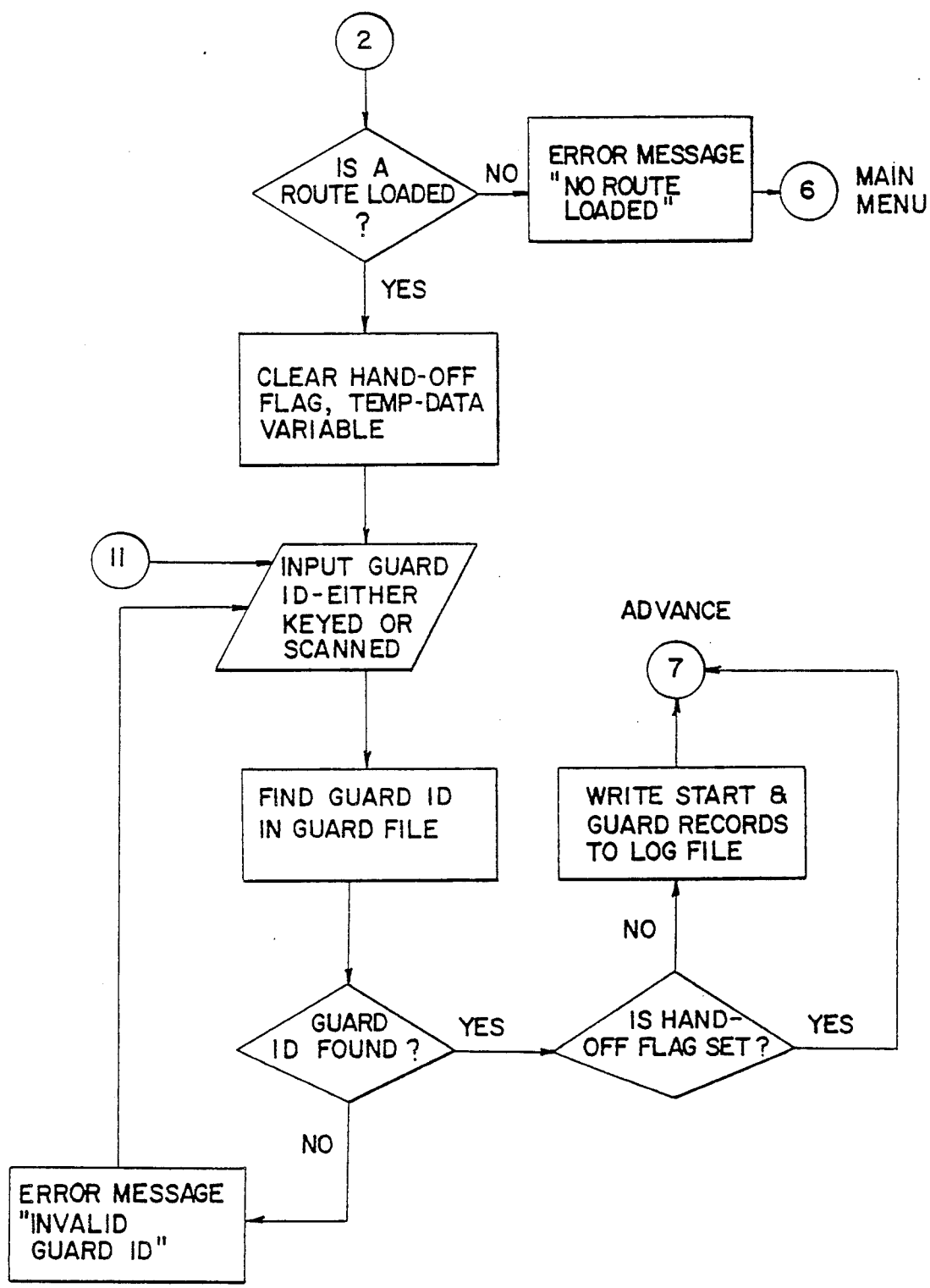
FIG. 8 is a flow chart of the Begin Tour Routine executed by the tour monitor 30.

When it is desired to start a tour, the F1 key is pressed from the main menu of FIG. 5. This causes control to branch to a Begin Tour routine as shown in FIG. 8. In this routine, the monitor 30 checks to confirm that a route as defined by a tour defining record has been loaded. Once this has been confirmed HAND-OFF and TEMP-DATA are reset. The routine then waits for a guard ID to be input, either via the keys of the keyboard 32 or a scan from an appropriate bar code. Once a guard ID has been input the monitor 30 reviews the list of acceptable guard ID's included in the tour defining record. If the guard ID that was input cannot be found in this list, an error message is displayed and the routine waits for another guard ID to be input. Otherwise, the routine checks HAND-OFF. HAND-OFF is a variable which is set when one guard hands-off to another guard within a tour. If HAND-OFF is set, no further action is taken in the routine of FIG. 5. Otherwise, the initial records of the tour log are written into the memory of the monitor 30.

The tour log includes six different types of entries as shown in the following table:

TABLE 1

| Record Type | Log Data | Time Stamp |
|---|---|---|
| Start | Route Number | Date, Time |
| Guard | Guard ID Number | Date, Time |
| Enter Zone | Zone Number | Date, Time |
| Leave Zone | Zone Number | Date, Time |
| Read | Bar Code | Date, Time |
| Finish | Route Number | Date, Time |

At the beginning of each tour, a Start record and a Guard record are entered into the log.

Figure 9:
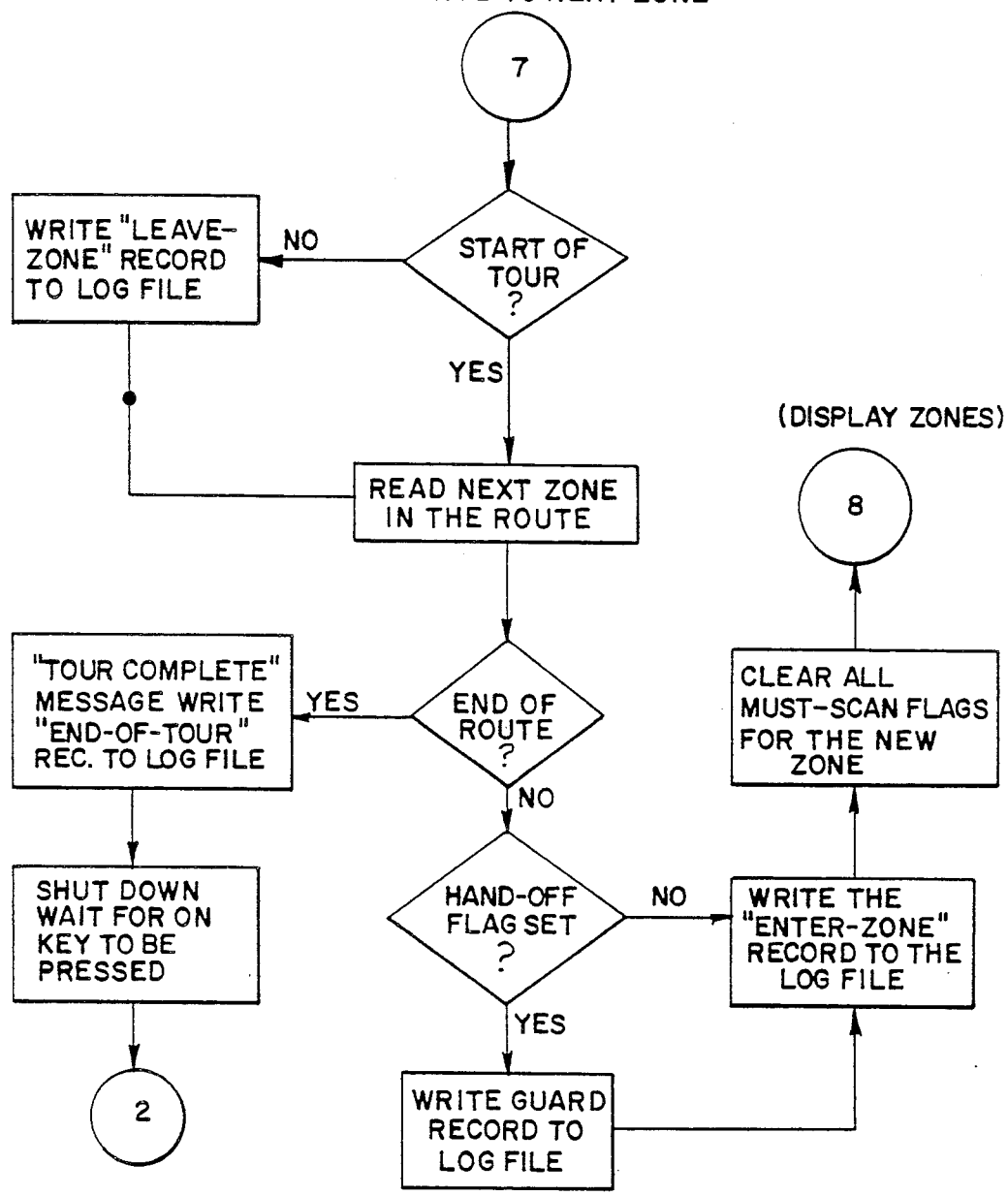
FIG. 9 is a flow chart of the Advance to Next Zone Routine executed by the tour monitor 30.

Once this has been accomplished, control is transferred to the Advance to Next Zone routine of FIG. 9. This routine first checks to determine whether this is the first zone of the tour. If not, a Leave Zone record is entered into the log. In any case, the routine then reads the next zone in the route and checks to determine whether the tour has been completed. If so, a tour complete message is displayed on the display 34 and a Finish record is entered into the log. The routine then shuts down the monitor 30 and awaits for a next key to be pressed.

Assuming that this is not the end of the tour, the routine then checks to see if HAND-OFF is set. If so, a Guard record is entered in the log and in any case an Enter Zone record is entered into the log and flags are cleared for all of the higher priority checkpoints in the new zone. These higher priority checkpoints are referred to as "must scan" checkpoints in the figures. Control is then transferred to the Display Zones routine of FIG. 10.

Figure 10:
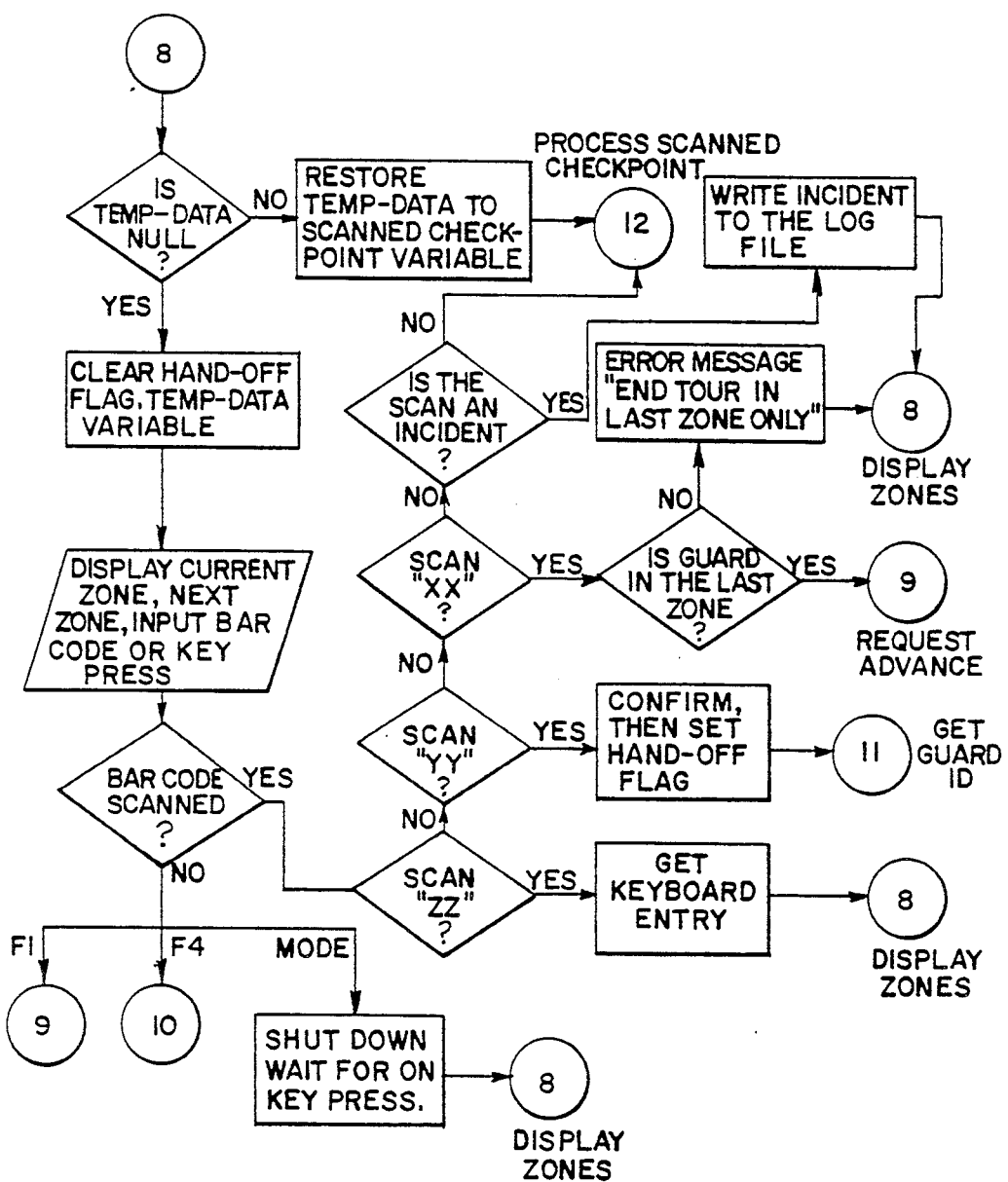
FIG. 10 is a flow chart of the Display Zones Routine executed by the tour monitor 30.

The Display Zones routine of FIG. 10 first checks TEMP-DATA. TEMP-DATA is a temporary storage location that is used to store a scanned bar code when the scanned bar code is outside of the current zone. Thus, TEMP-DATA will be equal to zero in the event the scanned bar code is inside the current zone. If TEMP-DATA is not equal to zero, TEMP-DATA is set equal to the scanned checkpoint variable and control is transferred to the Process Scanned Checkpoint routine of FIG. 13. Otherwise, HAND-OFF and TEMP-DATA are cleared and both the current zone and the next zone of the tour are displayed on the display 34. For example, when the guard enters Zone FL1A of FIG. 3, the display 34 is caused to display the messages "1ST FLOOR-W/1ST FLOOR-E". The routine then waits for the input of a bar code from the bar code reader 36 or a key input from the keyboard 32. If either the F1 or F4 key is pressed, control branches to the routines of FIGS. 11 and 12, respectively. If the mode key is pressed, the monitor 30 is shut down to wait for additional key inputs.

Assuming that a bar code has been scanned, the routine then checks for specific scanned codes. If the scanned code is equal to "ZZ", the routine stores an alphanumeric keyboard entry from the keyboard 32 and returns to the start of the Display Zones routine of FIG. 10. If the scanned code is equal to "YY", the routine confirms that the user is requesting a handoff, and then sets HAND-OFF and branches to node 11 of FIG. 8. If the scanned bar code is equal to "XX", the routine branches to the Request Advance routine of FIG. 11 if the guard is in the last zone, otherwise an error message is displayed and control is returned to the start of the Display Zones routine of FIG. 10.

Finally, if the scanned code is an incident code, the scanned code is simply written into the log as a Read entry before control is returned to the start of the Display Zones routine. Assuming that the scanned code is equal to none of the tested values, control branches to the Process Scanned Checkpoint routine of FIG. 13.

Figure 11:
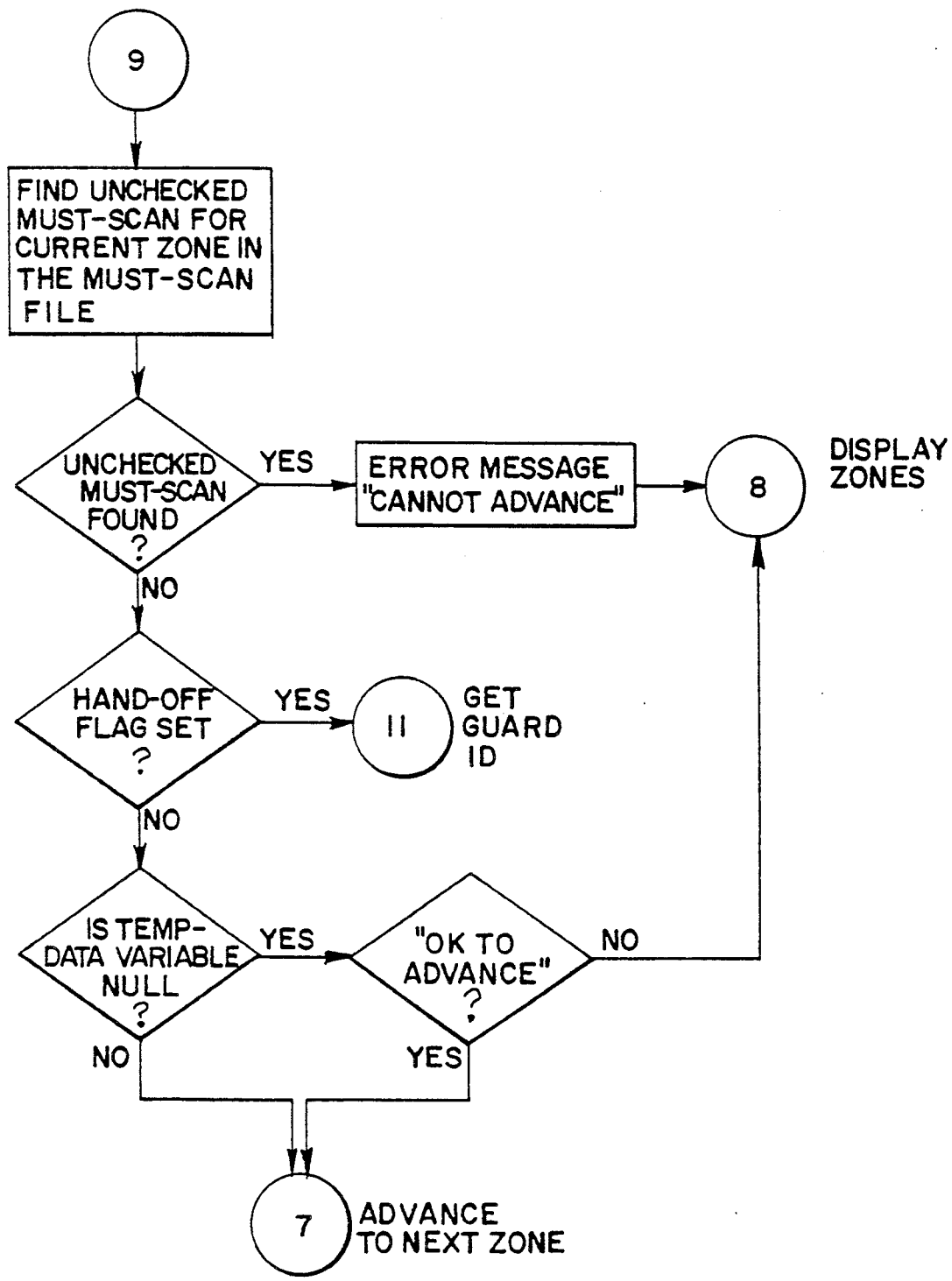
FIG. 11 is a flow chart of the Request Advance Routine executed by the tour monitor 30.

FIG. 11 shows the Request Advance routine that can be reached from the Display Zones routine of FIG. 10. This routine first checks to determine whether all of the higher priority or must scan checkpoints in the current zone have been scanned. If some of the must scan checkpoints have not be scanned, then an error message "MISSED MUST-SCAN/CANNOT ADVANCE/- HIT F4 TO REVIEW/MISSED MUST-SCAN" is presented on the display 34 and control is returned to the Display Zones routine of FIG. 10. Otherwise HAND-OFF is checked. If it is set, control is transferred to node 11 of FIG. 8 to get the new guard ID. Otherwise, TEMP-DATA is checked. If it is not equal to zero (indicating that the scanned code is outside of the current zone), control is transferred to the Advance to Next Zone routine of FIG. 9. Similarly, if TEMP-DATA is equal to zero and the o.k. to advance test is met, control is transferred to the Advance to Next Zone of FIG. 9. Otherwise, control is returned to the Display Zones routine of FIG. 10.

Figure 12:
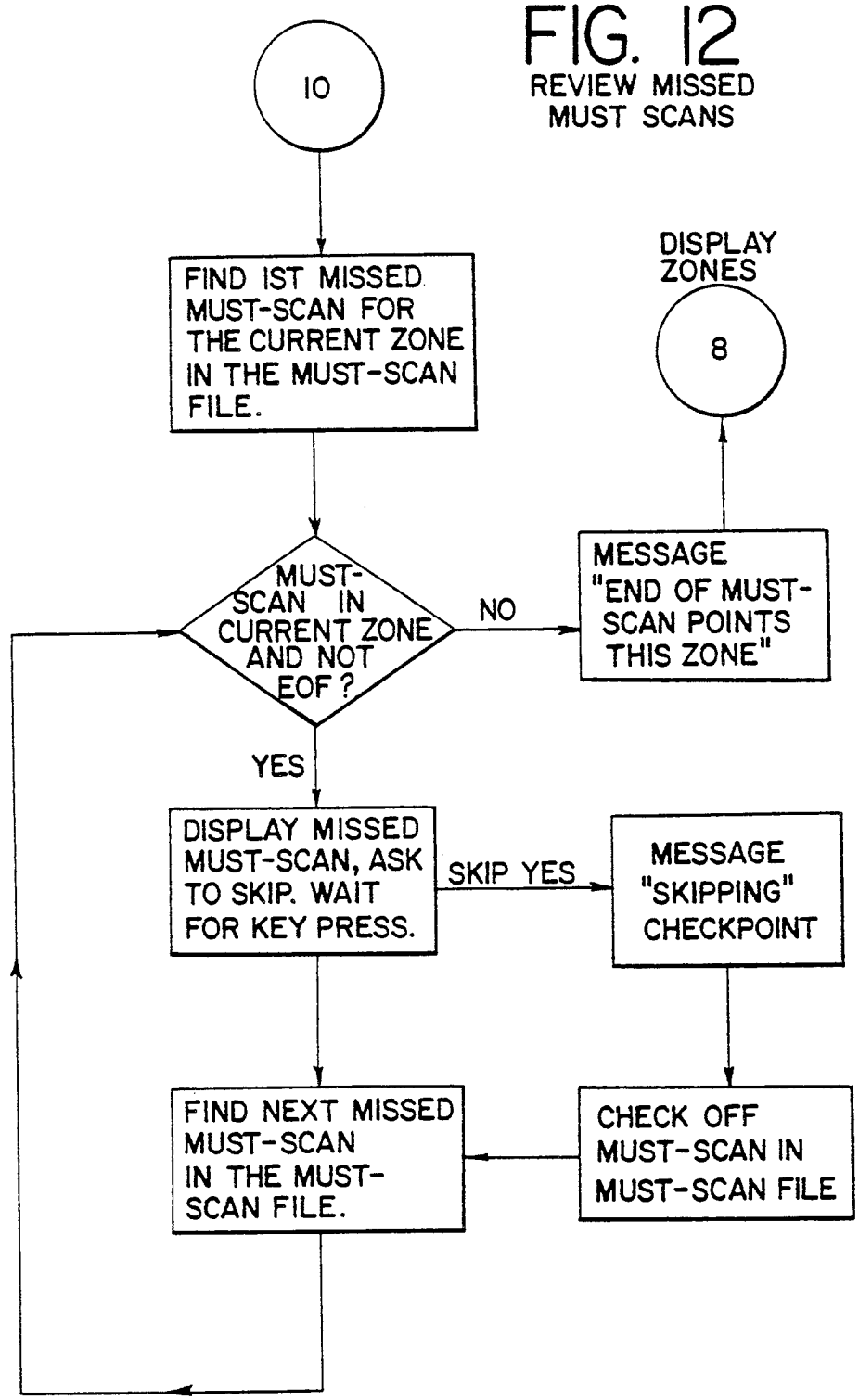
FIG. 12 is a flow chart of the Review Missed Must Scans Routine executed by the tour monitor 30.

FIG. 12 shows the Review Missed Must-Scans routine that is entered by use of the F4 key in the Display Zones routine of FIG. 10. The first step is to search for any higher priority or must scan checkpoints which were missed in the current zone. If there are no such checkpoints, a message is displayed ("END OF MUST-SCAN/POINTS THIS ZONE") and control is returned to the Display Zones routine of FIG. 10. Otherwise, the name of the missed must-scan checkpoint is displayed and the user is asked whether he wishes to skip this must scan checkpoint. If the received keyboard entry indicates the user wishes to skip the must scan checkpoint, then an appropriate message is displayed and the fact that the user or guard has provided an override signal to skip the checkpoint is recorded. The routine then finds the next missed must scan checkpoint and repeats the process.

Figure 13:
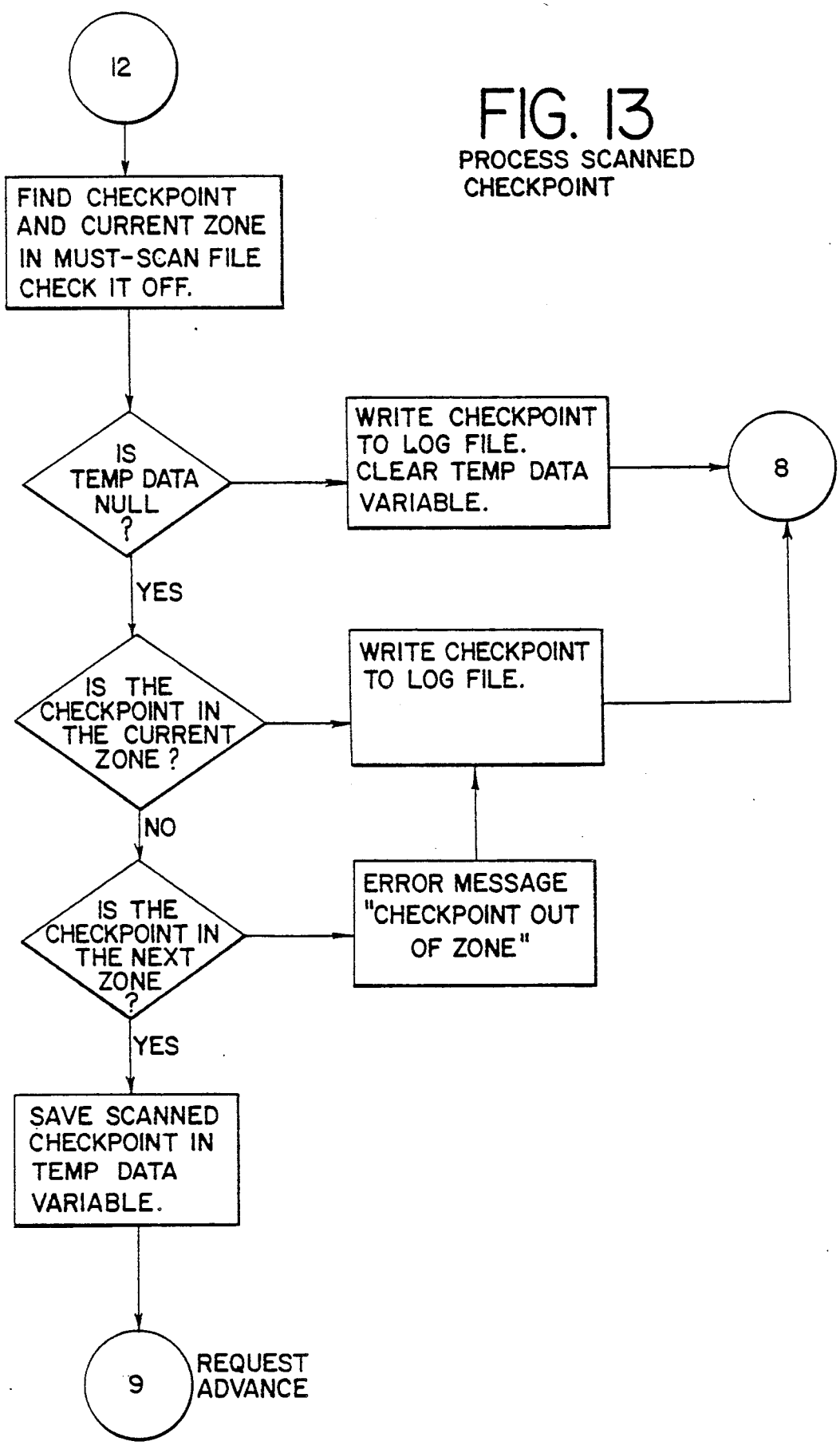
FIG. 13 is a flow chart of the Process Scanned Checkpoint Routine executed by the tour monitor 30.

FIG. 13 shows the Process Scanned Checkpoint routine that is called by the Display Zones routine of FIG. 10. The Process Scanned Checkpoint routine first determines whether the scanned bar code corresponds to one of the higher priority checkpoints in the current zone. If so, this higher priority checkpoint is indicated as having been scanned. Then TEMP-DATA is checked. If TEMP-DATA is not equal to zero the scanned bar code is date stamped and recorded in the log as a Read record, and TEMP-DATA is cleared before control is returned to the Display Zones routine of FIG. 10. If TEMP-DATA is equal to zero, the checkpoint corresponding to the most recently scanned bar code is checked to determine whether that checkpoint is in the current zone. If so, a Read record is recorded in the log. If the most recently scanned checkpoint is outside of the current zone, the routine then determines whether the scanned checkpoint is in the next zone. If not, an error message is displayed on the display 34 and a Read record is entered into the log before control is returned to the Display Zones routine of FIG. 10. If the scanned checkpoint is in the next zone, the scanned checkpoint is stored in TEMP-DATA and control branches to the Request Advance routine of FIG. 11.

Table 2 provides a sample log as created by the tour monitor 30 during a tour of the route illustrated in FIG. 3.

TABLE 2

SAMPLE LOG

| LOG ENTRIES | | | |
|---|---|---|---|
| 1 | S | R002 | 890113150622 |
| 2 | G | CEB | 890113150622 |
| 3 | E | FL1A | 890113150622 |
| 4 | R | F50A | 890113151019 |
| 5 | R | F50B | 890113151042 |
| 6 | R | F50C | 890113151105 |
| 7 | L | FL1A | 890113151210 |
| 8 | E | FL1B | 890113151210 |
| 9 | R | F51A | 890113151220 |
| 10 | R | ZZ | 890113151235 |
| 11 | R | F51D | 890113151350 |
| 12 | L | FL1B | 890113151410 |
| 13 | F | R002 | 890113151410 |
| | MESSAGES | | |
| 14 | WINDOW OPEN | | |

In Table 2, the route is designated R002. The checkpoint codes for checkpoints 50a–50c and 51a–51d are F50A–F50C and F51A–F51D, respectively. The date stamp is a twelve digit number in the form year-month-day-hour-minute-second. Note in the log of Table 2 that the guard has failed to scan the 51b and 51c checkpoints. Of these the 51c checkpoint is a higher priority, must scan checkpoint. Also at line 10 of the log the guard has scanned the bar code ZZ from a pocket reference card and then has entered the alphanumeric message "WINDOW OPEN", which is shown schematically at line 14.

A number of important operational features of the tour monitor 30 have been illustrated by the flowcharts of FIGS. 4–13. In particular, it should be noted that the monitor 30 displays on the display 34 both the name of the current zone and the name of the next zone in the tour. These zone identifying messages assist a new guard in conducting the tour in the order intended, and they also assist an experienced guard in learning a new tour.

Second, the monitor 30 is pre-programmed by the tour defining record for a tour made up of an ordered sequence of zones, wherein each zone includes a set of checkpoints that are not ordered within the set. This allows the guard to check the checkpoints within each zone in any order he desires while enforcing an overall sequence of zones in the tour.

Third, the checkpoints within each zone are designated as either higher priority (must scan) checkpoints or lower priority checkpoints. The monitor 30 does not take any action if lower priority checkpoints are not scanned during the tour. However, in the event any higher priority checkpoints are not scanned, the monitor 30 does not advance to the next zone until the guard has been reminded that the higher priority checkpoints were not scanned and the guard has indicated an intention to override this warning by skipping rather than scanning the missed checkpoints. This allows flexibility during the tour, because the guard can scan only a varying number of the lower priority checkpoints in each tour. Nevertheless, the guard is reminded that each of the higher priority checkpoints is to be scanned each tour. For example, potential fire sources such as coffee pots can be designated as higher priority checkpoints so that in each tour each coffee pot in a building is checked to ensure that it is unpowered and therefore not a fire hazard.

Another important advantage is that the monitor 30 allows the guard to record any desired alphanumeric message (within the allowed length) at any point within the tour. This is done by scanning a bar code that designates an alphanumeric message is to follow, and then entering the alphanumeric message via the keyboard 32. The keyboard 32 generates key signals which are then stored by the monitor in association with the bar codes of the log for later transmission to the computer 12. This feature provides an important degree of flexibility in the log which allows the guard to record unexpected events.

Figure 14:
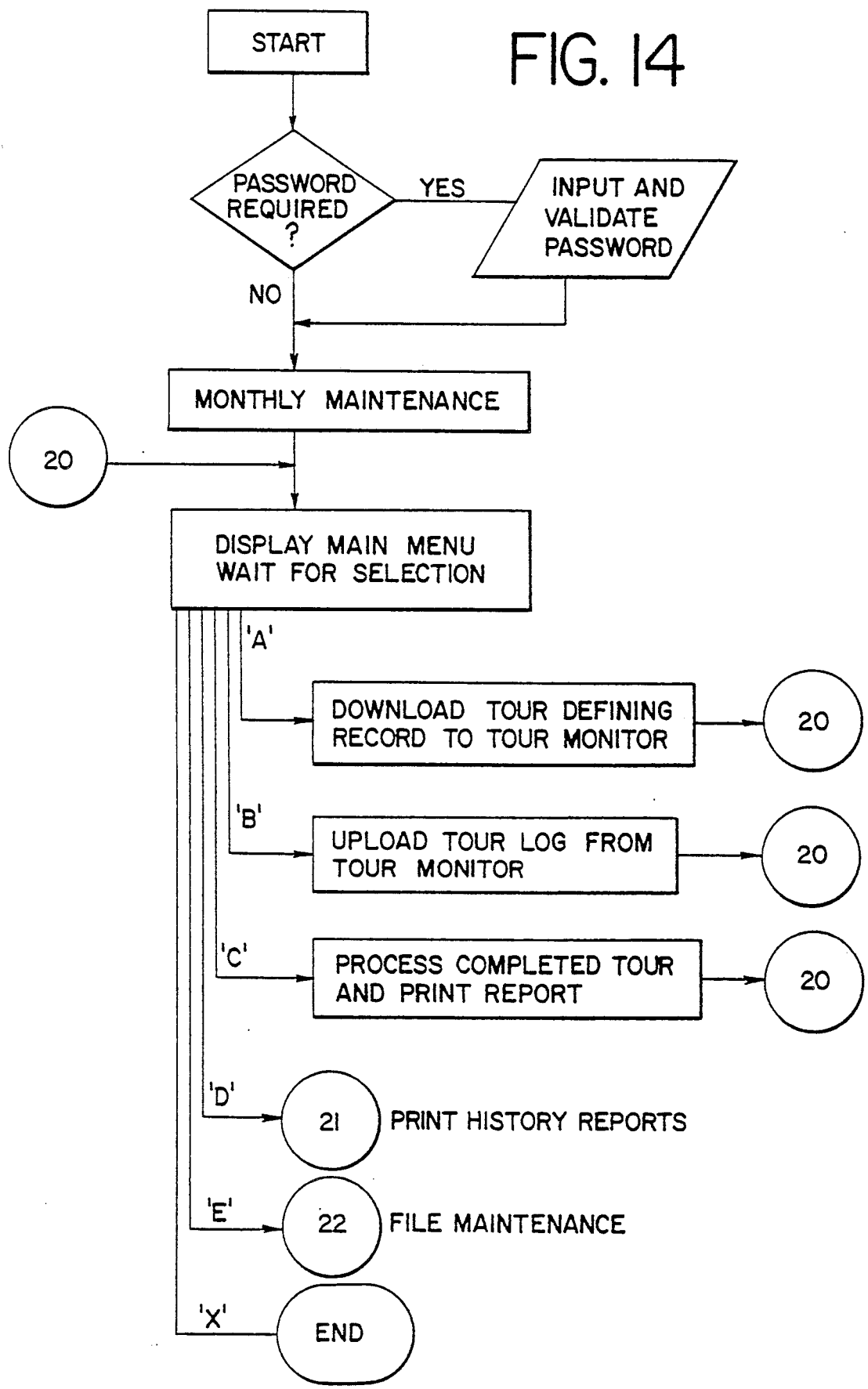
FIG. 14 is a flow chart of the program executed by the computer 12 of FIG. 1.

Turning now to FIGS. 14-16, the tour programming software 20 and the report generating software 22 of the computer 12 will now be described.

FIG. 14 shows an overall flowchart of the software of the computer 12. The software requires a password of the user and then after monthly maintenance displays a main menu and waits for a selection. As shown in FIG. 14 there are four basic sets of routines available to the user.

The first is a down-load routine that down-loads a tour defining record to the tour monitor 30. The tour defining record is of the type described above prior to the discussion of the program of FIG. 4, and it includes a route record which is created with the program of FIG. 16 described below.

The user can also select from the main menu an up-load routine that up-loads a completed tour log (as for example that shown in Table 2) from the tour monitor 30.

The letter "C" can be used to select processing routines that process a completed tour log and print a tour report. Table 3 is an example of a report that may, for example, be printed in response to the tour log of Table 2. This report provides a summary of the information included in the log, in a format that is readily understood by supervisory personnel.

TABLE 3

DETAIL ROUTE REPORT

| Guard Name: | John Doe | Check In: | 1-13-89 15:06 |
| --- | --- | --- | --- |
| Route Name: | Route No. 2 | Check Out: | 1-13-89 15:14 |
| | | Total Time: | 0 Hr. 8 Min. |
| Zones Checked: | 2 of 2 | Total In Zone Points: | 7 |
| In Zones: | 0 Hr. 8 Min. | In Zone Points Checked: | 5 |
| Between Zones: | 0 Hr. 0 Min. | Percent Checked: | 71% |
| | | Must Scans Missed: | 1 |

| Zone No. | Check Point | Bar Code | Check Time | Between Time | Incident |
| --- | --- | --- | --- | --- | --- |
| | Check In | | 15:06 | | |
| | Enter Zone FL1A - 1st Floor-W | | 15:06 | 00:00 | |
| FL1A | Suite 100-Kitchen | F50A | 15:10 | 00:04 | |
| FL1A | Coffee Pot | F50B | 15:11 | 00:01 | |
| FL1A | Window | F50C | 15:11 | 00:00 | |
| | Leave Zone | | | | |
| | Enter Zone FL1B - 1st Floor-E | | 15:12 | 00:01 | |
| FL1B | Hall Window | F51A | 15:12 | 00:00 | WINDOW OPEN |
| ! | Suite 102 | F51C | | | |
| FL1B | Hall Door | F51D | 15:14 | 00:02 | |
| | Leave Zone | | 15:14 | 00:00 | |

TABLE 3-continued

DETAIL ROUTE REPORT

| Check Out | 15:14 | 00:00 |
| --- | --- | --- |

\* = Out of Zone
! = Missed Must Scan

Note in particular that for each checkpoint that was scanned during the tour the report includes a description of the checkpoint along with the checkpoint's zone number, bar code and the time the checkpoint was scanned. As shown in Table 3, the report is divided into sections corresponding to the separate zones of the tour. This allows supervisory personnel to focus on particular zones easily.

Another important feature of the report of Table 3 is that it includes the alphanumeric messages that were keyed by the guard after the bar code "ZZ" was scanned. Note, for example, the "WINDOW OPEN" message in the incident column.

A third important feature of the report of Table 3 is that higher priority checkpoints that were not scanned by the guard are highlighted, while missed lower priority checkpoints are not indicated. Note the exclamation point at the line associated with Suite 102, bar code F51C. The exclamation point indicates that the guard missed this higher priority checkpoint. Also, the header of the report summarizes the total number of higher priority or must-scan checkpoints which were missed.

By pressing the letter "D" in the main menu, the user can select the print history reports routine shown in FIG. 15. This routine first displays a history report menu and then waits for the user to select one of five possible history reports. For example, the system can be commanded to prepare and print reports summarizing the history of a particular guard, a particular zone or zones, a particular checkpoint or checkpoints, and incidents reported by guards. Finally, detailed history reports are also available.

By typing the letter "E" in the main menu of FIG. 14, the user can select the file maintenance routines shown in FIG. 16. The file maintenance routines allow the user to create, delete and edit entries in a guard ID file, a set of zone files, and a set of route files.

The guard ID file maintains a list of authorized guard codes. Once the guard ID file has been created and updated as necessary in the routine of FIG. 16, this file is included in the tour defining record (Item 7).

In the zone maintenance portion of the routine of FIG. 16 a user can create or delete a zone and add, delete or edit checkpoints within the zone. Within each zone, a bar code, description and must-scan flag are entered by the user to define each checkpoint of the zone. The bar code identifies the bar code associated with the checkpoint; the description is used by the tour monitor 30 in the event of a missed higher priority checkpoint and by the report generating software; the must scan flag designates the checkpoint as either a higher priority or a lower priority checkpoint. None, some, or all of the checkpoints within any zone can be designated as higher priority checkpoints. Each zone can be thought of as a set of checkpoints, and if desired a zone can have no checkpoints (the empty set). Such a zone is in effect merely a message displayed to the guard at a selected point in the tour.

The route maintenance portion of the routine of FIG. 16 allows the user to create and delete a route and to add and delete zones within a route.

Finally, the print data listing portion of the routine of FIG. 16 allows the user to print out a list of guards, zones and routes.

The file maintenance routine of FIG. 16 is used by a user first to create a number of zones. In the example of Route No. 2 shown in FIG. 3, the user creates two zones, FL1A and FL1B. For each checkpoint in each zone, the user enters the checkpoint bar code, description, and must-scan flag for that checkpoint.

The user then uses the route maintenance portion of the routine of FIG. 16 to actually create the route. In this case, the user merely indicates that Route 2 is to include zones FL1A and FL1B.

Individual zones may appear in more than one route or more than once in a route, and individual checkpoints may appear in more than one zone. This allows a high degree of flexibility in programming the tour monitor 30. For example, a user can change the order in which zones are inspected, or move individual zones from one route to another, simply and easily, without re-entering individual checkpoints. This flexibility is directly attributable to the fact that each route is a set of zones, and that each zone is a set of checkpoints. This arrangement has been found to simplify the programming of the tour monitor 30 when routes are being modified.

Simply by way of example in order better to define the presently preferred embodiment of this invention, Appendices 1-1 and 2-1 list the programs executed by the computer 12 and the tour monitor 30, respectively. Appendix 3-1 provides instructions for using these listings, and Appendices 1-2, 1-3 and 1-4 are also referenced in Appendix 3-1. In each case the listing is to be regarded as the primary disclosure of the presently preferred embodiment. In the event of any inconsistency between the listing and the flowcharts the listing is to govern. In the event of any inconsistency between the flowcharts and the written description, the flowcharts are to govern.

Of course, it should be understood that a wide range of changes and modifications can be made to the preferred embodiments described above. For example, this invention is not limited to use in security tours, but can readily be adapted for other types of tours such as the tours to inspect or perform janitorial activities such as housekeeping activities. Furthermore, this invention is not limited to the specific hardware used in the foregoing examples. For example, magnetic code readers, character recognition devices and the like can be substituted for the bar code reader described above. Furthermore, it is not essential in all embodiments that a cable 42 be used to interconnect the monitor 30 with the computer 12. A wide variety of communication approaches can be used, including modems, radios, and optical communication systems. In the event remote transmission capabilities are provided to the monitor 30, it is not essential that the log be stored in memory until the tour is completed prior to transmission of portions of the log back to the computer 12. Of course, a wide variety of reports can be generated utilizing the information transmitted from the monitor 30 to the computer 12.

It is therefore intended that the foregoing detailed description be regarded as illustrative rather than limiting, and that it be understood that it is the following claims, including all equivalents, which were intended to define the scope of this invention.

APPENDICES 1-1 Source Code listings for Computer 12.
1-2 Instructions for creating TMMENU.EXE.
1-3 Instructions for creating TMMAINT.EXE.
1-4 File Structures for Computer 12.
2-1 Source Code listing for Tour Monitor 30.
3-1 Software Installation Instructions.

Appendix 1-1

Source Code Listings for Computer 12

```
* MAINTL1.PRG
* COPYRIGHT 1989, 1990 COMPUTER SYSTEMS DESIGN, INC.

PROCEDURE DISASTER
SET COLOR TO &HILIT
CLEAR SCREEN
HEADER('RECOVER FROM PROCESSING ERROR',-1)
MESS(10,'It an error occurred the last time PROCESS COMPLETED TOURS was run.')
MESS(11,'this routine will re-build the history data files.  All data will')
MESS(12,'appear as if the last batch of completed tours was never processed.')
MESS(16,'ESC to Quit')
SET CURSOR ON
IF CONFIRM(15,'N') .AND. LASTKEY()#27
   CLR(10)
   CLOSE DATABASES
   FUSE('CONFIG/CP')
   XZHIST=ZHIST
   XGHIST=GHIST
   XCHIST=CHIST
   USE
```

```
SET COLOR TO &BLUELIT
@ 6,10 CLEAR TO 12,70
SET COLOR TO &BLUELIT
@ 6,10 TO 12,70 DOUBLE
SET COLOR TO &HILIT
@ 7,17 SAY 'Zone History File Being Restored.     Working.'
FUSE('XZHISTORY/ZH')
GO XZHIST
SKIP
DELETE WHILE !EOF()
USE
SET COLOR TO &HILIT
@ 7,17 SAY 'Zone History File Restored.          Done.'
SET COLOR TO &HILIT
@ 8,17 SAY 'Guard History File Being Restored.   Working.'
FUSE('XGHISTORY/ZH')
GO XGHIST
SKIP
DELETE WHILE !EOF()
USE
SET COLOR TO &HILIT
@ 9, 17 SAY 'Guard History File Restored.         Done.'
SET COLOR TO &HILIT
@ 11,17 SAY 'Checkpoint History File Being Restored. Working.'
FUSE('XCHISTORY/ZH')
GO XCHIST
SKIP
DELETE WHILE !EOF()
USE
SET COLOR TO &HILIT
@ 11,17 SAY 'Checkpoint History File Restored.    Done.'
SET COLOR TO &HILIT
MESG(14,'All History files have been restored.')
MESG(15,'Reindexing will begin next.')
XJUNK=INKEY(5)
FUSE('DATAFILE/DF')
SET FILTER TO DRECOVER
GO TOP
XOLD=''
CLR(6)
SET COLOR TO &HILIT
MESG(18,'Reindexing restored files. This may take awhile.')
XYLP=7
XINDXNUM=0
XLASTFIL = NFILE
@ 6,10 CLEAR TO 12,70
SET COLOR TO &BLUELIT
@ 6,10 TO 12,70 DOUBLE
SET COLOR TO &HILIT
DO WHILE !EOF()
  NNFILE='X'+TRIM(NFILE)
  XINDXNUM=XINDXNUM+1
  IF XLASTFIL<>NFILE
    SET COLOR TO &BLUELIT
    @ XYLP,17 SAY 'Reindexing File: '+XLASTFIL+' Done.
    SET COLOR TO &HILIT
```

```
      XLASTFIL=NFILE
      XINDXNUM=1
      XXLP=XXLP+1
      IF XXLP>11
         XXLP=7
         CLR(6)
         SET COLOR TO &HILIT
         @ 7,11 CLEAR TO 11,69
      ENDIF
   ELSE
      SELECT DA
      SET COLOR TO &HILIT
      @ XXLP,17 SAY 'Reindexing File: '+NFILE+' On Index # '+TRANSFORM(XINDXNUM,'999')
   ENDIF
   IIFILE=TRIM(IFILE)
   SELECT 2
   USE('&NNFILE/AA/&IIFILE')
   IF NNFILE<>XOLD
      SELECT DA
      SET COLOR TO &HILIT
      @ XXLP,17 SAY 'Reindexing File: '+NFILE+' On Index # '+TRANSFORM(XINDXNUM,'999')
      SELECT AA
      PACK
      XOLD=NNFILE
   ELSE
      SELECT DA
      SET COLOR TO &HILIT
      @ XXLP,17 SAY 'Reindexing File: '+NFILE+' On Index # '+TRANSFORM(XINDXNUM,'999')
      SELECT AA
      REINDEX
   ENDIF
   USE
   SELECT DA
   SKIP
ENDDO
SET COLOR TO &BLUELIT
@ XXLP,17 SAY 'Reindexing File: '+XLASTFIL+' Done.
SET COLOR TO &HILIT
CLOSE DATABASES
MESG(18,'Reindexing of files is complete. Recovery is complete.')
XJUNK=INKEY(5)
ENDIF
SET COLOR TO &HILIT
RETURN
PROCEDURE RNDXPROG
IXFILNAME = 'DATAFILE'
HEADER('REINDEX FILES',-1)
MESG(10,'This selection reindexes ALL data files.')
SET CURSOR ON
IF ! CONFIRM(12,'N') .OR. LASTKEY()=27
   CLOSE DATABASES
   SET DELETE ON
   SET DELIMITERS ON
   SET CURSOR ON
   RETURN
ENDIF
CLR(5)
```

```
SET DELETE ON
FUSE('X'+IXFILNAME+'/DA')
COUNT FOR ! EMPTY(SFILE) TO TRECCOUNT
IF (TRECCOUNT = 0)
  ERRMESS(10,'Error, no index list found.')
  CLOSE DATABASES
  SET DELETE ON
  SET DELIMITERS ON
  SET CURSOR ON
  RETURN
ENDIF
SORT ON NFILE TO TEMP FOR ! EMPTY(SFILE)
SET DELETE OFF
FUSE('XTEMP/DA')
GO TOP
SELECT DA
GO TOP
N = 0
SET COLOR TO &HILIT
@ 6,5 CLEAR TO 17,75
SET COLOR TO &BLUELIT
@ 6,5 TO 17,75 DOUBLE
SET COLOR TO &HILIT
YOLDFILE = SPACE(1)
DO WHILE ! EOF()
  N=N+1
  IF N > 10
    N=1
    SET COLOR TO &HILIT
    @ 7,6 CLEAR TO 16,74
  ENDIF
  SET COLOR TO &HILIT
  @ N+6,7 SAY NFILE+' '+IFILE+' '+RTRIM(SFILE)
  @ N+6,64 SAY 'Reindexing'
  NF='X'+TRIM(NFILE)
  SF=TRIM(SFILE)
  IFL=TRIM(IFILE)
  SELECT 2
  FUSE('&NF/NF')
  IF YOLDFILE <> DA->NFILE
    YOLDFILE = DA->NFILE
    SELECT DA
    @ N+6,7 SAY NFILE+' '+IFILE+' '+RTRIM(SFILE)
    @ N+6,64 SAY 'Packing...'
    SELECT NF PACK
    SELECT DA
    @ N+6,7 SAY NFILE+' '+IFILE+' '+RTRIM(SFILE)
    @ N+6,64 SAY 'Reindexing'
    SELECT NF
  ENDIF
  INDEX ON &SF TO &IFL
  USE
  SELECT DA
  SET COLOR TO &BLUELIT
```

```
    @ N+6,7 SAY NFILE+' '+IFILE+' '+RTRIM(SFILE)
    @ N+6.64 SAY 'Done.
    SET COLOR TO &HILIT
    SKIP
ENDDO
SET DELETE ON
SET COLOR TO &HILIT
CLOSE DATABASES
MESS(19,'Reindexing of files is complete.')
XJUNK=INKEY(5)
SET DELIMITERS ON
SET CURSOR ON
DELETE FILE('TEMP.DBF')
RETURN
FUNCTION UPKDATE
PARAMETERS F0
XYY=SUBSTR(STR(ASC(F0)-150,3),2)
XMM=SUBSTR(STR(ASC(SUBSTR(F0,2))+68,3),2)
XDD=SUBSTR(STR(ASC(SUBSTR(F0,3))+68,3),2)
RETURN XMM+'/'+XDD+'/'+XYY
FUNCTION PKTIME
PARAMETERS F0
XHH=CHR(VAL(F0)+32)
XMM=CHR(VAL(SUBSTR(F0,4))+32)
RETURN XHH+XMM
FUNCTION UPKTIME
PARAMETERS F0
XHH=SUBSTR(STR(ASC(F0)+68,3),2)
XMM=SUBSTR(STR(ASC(SUBSTR(F0,2))+68,3),2)
IF XHH='25'
   RETURN '  :  '
ENDIF
RETURN XHH+':'+XMM
FUNCTION UPKTITLE
PARAMETERS F0
XT=''
FOR N=25 TO 1 STEP -1
   XT=XT+CHR(122-ASC(SUBSTR(F0,N)))
NEXT
RETURN XT
FUNCTION OKDATE
PARAMETER ADATE,P2ARM
IF LASTKEY()=27 .OR. LASTKEY()=5
   RETURN .T.
ENDIF
IF EMPTY(ADATE)
   ERRMESS(P2ARM,'Date must not be empty.')
   MESS(P2ARM,'ESC to exit.')
   RETURN .F.
ENDIF
RETURN .T.
FUNCTION PKDATE
PARAMETERS F0
XDD=CHR(DAY(F0)+32)
XMM=CHR(MONTH(F0)+32)
XYY=YEAR(F0)%100
```

```
XYY=CHR(XYY+IIF(XYY>=82,-50,50))
RETURN XYY+XMM+XDD

* DETREP3.PRG
* COPYRIGHT 1989, 1988 COMPUTER SYSTEMS DESIGN, INC.

FUNCTION SCANMISS
PARAMETER RTINE,RRORRC
SELECT &RRORRC
LZNREC  = RECNO()
ALLPNTIZONE = 0
SELECT BC
SET ORDER TO 2
SEEK XCURZ
DO WHILE (ZNUM = XCURZ) .AND. ! EOF()
  ALLPNTIZONE = ALLPNTIZONE + 1
  IF MUSTCHECK = 'Y'
    SELECT &RRORRC
    GO ZNREC
    DO WHILE (RECNO() <> LZNREC) .AND. ! EOF()
      IF LEN(TRIM(LOGDATA)) = 2 .AND. TYPE='R'
        IF TRIM(LOGDATA) = 'ZZ'
          SKIP
        ENDIF
      ELSE
        IF LOGDATA = BC->BARCODE
          EXIT
        ENDIF
      ENDIF
      SKIP
    ENDDO
    IF (LOGDATA <> BC->BARCODE) .OR. EOF()
      DO CASE
      CASE RTINE = 1
        TMISSCHK = TMISSCHK + 1
      CASE RTINE = 2
        L = L+1
        @ L,0 SAY '!'
        @ L,10 SAY BC->DESC
        @ L,28 SAY BC->BARCODE
      CASE RTINE = 3
        MISSCHK = MISSCHK + 1
      CASE RTINE = 4
        IF (L = 0) .OR. (L > LMAX)
          IF L <> 0
            EJECT
          ENDIF
          DO MSCANHEAD
        ENDIF
        @ L,0  SAY XRNUM
        @ L,8  SAY XGNAME
        @ L,33 SAY BC->BARCODE
        @ L,40 SAY BC->DESC
        @ L,57 SAY XCURZ
        @ L,65 SAY XZNAME
        L = L + 1
      ENDCASE
```

```
      ENDIF
    ENDIF
    SELECT BC
    SKIP
  ENDDO
  SELECT BC
  SET ORDER TO 1
  SELECT &RRORRC
  GO LZNREC
RETURN ALLPNTIZONE
PROCEDURE CALCTOTIZPNT
PARAMETER XROUTE
  SELECT RTD
  SEEK XROUTE
  DO WHILE RNUM = XROUTE .AND. ! EOF()
    SELECT ZN
    SEEK RTD->ZNUM
    IF ! EOF()
      IPNTIZONE = IPNTIZONE + POINTS
    ENDIF
    SELECT RTD
    ZTOTAL = ZTOTAL + 1
    SKIP
  ENDDO
RETURN
PROCEDURE NORMHEAD
@ 1, 0 SAY DATE()
@ 1,40-.5*(LEN(TRIM(HEAD))) SAY HEAD
@ 1,71 SAY 'Page: '+STR(XPG,3)
@ 2, 0 SAY TIME()
IF ISROAM
  IF ISFORDET
    @ 2,31 SAY 'DETAIL ROAM REPORT'
  ELSE
    @ 2,31 SAY 'SUMMARY ROAM REPORT'
  ENDIF
ELSE
  IF ISFORDET
    @ 2,31 SAY 'DETAIL ROUTE REPORT'
  ELSE
    @ 2,31 SAY 'SUMMARY ROUTE REPORT'
  ENDIF
ENDIF
@ 2,69 SAY 'Report: '+STR(XPNTPG,3)
@ 3,25 SAY 'The Tourwatch Manager (C) 1989'
@ 4, 0 SAY 'Guard Name : '+ XGNAME
@ 4,39 SAY 'Route Name : '+XROUTE
IF ISFORDET
  @ 6,0 SAY 'Zone                       Bar       Check     Between'
  @ 7,0 SAY 'Number  Checkpoint         Code      Time      Time     Incident'
ELSE
  @ 6,0 SAY 'Zone                    Enter Leave Total In-Zone In-Zone Percent Must-scans'
  @ 7,0 SAY 'Number  Zone Name       Time  Time  Time  Points  Pts Chkd Checked   Missed'
ENDIF
@ 8,0 SAY REPLICATE('-',80)
L = 9
RETURN
```

```
PROCEDURE MISSCAN
L    = 0
XRNUM = SPACE(6)
SET DEVICE TO PRINT
SELECT RC
GO TOP
DO WHILE !EOF()
   DO WHILE TYPE <> 'B' .AND. !EOF()
      SKIP
   ENDDO
   IF EOF()
      EXIT
   ELSE
      SKIP -1
      IF !EOF() .AND. TYPE = 'S'
         XRNUM = LOGDATA
      ENDIF
      SKIP
      SELECT GN
      SEEK UPPER(RC->LOGDATA)
      IF EOF()
         XGNAME = 'Undefined guard'
      ELSE
         XGNAME = GNAME
      ENDIF
   ENDIF
   SELECT RC
   SKIP
   DO WHILE TYPE <> 'B' .AND. !EOF()
      DO WHILE !(TYPE $ 'EB') .AND. !EOF()
         SKIP
      ENDDO
      IF TYPE = 'E' .AND. !EOF()
         XNREC = RECNO()
         XCURZ = LOGDATA
         SELECT ZN
         SEEK XCURZ
         IF EOF()
            XZNAME = 'Undefined zone'
         ELSE
            XZNAME = ZDESC
         ENDIF
         SELECT RC
         SKIP
         DO WHILE (TYPE = 'R') .AND. !EOF()
            SKIP
         ENDDO
         SCANMISS(4,'RC')
      ENDIF
   ENDDO
ENDDO
IF L = 0
   SET DEVICE TO PRINT
   DO MSCANHEAD
   @ L+2,0 SAY 'No must-scan checkpoints were missed.'
ENDIF
EJECT
```

```
SET DEVICE TO SCREEN
RETURN
PROCEDURE MSCANHEAD
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,29 SAY 'MISSED MUST-SCANS REPORT'
@ 3,25 SAY 'The TourWatch Manager (C) 1988'
@ 5, 0 SAY 'Route   Guard                    Bar                      Zone    Zone'
@ 6, 0 SAY 'Number  Name                     Code    Checkpoint       Number  Name'
@ 7, 0 SAY REPLICATE('-',80)
L = 3
RETURN
PROCEDURE INCIDSUM
L=0
FOR J=1 TO 2
  SET DEVICE TO SCREEN
  IF J=1
    XALIAS1 = 'RC'
    SELECT 1
    FUSE('RECORD/RC/RCNUMX')
  ELSE
    XALIAS1 = 'RR'
    SELECT 1
    FUSE('ROAMREC/RR/ROAM1X')
    SET ORDER TO
  ENDIF
  LOCATE FOR LEN(TRIM(LOGDATA))=2 .AND. TYPE = 'R'
  IF !EOF()
    SET DEVICE TO PRINT
    LMAX = 52
    IF L=0 .OR. L>LMAX
      DO INCIDHEAD
    ENDIF
    DUPLICATES = .F.
    SAMEZONES = 0
    INCIDQTY = 0
    DO WHILE .NOT. EOF()
      DO WHILE LEN(TRIM(LOGDATA))<>2 .AND. !EOF()
        SKIP
      ENDDO
      IF EOF()
        EXIT
      ENDIF
      IF TYPE<>'R'
        SKIP
        LOOP
      ENDIF
      XRECNO=RECNO()
      SKIP -1
      IF J=2 .AND. LEN(TRIM(LOGDATA))<>2 .AND. !DUPLICATES
        OLDRECNO = RECNO()
        OLDRCNUM = RCNUM
        SELECT BC
```

```
      SEEK &XALIAS1->LOGDATA
      SAMEZONES = 0
      INCIDQTY = 0
      DO WHILE BARCODE=&XALIAS1->LOGDATA .AND. !EOF()
        SAMEZONES = SAMEZONES+1
        SKIP
      ENDDO
      SELECT &XALIAS1
      IF SAMEZONES>=2
        DUPLICATES = .T.
        SKIP
        DO WHILE RCNUM=OLDRCNUM.AND.TYPE='R'.AND.LEN(TRIM(LOGDATA))=2.AND.!EOF()
          IF TRIM(LOGDATA)='ZZ'
            INCIDQTY=INCIDQTY+1
            SKIP
          ENDIF
          INCIDQTY=INCIDQTY+1
          SKIP
        ENDDO
      ELSE
        DUPLICATES=.F.
      ENDIF
      GO OLDRECNO
    ENDIF
    XXBARCODE=&XALIAS1->LOGDATA
    SELECT BC
    SEEK XXBARCODE
    IF EOF()
      XCHKPOINT='Undefined'
    ELSE
      XCHKPOINT=SUBSTR(DESC,1,15)
    ENDIF
    SELECT &XALIAS1
    DO WHILE TYPE<>'G' .AND. !BOF()
      SKIP -1
    ENDDO
    SELECT GN
    SEEK UPPER(&XALIAS1->LOGDATA)
    IF EOF()
      XGNAME='Undefined'
    ELSE
      XGNAME=SUBSTR(GNAME,1,24)
    ENDIF
    SELECT &XALIAS1
    GO XRECNO
    DO WHILE LEN(TRIM(LOGDATA))=2 .AND. TYPE='R' .AND. !EOF()
      IF L > LMAX
        IF ! CHNGPAGE('INCIDHEAD')
          CLEAR
          CLOSE DATABASES
          RETURN
        ENDIF
      ENDIF
      @ L, 0 SAY XXBARCODE
      @ L, 7 SAY XCHKPOINT
      @ L,24 SAY DATE
      @ L,33 SAY TIME
```

```
        @ L,40 SAY XGNAME
         IF LOGDATA='ZZ'
           SKIP
           SELECT OH
           SEEK &XALIAS1->LOGDATA
         ELSE
           SELECT SD
           SEEK TRIM(&XALIAS1->LOGDATA)
         ENDIF
         IF !EOF()
           IF ALIAS()<>'OH'
             @ L,65 SAY SUBSTR(EDESC,1,15)
           ELSE
             @ L,65 SAY SUBSTR(COMMENT,1,15)
           ENDIF
         ELSE
           @ L,65 SAY 'Undefined'
         ENDIF
         SELECT &XALIAS1
         SKIP
         L = L+1
       ENDDO
       IF DUPLICATES .AND. LEN(TRIM(LOGDATA))<>2 .AND. !EOF()
         SKIP INCIDQTY*(SAMEZONES-1) + (SAMEZONES-1)
         DUPLICATES=.F.
       ENDIF
     ENDDO
     EJECT
   ENDIF
 NEXT
 IF L = 0
   SET DEVICE TO PRINT
   DO INCIDHEAD
   @ L+2,0 SAY 'There were no incidents to print.'
   EJECT
 ENDIF
 SET DEVICE TO SCREEN
 RETURN
 PROCEDURE INCIDHEAD
 XPG = XPG + 1
 @ 1, 0 SAY DATE()
 @ 1,40-INT(LEN(HEAD)/2) SAY HEAD
 @ 1,71 SAY 'Page: '+STR(XPG,3)
 @ 2, 0 SAY TIME()
 @ 2,29 SAY 'INCIDENT SUMMARY REPORT'
 @ 3,25 SAY 'The Tourwatch Manager (C) 1988'
 @ 5, 0 SAY 'Bar                              Check  Check'
 @ 6, 0 SAY 'Code   Checkpoint          Date   Time  Guard Name                Incident'
 @ 7, 0 SAY REPLICATE('-',90)
 L = 8
 RETURN
```

```
* TMMENU.PRG
* COPYRIGHT 1989, 1992 COMPUTER SYSTEMS DESIGN, INC.

SET CONFIRM ON
SET EXCLUSIVE OFF
SET BELL OFF
SET INTENSITY OFF
SET TALK OFF
SET DELETE ON
SET SAFETY OFF
SET DELIMITERS TO '[]'
SET WRAP ON
SET EXACT ON
SET SOFTSEEK OFF
CLOSE DATABASES
9LINE=REPLICATE(CHR(196),9))
8LINE=REPLICATE(CHR(205),80)
LINE=SUBSTR(8LINE,1,50)
FRAME=CHR(213)+CHR(205)+CHR(184)+CHR(179)+CHR(217)+CHR(196)+CHR(192)+CHR(179)
LBLOCK=REPLICATE(CHR(205),5)+' '
RBLOCK=' '+REPLICATE(CHR(205),5)
XLEFT=CDOW(DATE())
UPLEFT='TourWatch Manager'
L=0
DATE=CMONTH(DATE())+' '+STR(DAY(DATE()),2)+', '+STR(YEAR(DATE()),4)
XPIC='99,999,999.99'
HLPVAR = 0
IF ISCOLOR()
   INVRS    = '+GR+/B'
   LOLIT    = '+BG/B,+W/BG,,,+GR+/B'
   HILIT    = '+GR+/B,+W/BG,,,+GR+/B'
   SCORELIT = '+BG/N,+W/BG,,,+GR+/B'
   PASSWD   = '+GR+/B,B/B,,,B/B'
   PASSWND  = '+BG/B'
   REDLIT   = '+R/B'
   BLUELIT  = '+BG/B'
   HMENU    = '+GR+/B,+W/BG,,,+GR+/B'
   BLNKWIND = '+W/N'
   F2WIND   = 'W/N,'
   F2INVRS  = '+GR+/N'
   HEADLIT  = 'BG/B,+W/BG,,,+BG/B'
ELSE
   INVRS    = 'N/W'
   HILIT    = '+W/N'
   LOLIT    = 'N/N'
   SCORELIT = 'U'
   PASSWND  = '+W/N'
   PASSWD   = '+W/N,X,,,X'
   HMENU    = '+W/N'
   F2WIND   = '+W/N'
   F2INVRS  = 'N/W'
   REDLIT   = '+W/N'
   BLUELIT  = 'W/N'
   BLNKWIND = '+W/N'
   HEADLIT  = 'W/N'
ENDIF
```

```
SET COLOR TO &HILIT
SET CURSOR ON
XWINDREC = 0
STA='1'
SETCANCEL(.F.)
SET KEY 3 TO NULL_FUNC
SET KEY 15 TO NULL_FUNC
SET MESSAGE TO 14
FUSE('CONFIG/CO')
HEAD=TRIM(UPKTITLE(CBUFFER))
KEYBOARD ''
XTMPASS=SPACE(6)
IF TMCHK1<>SPACE(6)
   SET EXACT ON
   CLR(0)
   SET COLOR TO &PASSWND
   @ 9,21 TO 11,59
   SET COLOR TO &PASSWD
   SET CONSOLE OFF
   SET DELIM ON
   SET INTEN ON
   @ 10,23 SAY 'Tourwatch Manager Password' GET XTMPASS PICTURE '@!'
   READ
   SET COLOR TO
   SET COLOR TO &HILIT
   SET CONSOLE ON
   IF LASTKEY()=27
      CLOSE DATABASES
      SET COLOR TO +W/N
      CLEAR SCREEN
      QUIT
   ELSE
      IF (XTMPASS<>TMCHK1)
         MESG(12,'Access to the Tourwatch Manager is denied.')
         INKEY(5)
         SET COLOR TO +W/N
         CLEAR SCREEN
         CLOSE DATABASES
         QUIT
      ENDIF
   ENDIF
ENDIF
CLEAR
SHEAD=HEAD
HEADPOS=CENTERP(TRIM(UPKTITLE(CBUFFER)))
IF THISMONTH<>SUBSTR(DTOC(DATE()),1,2) .AND. !FIRSTTIME
   USE
   MESG(10,'Performing monthly file maintenance.  Please wait....')
   SET CURSOR OFF
   FUSE('CONFIG/CO')
   LOCKF('CONFIG')
   REPLACE THISMONTH WITH SUBSTR(DTOC(DATE()),1,2)
   UNLOCK
   USE
   FUSE('DATAFILE/DA')
   SET FILTER TO MOPACK
```

```
GO TOP
XOLD=''
DO WHILE ! EOF()
  NNFILE='X'+TRIM(NFILE)
  IIFILE=TRIM(IFILE)
  MESS(12,TRIM(NFILE))
  SELECT 2
  FUSE('&NNFILE/AA/&IIFILE')
  IF XOLD<>NNFILE
    PACK
    XOLD=NNFILE
  ELSE
    REINDEX
  ENDIF
  USE
  SELECT DA
    SKIP
  ENDDO
  CLOSE DATABASES
  SET CURSOR ON
ENDIF
FUSE('CONFIG/CC')
IF FIRSTTIME
  LOCKF('CONFIG')
  REPLACE FIRSTTIME WITH .F.
  REPLACE THISMONTH WITH SUBSTR(DTOC(DATE()),1,2)
  UNLOCK
ENDIF
CLEAR
USE
DO WHILE .T.
  CLOSE DATABASES
  SET INTEN ON
  SET CURSOR ON
  SET DELIM ON
  SET COLOR TO &HILIT
  MS1='A  LOAD NEW ROUTE INTO MICRO-WAND'
  MS2='B  GET COMPLETED TOURS FROM MICRO-WAND'
  MS3='C  PROCESS COMPLETED TOURS'
  MS4='D  PRINT HISTORY REPORTS'
  MS5='E  MAINTAIN FILES'
  MS6='X  EXIT FROM TourWatch Manager'
  MS1='Transfer New Route to Micro-Wand'
  MS2='Transfer Completed Tour Information from Micro-Wand to Computer'
  MS3='Print Route Reports for Completed Tours and Update History Files'
  MS4='Print History Reports'
  MS5='Maintain Guard, Zone and Route Information'
  MS6='Quit'
  RES1=HEADER('M A I N   M E N U',6)
  CLEAR SCREEN
  BEGIN SEQUENCE
  DO CASE
  CASE RES1=1
    DO DOWNLOAD
  CASE RES1=2
    DO UPLOAD
```

```
    CASE RES1=3
      DO DETREP
    CASE RES1=4
      DO REPORTS
    CASE RES1=5
      DO MAINT
    CASE RES1=6
      SET CURSOR ON
      CLOSE DATABASES
      SET COLOR TO +W/N
      XX=0
      FOR YY=12 TO 0 STEP -1
        @ YY,0 CLEAR TO YY+XX,80
        FOR LITTLEWT=1 TO 17
        NEXT LITTLEWT
        XX=XX+2
      NEXT YY
      QUIT
    ENDCASE
    END
  ENDDO
RETURN

* DOWNLOAD.PRG
* COPYRIGHT 1999, 1986 COMPUTER SYSTEMS DESIGN, INC.

CLEAR
CLOSE DATABASES
SET DELIMITERS ON
HEADER('LOAD ROUTE INTO MICRO-WAND',-1)
FUSE('RSUM/RTS/RNUM2X')
SELECT 2
FUSE('RDET/RTD/RNUM1X')
DUMD=' '
DUMT=' '
DO WHILE .T.
  CLR(10)
  XRNUM = SPACE(6)
  MESS(24,'F2 to display ROUTES.  ESC to exit.')
  @ 10,25 SAY 'Enter ROUTE number: ' GET XRNUM PICTURE '!!!!!!'
  SET KEY -1 TO GENWIND
  READ
  SET KEY -1 TO
  IF LASTKEY() = 27
    CLOSE DATABASES
    RETURN
  ENDIF
  IF EMPTY(XRNUM)
    LOOP
  ENDIF
  IF XRNUM = 'ROAM  '
    EXIT
  ENDIF
  SELECT RTS
  SEEK XRNUM
  IF EOF()
```

```
            ERRMESG(24,'This ROUTE number does not exist.')
        ELSE
            SELECT RTD
            SEEK XRNUM
            IF EOF()
                ERRMESG(24,'There is no data for this ROUTE.')
            ELSE
                EXIT
            ENDIF
        ENDIF
    ENDDO
    CLR(10)
    MESG(10,'Please wait while preparing files...')
    IF XRNUM<>'ROAM   '
        SELECT RTD
        XREC=RECNO()
        COPY TO TEMPRTD WHILE RNUM=XRNUM
        GO XREC
        SELECT 3
        FUSE('XTEMPRTD/TRTD')
        SET UNIQUE ON
        INDEX ON ZNUM TO TEMPRTDX
        SET UNIQUE OFF
    ENDIF
    USE
    FUSE('GUARD/GD/GRDX')
    IF XRNUM<>'ROAM   '
        SELECT 4
        FUSE('ZONE/ZN/ZNUM1X')
        SELECT 5
        FUSE('BARCODE/BARCODE/ZNUM3X')
        COPY TO TEMPBARC FOR MUSTCHECK = 'Y'
        SELECT 6
        FUSE('XTEMPBARC/BC')
        INDEX ON ZNUM TO TBX
        SELECT RTD
        SET RELATION TO ZNUM INTO ZN
        GO TOP
    ENDIF
    SELECT 7
    FUSE('CONFIG/CG')
    XCOMPORT=COMPORT
    XPORT=VAL(XCOMPORT)
    CLOSECOMM(XPORT)
    RXSIZE=2048
    TXSIZE=2048
    X=OPENCOMM(XPORT,RXSIZE,TXSIZE)
    IF X < 0
        MESG(10,'COM PORT '+XCOMPORT+' ERROR')
        MESG(11,'ERROR NUMBER '+STR(X))
        MESG(12,'PRESS ANY KEY TO CONTINUE')
        DO WHILE INKEY() = 0
        ENDDO
        CLOSE DATABASES
        CLOSECOMM(XPORT)
        RETURN
```

```
ENDIF
DO WHILE .T.
  CLR(10)
  DD = DTOS(DATE())
  @ 10,30 SAY 'The date is: ' + SUBSTR(DD,5,2)+'/'+SUBSTR(DD,7,2)+'/'+SUBSTR(DD,3,2)
  @ 11,30 SAY 'The time is: ' + TIME()
  MESG(19,'ESC to exit.')
  MESG(15,'Enter N to Change Date and Time of Micro-Wand')
  CONFIRMED = CONFIRM(15)
  IF LASTKEY()=27
    EXIT
  ENDIF
  IF CONFIRMED
    DUMD=DTOS(DATE())
    DUMT=TIME()
    EXIT
  ENDIF
ENDIF
DO WHILE .T.
  CLR(13)
  NEWDATE = CTOD('  /  /  ')
  NEWTIME = SPACE(5)
  SET DELIM ON
  @ 13,28 SAY 'Enter new date' GET NEWDATE VALID OKDATE(NEWDATE,19)
  @ 14,29 SAY 'Enter new time' GET NEWTIME PICTURE '99:99' VALID OKTIME(NEWTIME)
  MESG(16,"Changing the Date/Time will reset the Micro-Wand's Date/Time")
  MESG(17,"but will leave the PC's Date/Time unchanged.")
  MESG(19,'ESC to exit.')
  READ
  IF LASTKEY() = 27
    EXIT
  ENDIF
  CLR(15)
  MESG(19,'ESC to exit.')
  CONFIRMED = CONFIRM(16)
  IF LASTKEY()=27
    EXIT
  ENDIF
  IF CONFIRMED
    EXIT
  ENDIF
ENDDO
IF LASTKEY()=27
  EXIT
ENDIF
IF CONFIRMED
  DUMD=DTOS(NEWDATE)
  DUMT=NEWTIME+':00'
  EXIT
ENDIF
ENDDO
IF LASTKEY()=27
  CLOSE DATABASES
  CLOSECOMM((PORT)
  DELETE FILE('TEMPRTD.DBF')
  DELETE FILE('TEMPRTDX.NTX')
  DELETE FILE('TEMPBARC.DBF')
  DELETE FILE('TBX.NTX')
```

```
  RETURN
ENDIF
SET CURSOR OFF
PNUM=31
CLR(10)
@ 10,9 SAY 'To transfer route '+TRIM(XRNUM)+' to the Micro-Wand:'
@ 12,9 SAY '   1. Bring up the main supervisor menu on the Micro-Wand.'
@ 13,9 SAY '   2. Select DATA MENU on the wand (F3 key)'
@ 14,9 SAY '   3. Select LOAD ROUTE on the wand (F1 key)'
@ 15,9 SAY '   4. Press the red ENT key on the wand to begin transmission'
IF CONNECT(XPORT)
   CLR(08)
   MESG(08,'Loading Route '+TRIM(XRNUM)+'.')
   MESG(10,'Initializing Date/Time in Micro-Wand')
   OUTSTR='DATE'
   PNUM=INCPNUM(PNUM)
   PTYPE='F'
   OUTSTR=BUILD_PACKET(OUTSTR,PNUM,PTYPE)
   IF ! SEND_PACKET(XPORT,OUTSTR)
      COMERROR()
      RETURN
   ENDIF
   PTYPE='D'
   OUTSTR=SUBSTR(DUMD,3,6)+SUBSTR(DUMT,1,2)+SUBSTR(DUMT,4,2)+SUBSTR(DUMT,7,2)
   PNUM=INCPNUM(PNUM)
   OUTSTR=BUILD_PACKET(OUTSTR,PNUM,PTYPE)
   IF ! SEND_PACKET(XPORT,OUTSTR)
      COMERROR()
      RETURN
   ENDIF
   PNUM=INCPNUM(PNUM)
   OUTSTR=CHR(PNUM)+'E'
   IF ! SEND_PACKET(XPORT,OUTSTR)
      COMERROR()
      RETURN
   ENDIF
   MESG(10,'Initializing Password in Micro-Wand')
   OUTSTR='PASSWORD'
   PNUM=INCPNUM(PNUM)
   PTYPE='F'
   OUTSTR=BUILD_PACKET(OUTSTR,PNUM,PTYPE)
   IF ! SEND_PACKET(XPORT,OUTSTR)
      COMERROR()
      RETURN
   ENDIF
   SELECT 06
   PTYPE='D'
   OUTSTR=MWCHK1
   PNUM=INCPNUM(PNUM)
   OUTSTR=BUILD_PACKET(OUTSTR,PNUM,PTYPE)
   IF ! SEND_PACKET(XPORT,OUTSTR)
      COMERROR()
      RETURN
   ENDIF
   PNUM=INCPNUM(PNUM)
   OUTSTR=CHR(PNUM)+'E'
```

```
IF ! SEND_PACKET(XPORT,OUTSTR)
   COMERROR()
   RETURN
ENDIF
MESG(10,'Sending Guard Data to Micro-wand.')
OUTSTR='GUARD'
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
   COMERROR()
   RETURN
ENDIF
PTYPE='D'
SELECT GD
GO TOP
DO WHILE ! EOF()
   OUTSTR=GNUM
   PNUM=INCPNUM(PNUM)
   OUTSTR=BUILD_PACKET(OUTSTR,PNUM,PTYPE)
   IF ! SEND_PACKET(XPORT,OUTSTR)
      COMERROR()
      RETURN
   ENDIF
   SKIP
ENDDO
PNUM=INCPNUM(PNUM)
OUTSTR=CHR(PNUM)+'E'
IF ! SEND_PACKET(XPORT,OUTSTR)
   COMERROR()
   RETURN
ENDIF
MESG(10,'Sending Route Data to Micro-wand.')
OUTSTR=XRNUM
PNUM=INCPNUM(PNUM)
PTYPE='F'
OUTSTR=BUILD_PACKET(OUTSTR,PNUM,PTYPE)
IF ! SEND_PACKET(XPORT,OUTSTR)
   COMERROR()
   RETURN
ENDIF
PTYPE='D'
IF XRNUM = 'ROAM     '
   OUTSTR='ROAM    '+SPACE(15)
   PNUM=INCPNUM(PNUM)
   OUTSTR=BUILD_PACKET(OUTSTR,PNUM,PTYPE)
   IF ! SEND_PACKET(XPORT,OUTSTR)
      COMERROR()
      RETURN
   ENDIF
ELSE
   SELECT RTD
   SEEK XRNUM
   DO WHILE RNUM = XRNUM .AND. ! EOF()
      OUTSTR=ZNUM+ZN->SDESC
      PNUM=INCPNUM(PNUM)
      OUTSTR=BUILD_PACKET(OUTSTR,PNUM,PTYPE)
```

```
            IF ! SEND_PACKET(XPORT,OUTSTR)
               COMERROR()
               RETURN
            ENDIF
            SKIP
         ENDDO
      ENDIF
   ENDIF
   PNUM=INCPNUM(PNUM)
   OUTSTR=CHR(PNUM)+'E'
   IF ! SEND_PACKET(XPORT,OUTSTR)
      COMERROR()
      RETURN
   ENDIF
   MESS(10,'Sending Must-Scan Data to Micro-wand.')
   OUTSTR='MUSTSCAN'
   PNUM=INCPNUM(PNUM)
   PTYPE='F'
   OUTSTR=BUILD_PACKET(OUTSTR,PNUM,PTYPE)
   IF ! SEND_PACKET(XPORT,OUTSTR)
      COMERROR()
      RETURN
   ENDIF
   IF XRNUM<>'ROAM '
      PTYPE='D'
      SELECT 3
      FUSE('TEMPRTD/TE/TEMPRTDX')
      DO WHILE !EOF()
         SELECT 5C
         SEEK TE->ZNUM
         DO WHILE ZNUM=TE->ZNUM .AND. !EOF()
            OUTSTR= ZNUM+BARCODE+DESC
            PNUM=INCPNUM(PNUM)
            OUTSTR=BUILD_PACKET(OUTSTR,PNUM,PTYPE)
            IF ! SEND_PACKET(XPORT,OUTSTR)
               COMERROR()
               RETURN
            ENDIF
            SKIP
         ENDDO
         SELECT TE
         SKIP
      ENDDO
   ENDIF
   PNUM=INCPNUM(PNUM)
   OUTSTR=CHR(PNUM)+'E'
   IF ! SEND_PACKET(XPORT,OUTSTR)
      COMERROR()
      RETURN
   ENDIF
   MESS(10,'Sending Checkpoint Data to Micro-Wand.')
   OUTSTR='BARC'
   PNUM=INCPNUM(PNUM)
   PTYPE='F'
   OUTSTR=BUILD_PACKET(OUTSTR,PNUM,PTYPE)
   IF ! SEND_PACKET(XPORT,OUTSTR)
      COMERROR()
```

```
        RETURN
      ENDIF
      IF XRNUM<>'ROAM'
        PTYPE='D'
        SELECT RTD
        SEEK XRNUM
        DO WHILE RNUM=XRNUM .AND. !EOF()
           XZNUM = ZNUM
           XLSTREC = RECNO()
           SKIP -1
           DO WHILE RNUM=XRNUM .AND. !BOF()
              IF ZNUM=XZNUM
                 EXIT
              ENDIF
              SKIP -1
           ENDDO
           IF RNUM=XRNUM .AND. !BOF()
              GO XLSTREC
              SKIP
              LOOP
           ENDIF
           GO XLSTREC
           SELECT BARCODE
           SEEK XZNUM
           IF !EOF()
              OUTSTR='*'+XZNUM+'*'
              PNUM=INCPNUM(PNUM)
              OUTSTR=BUILD_PACKET(OUTSTR,PNUM,PTYPE)
              IF !SEND_PACKET(XPORT,OUTSTR)
                 COMERROR()
                 RETURN
              ENDIF
           ENDIF
           DO WHILE ZNUM=XZNUM .AND. !EOF()
              OUTSTR=BARCODE
              PNUM=INCPNUM(PNUM)
              OUTSTR=BUILD_PACKET(OUTSTR,PNUM,PTYPE)
              IF !SEND_PACKET(XPORT,OUTSTR)
                 COMERROR()
                 RETURN
              ENDIF
              SKIP
           ENDDO
           SELECT RTD
           SKIP
        ENDDO
      ENDIF
   PNUM=INCPNUM(PNUM)
   OUTSTR=CHR(PNUM)+'E'
   IF ! SEND_PACKET(XPORT,OUTSTR)
      COMERROR()
      RETURN
   ENDIF
   PNUM=INCPNUM(PNUM)
   OUTSTR=CHR(PNUM)+'X'
   SEND_PACKET(XPORT,OUTSTR)
```

```
        TIMER(3)
        CLR(10)
        ERRMESG(10,'End of transmission...')
    ENDIF
    CLOSE DATABASES
    CLOSECOMM(XPORT)
    DELETE FILE('TEMPRTD.DBF')
    DELETE FILE('TEMPRTDX.NTX')
    DELETE FILE('TEMPBARC.DBF')
    DELETE FILE('TBX.NTX')
    RETURN
FUNCTION COMERROR
    CLR(14)
    MESG(14,'Communications Error')
    MESG(15,'Press any key to continue...')
    ? CHR(7)
    DO WHILE INKEY()=0
    ENDDO
    CLOSE DATABASES
    CLOSECOMM(XPORT)
    DELETE FILE('TEMPRTD.DBF')
    DELETE FILE('TEMPRTDX.NTX')
    DELETE FILE('TEMPBARC.DBF')
    DELETE FILE('TBX.NTX')
    RETURN .T.

* UPLOAD.PRG
* COPYRIGHT 1989, 1988 COMPUTER SYSTEMS DESIGN, INC.

HEADER('GET COMPLETED TOUR FROM MICRO-WAND',-1)
SET CURSOR OFF
CLOSE DATABASES
USE('CONFIG/CN')
GO TOP
XRCNUM=VAL(RCNUM) - 1
XCOMPORT=COMPORT
XPORT=VAL(XCOMPORT)
CLOSE DATABASES
DO WHILE .T.
    CLR(9)
    CLOSECOMM(XPORT)
    RXSIZE=2048
    TXSIZE=2048
    X=OPENCOMM(XPORT,RXSIZE,TXSIZE)
    IF X < 0
        MESG(10,'COM PORT '+XCOMPORT+' ERROR')
        MESG(11,'ERROR NUMBER '+STR(X))
        MESG(12,'PRESS ANY KEY TO CONTINUE')
        DO WHILE INKEY() = 0
        ENDDO
        CLOSE DATABASES
        CLOSECOMM(XPORT)
        IF FILE('TEMPRC.DBF')
            DELETE FILE('TEMPRC.DBF')
        ENDIF
        IF FILE('TEMPRR.DBF')
```

```
      DELETE FILE('TEMPRR.DBF')
   ENDIF
   IF FILE('TEMPOH.DBF')
      DELETE FILE('TEMPOH.DBF')
   ENDIF
   IF FILE('TEMPOH1X.NTX')
      DELETE FILE('TEMPOH1X.NTX')
   ENDIF
   RETURN
ENDIF
MESS(10,'Please wait while setting up files...')
CLOSE DATABASES
SELECT 1
FUSE('CONFIG/CN')
GO TOP
SELECT 2
FUSE('EXCEPT/EC/EXCX')
SELECT 3
FUSE('XRECORD/RC')
COPY TO TEMPRC STRU
USE
FUSE('XTEMPRC/RC')
SELECT 4
FUSE('XROAMREC/RR')
COPY TO TEMPRR STRU
USE
FUSE('XTEMPRR/RR')
SELECT 5
FUSE('XOHISTORY/OH/OHIST1X')
GO BOTT
IF EOF()
   XLASTOH = 0
ELSE
   XLASTOH = VAL(OCODE)+1
ENDIF
COPY TO TEMPOH STRU
USE
FUSE('XTEMPOH/OH')
INDEX ON OCODE TO TEMPOH1X
XALIAS='RC'
CLR(10)
@ 10,9 SAY 'To transfer completed tour information:'
@ 12,9 SAY '   1. Bring up the main supervisor menu on the Micro-Wand'
@ 13,9 SAY '   2. Select DATA MENU on the wand (F3 key)'
@ 14,9 SAY '   3. Select SEND LOG on the wand (F4 key)'
@ 15,9 SAY '   4. Press the red ENT key on the wand to begin transmission'
IF CONNECT(XPORT)
   CLR(10)
   MESS(10,'Transferring data packets. Please wait.')
   LPNUM=31
   INSTR=GETPACKET(XPORT,5)
   PTYPE=''
   EOT=.F.
   RETRY=0
   DO WHILE (INSTR <> 'TIMEOUT') .AND. (RETRY<=5)
      TEMPSTR=INSTR+SPACE(100)
      FNUM=ASC(SUBSTR(TEMPSTR,1,1))
```

```
PTYPE=SUBSTR(TEMPSTR,2,1)
DO CASE
CASE PTYPE='P'
  CHECKSUM=CALCHECK(TEMPSTR)
  PLEN=ASC(SUBSTR(TEMPSTR,3,1))-32
  XPNUM=INCPNUM(LPNUM)
  IF (SUBSTR(TEMPSTR,PLEN+4,1)=CHR(CHECKSUM)).AND.((PNUM=LPNUM).OR.(PNUM=XPNUM))
    ACK(XPORT,PNUM)
    IF PNUM=INCPNUM(LPNUM)
      LPNUM=PNUM
      TEMPSTR = SUBSTR(INSTR,4,PLEN)
    ENDIF
  ELSE
    NAK(XPORT,PNUM)
  ENDIF
CASE PTYPE='D'
  CHECKSUM=CALCHECK(TEMPSTR)
  PLEN=ASC(SUBSTR(TEMPSTR,3,1))-32
  IF (SUBSTR(TEMPSTR,PLEN+4,1)=CHR(CHECKSUM)) .AND. (PNUM=INCPNUM(LPNUM))
    ACK(XPORT,PNUM)
    IF PNUM=INCPNUM(LPNUM)
      LPNUM=PNUM
      TEMPSTR=SUBSTR(INSTR,4,PLEN)
      IF SUBSTR(TEMPSTR,1,1) = 'S'
        XRCNUM = XRCNUM + 1
        IF SUBSTR(TEMPSTR,2,5)='ROAM'
          XALIAS='RR'
        ELSE
          XALIAS='RC'
        ENDIF
      ENDIF
      SELECT &XALIAS
      APPEND BLANK
      REPLACE TYPE WITH SUBSTR(TEMPSTR,1,1)
      REPLACE LOGDATA WITH SUBSTR(TEMPSTR,2,6)
      REPLACE DATE WITH CTOD(SUBSTR(TEMPSTR,10,2)+'/'+SUBSTR(TEMPSTR,12,2)+'/'+SUBSTR(TEMPSTR,8,2))
      REPLACE TIME WITH SUBSTR(TEMPSTR,14,2)+':'+SUBSTR(TEMPSTR,16,2)
      REPLACE RCNUM WITH STR(XRCNUM,4)
      IF (LOGDATA='32    ') .AND. (TYPE='R')
        SELECT OH
        APPEND BLANK
        REPLACE OCODE WITH SUBSTR(STR(1000000+XLASTOH,7),2)
        REPLACE COMMENT WITH SUBSTR(TEMPSTR,20,15)
        SELECT &XALIAS
        APPEND BLANK
        REPLACE TYPE WITH 'R'
        REPLACE LOGDATA WITH SUBSTR(STR(1000000+XLASTOH,7),2)
        REPLACE DATE WITH CTOD(SUBSTR(TEMPSTR,10,2)+'/'+SUBSTR(TEMPSTR,12,2)+'/'+SUBSTR(TEMPSTR,8,2))
        REPLACE TIME WITH SUBSTR(TEMPSTR,14,2)+':'+SUBSTR(TEMPSTR,16,2)
        REPLACE RCNUM WITH STR(XRCNUM,4)
        XLASTOH = XLASTOH + 1
      ENDIF
    ENDIF
  ELSE
    NAK(XPORT,PNUM)
  ENDIF
```

```
    CASE PTYPE='S'
      IF ((PNUM=LPNUM) .OR. (PNUM=INCPNUM(LPNUM))) .AND. (LEN(INSTR)=2)
        ACK(XPORT,PNUM)
        LPNUM=PNUM
      ELSE
        NAK(XPORT,PNUM)
      ENDIF
    CASE PTYPE='X'
      IF ((PNUM=LPNUM) .OR. (PNUM=INCPNUM(LPNUM))) .AND. (LEN(INSTR)=2)
        ACK(XPORT,PNUM)
        LPNUM=PNUM
        EOT=.T.
      ELSE
        NAK(XPORT,PNUM)
      ENDIF
    OTHERWISE
      NAK(XPORT,PNUM)
    ENDCASE
    INSTR=GETPACKET(XPORT,5)
  ENDDO
  IF !EOT
    MESG(12,'Data transfer errors.')
    MESG(14,'Please wait...')
    CLOSECOMM(XPORT)
    ? CHR(7)
    INKEY(7)
    MESG(14,'Press any key to continue...')
    DO WHILE INKEY()=0
    ENDDO
  ELSE
    CLOSECOMM(XPORT)
    SET CURSOR OFF
    MESG(12,'Data transfer complete.')
    MESG(14,'Please wait while checking files...')
    ? CHR(7)
    SELECT RC
    XALIAS='RC'
    GO TOP
    DO DATCHECK
    SELECT RR
    XALIAS='RR'
    GO TOP
    DO DATCHECK
    SELECT 6
    FUSE('XROAMREC/REALRR/ROAM1X')
    SELECT 7
    FUSE('BARCODE/BC/BNUM%')
    SELECT RR
    GO TOP
    XCHECKPOINT=SPACE(6)
    DO WHILE !EOF()
      IF TYPE<>'R'
        DO RRREC WITH 0
        SKIP
        LOOP
      ENDIF
      POINTRECNO=RECNO()
```

```
            XCHEXPOINT=LOGDATA
            SELECT BC
            SEEK XCHEXPOINT
            IF EOF()
               DO RRREC WITH 0
               SKIP
               LOOP
            ENDIF
            DO WHILE BARCODE=XCHEXPOINT .AND. !EOF()
               DO RRREC WITH 1
               SKIP
               DO WHILE TYPE='R' .AND. LEN(TRIM(LOGDATA))=2 .AND. !EOF()
                  DO RRREC WITH 1
                  IF TRIM(LOGDATA)='ZZ'
                     SKIP
                     DO RRREC WITH 1
                  ENDIF
                  SKIP
               ENDDO
               NEXTRECNO=RECNO()
               GO POINTRECNO
               SELECT BC
               SKIP
            ENDDO
            SELECT RR
            GO NEXTRECNO
         ENDDO
         SELECT CN
         LOCKF('CONFIG')
         REPLACE RCNUM WITH STR(XRCNUM+1,4)
         UNLOCK
         SELECT RC
         USE
         FUSE('XRECORD/RC/RCNUMX')
         APPEND FROM TEMPRC
         SELECT OH
         USE
         FUSE('XOHISTORY/OH/OHISTIX')
         APPEND FROM TEMPOH
         SET CURSOR ON
         EXIT
      ENDIF
   ELSE
      EXIT
   ENDIF
ENDDO
CLOSE DATABASES
CLOSECOMM(XPORT)
IF FILE('TEMPRC.DBF')
   DELETE FILE('TEMPRC.DBF')
ENDIF
IF FILE('TEMPRR.DBF')
   DELETE FILE('TEMPRR.DBF')
ENDIF
IF FILE('TEMPOH.DBF')
   DELETE FILE('TEMPOH.DBF')
ENDIF
```

```
IF FILE('TEMPOH1X.NTX')
   DELETE FILE('TEMPOH1X.NTX')
ENDIF
RETURN
PROCEDURE DATCHECK
DO WHILE ! EOF()
   DO WHILE TYPE<>'S' .AND. !EOF()
      IF (TRIM(LOGDATA)=='ZZ') .AND. (TYPE='R')
         DELETE
         SKIP
         IF (TYPE='R') .AND. !EOF()
            SELECT OH
            SEEK &XALIAS->LOGDATA
            IF !EOF()
               DELETE
            ENDIF
            SELECT &XALIAS
         ENDIF
      ENDIF
      IF TYPE<>'S' .AND. !EOF()
         DELETE
         SKIP
      ENDIF
   ENDDO
   IF EOF()
      EXIT
   ENDIF
   XTOUR    = RCNUM
   TEMPRECNO = RECNO()
   SKIP
   IF (TYPE<>'G') .OR. (RCNUM<XTOUR) .OR. EOF()
      GO TEMPRECNO
      DELETE
      SKIP
      LOOP
   ENDIF
   SKIP
   IF (TYPE<>'E') .OR. (RCNUM<XTOUR) .OR. EOF()
      GO TEMPRECNO
      DELETE
      SKIP
      LOOP
   ENDIF
   SKIP
   DO WHILE LEN(TRIM(LOGDATA))=2.AND.TYPE='R'.AND.RCNUM=XTOUR.AND.!EOF()
      IF TRIM(LOGDATA)='ZZ'
         DELETE
         SKIP
         IF TYPE='R'.AND.RCNUM=XTOUR.AND.!EOF()
            SELECT OH
            SEEK &XALIAS->LOGDATA
            IF !EOF()
               DELETE
            ENDIF
            SELECT &XALIAS
            DELETE
```

```
        SKIP
      ENDIF
    ELSE
      DELETE
      SKIP
    ENDIF
ENDDO
BADTOUR=.F.
DO WHILE (RCNUM = XTOUR) .AND. !EOF()
  DO CASE
  CASE TYPE = 'L'
    SKIP -1
    IF TYPE='R'
      XTIME=TIME
      XDATE=DATE
      SKIP
      REPLACE TIME WITH XTIME
      REPLACE DATE WITH XDATE
    ELSE
      SKIP
    ENDIF
    SKIP
    IF (EOF()) .OR. (RCNUM<>XTOUR) .OR. !(TYPE $ 'EFG')
      BADTOUR=.T.
      EXIT
    ENDIF
  CASE TYPE='R'
    SKIP
  CASE TYPE='F'
    SKIP -1
    IF TYPE<>'L'
      BADTOUR=.T.
      EXIT
    ENDIF
    SKIP 2
    IF RCNUM=XTOUR .AND. !EOF()
      BADTOUR=.T.
      EXIT
    ENDIF
  CASE TYPE='G'
    IF XALIAS='RR'
      BADTOUR=.T.
      EXIT
    ENDIF
    SKIP -1
    IF TYPE<>'L'
      BADTOUR=.T.
      EXIT
    ENDIF
    SKIP 2
    IF TYPE<>'E'
      BADTOUR=.T.
      EXIT
    ENDIF
  CASE TYPE='E'
    IF XALIAS='RR'
      BADTOUR=.T.
```

```
            EXIT
         ENDIF
         SKIP -1
         IF TYPE<>'L' .AND. TYPE<>'G'
            BADTOUR=.T.
            EXIT
         ENDIF
         SKIP 2
         DO WHILE LEN(TRIM(LOGDATA))=2.AND.TYPE='R'.AND.RCNUM=XTOUR.AND.!EOF()
            IF TRIM(LOGDATA)='ZZ'
               DELETE
               SKIP
               IF TYPE='R'.AND.RCNUM=XTOUR.AND.!EOF()
                  SELECT OH
                  SEEK &XALIAS->LOGDATA
                  IF !EOF()
                     DELETE
                  ENDIF
                  SELECT &XALIAS
                  DELETE
                  SKIP
               ENDIF
            ELSE
               DELETE
               SKIP
            ENDIF
         ENDDO
      OTHERWISE
         BADTOUR=.T.
         EXIT
      ENDCASE
   ENDDO
   IF BADTOUR
      GO TEMPRECNO
      DELETE
      SKIP
   ENDIF
ENDDO
RETURN
PROCEDURE RRREC
PARAMETER FO
SELECT RE&RR
APPEND BLANK
REPLACE RCNUM WITH RR->RCNUM
REPLACE TYPE WITH RR->TYPE
REPLACE LOGDATA WITH RR->LOGDATA
REPLACE DATE WITH RR->DATE
REPLACE TIME WITH RR->TIME
IF FO=1
   REPLACE ZONE WITH BC->ZNUM
ENDIF
SELECT RR
RETURN
FUNCTION GETPACKET
PARAMETERS PORT,PWT
PACKSTR=GETSTR(PORT,PWT)
```

```
MESS(12,'PACKET '+STR(INCPNUM(LPNUM)-32,3))
RETURN PACKSTR

* DETREP.PRG
* COPYRIGHT 1969, 1988 COMPUTER SYSTEMS DESIGN, INC.

CLOSE DATABASES
HEADER('PROCESS COMPLETED TOURS',-1)
MESS(10,'This function will process the last batch of tour data that were')
MESS(11,'transferred from the Micro-Wands.  A set of reports will be printed,')
MESS(12,'after which the various history files will be updated.')
MESS(14,'These procedures may take a few minutes.')
FUSE('ROAMREC/RN/ROAMIX')
XXX=EOF()
USE
FUSE('RECORD/RC/RCNUMX')
IF EOF() .AND. XXX
   CLOSE DATABASES
   MESSWAIT(19,'No new route data to print.')
   RETURN
ENDIF
SELECT 2
FUSE('CONFIG/C2')
XPDETAIL = PDETAIL
IF !XPDETAIL
   MESS(1600,'WARNING: The Detail and Summary Route Report will NOT be printed!')
   MESS(1700,'Use the System Maintenance Program to change this configuration.')
ENDIF
MESS(22,'ESC to exit.')
IF !CONFIRM(19) .OR. LASTKEY()=27
   CLOSE DATABASES
   RETURN
ENDIF
CLR(9)
MESS( 9,'Please prepare printer for printing.')
MESS(10,'ESC to exit. Press any other key to continue.')
DO WHILE INKEY() = 0
ENDDO
IF LASTKEY() = 27
   CLEAR
   CLOSE DATABASES
   RETURN
ENDIF
CLR(5)
SET COLOR TO &HILIT
@ 6,5 CLEAR TO 20,75
SET COLOR TO &BLUELIT
@ 6,5 TO 20,75 DOUBLE
SET COLOR TO &HILIT
@ 7,7 SAY 'Please wait while setting up files.'
@ 7,63 SAY 'working...'
USE
FUSE('GUARD/GN/GRDX')
SELECT 3
FUSE('ZONE/ZN/ZNUMX')
SELECT 4
```

```
FUSE('BARCODE/BC/BNUMX,ZNUM2X')
SELECT 5
FUSE('CHISTORY/CH/CHIST1X')
SET COLOR TO &HILIT
@ 7,7 SAY 'Please wait while setting up files.'
@ 7,63 SAY 'Files Open'
XPG      = 0
LMAX     = 52
YPRINTIT = .T.
XTOUR    = SPACE(4)
IF XPDETAIL
   SET COLOR TO &HILIT
   @ 8,7 SAY 'Printing Detail Route Report.'
   @ 8,63 SAY 'Working...'
   SET DEVICE TO PRINT
   XPNTPG  = 0
   ISFORDET = .T.
   ISROAM   = .F.
   SELECT RC
   DO MAINLOOP WITH 'REPDETAIL'
   SET DEVICE TO SCREEN
   SET COLOR TO &BLUELIT
   @ 8,7 SAY 'Printing Detail Route Report.'
   @ 8,63 SAY 'Done.'
   SET COLOR TO &HILIT
   @ 9,7 SAY 'Printing Detail Roam Report.'
   @ 9,63 SAY 'Working...'
   SELECT 6
   FUSE('EXCEPT/EC/EXCX')
   SELECT 1
   FUSE('ROAMREC/RR/ROAMIX')
   SET DEVICE TO PRINT
   ISROAM  = .T.
   DO ROAMLOOP WITH 'DETROAM'
   SET DEVICE TO SCREEN
   SET COLOR TO &BLUELIT
   @ 9,7 SAY 'Printing Detail Roam Report.'
   @ 9,63 SAY 'Done.'
   SET COLOR TO &HILIT
   @ 10,7 SAY 'Printing Summary Route Report.'
   @ 10,63 SAY 'Working...'
   SELECT 1
   FUSE('RECORD/RC/RCNUMX')
   SET DEVICE TO PRINT
   XPNTPG  = 0
   ISFORDET = .F.
   ISROAM   = .F.
   DO MAINLOOP WITH 'SUMREP'
   SET DEVICE TO SCREEN
   SET COLOR TO &BLUELIT
   @ 10,7 SAY 'Printing Summary Route Report.'
   @ 10,63 SAY 'Done.'
   SET COLOR TO &HILIT
   @ 11,7 SAY 'Printing Summary Roam Report.'
   @ 11,63 SAY 'Working...'
   SELECT 6
```

```
    FUSE('EXCEPT/EC/EXCX')
    SELECT 1
    FUSE('ROAMREC/RR/ROAMIX')
    SET DEVICE TO PRINT
    ISROAM = .T.
    DO ROAMLOOP WITH 'SUMROAM'
    SET DEVICE TO SCREEN
    SET COLOR TO &BLUELIT
    @ 11,7 SAY 'Printing Summary Roam Report.'
    @ 11,63 SAY 'Done.'
    SET COLOR TO &HILIT
  ENDIF
  @ 12,7 SAY 'Printing Incident Summary Report.'
  @ 12,63 SAY 'Working...'
  SELECT 6
  IF ALIAS() <> 'EC'
    FUSE('EXCEPT/EC/EXCX')
  ENDIF
  DO INCIDSUM
  SET DEVICE TO SCREEN
  SET COLOR TO &BLUELIT
  @ 12,7 SAY 'Printing Incident Summary Report.'
  @ 12,63 SAY 'Done.'
  SET COLOR TO &HILIT
  @ 13,7 SAY 'Printing Missed Must-Scans Summary Report.'
  @ 13,63 SAY 'Working...'
  SELECT 1
  FUSE('RECORD/RC/RCNUMX')
  DO MISSCAN
  SET DEVICE TO SCREEN
  SET COLOR TO &BLUELIT
  @ 13,7 SAY 'Printing Missed Must-Scans Summary Report.'
  @ 13,63 SAY 'Done.'
  @ 7,7 SAY 'Please wait while setting up files.'
  @ 7,63 SAY '- CLOSED -'
  @ 15,27 SAY 'Done With Report Printing.'
  SET COLOR TO &HILIT
  KEYBOARD ''
  INKEY(7)
  SET DELIMITERS ON
  SET COLOR TO &HILIT
  @ 7,6 CLEAR TO 19,74
  @ 8,12 SAY 'Please verify that the reports are printed okay.'
  @ 12,16 SAY 'If you enter "Y", this same data WILL NOT appear'
  @ 13,16 SAY '   the next time you process completed tours.'
  @ 16,16 SAY 'If you enter "N", this same data WILL appear'
  @ 17,16 SAY '   the next time you process completed tours.'
  XDUMVAR=' '
  DO WHILE .T.
    @ 10,25 SAY 'Are the reports okay? (Y/N) ' GET XDUMVAR PICTURE '!' VALID XDUMVAR $ 'YN'
    READ
    IF LASTKEY() = 27
      LOOP
    ENDIF
    EXIT
  ENDDO
```

```
  IF XDUMVAR='Y'
     SET COLOR TO &HILIT
     @ 7,6 CLEAR TO 19,74
     DO POST
  ENDIF
  SET DELIMITERS ON
  CLOSE DATABASES
  RETURN
PROCEDURE MAINLOOP
PARAMETER RPTNAME
DO WHILE !EOF()
   IF (RCNUM = XTOUR) .AND. (TYPE = 'G')
      ISHANDOFF = .T.
   ELSE
      ISHANDOFF = .F.
   ENDIF
   XPG    = XPG+1
   XPNTPG = XPNTPG+1
   XDCHKIN = DATE
   XTCHKIN = TIME
   IF !ISHANDOFF
      XTOUR = RCNUM
      XRNUM = LOGDATA
      SET DEVICE TO SCREEN
      SELECT 6
      IF ALIAS() <> 'RTS'
         FUSE('RSUM/RTS/RNUM2X')
      ENDIF
      SET DEVICE TO PRINT
      SEEK XRNUM
      IF EOF()
         XROUTE = 'Undefined route'
      ELSE
         XROUTE = DESC
      ENDIF
      SELECT RC
      SKIP
      XOLDGNAME = ''
      SELECT GN
      SEEK RC->XLOGDATA
      IF EOF()
         XGNAME = 'Undefined guard'
      ELSE
         XGNAME = GNAME
      ENDIF
   ENDIF
   SELECT RC
   SKIP
   XFIRSTREC = RECNO()
   DO PROCTOUR
   SELECT RC
   GOTO XFIRSTREC
   IF (RCNUM = XTOUR) .AND. (!TYPE $ 'SG') .AND. ! EOF()
      DO &RPTNAME
      DO &RPTNAME
   ENDIF
ENDDO
```

```
RETURN
PROCEDURE PROCTOUR
BETZ    = .T.
XTOTINT = 0
TBETZ   = 0
TMISSCHK= 0
ZCHECK  = 0
TPNTCHK = 0
ZTOTAL  = 0
TPNTIZONE=0
TCHKZNPNT=0
XOURZ   = SPACE(6)
ZNPED   = 0
LINPED  = 0
XCHKPNT = SPACE(6)
XTOLD   = XTCHKIN
XDOLD   = XDCHKIN
XTDIFF  = 0
SET DEVICE TO SCREEN
SELECT 5
FUSE('RDET/RTD/RNUM1X')
DO CALCTOTZPNT WITH XRNUM
FUSE('OHISTORY/OH/OHIST1X')
SET DEVICE TO PRINT
SELECT RC
DO WHILE (RONUM = XTOUR) .AND. (.TYPE $ 'SS') .AND. .! EOF()
  XTDIFF = CETIME(-1,0,XTOLD,XDOLD,TIME,DATE)
  XDOLD = DATE
  XTOLD = TIME
  DO CASE
  CASE TYPE = 'E'
    BETZ   = .F.
    ZNPED  = REDNO()
    XOURZ  = LOGDATA
    ZCHECK = ZCHECK + 1
    SELECT ZN
    SEEK XOURZ
    IF .EOF()
      TCHKZNPNT = TCHKZNPNT + POINTS
    ENDIF
  CASE TYPE = 'L'
    BETZ   = .T.
    SCANMISS(1,'RC')
  CASE TYPE = 'R'
    XCHKPNT = TRIM(LOGDATA)

IF LEN(XCHKPNT) = 2
      IF XCHKPNT = 'ZZ'
        SKIP
      ENDIF
    ELSE
      XCHKPNT = XCHKPNT + SPACE(6-LEN(XCHKPNT))
      IF BETZ
        TBETZ = TBETZ + XTDIFF
```

```
      ELSE
        SELECT BC
        SEEK XCHKPNT+XCURZ
        IF ! EOF()
          SELECT RC
          LZNREC = RECNO()
          GO ZNREC
          SKIP
          DO WHILE (LOGDATA <> XCHKPNT) .AND. (RECNO() <> LZNREC)
            SKIP
          ENDDO
          IF (RECNO() = LZNREC)
            TPNTCHK = TPNTCHK + 1
          ELSE
          ENDIF
          GO LZNREC
        ENDIF
      ENDIF
    CASE TYPE = 'F'
      SKIP
      EXIT
    ENDCASE
    SELECT RC
    SKIP
  ENDDO
  IF TYPE = 'S'
    XDCHKOUT = DATE
    XTCHKOUT = TIME
    SKIP - 1
  ELSE
    SKIP -1
    XDCHKOUT = DATE
    XTCHKOUT = TIME
  ENDIF
  XTOTINT = CETIME(-1,0,XTCHKIN,XDCHKIN,XTCHKOUT,XDCHKOUT)
  IF !BETZ
    SCANMISS(1,'RC')
  ENDIF
  SKIP
  @ 1, 0 SAY DATE()
  @ 1,40-INT(LEN(LTRIM(TRIM(HEAD)))/2) SAY HEAD
  @ 1,71 SAY 'Page: '+STR(XPG,3)
  @ 2, 0 SAY TIME()
  IF ISFORDET
    @ 2,31 SAY 'DETAIL ROUTE REPORT'
  ELSE
    @ 2,31 SAY 'SUMMARY ROUTE REPORT'
  ENDIF
  @ 2,69 SAY 'Report: '+STR(XPNTPG,3)
  @ 3,25 SAY 'The TourWatch Manager (C) 1989'
  @ 5, 0 SAY 'Guard Name : '+SUBSTR(XGNAME,1,24)
  @ 5,39 SAY 'Check In   : '+DTOC(XDCHKIN)+' '+XTCHKIN
  @ 6, 0 SAY 'Route Name : '+XROUTE
  @ 6,39 SAY 'Check Out  : '+DTOC(XDCHKOUT)+' '+XTCHKOUT
  @ 7,39 SAY 'Total Time : '+CETIME(XTOTINT,2)
```

```
@ 10,0 SAY 'Zones Checked : '
@ 10,16 SAY LTRIM(STR(ZCHECK,5))+' of '+LTRIM(STR(ZTOTAL,5))
IF ISHANDOFF .OR. (TYPE = 'G' .AND. RONUM = XTOUR .AND. ! EOF())
   TPNTIZONE = TCHKZNPNT
ENDIF
@ 10,38 SAY 'Total In-Zone Points  : '+STR(TPNTIZONE,5)
@ 11,00 SAY 'In-Zones              : '+DETIME(XTOTINT-TBETZ,2)
@ 11,38 SAY 'In-Zone Points Checked : '+STR(TPNTCHK,5)
@ 12,00 SAY 'Between Zones : '+DETIME(TBETZ,2)
IF TPNTIZONE <> 0
   XPER = INT(TPNTCHK/TPNTIZONE*100)
ELSE
   XPER = 0
ENDIF
@ 12,38 SAY 'Percent Checked       : '+STR(XPER,5)+'%'
@ 13,38 SAY 'Must-scans Missed     : '+STR(TMISSCHK,5)
IF ISFORDET
   @ 15,0 SAY '* Out of Zone'
   @ 17,0 SAY '! Must-scan Missed'
ENDIF
IF ISFORDET
   @ 19,0 SAY 'Zone                             Bar       Check    Between'
   @ 20,0 SAY 'Number  Checkpoint               Code      Time     Time     Incident'
   @ 21,0 SAY REPLICATE('-',80)
   L = 22
ELSE
   @ 15,0 SAY 'Zone                             Enter Leave Total In-Zone In-Zone Percent Must-scans'
   @ 16,0 SAY 'Number  Zone Name                Time  Time  Time  Points  Pts Chkd Checked    Missed'
   @ 17,0 SAY REPLICATE('-',80)
   L = 19
ENDIF
RETURN
PROCEDURE REPDETAIL
SET DEVICE TO SCREEN
SELECT 6
IF ALIAS() <> 'ED'
   FUSE('EXCEPT/ED/EXCX')
ENDIF
SET DEVICE TO PRINT
SELECT RC
BETZ    = .T.
XTOTINT = 0
TBETZ   = 0
TMISSCHK= 0
ZCHECK  = 0
ZTOTAL  = 0
TPNTIZONE=0
XOURZ   = SPACE(6)
INREC   = 0
LZNREC  = 0
XCHKPNT = SPACE(6)
XTOLD   = XTCHKIN
XOOLD   = XDCHKIN
XTDIFF  = 0
IF ISHANDOFF
   @ L,5 SAY 'Continuing hand off tour from guard '+XOLDGNAME+','
```

```
   L = L+2
ENDIF
@ L,5 SAY 'Check In'
@ L,41 SAY XTCHKIN
DO WHILE (RCNUM = XTOUR) .AND. (!TYPE $ 'GG') .AND. ! EOF()
   XZNUM  = ''
   XDESCR = ''
   XCHKPNT = ''
   XEXCPT = ''
   ISEXCPT= .F.
   XTDIFF = CETIME(-1.0,XTOLD,XDOLD,TIME,DATE)
   XTOLD  = TIME
   XDOLD  = DATE
   DO CASE
   CASE TYPE = 'E'
     BETZ = .F.
     INREC = RECNO()
     XCURZ= LOGDATA
     SELECT ZN
     SEEK XCURZ
     IF EOF()
        XDESCR = 'Enter Zone '+XCURZ+' - unidentifiable'
     ELSE
        XDESCR = 'Enter Zone '+XCURZ+' - '+SDESC
     ENDIF
     SELECT RC
     SKIP -1
     IF TYPE <> 'L'
        L = L+1
     ENDIF
     SKIP
   CASE TYPE = 'L'
     BETZ  = .T.
     XDESCR = 'Leave Zone'
     SCANMISS(2,'RC')
   CASE TYPE = 'R'
     XCHKPNT = TRIM(LOGDATA) .
     IF LEN(XCHKPNT) = 2
        IF XCHKPNT <> 'ZZ'
          SELECT EC
          SEEK XCHKPNT
          IF EOF()
             XEXCPT = 'Undefined'
          ELSE
             XEXCPT = SUBSTR(EDESC,1,15)
          ENDIF
        ELSE
          SKIP
          XCHKPNT = LOGDATA
          SELECT OP
          SEEK XCHKPNT
          IF EOF()
             XEXCPT = 'Undefined'
          ELSE
             XEXCPT = SUBSTR(COMMENT,1,15)
          ENDIF
        ENDIF
     ENDIF
```

```
ISEXCEPT = .T.
ENDIF
IF ! ISEXCEPT
   XCHKPNT = XCHKPNT+SPACE(6-LEN(XCHKPNT))
   SELECT BC
   SEEK XCHKPNT
   IF EOF()
      XDESCR = ' Undefined barcode'
   ELSE
      XDESCR = ' '+DESC
   ENDIF
   IF SETZ
      XZNUM = '#'
   ELSE
      DO WHILE (XCHKPNT = BARCODE) .AND. (XCURZ <> ZNUM) .AND. ! EOF()
         SKIP
      ENDDO
      IF (XCHKPNT = BARCODE) .AND. (XCURZ = ZNUM) .AND. ! EOF()
         XZNUM = XCURZ
      ELSE
         XZNUM = '*'
      ENDIF
   ENDIF
   SELECT RC
ELSE
   SELECT RC
SKIP -1
IF TRIM(LOGDATA) = 'ZZ'
   SKIP -1
   XTOLD = TIME
   XDOLD = DATE
   SKIP
ELSE
   XTOLD = TIME
   XDOLD = DATE
ENDIF
SKIP
@ L,65 SAY SUBSTR(XEXCPT,1,15)
L = L + 1
SKIP
XCHKPNT = TRIM(LOGDATA)
DO WHILE LEN(XCHKPNT) = 2 .AND. TYPE='R' .AND. !EOF()
   IF XCHKPNT = 'ZZ'
      SKIP
      XCHKPNT = LOGDATA
      SELECT OH
      SEEK XCHKPNT
      IF EOF()
         @ L,65 SAY 'Undefined'
      ELSE
         @ L,65 SAY SUBSTR(COMMENT,1,15)
      ENDIF
   ELSE
      SELECT BC
      SEEK XCHKPNT
      IF EOF()
         @ L,65 SAY 'Undefined'
```

```
          ELSE
            @ L,65 SAY SUBSTR(EDESC,1,15)
          ENDIF
        ENDIF
        L = L + 1
        SELECT RC
        SKIP
        XCHKPNT = TRIM(LOGDATA)
      ENDDO
      SELECT RC
      SKIP - 1
      L = L - 1
    ENDIF
  CASE TYPE = 'F'
    XDESCR = 'Check Out'
  ENDCASE
  SELECT RC
  IF ! ISEXCEPT
    L = L+1
    IF L > LMAX
      XPG   = XPG + 1
      CHNGPAGE('NORMHEAD')
    ENDIF
    IF ! EMPTY(SUBSTR(XDESCR,1,2))
      @ L,5 SAY XDESCR
    ELSE
      @ L,0 SAY XINUM
      @ L,9 SAY XDESCR
    ENDIF
    IF ! EMPTY(XCHKPNT)
      @ L,28 SAY XCHKPNT
    ENDIF
    @ L,41 SAY TIME
    @ L,54 SAY CETIME(XTDIFF,1)
    IF TYPE = 'L'
      L = L+1
    ENDIF
  ENDIF
  SKIP
ENDDO
SKIP -1
IF TYPE <> 'F'
  IF !BETZ
    SCANMISS(2,'RC')
  ENDIF
  L = L + 1
  SKIP
  IF TYPE = 'G'
    XOLDGNAME = TRIM(XGNAME)
    SELECT GN
    SEEK RC->XLOGDATA
    IF EOF()
      XGNAME = 'Undefined guard'
    ELSE
      XGNAME = GNAME
    ENDIF
```

```
     @ L,5 SAY 'Hand off tour to guard '+TRIM(XGNAME)+'.'
       SELECT RC
     ELSE
       @ L,5 SAY 'Incomplete Tour'
     ENDIF
   ELSE
     SKIP
   ENDIF
   CHNGPAGE('')
   RETURN
   PROCEDURE SUMREP
   BETZ    = .T.
   XZDESCR = SPACE(15)
   XCURZ   = SPACE(6)
   XTOLD   = XTCHKIN
   XDOLD   = XDCHKIN
   XNEWT   = XTCHKIN
   XNEWD   = XDCHKIN
   ZNREC   = 0
   LZNREC  = 0
   PNTCHK  = 0
   PNTIZONE= 0
   MISSCHK = 0
   XCHKPNT = SPACE(6)
   IF ISHANDOFF
      @ L,5 SAY 'Continuing hand off tour from previous guard.'
      L = L+1
   ENDIF
   @ L,9 SAY 'Check in'
   @ L,24 SAY XTCHKIN
   L = L + 1
   DO WHILE (RDNUM = XTOUR) .AND. (!TYPE $ 'SG') .AND. ! EOF()
     DO CASE
     CASE TYPE = 'S'
        BETZ   = .F.
        PNTCHK = 0
        ZNREC  = RECNO()
        XTOLD  = TIME
        XDOLD  = DATE
        XCURZ  = LOGDATA
        SELECT ZN
        SEEK XCURZ
        IF EOF()
          XZDESCR = 'Undefined zone'
        ELSE
          XZDESCR = SDESC
        ENDIF
     CASE TYPE = 'L'
        BETZ  = .T.
        LZNREC = RECNO()
        XNEWT = TIME
        XNEWD = DATE
        MISSCHK = 0
        PNTIZONE = SCANMISS(3,'RC')
        IF L > LMAX
           XPG = XPG + 1
           CHNGPAGE('NORMHEAD')
```

```
      ENDIF
      @ L,0 SAY XCURZ
      @ L,5 SAY XIDESCR
      @ L,24 SAY XTOLD
      @ L,31 SAY XNEWT
      @ L,38 SAY GETIME(-1,1,XTOLD,XDOLD,XNEWT,XNEWD)
      @ L,47 SAY PNTIZONE PICTURE '9999'
      @ L,56 SAY PNTCHK PICTURE '9999'
      IF PNTIZONE <> 0
         XPER = INT(PNTCHK/PNTIZONE*100)
      ELSE
         XPER = 0
      ENDIF
      @ L,63 SAY XPER PICTURE '9999'
      @ L,67 SAY '%'
      @ L,76 SAY MISSCHK PICTURE '9999'
      L = L+1
    CASE TYPE = 'R'
      IF ! SET2
        XCHKPNT = TRIM(LOGDATA)
        IF LEN(XCHKPNT) = 2
          IF XCHKPNT = 'ZZ'
            SKIP
          ENDIF
        ELSE
          XCHKPNT = XCHKPNT+SPACE(6-LEN(XCHKPNT))
          SELECT BC
          SEEK XCHKPNT+XCURZ
          IF ! EOF()
            SELECT RC
            LZNREC = RECNO()
            GO ZNREC
            SKIP
            DO WHILE (LOGDATA <> XCHKPNT) .AND. (RECNO() <> LZNREC)
              SKIP
            ENDDO
            IF (RECNO() = LZNREC)
              PNTCHK = PNTCHK + 1
            ELSE
            ENDIF
            GO LZNREC
          ENDIF
        ENDIF
      ENDIF
   ENDCASE
   SELECT RC
   SKIP
 ENDDO
 SELECT RC
 SKIP -1
 IF TYPE <> 'F'
   IF ! SET2
     XNEWT = TIME
     XNEWD = DATE
     MISSCHK = 0
     PNTIZONE = SCANMISS(3,'RC')
```

```
    IF L > LMAX
      XPG  = XPG + 1
      CHNGPAGE('NORMHEAD')
    ENDIF
    @ L,0 SAY XCURZ
    @ L,8 SAY XZDESCR
    @ L,24 SAY XTOLD
    @ L,38 SAY CETIME(-1,1,XTOLD,XDOLD,XNEWT,XNEWD)
    @ L,47 SAY PNTIZONE PICTURE '9999'
    @ L,56 SAY PNTCHK PICTURE '9999'
    IF PNTIZONE <> 0
      XPER = INT(PNTCHK/PNTIZONE*100)
    ELSE
      XPER = 0
    ENDIF
    @ L,63 SAY XPER PICTURE '9999'
    @ L,67 SAY '%'
    @ L,76 SAY MISSCHK PICTURE '9999'
    L = L + 1
  ENDIF
  SELECT RC
  SKIP
  IF TYPE = 'G'
    XOLDGNAME = TRIM(XGNAME)
    SELECT GN
    SEEK RC->LOGDATA
    IF EOF()
      XGNAME = 'Undefined guard'
    ELSE
      XGNAME = GNAME
    ENDIF
    @ L,5 SAY 'Hand off tour to guard '+TRIM(XGNAME)+'.'
    SELECT RC
  ELSE
    @ L,8 SAY 'Incomplete Tour'
  ENDIF
ELSE
  @ L,8 SAY 'Check Out'
  @ L,31 SAY TIME
  IF L > LMAX - 1
    XPG  = XPG + 1
    CHNGPAGE('NORMHEAD')
  ENDIF
  SELECT RC
  SKIP
ENDIF
CHNGPAGE('')
RETURN

* REPORTS.PRG
* COPYRIGHT 1989, 1988 COMPUTER SYSTEMS DESIGN, INC.

DO WHILE .T.
  CLOSE DATABASES
  MS1='A  GUARD HISTORY REPORT'
  MS2='B  ZONE HISTORY REPORT'
```

```
MG3='C CHECKPOINT HISTORY REPORT'
MG4='D INCIDENT HISTORY REPORT'
MG5='E DETAILED HISTORY REPORT'
MG6='X RETURN TO MAIN MENU'
MG1='Print Guard History for a Time Period'
MG2='Print Zone History for and Time Period'
MG3='Print Checkpoint History for a Time Period'
MG4='Print History of Incidents for a Time Period'
MG5='Print Chronological History of Activity by Guard for a Time Period'
MG6='Return to the Main Menu'
RES2=HEADER('PRINT HISTORY REPORTS',6)
CLEAR
DO CASE
CASE RES2=1
   DO GHISTRPT
CASE RES2=2
   DO ZHISTRPT
CASE RES2=3
   DO CHISTRPT
CASE RES2=4
   DO IHISTRPT
CASE RES2=5
   DO DHISTRPT
CASE RES2=6
   CLOSE DATABASES
   RETURN
ENDCASE
ENDDO

* MAINT.PRG
* COPYRIGHT 1989, 1988 COMPUTER SYSTEMS DESIGN, INC.

DO WHILE .T.
  HLPVAR = 0
  CLOSE DATABASES
  MS1='A GUARD MAINTENANCE'
  MS2='B ZONE MAINTENANCE'
  MS3='C ROUTE MAINTENANCE'
  MS4='D PRINT LISTS'
  MS5='X RETURN TO MAIN MENU'
  MG1='Add/Modify/Delete Guards'
  MG2='Add/Modify/Delete Zones'
  MG3='Add/Modify/Delete Routes'
  MG4='Print Files to Printer'
  MG5='Return to the Main Menu'
  RES2 = ''
  DO WHILE TYPE('RES2') <> 'N'
     RES2=HEADER('MAINTAIN FILES',5)
  ENDDO
  CLEAR
  SET KEY 279
  SET KEY 275
  DO CASE
  CASE RES2=1
     HLPVAR = 1
     DO GUARD
```

```
       CASE RES2=2
          HLPVAR = 3
          DO ZONE
       CASE RES2=3
          HLPVAR = 2
          DO ROUTE
       CASE RES2=4
          DO PNTFILE
       CASE RES2=5
          CLEAR
          CLOSE DATABASES
          RETURN
       ENDCASE
    ENDDO
    RETURN

* POST.PRG
* COPYRIGHT 1989, 1988 COMPUTER SYSTEMS DESIGN, INC.

SET CURSOR OFF
CLOSE DATABASES
FUSE('RECORD/RC/RCNUMX')
N=0
XXX=EOF()
FUSE('ROAMREC/RR')
IF EOF() .AND. XXX
   CLOSE DATABASES
   SET CURSOR ON
   RETURN
ENDIF
COPY STRUC FIELDS ZONE,LOGDATA TO USEDBC
SELECT 2
SET COLOR TO &HILIT
@ 7,6 CLEAR TO 19,74
@ 7,7 SAY 'Preparing Needed Data Files.'
@ 7,49 SAY '# of Records'
@ 7,63 SAY 'Working...'
FUSE('XUSEDBC/UBC')
INDEX ON LOGDATA+ZONE TO TEMPBC1X
INDEX ON ZONE+LOGDATA TO TEMPBC2X
SET INDEX TO TEMPBC1X,TEMPBC2X
SELECT 3
FUSE('BARCODE/BC/BNUMX,BC2X')
SELECT 4
FUSE('ZONE/ZN/ZNUMX')
BLANKDATE=CTOD('  /  /  ')
BLANKTIME='00:00'
SET COLOR TO &BLUELIT
@ 7,7 SAY 'Preparing Needed Data Files.'
@ 7,49 SAY '# of Records'
@ 7,63 SAY 'Files Open'
SET COLOR TO &HILIT
@ 9,7 SAY 'Updating Checkpoint History.'
@ 9,49 SAY TRANSFORM(N,'9999')
@ 9,63 SAY 'Working...'
SET COLOR TO &BLUELIT
SELECT 5
```

```
FUSE('CHISTORY/CH/CHIST1X,CHIST2X,CHIST3X')
FOR J=1 TO 2
  IF J=1
    ALIAS1='RC'
    SELECT 1
    FUSE('RECORD/RC/RCNUMX')
  ELSE
    ALIAS1='RR'
    SELECT 1
    FUSE('ROAMREC/RR')
    SET COLOR TO &HILI
    @ 10,7 SAY 'Updating Checkpoint Roam History.'
    @ 10,49 SAY TRANSFORM(N,'9999')
    @ 10,63 SAY 'Working...'
  ENDIF
  N = 0
  XGNUM = SPACE(6)
  SELECT &ALIAS1
  GO TOP
  DO WHILE !EOF()
    DISPNUM(8-2)
    DO CASE
    CASE TYPE='G'
      XGNUM=LOGDATA
      SELECT &ALIAS1
      SKIP
    CASE TYPE='R'
      DUPCOUNT = 0
      INCIDQTY = 1
      DO CPOSTDATA
      IF ALIAS1='RR' .AND. LEN(TRIM(LOGDATA))<>2
        SKIP -1
        IF TRIM(LOGDATA)<>'ZZ'
          SKIP
          SELECT BC
          SEEK RR->XLOGDATA
          IF !EOF()
            SELECT CH
            LOCKF('Checkpoint History')
            REPLACE BARCODE WITH BC->SERNUM
            UNLOCK
            SELECT BC
            SKIP
            DO WHILE (BARCODE=RR->XLOGDATA) .AND. ! EOF()
              DUPCOUNT = DUPCOUNT + 1
              SKIP
            ENDDO
          ENDIF
        ELSE
          SKIP
        ENDIF
      ELSE
        IF ALIAS1='RC'.AND.LEN(TRIM(LOGDATA))<>2
          SKIP -1
          IF TRIM(LOGDATA)<>'ZZ'
            SKIP
            SELECT BC
```

```
                    SEEK RC->LOGDATA
                    IF (EOF())
                       SELECT CH
                       LOCKF('Checkpoint History')
                       REPLACE BARCODE WITH RC->XSERNUM
                       UNLOCK
                    ENDIF
                 ELSE
                    SKIP
                 ENDIF
              ENDIF
           ENDIF
           SELECT &ALIAS1
           SKIP
           DO WHILE LEN(TRIM(LOGDATA))=2 .AND. TYPE='R' .AND. !EOF()
              INCIDQTY = INCIDQTY + 1
              DO CPOSTDATA
              IF TRIM(LOGDATA) = 'ZZ'
                 SKIP
                 INCIDQTY = INCIDQTY + 1
                 DO CPOSTDATA
              ENDIF
              SKIP
           ENDDO
           SKIP (DUPCOUNT * INCIDQTY)
        OTHERWISE
           SELECT &ALIAS1
           SKIP
        ENDCASE
     ENDDO
     IF J=1
        SET COLOR TO &BLUELIT
        @ 9,7 SAY 'Updating Checkpoint History.'
        @ 9,49 SAY TRANSFORM(N,'9999')
        @ 9,63 SAY 'Done.'
        SET COLOR TO &HILIT
     ENDIF
NEXT
SET COLOR TO &BLUELIT
IF N>0
   @ 10,7 SAY 'Updating Checkpoint Roam History.'
   @ 10,49 SAY TRANSFORM(N,'9999')
   @ 10,63 SAY 'Done.'
ELSE
   @ 10,7 SAY 'There was NO Checkpoint Roam History.'
   @ 10,49 SAY '    '
   @ 10,63 SAY 'No Update.'
ENDIF
SET COLOR TO &HILIT
@ 11,7 SAY 'Updating Guard History.'
@ 11,63 SAY 'Working...'
SELECT UFC
ZAP
SELECT 5
FUSE('GHISTORY/GH/GHIST1X,GHIST2X,GHIST3X')
FOR J=1 TO 2
```

```
IF J=1
  ALIAS1='RC'
  SELECT 1
  USE('RECORD/RC/RCNUMX')
ELSE
  ALIAS1='RR'
  SELECT 1
  USE('ROAMREC/RR')
  SET COLOR TO WHILIT
  @ 12,7 SAY 'Updating Guard Roam History.'
  @ 12,49 SAY TRANSFORM(N,'9999')
  @ 12,65 SAY 'Working...'
ENDIF
N            = 0
ZONECNT      = 0
POINTCNT     = 0
ROUTEZNS     = 0
ROUTEPTS     = 0
CHPOINT      = 0
INZPCHECKED  = 0
INZONE       = .F.
XCHECKIND    = BLANKDATE
STORE SPACE(6) TO XGNUM,XRNUM,XZONE
STORE BLANKTIME TO XCHECKINT,XCHECKOUT
SELECT &ALIAS1
GO TOP
DO WHILE !EOF()
  DISPNUM(10+J)
  DO CASE
  CASE TYPE='S'
    SKIP -1
    IF BOF()
      GO TOP
    ELSE
      IF TYPE<>'F'
        IF ALIAS1='RR'
          DO GHISTTOTALS
          DO GRDREC WITH ZONECNT,POINTCNT
        ELSE
          DO GRDREC WITH ROUTEZNS,ROUTEPTS
        ENDIF
      ENDIF
      SKIP
    ENDIF
    SELECT &ALIAS1
    XRCNUM = RCNUM
    XRNUM  = LOGDATA
    INZONE = .F.
    IF ALIAS1='RC'
      DO ROUTE_TOT WITH XRNUM
    ENDIF
  CASE TYPE='S'
    SKIP -1
    IF ALIAS1 = 'RC' .AND. RCNUM = XRCNUM .AND. TYPE <> 'S'
      DO GRDREC WITH ZONECNT,POINTCNT
      ROUTEPTS = ROUTEPTS - POINTCNT
      ROUTEZNS = ROUTEZNS - ZONECNT
```

```
      ENDIF
      SELECT &ALIAS1
      SKIP
      XGNUM    = LOGDATA
      XCHECKIND = DATE
      STORE TIME TO XCHECKINT,XCHECKOUT
      STORE 0 TO POINTCNT,ZONECNT,INZPCHECKED,CHPOINT
      SELECT UBC
      ZAP
   CASE TYPE='E'
      INZONE   = .T.
      XZONE    = LOGDATA
      XCHECKOUT= TIME
      IF ALIAS1='RC'
         ZONECNT=ZONECNT+1
         SELECT ZN
         SEEK XZONE
         IF !EOF()
            POINTCNT=POINTCNT+POINTS
         ENDIF
      ENDIF
   CASE TYPE='R'
      IF LEN(TRIM(LOGDATA)) = 2
         IF TRIM(LOGDATA)='ZZ'
            SKIP
         ENDIF
      ELSE
         CHPOINT=CHPOINT+1
         IF INZONE
            IF ALIAS1='RC'
               SEARCH=LOGDATA+XZONE
               SELECT RC
               SEEK SEARCH
               IF !EOF()
                  IF NEWSCAN(SEARCH,XZONE,'RC')
                     INZPCHECKED=INZPCHECKED+1
                  ENDIF
               ENDIF
            ELSE
               SEARCH=LOGDATA
               SELECT BC
               SEEK SEARCH
               DO WHILE BARCODE=SEARCH .AND. !EOF()
                  IF NEWSCAN(SEARCH,ZNUM,'BR')
                     INZPCHECKED=INZPCHECKED+1
                  ENDIF
                  SELECT BC
                  SKIP
               ENDDO
            ENDIF
         ENDIF
      ENDIF
      SELECT &ALIAS1
      XCHECKOUT=TIME
   CASE TYPE='L'
      INZONE = .F.
```

```
      CASE TYPE='F'
        XCHECKOUT=TIME
        IF ALIAS1='RR'
          DO GHISTTOTALS
        ENDIF
        DO GRDREC WITH ZONECNT,POINTCNT
      ENDCASE
      SELECT &ALIAS1
      SKIP
    ENDDO
    IF N<>0
      SKIP -1
      IF TYPE<>'F'
        IF ALIAS1='RR'
          DO GHISTTOTALS
          DO GRDREC WITH ZONECNT,POINTCNT
        ELSE
          DO GRDREC WITH ROUTEZNS,ROUTEPTS
        ENDIF
      ENDIF
    ENDIF
    IF J=1
      SET COLOR TO &BLUELIT
      @ 11,7 SAY 'Updating Guard History.'
      @ 11,49 SAY TRANSFORM(N,'9999')
      @ 11,63 SAY 'Done.'
    ENDIF
  NEXT
  IF N<>0
    SET COLOR TO &BLUELIT
    @ 12,7 SAY 'Updating Guard Roam History.'
    @ 12,49 SAY TRANSFORM(N,'9999')
    @ 12,63 SAY 'Done.'
  ELSE
    SET COLOR TO &BLUELIT
    @ 12,7 SAY 'There was NO Guard Roam Activity.'
    @ 12,49 SAY '    '
    @ 12,63 SAY 'No Update.'
  ENDIF
  SET COLOR TO &HILIT
  @ 13,7 SAY 'Updating Zone History.'
  @ 13,63 SAY 'Working...'
  SELECT UPC
  ZAP
  SELECT 5
  FUSE('ZHISTORY/ZH/ZHIST1X')
  INZONE = .F.
  XZ1DAT=BLANKDATE
  STORE 0 TO N,INZPCHECKED
  STORE BLANKTIME TO XZ1TIM,XZ2TIM
  STORE SPACE(6) TO XZ1NUM,XGNUM,XRONUM
  SELECT 1
  FUSE('RECORD/RC/RCNUMX')
  GO TOP
  DO WHILE !EOF()
    DISPNUM(13)
```

```
DO CASE
CASE TYPE='B'
  SKIP -1
  IF BOF()
    GO TOP
  ELSE
    IF INZONE
      SELECT ZH
      LOCKF('Zone History')
      REPLACE INZPCHECK WITH INZPCHECKED
      UNLOCK
    ENDIF
    SELECT RC
    SKIP
  ENDIF
  INZONE=.F.
  XRNUM=LOGDATA
  STORE 0 TO INZPCHECKED,ZONECNT,POINTCNT
CASE TYPE='G'
  XGNUM=LOGDATA
CASE TYPE='E'
  SELECT UBC
  ZAP
  SELECT RC
  INZONE = .T.
  XZ1NUM=LOGDATA
  XZ1DAT=DATE
  XZ1TIM=TIME
  XZ2TIM='25:00'
  INZPCHECKED = 0
  DO ZNREC
CASE TYPE='R'
  IF LEN(TRIM(LOGDATA)) = 2
    IF LOGDATA='ZZ'
      SKIP
    ENDIF
  ELSE
    IF INZONE
      SEARCH=LOGDATA+XZ1NUM
      SELECT BC
      SEEK SEARCH
      IF !EOF()
        IF NEWSCAN(SEARCH,XZ1NUM,'RC')
          INZPCHECKED = INZPCHECKED + 1
        ENDIF
      ENDIF
    ENDIF
  ENDIF
CASE TYPE='L'
  INZONE = .F.
  SKIP - 1
  XZ2TIM=TIME
  SKIP
  SELECT ZH
  LOCKF('Zone History')
  REPLACE LEAVE WITH PKTIME(XZ2TIM)
```

```
      REPLACE INZPCHECK WITH INZPCHECKED
      UNLOCK
      SELECT RC
    ENDCASE
    SELECT RC
    SKIP
  ENDDO
  IF N()>0
    SKIP -1
    IF (BOF() .AND. INZONE
      SELECT ZH
      LOOKF('Zone History')
      REPLACE INZPCHECK WITH INZPCHECKED
      UNLOCK
    ENDIF
  ENDIF
SET COLOR TO &BLUELIT
@ 13,7 SAY 'Updating Zone History.'
@ 13,49 SAY TRANSFORM(N,'9999')
@ 13,63 SAY 'Done.'
SET COLOR TO &HILIT
@ 14,7 SAY 'Updating Roam Tour History.'
@ 14,49 SAY TRANSFORM(N,'9999')
@ 14,63 SAY 'Working...'
XZ1DAT=BLANKDATE
STORE 0 TO N,INZPCHECKED
STORE '25:00' TO XZ1TIM,XZ2TIM
STORE SPACE(6) TO XZ1NUM,XGNUM
SELECT UBC
ZAP
SELECT 1
FUSE('ROAMREC/RR')
SET FILTER TO TYPE='G' .OR. TYPE='R'
GO TOP
DO WHILE !EOF()
  DISPNUM(14)
  DO CASE
  CASE TYPE='G'
    SELECT UBC
    ZAP
    SELECT RR
    XGNUM=LOGDATA
    XZ1DAT=DATE
  CASE TYPE='R'
    DO WHILE TYPE<>'G' .AND. !EOF()
      IF LEN(TRIM(LOGDATA))=2 .AND. TYPE='R'
        IF LOGDATA = 'ZZ'
          SKIP
        ENDIF
      ELSE
        SEARCH=LOGDATA
        SELECT BC
        SEEK SEARCH
        DO WHILE BARCODE=SEARCH .AND. !EOF()
          NEWSCAN(SEARCH,ZNUM,'RR')
          SELECT BC
          SKIP
```

```
            ENDDO
           ENDIF
          SELECT RR
          SKIP
        ENDDO
        SKIP -1
        SELECT UBC
        SET ORDER TO 2
        GO TOP
        DO WHILE !EOF()
          XZ1NUM=ZONE
          INZPCHECKED=0
          DO WHILE XZ1NUM=ZONE .AND. !EOF()
             INZPCHECKED=INZPCHECKED+1
             SKIP
          ENDDO
          DO ZNREC
          SELECT UBC
        ENDDO
        SET ORDER TO 1
      ENDCASE
     SELECT RR
     SKIP
ENDDO

GO TOP
SET COLOR TO &BLUELIT
IF EOF()
   @ 14,7 SAY 'There Were No Roam Tours.'
   @ 14,63 SAY 'No Update.'
ELSE
   @ 14,7 SAY 'Updating Roam Tour History.'
   @ 14,49 SAY TRANSFORM(N,'9999')
   @ 14,63 SAY 'Done.'
ENDIF
SET COLOR TO &HILIT
SET FILTER TO
CLOSE DATABASES
FUSE('CONFIG/CO')
LOCKF('Configuration')
SELECT 2
FUSE('ZHISTORY/ZH')
GO BOTT
XREC=RECNO()
SELECT CO
REPLACE ZHIST WITH XREC
SELECT 2
FUSE('CHISTORY/CH')
GO BOTT
XREC=RECNO()
SELECT CO
REPLACE CHIST WITH XREC
SELECT 2
FUSE('GHISTORY/GH')
GO BOTT
XREC=RECNO()
SELECT CO
```

```
REPLACE GHIST WITH XREC
UNLOCK
CLOSE DATABASES
FUSE('XRECORD/RC/RCNUMX')
ZAP
FUSE('XROAMREC/RR/ROAM1X')
ZAP
SET COLOR TO &HILIT
CLOSE DATABASES
IF FILE('USEDRC.DBF')
   DELETE FILE('USEDRC.DBF')
ENDIF
IF FILE('TEMPBC1X.NTX')
   DELETE FILE('TEMPBC1X.NTX')
ENDIF
IF FILE('TEMPBC2X.NTX')
   DELETE FILE('TEMPBC2X.NTX')
ENDIF
SET CURSOR ON
SET COLOR TO &BLUELIT
@ 7,49 SAY '# of Records'
@ 7,63 SAY '- CLOSED -'
SET COLOR TO &HILIT
MESG(22,'Updating of History Files is Complete')
KEYBOARD ''
XJUNK=INKEY(5)
RETURN
FUNCTION DISPNUM
PARAMETERS F0
N=N+1
IF (N % 10) = 0
   @ F0,49 SAY TRANSFORM(N,'9999')
ENDIF
RETURN .T.
PROCEDURE ZNREC
SELECT ZN
SEEK XZ1NUM
SELECT ZH
LOCKF('Zone History')
APPEND BLANK
REPLACE ZNUM WITH XZ1NUM, DATE WITH PKDATE(XZ1DAT), ENTER WITH PKTIME(XZ1TIM), LEAVE WITH PKTIME(XZ2TIM),
   GNUM WITH XGNUM, POINTS WITH ZN->POINTS, IN
UNLOCK
RETURN
PROCEDURE GRDREC
PARAMETERS F0,F1
SELECT ZN
SEEK XZONE
SELECT GH
LOCKF('Guard History')
APPEND BLANK
REPLACE GNUM WITH XGNUM, DATE WITH PKDATE(XCHECKIND), RNUM WITH XRNUM, CHECKIN WITH PKTIME(XCHECKINT),
   CHECKOUT WITH PKTIME(XCHECKOUT)
REPLACE ZONES WITH F0, POINTS WITH F1, PCHECKED WITH CHPOINT, INZPCHECK WITH INZPCHECKED
UNLOCK
XCHECKIND=BLANKDATE
```

```
XCHECKINT=BLANKTIME
STORE " " TO XGNUM
STORE 0 TO ZONECNT,POINTCNT,CHPOINT,INZPCHECKED
SELECT &ALIAS1
RETURN
PROCEDURE GHISTTOTALS
POINTCNT =0
ZONECNT =0
XXOLDZONE=SPACE(6)
SELECT UBC
SET ORDER TO 2
GO TOP
DO WHILE !EOF()
   IF XXOLDZONE<>ZONE
      XXOLDZONE= ZONE
      ZONECNT = ZONECNT+1
      SELECT ZN
      SEEK XXOLDZONE
      IF !EOF()
         POINTCNT=POINTCNT+POINTS
      ENDIF
   ENDIF
   SELECT UBC
   SKIP
ENDDO
SET ORDER TO 1
SELECT &ALIAS1
RETURN
PROCEDURE ROUTE_TOT
PARAMETERS F0
ROUTEZNS=0
ROUTEPTS=0
SELECT 2
USE('RDT/RDT/RNUM1X')
SELECT RDT
SEEK F0
DO WHILE RNUM=F0 .AND. !EOF()
   ROUTEZNS=ROUTEZNS+1
   SELECT ZN
   SEEK RDT->ZNUM
   IF !EOF()
      ROUTEPTS=ROUTEPTS+POINTS
   ENDIF
   SELECT RDT
   SKIP
ENDDO
SELECT 2
USE('XUSEDBC/UBC/TEMPBC1X,TEMPBC2X')

SELECT &ALIAS1
RETURN
FUNCTION NEWSCAN
PARAMETERS F0,F1,F2
SELECT UBC
SEEK F0
IF !EOF()
   IF F2='RC'
```

```
       RETURN .F.
     ENDIF
     DO WHILE LOGDATA=F0 .AND. !EOF()
       IF F1=ZONE
         RETURN .F.
       ENDIF
       SKIP
     ENDDO
   ENDIF
   APPEND BLANK
   REPLACE LOGDATA WITH SUBSTR(F0,1,6)
   REPLACE ZONE WITH F1
   RETURN .T.
   PROCEDURE CPOSTDATA
   SELECT CH
   LOCKF('Checkpoint History')
   APPEND BLANK
   REPLACE DATE WITH PKDATE(&ALIAS1->DATE)
   REPLACE TIME WITH PKTIME(&ALIAS1->TIME)
   REPLACE GNUM WITH XGNUM
   REPLACE BARCODE WITH &ALIAS1->LOGDATA
   UNLOCK
   SELECT &ALIAS1
   RETURN

* GHISTRPT.PRG
   * COPYRIGHT 1989, 1988 COMPUTER SYSTEMS DESIGN, INC.

SET INTEN OFF
   SET DELIMITERS ON
   CLEAR
   CLOSE DATABASES
   HEADER('GUARD HISTORY REPORT',-1)
   MESG(7,'This report displays summarized tour activity')
   MESG(8,'information about a guard for a designated time period.')
   MESG(12,'Please wait while setting up files...')
   SELECT 1
   FUSE('BARCODE/BC/BNUMX,ZNUM2X')
   SELECT 2
   FUSE('GHISTORY/GH/GHIST3X')
   IF EOF()
     CLOSE DATABASES
     MESGWAIT(18,'There is no history for any guard.')
     RETURN
   ENDIF
   SELECT 3
   FUSE('GUARD/GN/GRDX,GRDX1')
   IF EOF()
     CLOSE DATABASES
     MESGWAIT(18,'There are no guards defined.')
     RETURN
   ENDIF
   EXCLAM = REPLICATE("X",24)
   DO WHILE .T.
     X0DATE = CTOD('  /  /  ')
     X1DATE = CTOD('  /  /  ')
```

```
XGRDNUM = SPACE(6)
XGRDNAME = SPACE(24)
DO WHILE .T.
  CLR(9)
  SELECT GN
  MESS(19,'F2 to display GUARDS.  ESC to exit.')
  @ 12,20 SAY 'Guard Name    ' GET XGRDNAME PICTURE '&EXCLAM' VALID OKGUARD(XGRDNAME,'2','GHISTRPT')
  @ 13,20 SAY 'Guard ID      ' GET XGRDNUM PICTURE '!!!!!!' VALID OKGUARD(XGRDNUM,'1','GHISTRPT')
  SET COLOR TO &LOLIT
  @ 14,16 SAY "Enter a Guard Name ot '**' for all guards."
  SET COLOR TO &HILIT
  @ 16,20 SAY 'Starting Date ' GET XODATE VALID OKDATE(XODATE,19)
  @ 17,20 SAY 'Ending Date   ' GET X1DATE VALID OKDATE(X1DATE,19)
  SET KEY -1 TO GENWIND
  READ
  SET KEY -1
  SET ORDER TO 1
  CLR(20)
  IF LASTKEY() = 27
    EXIT
  ENDIF
  IF LEN(XGRDNUM)<6
    XGRDNUM=XGRDNUM+SPACE(6-LEN(XGRDNUM))
  ENDIF
  PODATE=PKDATE(XODATE)
  P1DATE=PKDATE(X1DATE)
  IF P1DATE < PODATE
    MESSWAIT(19,'Starting date is later than ending date.')
    LOOP
  ENDIF
  MESS(19,'Please wait while processing files...')
  DO CASE
  CASE XGRDNUM='**'
    SELECT GN
    SET ORDER TO 1
    GO TOP
    SET SOFTSEEK ON
    DO WHILE !EOF()
      SELECT GH
      SEEK GN->GNUM+PODATE
      IF GNUM=GN->GNUM.AND.DATE>=PODATE.AND.DATE<=P1DATE.AND.!EOF()
        EXIT
      ENDIF
      SELECT GN
      SKIP
    ENDDO
    SET SOFTSEEK OFF
    IF EOF()
      MESSWAIT(19,'No guards were active during this period.')
      LOOP
    ELSE
      EXIT
    ENDIF
  OTHERWISE
    SELECT GH
    SET SOFTSEEK ON
```

```
        SEEK XGRDNUM + PODATE
        SET SOFTSEEK OFF
        IF XGRDNUM=GNUM .AND. DATE>=PODATE .AND. DATE<=P1DATE .AND. !EOF()
           EXIT
        ENDIF
        MESSWAIT(19,'No history for guard '+TRIM(XGRDNUM)+' during this period.')
      ENDCASE
    ENDDO
    IF LASTKEY() = 27
       EXIT
    ENDIF
    XPG = 0
    LMAX = 0
    YPRINTIT = ' '
    IF ! SORP()
       LOOP
    ENDIF
    SET DELIMITERS ON
    DO GHISTHEAD
    SELECT GH
    IF XGRDNUM='**'
       DO ALLSHIST
    ELSE
       DO ONEGHIST
    ENDIF
    SET DEVICE TO SCREEN
    IF YPRINTIT
       EJECT
    ELSE
       IF LASTKEY() <> 27
          MESG(24,'End of report.  Press any key to continue...')
          DO WHILE INKEY() = 0
          ENDDO
       ENDIF
    ENDIF
    CLEAR
    HEADER('GUARD HISTORY REPORT',-1)
    MESG(7,'This report displays summarized tour activity')
    MESG(8,'information about a guard for a designated time period.')
ENDDO
CLOSE DATABASES
RETURN
PROCEDURE ALLSHIST
SELECT GN
SET ORDER TO 1
DO WHILE !EOF()
   XGRDNUM=GNUM
   XGRDNAME=GNAME
   SELECT GH
   SET SOFTSEEK ON
   SEEK XGRDNUM+PODATE
   SET SOFTSEEK OFF
   IF XGRDNUM=GNUM.AND.DATE>=PODATE.AND.DATE<=P1DATE.AND.!EOF()
      DO ONEGHIST
   ENDIF
   IF LASTKEY()=27
```

```
      EXIT
    ENDIF
    SELECT GN
    SKIP
 ENDDO
 RETURN
 PROCEDURE ONEGHIST
 SELECT GH
 TZ=0
 TIZP=0
 TIZPC=0
 CHANGED_GUARD=.T.
 DO WHILE XGRDNUM=GNUM .AND. DATE >=PODATE .AND. DATE<=P1DATE .AND. !EOF()
   IF (L > LMAX) .OR. (CHANGED_GUARD .AND. L>=LMAX-1)
     IF ! CHNGPAGE('GHISTHEAD')
       EXIT
     ENDIF
   ENDIF
   IF CHANGED_GUARD
     @ L,0 SAY 'Guard Name:  '+TRIM(XGRDNAME)
     L=L+1
   ENDIF
   XIN   = UPKTIME(CHECKIN)
   XOUT  = UPKTIME(CHECKOUT)
   XDATE = CTOD(UPKDATE(DATE))
   @ L, 0 SAY XDATE
   @ L,11 SAY RNUM
   @ L,20 SAY XIN
   @ L,28 SAY XOUT
   IF !EMPTY(XOUT)
     IF VAL(SUBSTR(XOUT,1,2)) < VAL(SUBSTR(XIN,1,2))
       @ L,36 SAY CETIME(-1,1,XIN,XDATE,XOUT,XDATE+1)
     ELSE
       @ L,36 SAY CETIME(-1,1,XIN,XDATE,XOUT,XDATE)
     ENDIF
   ENDIF
   @ L,46 SAY ZONES PICTURE '999'
   @ L,55 SAY POINTS PICTURE '9999'
   @ L,66 SAY INZPCHECK PICTURE '9999'
   TZ=TZ+ZONES
   TIZP=TIZP+POINTS
   TIZPC=TIZPC+INZPCHECK
   IF POINTS = 0
     @ L,77 SAY '0'
   ELSE
     @ L,75 SAY INT(100*INZPCHECK/POINTS) PICTURE '999'
   ENDIF
   @ L,79 SAY '%'
   L = L+1
   SKIP
   CHANGED_GUARD=.F.
 ENDDO
 IF LASTKEY()<>27
   IF L>=LMAX-1
     IF ! CHNGPAGE('GHISTHEAD')
       RETURN
     ENDIF
```

```
    ENDIF
    @ L,44 SAY '=====  =======  ========'
    L=L+1
    @ L,43 SAY TZ PICTURE '9999'
    @ L,54 SAY TIZP PICTURE '99999'
    @ L,65 SAY TIZPC PICTURE '99999'
    IF TIZP=0
      @ L,77 SAY '0'
    ELSE
      @ L,75 SAY INT(100*TIZPC/TIZP) PICTURE '999'
    ENDIF
    @ L,79 SAY '%'
  ENDIF
  L=L+2
RETURN
PROCEDURE GHISTHEAD
  IF ! YPRINTIT
    CLEAR
  ENDIF
  XPG = XPG + 1
  @ 1, 0 SAY DATE()
  @ 1,40-INT(LEN(TRIM(LTRIM(HEAD)))/2) SAY HEAD
  @ 1,71 SAY 'Page: '+STR(XPG,3)
  @ 2, 0 SAY TIME()
  @ 2,30 SAY 'GUARD HISTORY REPORT'
  @ 3,25 SAY 'The Tourwatch Manager (C) 1988'
  IF ! YPRINTIT
    SET COLOR TO &BLUELIT
  ENDIF
  @ 5,0 SAY 'Begin Date : '+DTOC(X0DATE)
  @ 6,0 SAY 'End Date   : '+DTOC(X1DATE)
  @ 8,0 SAY 'Tour      Route    Check   Check   Total   Total   In-Zone   In-Zone   Percent'
  @ 9,0 SAY 'Date      Number   In      Out     Time    Zones   Points    Pts Chkd  Checked'
  IF ! YPRINTIT
    @ 10,0 SAY SLINE
    SET COLOR TO &HILIT
  ELSE
    @ 10,0 SAY REPLICATE('-',80)
  ENDIF
  L = 11
RETURN

* ZHISTRPT.PRG
* COPYRIGHT 1987, 1988 COMPUTER SYSTEMS DESIGN, INC.

SET INTEN OFF
SET DELIMITERS ON
CLEAR
CLOSE DATABASES
HEADER('ZONE HISTORY REPORT',-1)
MESG(7,'This report displays summarized tour activity information')
MESG(8,'about a zone for a designated time period.')
MESG(12,'Please wait while setting up files...')
SELECT 1
FUSE('ZHISTORY/ZH/ZHIST1X')
IF EOF()
  CLOSE DATABASES
```

```
    MESGWAIT(18,'There is no history for any zone.')
    RETURN
ENDIF
SELECT 2
FUSE('GUARD/G/GRDX')
SELECT 3
FUSE('ZONE/ZN/ZNUM1X,ZNAMX')
IF EOF()
    CLOSE DATABASES
    MESGWAIT(18,'There are no zones defined.')
    RETURN
ENDIF
EXCLAM=REPLICATE("X",15)
DO WHILE .T.
  XODATE = CTOD('  /  /  ')
  X1DATE = CTOD('  /  /  ')
  XZNUM = SPACE(6)
  XZDESC=SPACE(15)
  DO WHILE .T.
    CLR(10)
    SELECT ZN
    MESG(19,'F2 to display ZONES.  ESC to exit.')
    @ 11,20 SAY 'Zone Name    ' GET XZDESC PICTURE '&EXCLAM' VALID OKZONE(XZDESC,'2')
    @ 12,20 SAY 'Zone Number  ' GET XZNUM PICTURE '!!!!!!' VALID OKZONE(XZNUM,'1')
    SET COLOR TO &LOLIT
    @ 13,19 SAY 'Enter a Zone Name of "**" for all zones."
    SET COLOR TO &HILIT
    @ 15,20 SAY 'Starting Date ' GET XODATE VALID OKDATE(XODATE,19)
    @ 16,20 SAY 'Ending Date   ' GET X1DATE VALID OKDATE(X1DATE,19)
    SET KEY -1 TO GENWIND
    READ
    SET KEY -1
    CLR(19)
    IF LASTKEY() = 27
      EXIT
    ENDIF
    IF LEN(XZNUM)<6
      XZNUM=XZNUM+SPACE(6-LEN(XZNUM))
    ENDIF
    PODATE=PKDATE(XODATE)
    P1DATE=PKDATE(X1DATE)
    IF PODATE > P1DATE
      MESGWAIT(19,'Starting date is later than ending date.')
      LOOP
    ENDIF
    MESG(19,'Please wait while processing files...')
    SELECT ZH
    IF XZNUM='**'
      SELECT ZN
      SET ORDER TO 1
      GO TOP
      SET SOFTSEEK ON
      DO WHILE !EOF()
        SELECT ZH
        SEEK ZN->ZNUM+PODATE
        IF ZNUM=ZN->ZNUM.AND.DATE>=PODATE.AND.DATE<=P1DATE.AND.!EOF()
```

```
        EXIT
      ENDIF
      SELECT ZN
      SKIP
    ENDDO
    SET SOFTSEEK OFF
    IF ZNUM<>ZN->ZNUM.OR.DATE<PODATE.OR.DATE>P1DATE.OR.EOF()
      MESSWAIT(19,'No history for any zones for this time period.')
      LOOP
    ENDIF
  ELSE
    SELECT ZH
    SET SOFTSEEK ON
    SEEK XZNUM+PODATE
    SET SOFTSEEK OFF
    IF ZNUM<>XZNUM.OR.DATE<PODATE.OR.DATE>P1DATE.OR.EOF()
      MESSWAIT(19,'No history for this zone for this time period.')
      LOOP
    ENDIF
  ENDIF
  EXIT
ENDDO
IF LASTKEY() = 27
  EXIT
ENDIF
XPG = 0
LMAX = 0
YPRINTIT = ' '
IF ISOBS()
  LOOP
ENDIF
SET DELIMITERS ON
DO ZHISTHEAD
IF XZNUM='**'
  DO ALLZHIST
ELSE
  DO ONEZHIST
ENDIF
SET DEVICE TO SCREEN
IF YPRINTIT
  EJECT
ELSE
  IF LASTKEY()<>27
    MESS(24,'End of report.  Press any key to continue.')
    DO WHILE INKEY()=0
    ENDDO
  ENDIF
ENDIF
CLEAR
HEADER('ZONE HISTORY REPORT',-1)
MESS(7,'This report displays summarized tour activity information')
MESS(8,'about a zone for a designated time period.')
ENDDO
CLOSE DATABASES
RETURN
PROCEDURE ALLZHIST
SELECT ZN
```

```
SET ORDER TO 1
DO WHILE !EOF()
  XZDESC=SDESC
  XZNUM=ZNUM
  SELECT ZH
  SET SOFTSEEK ON
  SEEK XZNUM+PODATE
  IF ZNUM=XZNUM.AND.DATE>=PODATE.AND.DATE<=P1DATE.AND.!EOF()
    DO ONEZHIST
    L=L+3
  ENDIF
  SELECT ZN
  SKIP
  IF LASTKEY()=27
    EXIT
  ENDIF
ENDDO
RETURN
PROCEDURE ONEZHIST
SELECT ZH
ISP =0
ITSO=0
CHANGED_ZONE=.T.
DO WHILE ZNUM=XZNUM .AND. DATE>=PODATE .AND. DATE<=P1DATE .AND. !EOF()
  IF (L > LMAX) .OR. (CHANGED_ZONE .AND. L>=LMAX-1)
    IF CHANGPAGE('Z=1STREAD')
      EXIT
    ENDIF
  ENDIF
  XDATE = CTOD(UP*DATE(DATE))
  INTIME = UP*TIME(ENTER)
  IF EMPTY(INTIME)
    INTIME = 'ROAM'
    ELAPSED = ''
    OUTTIME = ''
  ELSE
    OUTTIME=UP*TIME(LEAVE)
    IF EMPTY(OUTTIME)
      ELAPSED=''
    ELSE
      IF VAL(SUBSTR(OUTTIME,1,2)) < VAL(SUBSTR(INTIME,1,2))
        ELAPSED=CETIME(-1,1,INTIME,XDATE,OUTTIME,XDATE+1)
      ELSE
        ELAPSED=CETIME(-1,1,INTIME,XDATE,OUTTIME,XDATE)
      ENDIF
    ENDIF
  ENDIF
  IF CHANGED_ZONE
    @ L,0 SAY 'Zone Name:   '+TRIM(ZN->SDESC)
    L=L+1
  ENDIF
  @ L, 0 SAY XDATE
  @ L, 9 SAY INTIME
  @ L,16 SAY OUTTIME
  @ L,23 SAY ELAPSED
  SELECT G
```

```
    SEEK ZH->GNUM
    IF FOUND()
        @ L,30 SAY SUBSTR(GNAME,1,24)
    ELSE
        @ L,30 SAY 'Undefined'
    ENDIF
    SELECT ZH
    @ L,57 SAY STR(POINTS,3)
    @ L,62 SAY STR(INZPCHECK,3)
    IF POINTS = 0
        @ L,77 SAY '0'
    ELSE
        @ L,75 SAY INT(100*INZPCHECK/POINTS) PICTURE '999'
    ENDIF
    @ L,79 SAY '%'
    IZP=IZP+POINTS
    IZPC=IZPC+INZPCHECK
    L = L+1
    SKIP
    CHANGED_ZONE=.F.
ENDDO
IF LASTKEY()<>27
    IF L>=LMAX-1
        IF ! CHNGPAGE('ZHISTHEAD')
            RETURN
        ENDIF
    ENDIF
    @ L ,54 SAY '======    ======'
    @ L+1,55 SAY IZP PICTURE '99999'
    @ L+1,66 SAY IZPC PICTURE '99999'
    IF IZP=0
        @ L,77 SAY '0'
    ELSE
        @ L+1,75 SAY INT(100*IZPC/IZP) PICTURE '999'
    ENDIF
    @ L+1,79 SAY '%'
ENDIF
RETURN
PROCEDURE ZHISTHEAD
IF ! YPRINTIT
    CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,31 SAY 'ZONE HISTORY REPORT'
@ 3,25 SAY 'The TourWatch Manager (C) 1990'
IF ! YPRINTIT
    SET COLOR TO BR/BLIT
ENDIF
@ 5,0 SAY 'Begin Date : '+DTOC(X0DATE)
@ 6,0 SAY 'End Date   : '+DTOC(X1DATE)
@ 8,0 SAY 'Tour    Enter Leave Total                    In-Zone In-Zone Percent'
@ 9,0 SAY 'Date    Zone  Zone  Time  Guard Name        Points  Pts Chkd Checked'
IF ! YPRINTIT
```

```
    @ 10,0 SAY SLINE
    SET COLOR TO WHILIT
  ELSE
    @ 10,0 SAY REPLICATE('-',30)
  ENDIF
  L = 11
  RETURN

* CHISTRPT.PRG
* COPYRIGHT 1989, 1990 COMPUTER SYSTEMS DESIGN, INC.

SET INTEN OFF
SET DELIM ON
CLEAR
HEADER('CHECKPOINT HISTORY REPORT',-1)
MESS(7,'This report displays checkpoint activity.')
MESS(8,'for a designated time period.')
MESS(10,'Please wait while setting up files...')
CLOSE DATABASES
SELECT 1
FUSE('CHISTORY/CH/CHIST1X,CHIST2X,CHIST3X')
IF EOF()
   CLOSE DATABASES
   MESSWAIT(18,'There is no history for any checkpoint.')
   RETURN
ENDIF
SELECT 2
FUSE('BARCODE/BC/BNUMX,BC1X,BC2X')
IF EOF()
   CLOSE DATABASES
   MESSWAIT(18,'There are no checkpoints defined.')
   RETURN
ENDIF
SELECT 3
FUSE('EXCEPT/EX/EXCX')
SELECT 4
FUSE('GUARD/G/GRDX')
SELECT 5
FUSE('CHISTORY/CH/CHIST1X')
EXCLAM=REPLICATE("!",15)
DO WHILE .T.
   XBARCODE = SPACE(6)
   XCHKDESC = SPACE(15)
   X0TIME='00:00'
   X1TIME='23:59'
   X0DATE = CTOD('  /  /  ')
   X1DATE = CTOD('  /  /  ')
   DO WHILE .T.
      CLR(9)
      XWINDRED=0
      INCID_ONLY = 'N'
      SELECT BC
      MESS(19,'F2 to display CHECKPOINTS.  ESC to exit.')
      @ 10,20 SAY 'Checkpoint   ' GET XCHKDESC PICTURE '&EXCLAM' VALID OKCPNTHIST(XCHKDESC,'2')
      @ 11,20 SAY 'Bar Code     ' GET XBARCODE PICTURE '!!!!!!' VALID OKCPNTHIST(XBARCODE,'1')
      SET COLOR TO WHILIT
```

```
@ 12,17 SAY "Enter a Checkpoint of '**' for all checkpoints."
SET COLOR TO WHILIT
@ 14,20 SAY 'Starting Date ' GET X0DATE VALID OKDATE(X0DATE,19)
@ 14,48 SAY 'Time ' GET X0TIME PICTURE '99:99' VALID OKHISTTIME(X0TIME,1)
@ 15,20 SAY 'Ending Date   ' GET X1DATE VALID OKDATE(X1DATE,19)
@ 15,48 SAY 'Time ' GET X1TIME PICTURE '99:99' VALID OKHISTTIME(X1TIME,1)
@ 17,26 SAY 'Incidents only (Y/N) ? ' GET INCID_ONLY PICTURE 'Y'
SET KEY -1 TO GENWIND
READ
SET KEY -1
IF LASTKEY() = 27
   EXIT
ENDIF
IF LEN(XBARCODE)<6
   XBARCODE=XBARCODE+SPACE(6-LEN(XBARCODE))
ENDIF
P0DATE=PKDATE(X0DATE)
P1DATE=PKDATE(X1DATE)
P0TIME=PKTIME(X0TIME)
P1TIME=PKTIME(X1TIME)
IF P0DATE>P1DATE
   MESGWAIT(19,'Starting date is later than ending date.')
   LOOP
ENDIF
IF P0DATE=P1DATE.AND.P0TIME>P1TIME
   MESGWAIT(19,'Starting time is later than ending time.')
   LOOP
ENDIF
MESG(19,'Please wait while processing files...')
DO CASE
CASE XBARCODE='**'
   SELECT CH
   SET ORDER TO 3
   SET SOFTSEEK ON
   SEEK P0DATE+P0TIME
   SET SOFTSEEK OFF
   IF OKSEEKS().AND..!EOF()
      EXIT
   ENDIF
   MESGWAIT(19,'No checkpoint activity for this time period.')
OTHERWISE
   SELECT BC
   IF XWINDREC<>0
      GO XWINDREC
      XSERNUM=SERNUM
      XBARCODE=BARCODE
      XCHKDESC=DESC
   ELSE
      SET ORDER TO 1
      SEEK XBARCODE
      IF XBARCODE=BARCODE .AND. !EOF()
         XSERNUM=SERNUM
         XBARCODE=BARCODE
         XCHKDESC=DESC
      ELSE
         MESGWAIT(19,'Unable to find this checkpoint in the bar code file.')
         LOOP
```

```
            ENDIF
          ENDIF
          SELECT CH
          SET ORDER TO 1
          SET SOFTSEEK ON
          SEEK XSERNUM+PODATE+POTIME
          SET SOFTSEEK OFF
          IF XSERNUM=BARCODE.AND.OKSEEK$().AND.!EOF()
              EXIT
          ENDIF
          MESGWAIT(19,'No activity for bar code '+TRIM(XBARCODE)+' for this time period.')
        ENDCASE
      ENDDO
      IF LASTKEY() = 27
        EXIT
      ENDIF
      STORE 0 TO XPG,LMAX,L
      YPRINTIT=' '
      SET DELIMITERS ON
      SELECT CH
      SET ORDER TO 1
      IF XBARCODE='**'
        DO ALLCHIST
      ELSE
        DO ONECHIST
      ENDIF
      SET DEVICE TO SCREEN
      IF (L = 0)
        CLR(19)
        MESGWAIT(23,'No incidents occurred at this checkpoint over this time period.')
      ELSE
        IF YPRINTIT
          EJECT
        ELSE
          IF LASTKEY()<>27
            MESG(24,'End of report.  Press any key to continue.')
            DO WHILE INKEY() = 0
            ENDDO
          ENDIF
        ENDIF
      ENDIF
      CLEAR
      HEADER('CHECKPOINT HISTORY REPORT',-1)
      MESG(7,'This report displays checkpoint activity.')
      MESG(8,'for a designated time period.')
ENDDO
CLOSE DATABASES
RETURN
PROCEDURE ALLCHIST
SELECT BC
SET ORDER TO 3
GO TOP
XSERNUM=SPACE(6)
DO WHILE !EOF()
  IF SERNUM<>XSERNUM
    XSERNUM=SERNUM
    SELECT CH
```

```
      SET SOFTSEEK ON
      SEEK BC->SERNUM+PODATE+POTIME
      SET SOFTSEEK OFF
      IF BC->SERNUM=BARCODE.AND..!EOF()
         IF OKSEEKS()
            XSERNUM=BC->SERNUM
            XBARCODE=BC->BARCODE
            XCHKDESC=BC->DESC
            DO ONECHIST
            L=L+1
         ENDIF
      ENDIF
   ENDIF
   IF LASTKEY()=27
      EXIT
   ENDIF
   SELECT BC
   SKIP
ENDDO
RETURN
PROCEDURE ONECHIST
SELECT CH
CHANGED_POINT=.T.
DO WHILE BARCODE=XSERNUM.AND.OKSEEKS().AND.!EOF()
   XXXDATE  = UPKDATE(DATE)
   XXXTIME  = UPKTIME(TIME)
   XXXGUARD = GNUM
   SELECT G
   SEEK CH->GNUM
   IF .NOT. EOF()
      XXXGNAME=GNAME
   ELSE
      XXXGNAME='Undefined'
   ENDIF
   SELECT CH
   XREC = RECNO()
   SET ORDER TO 2
   SKIP
   IF OKSEEKS().AND.!EOF()
      IF (INCID_ONLY='N') .OR. (XXXGUARD=GNUM.AND.LEN(TRIM(BARCODE))=2)
         IF (L = 0)
            YPRINTIT=' '
            IF !SORP()
               EXIT
            ENDIF
            DO CPNTHEAD
         ENDIF
         IF (L>LMAX) .OR. (CHANGED_POINT.AND.L>=LMAX-1.AND.L<>0)
            IF ! CHNGPAGE('CPNTHEAD')
               EXIT
            ENDIF
         ENDIF
         IF CHANGED_POINT
            @ L,0 SAY 'Checkpoint:  '+TRIM(XCHKDESC)
            L=L+1
            CHANGED_POINT=.F.
```

```
      ENDIF
     ENDIF
    ENDIF
    XICODEF = .F.
    DO WHILE XXXGUARD=GNUM.AND.LEN(TRIM(BARCODE))=2.AND.OKSEEKS().AND.!EOF()
      IF L>LMAX
        IF ! CHNGPAGE('CPNTHEAD')
          EXIT
        ENDIF
      ENDIF
      XICODEF=.T.
      IF BARCODE = 'ZZ'
        SKIP
        XXXDATE=UPKDATE(DATE)
        XXXTIME=UPKTIME(TIME)
        SELECT CH
        SEEK CH->BARCODE
      ELSE
        XXXDATE=UPKDATE(DATE)
        XXXTIME=UPKTIME(TIME)
        SELECT EX
        SEEK TRIM(CH->BARCODE)
      ENDIF
      @ L, 0 SAY XXXDATE
      @ L,13 SAY XXXTIME
      @ L,27 SAY XXXGNAME
      IF !EOF()
        IF ALIAS()='EX'
          @ L,59 SAY SUBSTR(EDESC,1,15)
        ELSE
          @ L,59 SAY SUBSTR(COMMENT,1,15)
        ENDIF
      ELSE
        @ L,59 SAY 'Undefined'
      ENDIF
      L=L+1
      SELECT CH
      SKIP
    ENDDO
    IF LASTKEY()=27
      EXIT
    ENDIF
    IF !XICODEF .AND. INCID_ONLY = 'N'
      @ L, 0 SAY XXXDATE
      @ L,13 SAY XXXTIME
      @ L,27 SAY XXXGNAME
      L=L+1
    ENDIF
    SET ORDER TO 1
    GO XREC
    SKIP
  ENDDO
RETURN
PROCEDURE CPNTHEAD
IF ! YPRINTIT
  CLEAR
ENDIF
```

```
   XPG = XPG + 1
   @ 1, 0 SAY DATE()
   @ 1,40-(INT(LEN(HEAD)/2)) SAY HEAD
   @ 1,71 SAY 'Page: '+STR(XPG,3)
   @ 2, 0 SAY TIME()
   @ 2,28 SAY 'CHECKPOINT HISTORY REPORT'
   @ 3,25 SAY 'The TourWatch Manager (C) 1989'
   IF ! YPRINTIT
      SET COLOR TO &BLUELIT
   ENDIF
   @ 5,0 SAY 'Begin Date : '+DTOC(X0DATE)
   @ 6,0 SAY 'End Date   : '+DTOC(X1DATE)
   @ 8,0 SAY 'Check      Check'
   @ 9,0 SAY 'Date       Time       Guard Name                Incident'
   IF ! YPRINTIT
      @ 10,0 SAY SLINE
      SET COLOR TO &HILIT
   ELSE
      @ 10,0 SAY REPLICATE('-',80)
   ENDIF
   L = 11
   RETURN
   FUNCTION CKCPNTHIST
   PARAMETER F0,F1
   IF INKEY()=269
      RETURN .T.
   ENDIF
   IF LASTKEY()= 5
      IF F1 = '1'
         XBARCODE=SPACE(6)
         @ 11,36 SAY XBARCODE
         RETURN .T.
      ELSE
         RETURN .F.
      ENDIF
   ENDIF
   IF F1='2'
      IF AT('',XCHKDESC)<>0 .OR. (UPPER(XCHKDESC)='ALL CHECKPOINTS'.AND.AT('',XBARCODE)<>0)
         XBARCODE='**'
         XCHKDESC='ALL CHECKPOINTS'
         @ 10,36 SAY XCHKDESC
         KEYBOARD XBARCODE+CHR(13)+CHR(269)
         RETURN .T.
      ENDIF
   ENDIF
   IF F1='1'
      IF AT('',XCHKDESC)<>0 .OR. (AT('ALL CHECKPOINTS',UPPER(XCHKDESC))<>0.AND.AT('',XBARCODE)<>0)
         XBARCODE='**'
         XCHKDESC='ALL CHECKPOINTS'
         @ 10,36 SAY XCHKDESC
         @ 11,36 SAY XBARCODE
         RETURN .T.
      ENDIF
   ENDIF
   IF EMPTY(F0)
      IF F1 ='2'
```

```
            XCHKDESC = SPACE(15)
            RETURN .T.
          ELSE
            IF EMPTY(XBARCODE)
              ERRMESG(19,'Missing bar code.')
              MESG(19,'F2 to display CHECKPOINTS.  ESC to exit.')
              RETURN .F.
            ELSE
              SELECT BC
              SET ORDER TO 1
              SEEK XBARCODE
              XCHKDESC = DESC
              @ 10,36 SAY DESC
              RETURN .T.
            ENDIF
          ENDIF
        ENDIF
        IF F1 = '1'
          F0 = SUBSTR(LTRIM(F0)+SPACE(6),1,6)
          XBARCODE = F0
          @ 11,36 SAY F0
        ELSE
          F0 = SUBSTR(LTRIM(F0)+SPACE(15),1,15)
          XCHKDESC = F0
          @ 10,36 SAY F0
        ENDIF
        SELECT BC
        SET ORDER TO &F1
        IF XWINDREC = 0
          SEEK UPPER(F0)
          IF F1 = '2' .AND. ! EMPTY(XBARCODE) .AND. ! EOF()
            DO WHILE UPPER(F0) = UPPER(DESC) .AND. BARCODE <> XBARCODE .AND. !EOF()
              SKIP
            ENDDO
            IF UPPER(F0)<>UPPER(DESC) .OR. EOF()
              SEEK UPPER(F0)
            ENDIF
          ENDIF
        ELSE
          GO XWINDREC
          XWINDREC = 0
        ENDIF
        IF EOF()
          IF F1='1'
            ERRMESG(19,'Invalid bar code.')
          ELSE
            ERRMESG(19,'Invalid checkpoint.')
          ENDIF
          MESG(19,'F2 to display CHECKPOINTS.  ESC to exit.')
          RETURN .F.
        ENDIF
        XBARCODE = BARCODE
        XCHKDESC = DESC
        @ 10,36 SAY XCHKDESC
        @ 11,36 SAY BARCODE
        IF F1='2'
          KEYBOARD XBARCODE+CHR(13)+CHR(255)
```

```
ENDIF
RETURN .T.

* IHISTRPT.PRG
* COPYRIGHT 1989, 1988 COMPUTER SYSTEMS DESIGN, INC.

SET INTEN OFF
SET DELIM ON
CLEAR
HEADER('INCIDENT HISTORY REPORT',-1)
MESG(7,'This report displays occurrences of')
MESG(8,'incidents for a designated time period.')
MESG(11,'Please wait while setting up files...')
CLOSE DATABASES
SELECT 1
FUSE('CHISTORY/CH/CHIST1X')
IF EOF()
   MESGWAIT(19,'There is no history of any incident.')
   CLOSE DATABASES
   RETURN
ENDIF
SELECT 2
FUSE('EXCEPT/EX/EXCX')
SELECT 3
FUSE('BARCODE/BC/BNUMX,BC2X')
IF EOF()
   MESGWAIT(19,'There are no checkpoints defined.')
   CLOSE DATABASES
   RETURN
ENDIF
SELECT 4
FUSE('GUARD/GRD/GRDX')
SELECT 5
FUSE('CHISTORY/CH/CHIST1X')
DO WHILE .T.
   XICODE=SPACE(2)
   X0DATE = CTOD('  /  /  ')
   X1DATE = CTOD('  /  /  ')
   X0TIME = '00:00'
   X1TIME = '23:59'
   DO WHILE .T.
      CLR(10)
      SET COLOR TO &LOLIT
      @ 13,22 SAY "Enter '**' for all incident codes."
      SET COLOR TO &HILIT
      MESG(19,'F2 to display INCIDENT CODES.  ESC to exit.')
      @ 12,27 SAY 'Incident Code ' GET XICODE PICTURE '!!' VALID OKICODE(1)
      @ 15,20 SAY 'Starting Date ' GET X0DATE VALID OKDATE(X0DATE,19)
      @ 15,48 SAY 'Time ' GET X0TIME PICTURE '99:99' VALID OKHISTTIME(X0TIME,2)
      @ 16,20 SAY 'Ending Date  ' GET X1DATE VALID OKDATE(X1DATE,19)
      @ 16,48 SAY 'Time ' GET X1TIME PICTURE '99:99' VALID OKHISTTIME(X1TIME,2)
      SET KEY -1 TO GENWIND
      READ
      SET KEY -1
      CLR(19)
      IF LASTKEY() = 27
```

```
      EXIT
    ENDIF
    PODATE=PKDATE(X0DATE)
    P1DATE=PKDATE(X1DATE)
    POTIME=PKTIME(X0TIME)
    P1TIME=PKTIME(X1TIME)
    IF PODATE>P1DATE
      MESGWAIT(19,'Starting date is later than ending date.')
      LOOP
    ENDIF
    IF PODATE=P1DATE.AND.POTIME>P1TIME
      MESGWAIT(19,'Starting time is later than ending time.')
      LOOP
    ENDIF
    MESG(19,'Please wait while processing files...')
    SELECT CH
    SET ORDER TO 1
    DO CASE
    CASE XICODE='**'
      SELECT EX
      GO TOP
      SET SOFTSEEK ON
      DO WHILE !EOF()
        SELECT CH
        SEEK EX->ECODE+SPACE(4)+PODATE+POTIME
        IF BARCODE=EX->ECODE.AND.!EOF()
          IF OKSEEKS()
            EXIT
          ENDIF
        ENDIF
        SELECT EX
        SKIP
      ENDDO
      SET SOFTSEEK OFF
      IF EOF()
        MESGWAIT(19,'No history of any incidents for this time period.')
        LOOP
      ELSE
        EXIT
      ENDIF
    OTHERWISE
      SET SOFTSEEK ON
      SEEK XICODE+SPACE(4)+PODATE+POTIME
      SET SOFTSEEK OFF
      IF BARCODE=XICODE.AND.OKSEEKS().AND.!EOF()
        EXIT
      ENDIF
      MESGWAIT(19,'No history for incident code '+XICODE+' during this time period.')
    ENDCASE
  ENDDO
  IF XICODE<>'ZZ'
    XEDESC=SUBSTR(EX->EDESC,1,15)
  ENDIF
  IF LASTKEY()=27
    EXIT
  ENDIF
  YPRINTIT = ' '
```

```
      STORE 0 TO XPG,LMAX,L
      IF ISOPR()
        LOOP
      ENDIF
      SET DELIMITERS ON
      DO IHISTHEAD
      IF XICODE='**'
        DO ALLIHIST
      ELSE
        DO ONEIHIST
      ENDIF
      SET DEVICE TO SCREEN
      IF YPRINTIT
        EJECT
      ELSE
        IF LASTKEY() <> 27
          MESG(24,'End of report.  Press any key to continue...')
          DO WHILE INKEY() = 0
          ENDDO
        ENDIF
      ENDIF
      CLEAR
      HEADER('INCIDENT HISTORY REPORT',-1)
      MESG(7,'This report displays occurrences of')
      MESG(8,'incidents for a designated time period.')
ENDDO
CLOSE DATABASES
RETURN
PROCEDURE ALLIHIST
SELECT CH
SET ORDER TO 1
SELECT EX
GO TOP
DO WHILE !EOF()
   SELECT CH
   SET SOFTSEEK ON
   SEEK EX->ECODE+SPACE(4)+PUDATE+PUTIME
   SET SOFTSEEK OFF
   IF BARCODE=EX->ECODE.AND. OKSEEKS().AND. !EOF()
     IF EX->ECODE<>'ZZ'
       XEDESC=SUBSTR(EX->EDESC,1,15)
     ENDIF
     XICODE=EX->ECODE
     DO ONEIHIST
     L=L+1
   ENDIF
   IF LASTKEY()=27
     EXIT
   ENDIF
   SELECT EX
   SKIP
ENDDO
RETURN
PROCEDURE ONEIHIST
SELECT CH
SET ORDER TO 1
DO WHILE BARCODE=XICODE.AND.OKSEEKS().AND.!EOF()
```

```
XPEDNO=RECNO()
SET ORDER TO
DO WHILE .T.
   IF LEN(TRIM(BARCODE))<>2
      SKIP -1
      IF BARCODE<>'ZZ'
         SKIP
         EXIT
      ENDIF
   ELSE
      SKIP -1
   ENDIF
ENDDO
SET ORDER TO 1
XBARCODE=SPACE(6)
XSERNUM=SPACE(6)
IF EOF()
   XCHKPOINT='No reference'
ELSE
   XSERNUM=CH->BARCODE
   SELECT BC
   SET ORDER TO 2
   SEEK XSERNUM
   IF !EOF()
      XBARCODE=BARCODE
      XCHKPOINT=SUBSTR(DESC,1,15)
   ELSE
      XBARCODE=CH->BARCODE
      XCHKPOINT='Undefined'
   ENDIF
ENDIF
SELECT CH
SET ORDER TO 1
GO XPEDNO
XDATE=UPKDATE(DATE)
XTIME=UPKTIME(TIME)
SELECT GRD
SEEK CH->GNUM
IF EOF()
   XGNAME='Undefined'
ELSE
   XGNAME=GNAME
ENDIF
SELECT CH
IF BARCODE='ZZ'
   SET ORDER TO
   SKIP
   SELECT CH
   SEEK CH->BARCODE
   IF EOF()
      XEDESC='Undefined'
   ELSE
      XEDESC=SUBSTR(COMMENT,1,15)
   ENDIF
   SELECT CH
   SKIP -1
```

```
    ENDIF
    IF L > LMAX
      IF ! CHNGPAGE('IHISTHEAD')
        EXIT
      ENDIF
    ENDIF
    DO IHISTDATA
    L=L+1
    SELECT CH
    SET ORDER TO 1
    SKIP
ENDDO
RETURN
PROCEDURE IHISTHEAD
IF ! YPRINTIT
   CLEAR
ENDIF
XPG = XPG + 1
@ 1, 0 SAY DATE()
@ 1,40-(INT(LEN(HEAD)/2)) SAY HEAD
@ 1,71 SAY 'Page: '+STR(XPG,3)
@ 2, 0 SAY TIME()
@ 2,29 SAY 'INCIDENT HISTORY REPORT'
@ 3,25 SAY 'The TourWatch Manager (C) 1990'
IF ! YPRINTIT
   SET COLOR TO &BLUELIT
ENDIF
@ 5, 0 SAY 'Begin Date : '+DTOC(X0DATE)
@ 6, 0 SAY 'End Date   : '+DTOC(X1DATE)
@ 8, 0 SAY 'Check    Check                           Bar'
@ 9, 0 SAY 'Date     Time  Guard Name                Code   Checkpoint    Incident'
IF ! YPRINTIT
   @ 10,0 SAY SLINE
   SET COLOR TO &HILIT
ELSE
   @ 10,0 SAY REPLICATE('-',80)
ENDIF
L = 11
RETURN
PROCEDURE IHISTDATA
@ L, 0 SAY XDATE
@ L, 9 SAY XTIME
@ L,15 SAY XGNAME
@ L,41 SAY XBARCODE
@ L,49 SAY XCHKPOINT
@ L,65 SAY XEDESC
RETURN
FUNCTION OKSEEKS
DO CASE
CASE PODATE=P1DATE
   IF DATE=PODATE.AND.TIME>=POTIME.AND.TIME<=P1TIME
      RETURN .T.
   ENDIF
CASE DATE=PODATE
   IF TIME>=POTIME
      RETURN .T.
   ENDIF
```

```
CASE DATE=P1DATE
  IF TIME<=P1TIME
    RETURN .T.
  ENDIF
CASE DATE>PODATE.AND.DATE<P1DATE
  RETURN .T.
ENDCASE
RETURN .F.

* DHISTRPT.PRG
* COPYRIGHT 1999, 1998 COMPUTER SYSTEMS DESIGN, INC.

SET INTEN OFF
SET DELIM ON
CLEAR
HEADER('DETAILED HISTORY REPORT',-1)
MESG(7,'This report provides a chronological listing')
MESG(8,'of activity by guard for a designated time period.')
MESG(10,'Please wait while setting up files...')
CLOSE DATABASES
SELECT 1
FUSE('DHISTORY/DH/DHIST1X,DHIST2X,DHIST3X')
IF EOF()
  CLOSE DATABASES
  MESGWAIT(19,'There is no history to print.')
  RETURN
ENDIF
SELECT 2
FUSE('BARCODE/BC/BNUMX,BC2X')
IF EOF()
  CLOSE DATABASES
  MESGWAIT(19,'There are no checkpoints defined.')
  RETURN
ENDIF
SELECT 3
FUSE('EXCEPT/EX/EXCX')
SELECT 4
FUSE('GUARD/GN/GRDX,GRDX1')
SELECT 5
FUSE('DHISTORY/DH/DHIST1X')
EXCLAM=REPLICATE('X',24)
DO WHILE .T.
  XGRDNUM=SPACE(6)
  XGRDNAME=SPACE(24)
  XODATE = CTOD('  /  /  ')
  X1DATE = CTOD('  /  /  ')
  XOTIME = '00:00'
  X1TIME = '23:59'
  DO WHILE .T.
    CLR(9)
    XWINDREC=0
    @ 12,20 SAY 'Guard Name    ' GET XGRDNAME PICTURE '&EXCLAM' VALID OKGUARD(XGRDNAME,'2','DHISTRPT')
    @ 13,20 SAY 'Guard ID      ' GET XGRDNUM PICTURE '!!!!!!' VALID OKGUARD(XGRDNUM,'1','DHISTRPT')
    SET COLOR TO &LOLIT
    @ 14,20 SAY "Enter a Guard Name of '**' for all guards."
    SET COLOR TO &HILIT
```

```
@ 16,20 SAY 'Starting Date ' GET X0DATE VALID OKDATE(X0DATE,19)
@ 16,48 SAY 'Time ' GET X0TIME PICTURE '99:99' VALID OKHISTTIME(X0TIME,3)
@ 17,20 SAY 'Ending Date   ' GET X1DATE VALID OKDATE(X1DATE,19)
@ 17,48 SAY 'Time ' GET X1TIME PICTURE '99:99' VALID OKHISTTIME(X1TIME,3)
MESG(19,'F2 to display GUARDS.  ESC to exit.')
SET KEY -1 TO GENWIND
READ
SET KEY -1
IF LASTKEY() = 27
   EXIT
ENDIF
IF XWINDREC<>0
   GO XWINDREC
   XGRDNAME=GN->GNAME
   XGRDNUM=GN->GNUM
ENDIF
IF LEN(XGRDNUM)<6
   XGRDNUM=XGRDNUM+SPACE(6-LEN(XGRDNUM))
ENDIF
P0DATE=PKDATE(X0DATE)
P1DATE=PKDATE(X1DATE)
P0TIME=PKTIME(X0TIME)
P1TIME=PKTIME(X1TIME)
IF P0DATE > P1DATE
   MESSWAIT(19,'Starting date is later than ending date.')
   LOOP
ENDIF
IF P0DATE=P1DATE .AND. P0TIME>P1TIME
   MESSWAIT(19,'Starting time is later than ending time.')
   LOOP
ENDIF
MESG(19,'Please wait while processing files...')
SELECT GH
DO CASE
CASE XGRDNUM='**'
   SET ORDER TO 3
   SET SOFTSEEK ON
   SEEK P0DATE+P0TIME
   SET SOFTSEEK OFF
   IF OKSEEKS() .AND. !EOF()
      EXIT
   ENDIF
   MESSWAIT(19,'No activity for this period.')
OTHERWISE
   SET ORDER TO 2
   SET SOFTSEEK ON
   SEEK XGRDNUM+P0DATE+P0TIME
   SET SOFTSEEK OFF
   IF GNUM=XGRDNUM.AND.OKSEEKS().AND.!EOF()
      EXIT
   ENDIF
   MESSWAIT(19,'Guard '+TRIM(XGRDNUM)+' not active during this period.')
ENDCASE
ENDDO
IF LASTKEY() = 27
   EXIT
```

```
    ENDIF
    STORE 0 TO XPG,L,LMAX
    YPRINTIT = ' '
    IF ISCRP()
      LOOP
    ENDIF
    IF YPRINTIT
      SET DEVICE TO PRINT
    ENDIF
    SET DELIMITERS ON
    SELECT CH
    DO DHISTHEAD
    IF XGRDNUM='**'
      DO ALLDHIST
    ELSE
      DO ONEDHIST
    ENDIF
    SET DEVICE TO SCREEN
    IF YPRINTIT
      EJECT
    ELSE
      IF LASTKEY()<>27
        MESS(24,'End of report.  Press any key to continue.')
        DO WHILE INKEY() = 0
        ENDDO
      ENDIF
    ENDIF
    CLEAR
    HEADER('DETAILED HISTORY REPORT',-1)
    MESS(7,'This report provides a chronological listing')
    MESS(8,'of activity by guard for a designated time period.')
ENDDO
CLOSE DATABASES
RETURN
PROCEDURE ALLDHIST
SELECT CH
SET ORDER TO 2
SELECT GN
GO TOP
DO WHILE !EOF()
  XGRDNUM=GNUM
  XGRDNAME=GNAME
  SELECT CH
  SET SOFTSEEK ON
  SEEK GN->GNUM+P(DATE+P(TIME
  SET SOFTSEEK OFF
  IF XGRDNUM=GNUM.AND.!EOF()
    IF DKSEEKS()
      DO ONEDHIST
      L=L+1
    ENDIF
  ENDIF
  SELECT GN
  SKIP
  IF LASTKEY()=27
    EXIT
```

```
    ENDIF
  ENDDO
  RETURN
PROCEDURE ONEDHIST
CHANGED_GUARD=.T.
DO WHILE GNUM=XGRDNUM.AND.OKSEEKS().AND.!EOF()
  DO WHILE GNUM=XGRDNUM.AND.DATE>=P0DATE.AND.DATE<=P1DATE.AND.LEN(TRIM(BARCODE))=2.AND.!EOF()
    SKIP
  ENDDO
  SELECT BC
  SET ORDER TO 2
  SEEK CH->BARCODE
  IF !EOF()
    XBARCODE=BARCODE
    XCHKPOINT=DESC
  ELSE
    XBARCODE=CH->BARCODE
    XCHKPOINT='Undefined'
  ENDIF
  SELECT CH
  SKIP
  DO CASE
  CASE LEN(TRIM(BARCODE))<>2.OR.EOF()
    XINCIDENT=SPACE(15)
    SKIP -1
    IF (L>LMAX) .OR. (CHANGED_GUARD .AND. L>=LMAX-2)
      IF !CHNGPAGE('DHISTHEAD')
        EXIT
      ENDIF
    ENDIF
    DO DHISTDATA
    CHANGED_GUARD=.F.
    SKIP
  OTHERWISE
    DO WHILE LEN(TRIM(BARCODE))=2.AND.OKSEEKS().AND.!EOF()
      IF BARCODE='ZZ'
        SKIP
        SELECT OH
      ELSE
        SELECT EX
      ENDIF
      SEEK TRIM(CH->BARCODE)
      IF !EOF() .AND. ALIAS()='OH'
        XINCIDENT=SUBSTR(COMMENT,1,15)
      ELSE
        IF !EOF() .AND. ALIAS()='EX'
          XINCIDENT=SUBSTR(EDESC,1,15)
        ELSE
          XINCIDENT='Undefined'
        ENDIF
      ENDIF
      SELECT CH
      IF (L>LMAX) .OR. (CHANGED_GUARD .AND. L>=LMAX-2)
        IF !CHNGPAGE('DHISTHEAD')
          EXIT
        ENDIF
      ENDIF
```

```
            DO DHISTDATA
            CHANGED_GUARD=.F.
          ENDIF
        ENDDO
        IF LASTKEY()=27
          EXIT
        ENDIF
      ENDCASE
    ENDDO
    RETURN
    PROCEDURE DHISTHEAD
    IF !YPRINTIT
       CLEAR
    ENDIF
    XPG = XPG + 1
    @ 1, 0 SAY DATE()
    @ 1,40-(INT(LEN(HEAD)/2)) SAY HEAD
    @ 1,71 SAY 'Page: '+STR(XPG,3)
    @ 2, 0 SAY TIME()
    @ 2,29 SAY 'DETAILED HISTORY REPORT'
    @ 3,25 SAY 'The Tourwatch Manager (C) 1999'
    IF !YPRINTIT
       SET COLOR TO &BLUELIT
    ENDIF
    @ 5, 0 SAY 'Begin Date : '+DTOC(X0DATE)
    @ 6, 0 SAY 'End Date   : '+DTOC(X1DATE)
    @ 8, 0 SAY '                                   Bar'
    @ 9, 0 SAY '           Date    Time    Code    Checkpoint       Incident'
    IF !YPRINTIT
      @ 10,0 SAY SLINE
      SET COLOR TO &HILIT
    ELSE
      @ 10,0 SAY REPLICATE('-',80)
    ENDIF
    L = 11
    RETURN
    PROCEDURE DHISTDATA
    IF CHANGED_GUARD
      @ L,0 SAY 'Guard Name:  '+TRIM(XGRDNAME)
      L=L+1
    ENDIF
    @ L,13 SAY CTOD(UP&DATE(DATE))
    @ L,22 SAY UP&TIME(TIME)
    @ L,30 SAY XBARCODE
    @ L,39 SAY XCHKPOINT
    @ L,59 SAY XINCIDENT
    L=L+1
    RETURN

* GUARD.PRG
    * COPYRIGHT 1999, 1988 COMPUTER SYSTEMS DESIGN, INC.

DECLARE GRD[200],GRNAME[200],STAT[200]
    MESS(0,LBLOCK+' GUARD MAINTENANCE '+RBLOCK)
    CLR(5)
    MESS(10,'The list of guards may be displayed in order of Guard Id #')
    MESS(11,'or alphabetically by Guard Name.')
```

```
MESG(24,'Use the '+CHR(27)+' or '+CHR(26)+' keys to position cursor.
   Press Enter '+CHR(17)+CHR(196)+CHR(217)+' to select')
XRES = 1
SET INTEN ON
SET DELIM ON
SET COLOR TO &MENU
DO WHILE .T.
   SET MESSAGE TO
   @ 14.13 PROMPT 'Name Order'
   @ 14.35 PROMPT ' ID Order '
   @ 14.57 PROMPT '   Quit   '
   MENU TO XRES
   IF LASTKEY() <> 27
      EXIT
   ENDIF
ENDDO
SET INTEN OFF
SET COLOR TO &HILIT
IF (XRES = 3)
   CLEAR
   CLOSE DATABASES
   RETURN
ENDIF
SET DELIMITERS OFF
CLR(1)
MESG(10,'Please wait while setting up files...')
CLOSE DATABASES
FUSE('GUARD/GN/GRDX,GRDX1')
SELECT 2
FUSE('GHISTORY/GH/GHIST1X')
SELECT GN
IF XRES = 1
   SET ORDER TO 2
   GO TOP
ENDIF
XNB = 0
DO WHILE .NOT. EOF()
   XNB = XNB+1
   GRD[XNB] = GNUM
   GRNAME[XNB]=GNAME
   STAT[XNB]=.T.
   SKIP
ENDDO
@ 2,00 SAY 'Line  ID        Name'
@ 3,00 SAY LINE(38)
@ 2,40 SAY 'Line  ID        Name'
@ 3,40 SAY LINE(38)
XHASMODIFY = .F.
XPGTOP = 1
XPGLD = 1
DO DISPGUARD WITH 1
XADD = (XNB = 0)
IF XADD
   CLR(23)
   DO GETGRD WITH XNB + 1
ENDIF
```

```
SET MESSAGE TO
XRES = 1
DO WHILE .T.
   XADD = .F.
   CLR(23)
   @ 23,0 SAY LINE(80)
   SET KEY 3 TO
   SET KEY 18 TO
   SET INTENSITY ON
   @ 24,00 PROMPT ' Add '
   @ 24,14 PROMPT 'Change'
   @ 24,29 PROMPT 'Delete'
   @ 24,44 PROMPT 'NextPg'
   @ 24,60 PROMPT 'PrevPg'
   @ 24,74 PROMPT ' Quit '
   MENU TO XRES
   IF LASTKEY() = 3
      XRES = 4
   ENDIF
   IF LASTKEY() = 18
      XRES = 5
   ENDIF
   SET KEY 3 TO NULL_FUNC
   SET KEY 18 TO NULL_FUNC
   SET INTENSITY OFF
   DO CASE
   CASE XRES = 1
      IF XNB >= 200
         ERRMESS(24,'No more room for new guard definition.')
         LOOP
      ENDIF
      XADD = .T.
      XPOLD = XPSTOP
      DO WHILE (XPSTOP + 16) <= (XNB + 1)
         XPSTOP = XPSTOP + 16
      ENDDO
      IF XPOLD <> XPSTOP
         DO DISPGUARD WITH XPSTOP
      ENDIF
      DO SETGRD WITH XNB + 1
   CASE XRES = 2
      DO WHILE .T.
         @ 24,0
         XRES1 = 0
         SET DELIMITERS ON
         @ 24,20 SAY 'What LINE do you want to change?' GET XRES1 PICTURE '@Z 999'
         READ
         SET DELIMITERS OFF
         IF OKLNUM(XRES1,25)
            EXIT
         ENDIF
      ENDDO
      IF XRES1 = 0
         LOOP
      ENDIF
      IF !STAT[XRES1]
         LOOP
```

```
    ENDIF
    SELECT GN
    DO SETGRD WITH XRES1
  CASE XRES = 3
    DO WHILE .T.
      @ 24,0
      XRES1 = 0
      SET DELIMITERS ON
      @ 24,20 SAY 'What LINE do you want to delete?' GET XRES1 PICTURE '@Z 999'
      READ
      SET DELIMITERS OFF
      IF OKLNUM(XRES1,35)
        EXIT
      ENDIF
    ENDDO
    IF XRES1 = 0
      LOOP
    ENDIF
    IF ! STAT(XRES1)
      LOOP
    ENDIF
    SELECT G4
    SEEK GRD(XRES1)
    IF !EOF()
      ERRMESS(24,'Guard '+TRIM(GRD(XRES1))+' is in history and may not be deleted.')
      SELECT GN
      LOOP
    ENDIF
    SELECT GN
    XR = (XRES1-1) % 18 + 4
    XC = (INT((XRES1 - 1)/18)*40 % 80)
    SET COLOR TO &INV&9
    @ XR,XC SAY STR(XRES1,4)
    @ XR,XC+6 SAY GRD(XRES1)
    @ XR,XC+16 SAY GRNAME(XRES1)
    IF CONFDEL(24,'Delete this guard (Y/N)? ')
      SET COLOR TO &HILIT
      XGRMODIFY = .T.
      @ XR,XC SAY STR(XRES1,4)
      @ XR,XC+6 SAY SPACE(34)
      STAT(XRES1) = .F.
    ELSE
      SET COLOR TO &HILIT
      @ XR,XC SAY STR(XRES1,4)+' '+GRD(XRES1)+' '+GRNAME(XRES1)
    ENDIF
  CASE XRES = 4
    IF XPGTOP + 36 <= XN9
      XPGTOP = XPGTOP + 36
      DO DISPGUARD WITH XPGTOP
    ENDIF
  CASE XRES = 5
    IF XPGTOP - 36 > 0
      XPGTOP = XPGTOP - 36
      DO DISPGUARD WITH XPGTOP
    ENDIF
  CASE XRES = 6
```

```
      IF XHASMODIFY
        @ 24,0
        XRES1 = 'YES'
        SET ESCAP OFF
        SET DELIM ON
        @ 24,12 SAY 'Do you wish to save the changes you have made? '
          GET XRES1 PICTURE '@K !!!' VALID !EMPTY(XRES1)
        READ
        SET ESCAP ON
        SET DELIM OFF
        IF XRES1 = 'YES'
          CLS(1)
          MESS(10,'Please wait while updating...')
          SELECT GN
          LOCKF('GUARD')
          DELETE ALL
          FOR I=1 TO XNB
            IF STAT[I] .AND. !EMPTY(GRD[I])
              APPEND BLANK
              REPLACE GNUM WITH GRD[I]
              REPLACE GNAME WITH GRNAME[I]
            ENDIF
          NEXT
          UNLOCK
        ENDIF
      ENDIF
      EXIT
    ENDCASE
  ENDDO
PROCEDURE GETGRD
PARAMETER F0
IF F0 = 0
  RETURN
ENDIF
IF (F0 < 0)
  ERRMESS(24,'Invalid line #.')
ENDIF
IF (F0 > XBGTOP)

ERRMESS(24,'Line # not on this page.')
  RETURN
ENDIF
IF XADD
  XNB = XNB + 1
  GRD[XNB] = SPACE(6)
  GRNAME[XNB] = SPACE(24)
  STAT[XNB] = .T.
ENDIF
MESS(24,'ESC to cancel entry.')
XR = (F0 -1)%19+6
XC = (INT((F0 -1)/19)*40)+20
SET INTENSITY ON
@ XR,10 SAY STR(F0,4)
XGRD = GRD[F0]
XGRNAME = GRNAME[F0]
```

```
SELECT GN
  IF XADD
    @ XR,XC+6 GET YGRD PICTURE '!!!!!!!' VALID OKNEWGUARD()
  ENDIF
  @ XR,XC-14 GET YGRNAME VALID OKGNAME()
  READ
  SET INTENSITY OFF
  LK = LASTKEY()
  IF LK = 27 .AND. XADD
    XNG = XNG -1
    XPGTOP = XPOLD
  ENDIF
  IF LK <> 27
    IF (GRDIF0) <> YGRD) .OR. (GRNAMEIF0) <> YGRNAME)
      XHASMODIFY = .T.
      GRDIF0) = YGRD
      GRNAMEIF0) = YGRNAME
    ENDIF
  ENDIF
ENDIF
DO DISPGUARD WITH XPGTOP
RETURN
PROCEDURE DISPGUARD
PARAMETER XPTOP
XPAGETOP = XPTOP
@ 4,0,22,79 BOX ''
SET DELIMITERS OFF
XR = 3
XC = 0
I = 1
DO WHILE (I < 37) .AND. (XPAGETOP <= XNG)
  XR = XR + 1
  IF XR > 21
    XR = 4
    XC = 40
  ENDIF
  IF ! STAT(XPAGETOP)
    @ XR,XC SAY STR(XPAGETOP,4)
  ELSE
    @ XR,XC SAY STR(XPAGETOP,4)+' '+GRDIXPAGETOP)+' '+GRNAMEIXPAGETOP)
  ENDIF
  I = I+1
  XPAGETOP = XPAGETOP + 1
ENDDO
RETURN
FUNCTION CONFDEL
PARAMETER F0,F1
SET COLOR TO &INVFS
@ F0,0
MESG(F0,F1)
XKEY = 'N'
F2 = 40 - (LEN(F1)/2)
@ F0,F2 GET XKEY PICTURE 'Y'
READ
SET COLOR TO &HILIT
@ F0,0
IF UPPER(XKEY) = 'Y'
```

```
     RETURN .T.
   ELSE
     RETURN .F.
   ENDIF

* ZONE.PRG
* COPYRIGHT 1999, 1998 COMPUTER SYSTEMS DESIGN, INC.

DECLARE B1[200],STAT[200],MJST[200],DESCR[200],SERIAL[200]
MESS(0,LBLOCK+' ZONE MAINTENANCE '+RBLOCK)
CLR(5)
MESS(10,'A list of checkpoints may be displayed in bar code order or')
MESS(11,'alphabetically by their descriptions.')
MESS(24,'Use the '+CHR(27)+' or '+CHR(26)+' keys to position cursor.
    Press Enter '+CHR(17)+CHR(196)+CHR(217)+' to select')
SET COLOR TO &HMENU
SET INTEN ON
SET DELIM ON
XRESO = 1
DO WHILE .T.
   SET MESSAGE TO
   @ 14, 9 PROMPT 'Checkpoint Order'
   @ 14,30 PROMPT ' Bar Code Order '
   @ 14,55 PROMPT '      Quit      '
   MENU TO XRESO
   IF LASTKEY() <> 27
     EXIT
   ENDIF
ENDDO
SET INTEN OFF
SET COLOR TO &HILIT
IF XRESO = 3
   CLEAR
   CLOSE DATABASES
   RETURN
ENDIF
SET DELIM OFF
CLR(1)
MESS(10,'Please wait while setting up files...')
CLOSE DATABASES
FUSE('BARCODE/BC/ZNUM2X,ZNUM3X,SNUMX,BC1X,BC2X')

SELECT 2
FUSE('ZONE/ZN/ZNUM1X,ZNAMX')
SELECT 3
FUSE('CHISTORY/CH/CHIST1X')
SELECT 4
FUSE('RDET/RD/RDETX')
IF XRESO = 2
   SELECT BC
   SET ORDER TO 2
   BC TOP
ENDIF
DO WHILE .T.
   SET INTEN OFF
   SET DELIM ON
```

```
XZNUM = SPACE(6)
XNEW = .T.
CLS(1)
@ 3,00 SAY '      Bar    Must'
@ 3,40 SAY '      Bar    Must'
@ 4,00 SAY 'Line Code   Scan Checkpoint '
@ 4,40 SAY 'Line Code   Scan Checkpoint '
@ 5,00 SAY LINE(39)
@ 5,40 SAY LINE(39)
@ 20,0 SAY LINE(80)
DO WHILE .T.
   XZNUM = XZNUM+SPACE(6-LEN(XZNUM))
   @ 1,0
   @ 1,40 SAY 'Zone Name: '
   MESS(24,'F1 Help   F2 display ZONES    ESC exit')
   @ 1,2 SAY 'Zone Number: ' GET XZNUM PICTURE '!!!!!!' VALID OKZNUM()
   SET KEY -1 TO GENWIND
   READ
   SET KEY -1
   IF LASTKEY() = 27
      CLEAR
      CLOSE DATABASES
      RETURN
   ENDIF
   IF XNEW
      MESS(24,'Enter name for new zone.  ESC to cancel entry.')
      XSDESC = SPACE(15)
   ELSE
      MESS(24,'Change zone name or press ENTER to continue.  ESC to cancel entry.')
      XSDESC = SDESC
   ENDIF
   @ 1,52 GET XSDESC VALID OKSDESC()
   READ
   IF LASTKEY() <> 27
      EXIT
   ENDIF
ENDDO
MESS(10,'Setting up zone file...')
SELECT ZN
LOCKF('ZONE')
IF XNEW
   APPEND BLANK
   REPLACE ZNUM WITH XZNUM
ENDIF
IF (SDESC <> XSDESC)
   REPLACE SDESC WITH XSDESC
ENDIF
UNLOCK
SELECT BC
SEEK XZNUM
XNB=0
DO WHILE ZNUM==XZNUM .AND. !EOF()
   XNB=XNB+1
   BI[XNB]=BARCODE
   DESCR[XNB]=DESC
   MUST[XNB]=MUSTCHECK
   STAT[XNB]=.T.
```

```
   SERIAL(XNB)=VAL(SERNUM)
   SKIP
ENDDO
FOR FXX = XNB+1 TO 200
   SERIAL(FXX) = 0
   NEXT
   XHASMODIFY = .F.
   XPSTOP = 1
   XPOLD = 1
   DO DISPBARC WITH 1
   XADD = (XNB = 0)
   IF XADD
      DO GETLN WITH XNB + 1
   ENDIF
   SET MESSAGE TO
   XRES = 1
   DO WHILE .T.
      XADD = .F.
      @ 24,0
      SET COLOR TO &HMENU
      SET KEY 3 TO
      SET KEY 19 TO
      SET INTEN ON
      @ 24,00 PROMPT '  Add  '
      @ 24,14 PROMPT 'Change'
      @ 24,29 PROMPT 'Delete'
      @ 24,44 PROMPT 'NextPg'
      @ 24,59 PROMPT 'PrevPg'
      @ 24,74 PROMPT ' Quit '
      MENU TO XRES
      IF LASTKEY() = 3
         XRES = 4
      ENDIF
      IF LASTKEY() = 19
         XRES = 5
      ENDIF
      SET KEY 3 TO NULL_FUNC
      SET KEY 19 TO NULL_FUNC
      SET INTEN OFF
      SET COLOR TO &HILIT
      DO CASE
      CASE XRES = 1
         IF XNB >= 200
            ERRMESS(24,'No more room for additional bar codes.')
            LOOP
         ENDIF
         XADD = .T.
         XPOLD = XPSTOP
         DO WHILE (XPSTOP + 32) <= (XNB + 1)
            XPSTOP = XPSTOP + 32
         ENDDO
         IF XPOLD <> XPSTOP
            DO DISPBARC WITH XPSTOP
         ENDIF
         DO GETLN WITH XNB + 1
      CASE XRES = 2
```

```
DO WHILE .T.
  SET DELIM ON
  XRES1 = 0
  @ 24,0
  @ 24,20 SAY 'What LINE do you want to change? ' GET XRES1 PICTURE '@Z 999'
  READ
  SET DELIM OFF
  IF OK_NUM(XRES1,31)
    EXIT
  ENDIF
ENDDO
IF XRES1 = 0
  LOOP
ENDIF
IF !STAT(XRES1)
  LOOP
ENDIF
DO GETLN WITH XRES1
CASE XRES = 3
  XNONELFT = .T.
  XKEY = 'Y'
  I = 1
  DO WHILE (I <= XN2)
    IF STAT(I)
      XNONELFT = .F.
      IF NOKILL(I)
        XKEY = 'N'
        EXIT
      ENDIF
    ENDIF
    I = I + 1
  ENDDO
  SET DELIMITERS ON
  SELECT 9D
  SEEK IN->ZNUM
  DO WHILE .T.
    @ 24,0
    XRES1 = SPACE(3)
    IF EOF()
      IF XNONELFT
        @ 24,25 SAY 'Enter "**" to delete entire zone ' GET XRES1 PICTURE '!!!!'
      ELSE
        IF XKEY = 'Y'
          @ 24,7 SAY 'What LINE to Delete (enter "**" to delete entire zone)? ' GET XRES1 PICTURE '!!!!'
        ELSE
          @ 24,30 SAY 'What LINE to Delete? ' GET XRES1 PICTURE '!!!!'
        ENDIF
      ENDIF
    ELSE
      IF XNONELFT
        ERRMESG(24,'This zone is in route '+TRIM(RNUM)+' and cannot be deleted.')
        EXIT
      ELSE
        @ 24,2 SAY 'What LINE to Delete (zone is in route '+TRIM(RNUM)+' and cannot be deleted)? ' GET XRES1 PICTURE '999'
      ENDIF
    ENDIF
```

```
       READ
       IF '**' $ XRES1
         EXIT
       ELSE
         IF OKLNUM(VAL(XRES1),31)
           EXIT
         ENDIF
       ENDIF
    ENDDO
    SET DELIM OFF
    XKEY = 'Y'
    IF '**' $ XRES1
      SELECT 4
      FUSE('ZHISTORY/ZH/ZHIST:X')
      SEEK XZNUM
      IF EOF()
        IF !CONFDEL(24,'Delete this zone (Y/N)? ')
          XKEY = 'N'
        ENDIF
      ELSE
        IF !CONFDEL(24,'Access to this zone in history will be lost.  Delete anyway (Y/N)? ')
          XKEY = 'N'
        ENDIF
      ENDIF
      SELECT 4
      FUSE('RDET/RD/RDET:X')
      IF XKEY = 'Y'
        SELECT ZN
        LOOKF('ZONE')
        DELETE
        UNLOCK
        SELECT BC
        SEEK XZNUM
        LOOKF('BARCODE')
        DELETE WHILE ZNUM==XZNUM
        UNLOCK
        EXIT
      ENDIF
      LOOP
    ENDIF
    XRES1 = VAL(XRES1)
    IF XRES1 = 0
      LOOP
    ENDIF
    IF : STAT(XRES1)
      LOOP
    ENDIF
    IF NOKILL(XRES1)
      XKEY = 'N'
      ERRMESG(24,'Checkpoint '+TRIM(B1(XRES1))+' is in history and may not be deleted.')
    ENDIF
    IF XKEY = 'Y'
      XR = (XRES1 - 1) % 16 + 6
      XC = (INT((XRES1 - 1)/16)*40 % 80)
      SET COLOR TO &INVRS
      @ XR,XC SAY STR(XRES1,4)
```

```
            @ XR,XC+6 SAY B1(XRES1)
            @ XR,XC+16 SAY MUST(XRES1)
            @ XR,XC+20 SAY DESCR(XRES1)
            IF CONFDEL(24,'Delete this checkpoint (Y/N)? ')
              SET COLOR TO &HILIT
              XHASMODIFY = .T.
              @ XR,XC SAY STR(XRES1,4)
              @ XR,XC+6 SAY SPACE(34)
              STAT(XRES1) = .F.
            ELSE
              SET COLOR TO &HILIT
              @ XR,XC SAY STR(XRES1,4)+' '+B1(XRES1)+'    '+MUST(XRES1)+'   '+DESCR(XRES1)
            ENDIF
          ENDIF
          SELECT BC
          SET ORDER TO XRES0
       CASE XRES = 4
          IF XPSTOP + 32 <= XNS
            XPSTOP = XPSTOP + 32
            DO DISPBARC WITH XPSTOP
          ENDIF
       CASE XRES = 5
          IF XPSTOP - 32 > 0
            XPSTOP = XPSTOP - 32
            DO DISPBARC WITH XPSTOP
          ENDIF
       CASE XRES = 6
          IF XHASMODIFY
            @ 24,0
            XRES1 = 'YES'
            SET ESCAPE OFF
            SET DELIMITERS ON
            @ 24,14 SAY 'Do you wish to save changes you have made? ' GET XRES1 PICTURE '@K !!!'
            READ
            SET ESCAPE ON
            SET DELIMITERS OFF
            @ 24,0
            IF 'YES' $ XRES1
              CLR()
              MESG(10,'Please wait while updating...')
              SELECT SC
              SET ORDER TO 5
              GO BOTTOM
              IF EOF()
                XSERNUM = 1
              ELSE
                XSERNUM = VAL(SERNUM) + 1
              ENDIF
              SET ORDER TO XRES0
              SEEK XZNUM
              LOCKF('BARCODE')
              DELETE WHILE ZNUM==XZNUM
              SET ORDER TO 3
              XPOINTS=0
              FOR I=1 TO XNS
                IF STAT(I) .AND. !EMPTY(B1(I))
```

```
              IF EMPTY(SERIAL[I])
                SERIAL[I] = XSERNUM
                XSERNUM = XSERNUM + 1
                YSERNUM = SUBSTR(STR(1000000+SERIAL[I]),7),2)
              ELSE
                YSERNUM = SUBSTR(STR(1000000+SERIAL[I]),7),2)
                SET ORDER TO 5
                SEEK YSERNUM
                DO WHILE (SERNUM == YSERNUM) .AND. ! EOF()
                  IF BARCODE <> B1[I]
                    REPLACE BARCODE WITH B1[I]
                  ENDIF
                  IF DESC <> DESCR[I]
                    REPLACE DESC WITH DESCR[I]
                  ENDIF
                  SKIP
                ENDDO
                SET ORDER TO XRESO
              ENDIF
              APPEND BLANK
              REPLACE SERNUM WITH YSERNUM
              REPLACE BARCODE WITH B1[I]
              REPLACE ZNUM WITH XZNUM
              REPLACE DESC WITH DESCR[I]
              REPLACE MUSTCHECK WITH MUST[I]
              XPOINTS=XPOINTS+1
            ENDIF
          NEXT
          UNLOCK
          SELECT ZN
          SEEK XZNUM
          LOOKF('ZONE')
          REPLACE POINTS WITH XPOINTS
          UNLOCK
          SELECT BC
          SET ORDER TO XRESO
        ENDIF
      ENDIF
      EXIT
    ENDCASE
  ENDDO
  SET COLOR TO &HILIT
ENDDO
PROCEDURE SETLN
PARAMETER F0
@ 24,0
IF F0 = 0
  RETURN
ENDIF
IF (F0 < 0)
  ERRMESS(24,'Invalid line number.')
  RETURN
ENDIF
IF (F0 < XPSTOP)
  ERRMESS(24,'Line number is not on this page.')
  RETURN
```

```
  ENDIF
  IF XADD
    XNB = XNB + 1
    B1[XNB] = SPACE(6)
    DESCR[XNB] = SPACE(15)
    MUST[XNB] = 'N'
    STAT[XNB] = .T.
    SERIAL[XNB] = 0
  ENDIF
  MESG(24,'F1 Help    F2 Display Bar Codes    ESC cancel entry')
  XR = (FO - 1) % 16 + 6
  XC = (INT((FO - 1)/16)*40 % 80)
  SET INTENSITY ON
  @ XR,XC SAY STR(FO,4)
  YB1 = B1[FO]
  YMUST = MUST[FO]
  YDESCR = DESCR[FO]
  YSERIAL = SERIAL[FO]
  SET KEY -1 TO GENWIND
  @ XR,XC+6 GET YB1 PICTURE '!!!!!!' VALID B1()
  @ XR,XC+16 GET YMUST PICTURE '!' VALID MUST()
  @ XR,XC+20 GET YDESCR VALID DESCR()
  READ
  SET KEY -1 TO
  SET INTENSITY OFF
  @ 24,0
  LK = LASTKEY()
  IF LK = 27 .AND. XADD
    XNB = XNB - 1
    XPGTOP = XPOLD
  ENDIF
  IF LK <> 27
    IF (B1[FO]<>YB1).OR.(MUST[FO]<>YMUST).OR.(DESCR[FO]<>YDESCR).OR.(SERIAL[FO]<>YSERIAL)
      XHASMODIFY = .T.
      B1[FO] = YB1
      MUST[FO] = YMUST
      DESCR[FO] = YDESCR
      SERIAL[FO]= YSERIAL
    ENDIF
  ENDIF
ENDIF
DO DISPBARC WITH XPGTOP
RETURN
PROCEDURE DISPBARC
PARAMETER XPTOP
XPAGETOP = XPTOP
@ 6,0,22,79 BOX ''
SET DELIMITERS OFF
XR = 5
XC = 0
I = 1
DO WHILE (I < 33) .AND. (XPAGETOP <= XNB)
  XR = XR + 1
  IF XR > 21
    XR = 6
    XC = 40
  ENDIF
  IF ! STAT[XPAGETOP]
```

```
        @ XR,XC SAY STR(XPAGETOP,4)
      ELSE
        @ XR,XC SAY STR(XPAGETOP,4)+' '+B1(XPAGETOP)+' '+MUST(XPAGETOP)+' '+DESCR(XPAGETOP)
      ENDIF
      I = I + 1
      XPAGETOP = XPAGETOP + 1
    ENDDO
RETURN
FUNCTION CHKDESC
IF LASTKEY() = 27
  RETURN .T.
ENDIF
IF EMPTY(XSDESC)
  ERRMESS(24,'Zone name cannot be empty.')
  IF XNEW
    MESS(24,'Enter name for new zone.  ESC to cancel entry.')
  ELSE
    MESS(24,'Change zone name or press ENTER to continue.  ESC to cancel entry.')
    XSDESC = SDESC
  ENDIF
  RETURN .F.
ENDIF
IF '**' $ XSDESC
  ERRMESS(24,'"**" is a reserved zone name and may not be used.')
  IF XNEW
    MESS(24,'Enter name for new zone.  ESC to cancel entry.')
  ELSE
    MESS(24,'Change zone name or press ENTER to continue.  ESC to cancel entry.')
    XSDESC = SDESC
  ENDIF
  RETURN .F.
ENDIF
RETURN .T.
FUNCTION B1
IF EMPTY(YB1)
  ERRMESS(24,'Invalid bar code.')
  MESS(24,'F1 Help     F2 Display Bar Codes     ESC cancel entry')
  RETURN .F.
ENDIF
IF ('**' $ YB1)
  ERRMESS(24,'"**" is a reserved bar code name and may not be used.')
  MESS(24,'F1 Help     F2 Display Bar Codes     ESC cancel entry')
  RETURN .F.
ENDIF
YB1=SUBSTR(LTRIM(YB1)+SPACE(6),1,6)
IF LEN(TRIM(YB1))=2
  ERRMESS(24,'Bar code cannot have a length of two characters.')
  MESS(24,'F1 Help     F2 Display Bar Codes     ESC cancel entry')
  RETURN .F.
ENDIF
XX1 = 1
DO WHILE (XX1 <= XNB)
  IF XX1 = F0
    XX1 = XX1 + 1
    LOOP
  ENDIF
  IF (B1(XX1) = YB1)
```

```
   IF STAT[XX1]
      ERRMESG(24,'Bar code '+TRIM(YB1)+' already exist in this zone.')
      MESG(24,'F1 Help      F2 Display Bar Codes      ESC cancel entry')
      YB1 = B1[F0]
      SET ORDER TO XRES0
      RETURN .F.
   ENDIF
 ENDIF
 XX1 = XX1 + 1
ENDDO
IF (B1[F0] <> YB1)
   SELECT SC
   SET ORDER TO 3
   SEEK YB1
   IF (EOF()
      DO WHILE (YB1 = BARCODE) .AND. (ZNUM = XZNUM) .AND. : EOF()
         SKIP
      ENDDO
      IF (YB1 = BARCODE) .AND. (ZNUM <> XZNUM) .AND. : EOF()
         IF (0ADD
            MESG(24,'Bar code '+TRIM(YB1)+' is already used by another checkpoint.')
            ?? CHR(7)
            INKEY(3)
            YB1 = B1[F0]
            MESG(24,'F1 Help      F2 Display Bar Codes      ESC cancel entry')
            RETURN .F.
         ELSE
            SET COLOR TO &INVRS
            ?? CHR(7)
            @ 24,0
            @ XR,XC+16 SAY MUSTCHECK
            @ XR,XC+20 SAY DESC
            @ 24, 0 SAY 'Bar code is already in zone '+TRIM(LTRIM(ZNUM))+' '
            @ 24,41 SAY 'Place it in this zone also (Y/N) ? [ ]'
            @ 24,78 SAY ''
            DO WHILE .T.
               DO WHILE INKEY()=0
               ENDDO
               XCONFIRM=UPPER(CHR(LASTKEY()))
               IF XCONFIRM $ 'YN'
                  EXIT
               ENDIF
            ENDDO
            SET COLOR TO &HILIT
            IF XCONFIRM='Y'
               YMUST=MUSTCHECK
               YDESCR=DESC
               YSERIAL=VAL(SERNUM)
               MESG(24,'Enter "Y" to indicate Must-Scan.  ESC to cancel entry.')
            ELSE
               MESG(24,'F1 Help      F2 Display Bar Codes      ESC cancel entry')
               SET ORDER TO XRES0
               RETURN .F.
            ENDIF
         ENDIF
      ENDIF
ENDIF
```

```
    ENDIF
  ENDIF
  SET ORDER TO XRES0
  IF B1(F0) = 'Y'
    YMUST  = MUST(F0)
    YDESCR = DESCR(F0)
    YSERIAL= SERIAL(F0)
  ENDIF
MESS(24,'Enter "Y" to indicate Must-Scan.  ESC to cancel entry.')
RETURN .T.
FUNCTION MUST
IF LASTKEY() = 5
  MESS(24,'F1 Help    F2 Display Bar Codes    ESC cancel entry')
  RETURN .T.
ENDIF
IF !(YMUST $ 'YN')
  ERRMESS(24,'Enter "Y" for Must-Scan Bar Code.  Otherwise, enter "N".')
  MESS(24,'Enter "Y" to indicate Must-Scan.  ESC to cancel entry.')
  YMUST = 'N'
  RETURN .F.
ENDIF
MESS(24,'ESC to cancel entry.')
RETURN .T.
FUNCTION DESCR
IF LASTKEY() = 1
  MESS(24,'Enter "Y" to indicate Must-Scan.  ESC to cancel entry.')
  RETURN .T.
ENDIF
IF EMPTY(YDESCR)
  ERRMESS(24,'Invalid checkpoint.')
  MESS(24,'ESC to cancel entry')
  RETURN .F.
ENDIF
IF '**' $ YDESCR
  ERRMESS(24,'"**" is a reserved bar code name and may not be used.')
  MESS(24,'ESC to cancel entry')
  RETURN .F.
ENDIF
RETURN .T.
FUNCTION NOKILL
PARAMETER F0
IF !EMPTY(SERIAL(F0))
  SELECT BC
  XBCREC = RECNO()
  SET ORDER TO 5
  YSERNUM = SUBSTR(STR(100000)+SERIAL(F0),7,2)
  SEEK YSERNUM
  SKIP
  IF (YSERNUM <> YSERNUM) .OR. EOF()
    SELECT D1
    SEEK YSERNUM
    IF !EOF()
      SELECT BC
      SET ORDER TO XRES0
      GO XBCREC
      RETURN .T.
    ENDIF
```

```
  ENDIF
  SELECT BC
  SET ORDER TO XRESO
  GO XSCREC
ENDIF
RETURN .F.

* ROUTE.PRG
* COPYRIGHT 1989, 1988 COMPUTER SYSTEMS DESIGN, INC.

CLEAR
CLOSE DATABASES
MESG(0,LBLOCK+' ROUTE MAINTENANCE '+RBLOCK)
MESG(10,'Please wait while setting up files...')
DECLARE ZONE[200],STAT[200],DESCR[200]
FUSE('RSUM/RTS/RNUM2X,RNAMX')
SELECT 2
FUSE('RDET/RTD/RNUM1X,RDETX')
SELECT 3
FUSE('ZONE/ZN/ZNUM1X,ZNAMX')
SELECT RTD
SET RELATION TO ZNUM INTO ZN
GO TOP
SELECT RTS
DO WHILE .T.
  SET INTEN OFF
  SET DELIM ON
  XRNUM=SPACE(6)
  XNEW=.T.
  CLEAR
  @ 2,00 SAY 'Line Zone   Description'
  @ 3,40 SAY 'Line Zone   Description'
  @ 4,00 SAY LINE(36)
  @ 4,40 SAY LINE(36)
  @ 20,0 SAY LINE(80)
  DO WHILE .T.
    XRNUM = XRNUM+SPACE(6-LEN(XRNUM))
    @ 1,0
    @ 1,40 SAY 'Description: '
    MESG(24,'F1 Help   F2 display ROUTES   ESC exit')
    SET KEY -1 TO GENWINC
    @ 1,2 SAY 'Route: ' GET XRNUM PICTURE '!!!!!!' VALID OKROUT(XRNUM)
    READ
    SET KEY -1
    IF LASTKEY() = 27
      CLOSE DATABASES
      RETURN
    ENDIF
    IF XNEW
      MESG(24,'Enter name for new route, ESC to cancel entry.')
      XDESC=SPACE(20)
    ELSE
      MESG(24,'Change route name or press ENTER to continue.  ESC to cancel change.')
      XDESC = DESC
    ENDIF
    @ 1,58 GET XDESC VALID OKDESC()
```

```
      READ
      IF LASTKEY() = 27
        LOOP
      ENDIF
      EXIT
ENDDO
MESS(10,'Setting up route file...')
SELECT RTB
LOCKF('RSUM')
IF XNEW
   APPEND BLANK
   REPLACE RNUM WITH XRNUM
ENDIF
IF (DESC<>XDESC)
   REPLACE DESC WITH XDESC
ENDIF
UNLOCK
SELECT RTD
SEEK XRNUM
XNB=0
DO WHILE RNUM==XRNUM .AND. !EOF()
   XNB=XNB+1
   ZONE[XNB]=ZNUM
   DESCR[XNB]=ZN->SDESC
   STAT[XNB]=.T.
   SKIP
ENDDO
XHASMODIFY = .F.
XPSTOP = 1
XPOLD = 1
DO DISPARRAY WITH 1
XINSERT = .F.
XADD = (XNB = 0)
IF XADD
   DO GETLNS WITH XNB + 1
ENDIF
SET MESSAGE TO
XRES = 1
DO WHILE .T.
   XADD = .F.
   XINSERT = .F.
   @ 24,0
   SET INTENSITY ON
   SET KEY 3 TO
   SET KEY 18 TO
   @ 24,00 PROMPT ' Add '
   @ 24,12 PROMPT 'Change'
   @ 24,25 PROMPT 'Delete'
   @ 24,37 PROMPT 'Insert'
   @ 24,50 PROMPT 'NextPg'
   @ 24,62 PROMPT 'PrevPg'
   @ 24,74 PROMPT ' Quit '
   MENU TO XRES
   IF LASTKEY() = 3
      XRES = 5
   ENDIF
```

```
    IF LASTKEY() = 18
      XRES = 5
    ENDIF
    SET KEY 3 TO NULL_FUNC
    SET KEY 18 TO NULL_FUNC
    SET INTENSITY OFF
    DO CASE
    CASE XRES = 1
      IF XNB >= 100
        ERRMESS(24,'No more room for additional zone.')
        LOOP
      ENDIF
      XADD = .T.
      XPOLD = XPSTOP
      DO WHILE (XPSTOP + 34) <= (XNB + 1)
        XPSTOP = XPSTOP + 34
      ENDDO
      IF XPOLD <> XPSTOP
        DO DISPARRAY WITH XPSTOP
      ENDIF
      DO GETLN2 WITH XNB + 1
    CASE XRES = 2
      DO WHILE .T.
        @ 24,0
        XRES1 = 0
        SET DELIMITERS ON
        @ 24,20 SAY 'What LINE do you want to change?' GET XRES1 PICTURE '@Z 999'
        READ
        SET DELIMITERS OFF
        IF OKLNUM(XRES1,33)
          EXIT
        ENDIF
      ENDDO
      IF XRES1 = 0
        LOOP
      ENDIF
      IF ! STAT(XRES1)
        LOOP
      ENDIF
      DO GETLN2 WITH XRES1
    CASE XRES = 3
      SET DELIMITERS ON
      DO WHILE .T.
        @ 24,0
        XRES1 = SPACE(3)
        @ 24,7 SAY 'What LINE to Delete (enter "**" to delete entire route)? ' GET XRES1 PICTURE '!!!'
        READ
        IF '**' $ XRES1
          EXIT
        ELSE
          IF OKLNUM(VAL(XRES1),33)
            EXIT
          ENDIF
        ENDIF
      ENDDO
      SET DELIMITERS OFF
```

```
            IF '**' $ XRES1
              IF CONFDEL(24,'Delete this route (Y/N)? ')
                SELECT RTS
                LOCKF('RSUM')
                DELETE
                UNLOCK
                SELECT RTD
                SEEK XRNUM
                LOCKF('RDET')
                DELETE WHILE RNUM==XRNUM
                UNLOCK
                EXIT
              ENDIF
              LOOP
            ENDIF
            XRES1 = VAL(XRES1)
            IF XRES1 = 0
              LOOP
            ENDIF
            IF !STAT[XRES1]
              LOOP
            ENDIF
            XHASMODIFY = .T.
            XR = (XRES1 - 1) % 17 + 5
            XC = (INT((XRES1 - 1)/17)*40 % 80)
            @ XR,XC+6 SAY SPACE(34)
            STAT[XRES1] = .F.
        CASE XRES = 4
          IF XNB >= 200
            ERRMESS(24,'No more room for additional zone.')
            LOOP
          ENDIF
          XINSERT = .T.
          DO WHILE .T.
            @ 24,0
            XRES1 = 0
            SET DELIMITERS ON
            @ 24,17 SAY 'Insert new zone ABOVE which line? ' GET XRES1 PICTURE '@Z 999'
            READ
            SET DELIMITERS OFF
            IF OKLNUM(XRES1,33)
              EXIT
            ENDIF
          ENDDO
          DO GETLN2 WITH XRES1
        CASE XRES = 5
          IF XPGTOP + 34 <= XNB
            XPGTOP = XPGTOP + 34
            DO DISPARRAY WITH XPGTOP
          ENDIF
        CASE XRES = 6
          IF XPGTOP - 34 > 0
            XPGTOP = XPGTOP - 34
            DO DISPARRAY WITH XPGTOP
          ENDIF
```

```
      CASE XRES = 7
         IF XHASMODIFY
            @ 24,0
            XRES1 = 'YES'
            SET ESCAPE OFF
            SET DELIMITERS ON
            @ 24,14 SAY 'Do you wish to save the changes you have made? ' GET XRES1 PICTURE '@K !!'
            READ
            SET ESCAPE ON
            SET DELIMITERS OFF
            IF 'YES' $ UPPER(XRES1)
               CLR(1)
               MESG(10,'Please wait while updating...')
               SELECT RTD
               SEEK XRNUM
               LOCKF('RDET')
               DELETE WHILE RNUM==XRNUM
               FOR I=1 TO XNB
                  IF STAT[I] .AND. !EMPTY(ZONE[I])
                     APPEND BLANK
                     REPLACE ZNUM WITH ZONE[I]
                     REPLACE RNUM WITH XRNUM
                  ENDIF
               NEXT
               UNLOCK
            ENDIF
         ENDIF
         EXIT
      ENDCASE
   ENDDO
ENDDO
PROCEDURE DISPARRAY
PARAMETER XPTOP
XPAGETOP = XPTOP
@ 5,0,22,79 BOX ''
SET DELIMITERS OFF
XR = 4
XC = 0
I = 1
DO WHILE (I < 35) .AND. (XPAGETOP <= XNB)
   XR = XR+1
   IF XR > 21
      XR = 5
      XC = 40
   ENDIF
   IF ! STAT[XPAGETOP]
      @ XR,XC SAY STR(XPAGETOP,4)
   ELSE
      @ XR,XC SAY STR(XPAGETOP,4)+' '+ZONE[XPAGETOP]+' '+DESCR[XPAGETOP]
   ENDIF
   I = I+1
   XPAGETOP = XPAGETOP + 1
ENDDO
RETURN
PROCEDURE SETLN2
PARAMETER P0
@ 24,0
```

```
IF F0 = 0
   RETURN
ENDIF
IF (F0 < 0)
   ERRMESS(24,'Invalid line #.')
   RETURN
ENDIF
IF (F0 < XPSTOP)
   ERRMESS(24,'Line # not on this page.')
   RETURN
ENDIF
IF XADD
   XNB = XNB - 1
   ZONE(XNB) = SPACE(6)
   DESCR(XNB) = SPACE(15)
   STAT(XNB) = .T.
ENDIF
IF XINSERT
   FOR I = XNB TO F0 STEP -1
      ZONE(I+1) = ZONE(I)
      DESCR(I+1) = DESCR(I)
      STAT(I+1) = STAT(I)
   NEXT
   ZONE(F0) = SPACE(6)
   DESCR(F0) = SPACE(15)
   STAT(F0) = .T.
   XNB = XNB + 1
   DO DISPARRAY WITH XPSTOP
ENDIF
MESS(24,'F1 help    F2 display ZONES    ESC cancel entry')
XR = (F0 - 1) % 17 + 5
XC = (INT((F0 - 1)/17)*40 % 80)
SET INTENSITY ON
@ XR,XC SAY STR(F0,4)
XZNUM = ZONE(F0)
YDESCR = DESCR(F0)
COLF = 14
SET KEY -1 TO GENWIND
@ XR,XC+6 GET XZNUM PICTURE '!!!!!!' VALID OKZNUM(1)
@ XR,XC+14 SAY YDESCR
READ
SET KEY -1
SET INTENSITY OFF
@ 24,0
LK = LASTKEY()
IF LK = 27
   IF XINSERT
      FOR I = F0 TO XNB - 1
         ZONE(I) = ZONE(I+1)
         DESCR(I) = DESCR(I+1)
         STAT(I) = STAT(I+1)
      NEXT
   ENDIF
   IF XINSERT .OR. XADD
      XNB = XNB - 1
      XPSTOP = XPOLD
```

```
    ENDIF
  ENDIF
  IF LK <> 27
    IF (XZNUM <> ZONE[FO]) .OR. (YDESCR <> DESCR[FO])
      XHASMODIFY = .T.
      ZONE[FO] = XZNUM
      DESCR[FO] = YDESCR
    ENDIF
  ENDIF
DO DISPARRAY WITH XFGTOP
RETURN
FUNCTION OKDESC
IF LASTKEY() = 27
  RETURN .T.
ENDIF
IF EMPTY(XDESC)
  ERRMESG(24,'Route description cannot be empty.')
  IF XNEW
    MESG(24,'Enter name for new route.  ESC to cancel entry.')
  ELSE
    MESG(24,'Change route name or press ENTER to continue.  ESC to cancel entry.')
    XDESC = DESC
  ENDIF
  RETURN .F.
ENDIF
IF '**' $ XDESC
  ERRMESG(24,'"**" is a reserved route name and may not be used.')
  IF XNEW
    MESG(24,'Enter name for new route.  ESC to cancel entry.')
  ELSE
    MESG(24,'Change route name or press ENTER to continue.  ESC to cancel entry.')
    XDESC = DESC
  ENDIF
  RETURN .F.
ENDIF
RETURN .T.

* PNTFILE.PRG
* COPYRIGHT 1989, 1990 COMPUTER SYSTEMS DESIGN, INC.

DO WHILE .T.
  CLOSE DATABASES
  MS1 = 'A  PRINT GUARD LIST'
  MS2 = 'B  PRINT ROUTE LIST'
  MS3 = 'C  PRINT ZONE LIST'
  MS4 = 'X  RETURN TO MAINTENANCE MENU'
  MSG1 = 'Print all Guards'
  MSG2 = 'Print all Routes'
  MSG3 = 'Print all Zones'
  MSG4 = 'Return to Previous Menu'
  PSEL = HEADER('PRINT LISTS',4)
  CLEAR
  SET DELETED ON
  DO CASE
  CASE PSEL = 1
    HEADER('GUARD LIST',-1)
    MESG(7,'This report displays all the guards currently defined.')
```

```
    MESS(11,'Setting up guard files...')
    USE('GUARD/ZN/GRDX')
    DO GUARDPRINT
CASE RESS = 2
    HEADER('ROUTE LIST',-1)
    MESS(7,'This report displays all zones within a route.')
    MESS(11,'Setting up route files...')
    USE('RSUM/RTS/RNUMX,RNAMX')
    SELECT 2
    USE('RDET/RTD/RNUM1X')
    SELECT 3
    USE('ZONE/ZN/ZNUM1X,ZNAMX')
    SELECT RTD
    SET RELATION TO ZNUM INTO ZN
    GO TOP
    SELECT RTS
    SET INTENSITY OFF
    SET DELIM ON
    DO WHILE .T.
        CLR(11)
        SET COLOR TO R+,U+T
        @ 13,16 SAY "Enter a Route Name of '**' to list every route."
        SET COLOR TO W+,U+T
        MESS(19,'F2 to display ROUTES.  ESC to exit.')
        SET KEY -1 TO GENWIND
        XRNUM = SPACE(6)
        XRDESC= SPACE(20)
        @ 11,20 SAY 'Route Name    ' GET XRDESC PICTURE 'XXXXXXXXXXXXXXXXXXXX' VALID OKRDESC(XRDESC,'2')
        @ 12,20 SAY 'Route Number  ' GET XRNUM PICTURE '!!!!!!' VALID OKRDESC(XRNUM,'1')
        READ
        IF LASTKEY()=27
            EXIT
        ENDIF
        SET KEY -1
        CLR(10)
        DO ROUTEPRINT
    ENDDO
CASE RESS = 3
    HEADER('ZONE LIST',-1)
    MESS(7,'This report displays all checkpoints within a zone.')
    MESS(11,'Setting up zone files...')
    USE('BARCODE/BC/ZNUMBX,ZNUMCX')
    SELECT 2
    USE('ZONE/ZN/ZNUM1X,ZNAMX')
    MESS(11,'The checkpoints may be printed in order by their ')
    MESS(12,'barcodes or alphabetically by their descriptions.')
    MESS(24,'Use the '+CHR(27)+' or '+CHR(26)+' keys to position cursor.
        Press Enter '+CHR(17)+CHR(196)+CHR(217)+' to select')
    XRES = 1
    SET INTENSITY ON
    SET DELIMITERS ON
    SET MESSAGE TO
    DO WHILE .T.
        @ 16, 9 PROMPT ' Bar Code Order '
        @ 16,32 PROMPT ' Checkpoint Order '
        @ 16,56 PROMPT '     Quit      '
```

```
        NEXT TO XRES
        IF LASTKEY() <> 27
          EXIT
        ENDIF
      ENDDO
      SET INTENSITY OFF
      IF XRES = 3
        LOOP
      ENDIF
      IF XRES = 2
        SELECT SC
        SET ORDER TO 2
        GO TOP
        SELECT ZN
      ENDIF
      DO WHILE .T.
        CLR(11)
        SET COLOR TO &LOLIT
        @ 10,19 SAY 'Enter a Zone Name of "**" for all zones.'
        SET COLOR TO &HILIT
        MESS(19,'F2 to display ZONES.  ESC to exit.')
        SET KEY -1 TO GENWIND
        XZNUM = SPACE(6)
        XZDESC= SPACE(15)
        @ 11,20 SAY 'Zone Name   ' GET XZDESC PICTURE 'XXXXXXXXXXXXXXX' VALID OKZONE(XZDESC,'2')
        @ 12,20 SAY 'Zone Number ' GET XZNUM PICTURE '!!!!!!' VALID OKZONE(XZNUM,'1')
        READ
        SET KEY -1
        CLR(13)
        IF LASTKEY()=27
          EXIT
        ENDIF
        DO ZONEPRINT
      ENDDO
    CASE RESS = 4
      CLEAR
      CLOSE DATABASES
      RETURN
    ENDCASE
  ENDDO
RETURN
FUNCTION RPHEAD
IF EOF()
  RETURN 0
ENDIF
XFIRST = RECNO()
ICOUNTER = 0
XSECOND = 0
DO WHILE RNUM = XRNUM .AND. ! EOF()
  ICOUNTER = ICOUNTER + 1
  IF ICOUNTER > 43
    EXIT
  ENDIF
  SKIP
ENDDO
IF (ICOUNTER > 43)
  XSECOND = RECNO()
```

```
    XTWODD = .T.
ENDIF
GO XFIRST
XPG = XPG - 1
SELECT RTB
SEEK XRNUM
@ 1,0 SAY DATE()
@ 1,40-INT(LEN(LTRIM(TRIM(HEAD)))/2) SAY HEAD
@ 1,71 SAY 'Page '
@ 1,76 SAY XPG PICTURE '999'
@ 2,0 SAY TIME()
@ 2,35 SAY 'ROUTE LIST'
@ 4,0 SAY 'Route Number: '+XRNUM
@ 5,0 SAY 'Route Name  : '+RDESC
IF XTWODD
   @ 7,0 SAY '          Zone    Zone'
   @ 7,40 SAY '         Zone    Zone'
   @ 8,0 SAY 'Order  Number   Name'
   @ 8,40 SAY 'Order  Number   Name'
   @ 9,0 SAY REPLICATE('-',38)
   @ 9,40 SAY REPLICATE('-',39)
ELSE
   @ 7,0 SAY '          Zone    Zone'
   @ 8,0 SAY 'Order  Number   Name'
   @ 9,0 SAY REPLICATE('-',38)
ENDIF
L = 10
SELECT RTD
RETURN XSECOND
PROCEDURE ROUTEPRINT
CLR(15)
MESG(15,'Is the printer ready?')
IF ! CONFIRM(16)
   SET DELIMITERS ON
   RETURN
ENDIF
SET DELIMITERS ON
CLR(11)
MESG(11,'Please wait while printing ...')
STORE 0 TO XFIRST,XSECOND,XPG
SET DEVICE TO PRINT
SELECT RTD
IF '**' $ XRNUM
   GO TOP
ELSE
   YRNUM = XRNUM
   SEEK XRNUM
ENDIF
IF EOF()
   SET DEVICE TO SCREEN
   MESG(11,'No zone data for '+TRIM(LTRIM(XRNUM))+' route.')
   MESG(12,'Press any key to continue...')
   DO WHILE INKEY() = 0
   ENDDO
ENDIF
DO WHILE ! EOF()
```

```
  IF '**' < YRNUM
    YRNUM = RNUM
  ENDIF
  XTWOCOL = .F.
  STORE 0 TO XZCOUNT,L,XFIRST
  SET DEVICE TO SCREEN
  MESG(13,'Route = '+YRNUM)
  SET DEVICE TO PRINT
  XSECOND = RPHEAD()
  DO WHILE (RNUM = YRNUM) .AND. .NOT. EOF()
    XZCOUNT = XZCOUNT + 1
    IF XTWOCOL
      GO XFIRST
      @ L,0 SAY XZCOUNT PICTURE '99999'
      @ L,7 SAY ZNUM
      SELECT ZN
      @ L,15 SAY SDESC
      SELECT RTD
      SKIP
      XFIRST = RECNO()
      IF ! EMPTY(XSECOND)
        GO XSECOND
        @ L,40 SAY 40+XZCOUNT PICTURE '99999'
        @ L,47 SAY ZNUM
        SELECT ZN
        @ L,55 SAY SDESC
        SELECT RTD
        SKIP
        IF (RNUM <> YRNUM) .OR. EOF()
          XSECOND = 0
        ELSE
          XSECOND = RECNO()
        ENDIF
      ENDIF
      GO XFIRST
    ELSE
      @ L,0 SAY XZCOUNT PICTURE '99999'
      @ L,7 SAY ZNUM
      SELECT ZN
      @ L,15 SAY SDESC
      SELECT RTD
      SKIP
    ENDIF
    L = L+1
    IF L > 52
      IF ! EMPTY(XSECOND)
        GO XSECOND
        XZCOUNT = XZCOUNT + 43
        XTWOCOL = .F.
        EJECT
        XSECOND = RPHEAD()
      ELSE
        DO WHILE (RNUM = YRNUM) .AND. .NOT. EOF()
          SKIP
        ENDDO
      ENDIF
    ENDIF
  ENDIF
```

```
      ENDDO
      IF .NOT. ('**' $ XRNUM)
        EJECT
        EXIT
      ELSE
        EJECT
      ENDIF
    ENDDO
    SET DEVICE TO SCREEN
    RETURN
    FUNCTION ZPHEAD
    IF EOF()
      RETURN 0
    ENDIF
    XFIRST = RECNO()
    ICOUNTER = 0
    XSECOND = 0
    DO WHILE ZNUM = YZNUM .AND. ! EOF()
      ICOUNTER = ICOUNTER + 1
      IF ICOUNTER > 43
        EXIT
      ENDIF
      SKIP
    ENDDO
    IF ICOUNTER > 43
      XSECOND = RECNO()
      XTWOCOL = .T.
    ENDIF
    GO XFIRST
    XPG = XPG + 1
    SELECT ZN
    SEEK YZNUM
    @ 1,0 SAY DATE()
    @ 1,40-INT(LEN(LTRIM(TRIM(HEAD)))/2) SAY HEAD
    @ 1,71 SAY 'Page '
    @ 1,76 SAY XPG PICTURE '999'
    @ 2,0 SAY TIME()
    @ 2,35 SAY 'ZONE LIST'
    IF XPG = 1
      @ 3,33 SAY 'BAR CODE ORDER'
    ELSE
      @ 3,31 SAY 'CHECKPOINT ORDER'
    ENDIF
    @ 4,0 SAY 'Zone Number: '+YZNUM
    @ 5,0 SAY 'Zone Name  : '+SDESC
    IF XTWOCOL
      @ 7,0 SAY '              Must'
      @ 7,40 SAY '              Must'
      @ 8,0 SAY 'Bar Code  Scan    Checkpoint'
      @ 8,40 SAY 'Bar Code  Scan    Checkpoint'
      @ 9,0 SAY REPLICATE('-',38)
      @ 9,40 SAY REPLICATE('-',38)
    ELSE
      @ 7,0 SAY '              Must'
      @ 8,0 SAY 'Bar Code  Scan    Checkpoint'
      @ 9,0 SAY REPLICATE('-',38)
    ENDIF
```

```
L = 10
SELECT BC
RETURN XSECOND
PROCEDURE ZONEPRINT
CLR(15)
MESG(15,'Is the printer ready?')
IF ! CONFIRM(18)
   SET DELIMITERS ON
   RETURN
ENDIF
SET DELIMITERS ON
CLR(11)
MESG(11,'Please wait while printing ...')
STORE 0 TO XFIRST,XSECOND,XPG
SET DEVICE TO PRINT
SELECT BC
IF '**' $ XZNUM
   GO TOP
ELSE
   YZNUM = XZNUM
   SEEK XZNUM
ENDIF
IF EOF()
   SET DEVICE TO SCREEN
   MESG(11,'No checkpoint for '+TRIM(LTRIM(XZNUM))+' zone.')
   MESG(12,'Press any key to continue...')
   DO WHILE INKEY() = 0
   ENDDO
ENDIF
DO WHILE ! EOF()
   IF '**' $ XZNUM
      YZNUM = ZNUM
   ENDIF
   XTWOCOL = .F.
   STORE 0 TO L,XFIRST
   SET DEVICE TO SCREEN
   MESG(15,'Zone = '+YZNUM)
   SET DEVICE TO PRINT
   XSECOND = ZFHEAD()
   DO WHILE (ZNUM = YZNUM) .AND. .NOT. EOF()
      IF XTWOCOL
         GO XFIRST
         @ L,0 SAY BARCODE
         @ L,12 SAY MUSTCHECK
         @ L,18 SAY DESC
         SKIP
         XFIRST = RECNO()
         IF ! EMPTY(XSECOND)
            GO XSECOND
            @ L,40 SAY BARCODE
            @ L,52 SAY MUSTCHECK
            @ L,58 SAY DESC
            SKIP
            IF (ZNUM <> YZNUM) .OR. EOF()
               XSECOND = 0
            ELSE
```

```
              XSECOND = RECNO()
            ENDIF
          ENDIF
          GO XFIRST
        ELSE
          @ L,0 SAY BARCODE
          @ L,12 SAY MUSTCHECK
          @ L,18 SAY DESC
          SKIP
        ENDIF
        L = L+1
        IF L > 52
          IF ! EMPTY(XSECOND)
            GO XSECOND
            XTWOCOL = .F.
            EJECT
            XSECOND = ZPHEAD()
          ELSE
            DO WHILE (ZNUM = YZNUM) .AND. .NOT. EOF()
              SKIP
            ENDDO
          ENDIF
        ENDIF
      ENDDO
      IF .NOT. ('**' $ YZNUM)
        EJECT
        EXIT
      ELSE
        EJECT
      ENDIF
ENDDO
SET DEVICE TO SCREEN
RETURN
PROCEDURE GPHEAD
XPG = XPG+1
@ 1,0 SAY DATE()
@ 1,40-INT(LEN(LTRIM(TRIM(HEAD)))/2) SAY HEAD
@ 1,71 SAY 'Page '
@ 1,76 SAY XPG PICTURE '999'
@ 2,0 SAY TIME()
@ 2,35 SAY 'GUARD LIST'
@ 4,10 SAY 'Guard ID    Guard Name'
@ 5,10 SAY REPLICATE('-',40)
L = 6
RETURN
PROCEDURE GUARDPRINT
CLR(11)
MESG(11,'Is the printer ready?')
IF ! CONFIRM(15)
  SET DELIMITERS ON
  RETURN
ENDIF
SET DELIMITERS ON
CLR(11)
MESG(11,'Please wait while printing guards...')
SET DEVICE TO PRINT
```

```
L = 0
XPG = 0
DO GPHEAD
SELECT GN
GO TOP
IF EOF()
  SET DEVICE TO SCREEN
  MESG(11,'No guard found.')
  MESG(12,'Press any key to continue...')
ENDIF
DO WHILE .NOT. EOF()
  @ L,10 SAY GNUM
  @ L,23 SAY GNAME
  SKIP
  L = L+1
  IF L > 52
    EJECT
    DO GPHEAD
  ENDIF
ENDDO
SET DEVICE TO SCREEN
RETURN

* HELP.PRG
* COPYRIGHT 1985, 1986 COMPUTER SYSTEMS DESIGN, INC.

PARAMETER CALL_PRG, LINE_NUM, INPUT_VAR
IF CALL_PRG = 'HELP'
  RETURN
ENDIF
IF TYPE('HLPVAR') = 'U'
  RETURN
ENDIF
IF (HLPVAR = 0)
  RETURN
ENDIF
SAVE SCREEN
@ 0,0 CLEAR
DO CASE
CASE HLPVAR = 1
  @ 1,0
  TEXT
   The menu displayed at the bottom of the Guard Maintenance screen
   lets you add, change, delete, or view guard information.

To select an option from the menu, you may either:
     Use the LEFT and RIGHT arrow keys to move from one selection
     to another. Press ENTER at the desired selection.
                     -- OR --
     Press the first letter of the desired selection.

Menu options and their respective functions:

Add    : To enter a new guard.
              Enter a UNIQUE guard ID and corresponding guard name.
```

```
    Change :  To change a specific guard's name.
              Enter the LINE number of the guard to be changed.
    Delete :  To delete a guard.
              Enter the LINE number of a guard to delete.
    NextPg :  To display the next screen, if more information exists.
    PrevPg :  To display the previous screen.
    Quit   :  To exit the guard maintenance program.
 ENDTEXT
 SET COLOR TO &BLUELIT
 @ 0,0 TO 24,79
 SET COLOR TO &WHILIT
 @ 0,24 SAY ' GUARD MAINTENANCE HELP WINDOW '
CASE HLPVAR = 2
 @ 1,0
 TEXT
The menu displayed at the bottom of the Route Maintenance screen
lets you add, change, delete, insert, or view zones within a route.

To select an option from the menu, you may either:
  Use the LEFT and RIGHT arrow keys to move from one selection
  to another. Press ENTER at the desired selection.
                    -- OR --
  Press the first letter of the desired selection.

Menu options and their respective functions:
    Add    :  To add a zone to the end of the route.
              Enter a valid zone number. The zone name will be displayed.
    Change :  To replace a zone in the route.
              Enter the LINE number of the zone to be replaced.
    Delete :  To delete a zone in the route.
              Enter the LINE number of the zone to delete.
    Insert :  To insert a zone at a specific position in the route.
              Enter a valid zone number. The zone name will be displayed.
    NextPg :  To display the next screen, if more information exists.
    PrevPg :  To display the previous screen.
    Quit   :  To exit the route maintenance program.
 ENDTEXT
 SET COLOR TO &BLUELIT
 @ 0,0 TO 24,79
 SET COLOR TO &WHILIT
 @ 0,24 SAY ' ROUTE MAINTENANCE HELP WINDOW '
CASE HLPVAR = 3
 @ 1,0
 TEXT
The menu displayed at the bottom of the Zone Maintenance screen
lets you add, change, delete, or view checkpoints within a zone.

To select an option from the menu, you may either:
  Use the LEFT and RIGHT arrow keys to move from one selection
  to another. Press ENTER at the desired selection.
                    -- OR --
  Press the first letter of the desired selection.

Menu options and their respective functions:
    Add    :  To add a checkpoint to the zone.
              Enter a bar code, a must-scan indicator
```

```
                     ('Y' for YES, 'N' for NO), and the checkpoint's description.
    Change  :  To change checkpoint information in the zone.
               Enter the LINE number of the checkpoint to be changed.
    Delete  :  To delete a checkpoint.
               Enter the LINE number of a checkpoint to delete.
    NextPg  :  To display the next screen, if more information exists.
    PrevPg  :  To display the previous screen.
    Quit    :  To exit the zone maintenance program.
ENDTEXT
SET COLOR TO &BLUELIT
@ 0,0 TO 24,79
SET COLOR TO &HILIT
@ 0,25 SAY ' ZONE MAINTENANCE HELP WINDOW '
ENDCASE
@ 24,30 SAY ' ESC to exit '
DO WHILE INKEY() <> 27
ENDDO
RESTORE SCREEN
RETURN

* DETREP2.PRG
* COPYRIGHT 1989, 1996 COMPUTER SYSTEMS DESIGN, INC.

PROCEDURE ROAMHEAD
@ 1, 0 SAY DATE()
@ 1,40-INT(LEN(LTRIM(TRIM(HEAD)))/2) SAY HEAD
@ 1,71 SAY 'Page: '+STR(XPG,3)
@ 2, 0 SAY TIME()
IF ISFORDET
   @ 2,31 SAY 'DETAIL ROAM REPORT'
ELSE
   @ 2,31 SAY 'SUMMARY ROAM REPORT'
ENDIF
@ 2,69 SAY 'Report: '+STR(XPNTPG,3)
@ 3,29 SAY 'The TourWatch Manager (C) 1989'
@ 5, 0 SAY 'Guard Name : '+SUBSTR(XGNAME,1,24)
@ 5,32 SAY 'Check In   : '+DTOC(XDCHKIN)+'  '+XTCHKIN
@ 6, 0 SAY 'Route Name : '+XROUTE
@ 6,32 SAY 'Check Out  : '
IF .NOT. EMPTY(XDCHKOUT)
   @ 6,51 SAY DTOC(XDCHKOUT)+'  '+XTCHKOUT
ENDIF
@ 7,32 SAY 'Total Time : '+XTDIFF
IF ISFORDET
   @ 9,0 SAY 'Zone                              Bar      Check    Between'
   @ 10,0 SAY 'Number  Checkpoint                Code     Time     Time      Incident'
ELSE
   @ 9,0 SAY 'Zone                       Enter Leave Total In-Zone In-Zone Percent Must-scans'
   @ 10,0 SAY 'Number  Zone Name          Time  Time  Time  Points Pts Chkd Checked     Missed'
ENDIF
@ 11,0 SAY REPLICATE('-',80)
_L = 11
RETURN
PROCEDURE ROAMLOOP
PARAMETER RPTNAME
XROUTE = 'ROAM'
```

```
DO WHILE ! EOF()
  XPG   = XPG + 1
  XPNTPG= XPNTPG+1
  XTOUR = RCNUM
  SEEK XTOUR+'2'
  XDCHKIN = DATE
  XTCHKIN = TIME
  SELECT GN
  SEEK RR->XLOGDATA
  IF EOF()
    XGNAME = 'Undefined guard'
  ELSE
    XGNAME = GNAME
  ENDIF
  SELECT RR
  SEEK XTOUR+'5'
  IF ! EOF()
    XDCHKOUT = DATE
    XTCHKOUT = TIME
    XTDIFF   = CETIME(-1,2,XTCHKIN,XDCHKIN,XTCHKOUT,XDCHKOUT)
  ELSE
    XDCHKOUT = SPACE(8)
    XTCHKOUT = SPACE(5)
    XTDIFF   = SPACE(12)
  ENDIF
  DO ROAMHEAD
  L = L + 1
  IF ISFORGET
    @ L,5 SAY 'Check In'
    @ L,41 SAY XTCHKIN
    L = L + 2
  ELSE
    @ L,5 SAY 'Check In'
    @ L,24 SAY XTCHKIN
    L = L + 1
  ENDIF
  SELECT RR
  SEEK XTOUR+'R'
  IF (RCNUM = XTOUR) .AND. (TYPE = 'R') .AND. ! EOF()
    DO LRPTNAME
    DO &RPTNAME
  ENDIF
  SELECT RR
  SEEK XTOUR+'2'
  SET ORDER TO
  DO WHILE (RCNUM = XTOUR) .AND. ! EOF()
    SKIP
  ENDDO
  SKIP -1
  IF ISFORGET
    IF ! EMPTY(XTCHKOUT)
      @ L,5 SAY 'Check Out'
      @ L,41 SAY XTCHKOUT
    ELSE
      @ L,5 SAY 'Last recorded time is '+TIME
    ENDIF
```

```
      ELSE
        IF ! EMPTY(XTCHKOUT)
          @ L,8 SAY 'Check Out'
          @ L,21 SAY XTCHKOUT
        ELSE
          @ L,8 SAY 'Last recorded time is '+TIME
        ENDIF
      ENDIF
    ENDIF
    SKIP
    SET ORDER TO 1
ENDDO
RETURN
PROCEDURE DETROAM
DO WHILE (RCNUM = XTOUR) .AND. (TYPE = 'R') .AND. ! EOF()
  XCHKPNT = LOGDATA
  IF LEN(TRIM(XCHKPNT)) = 2
    IF TRIM(XCHKPNT) = 'ZZ'
      SKIP
    ENDIF
    SKIP
    LOOP
  ENDIF
  XCURZ = ZONE
  SELECT ZN
  SEEK XCURZ
  IF EOF()
    XZDESC = 'Undefined zone'
  ELSE
    XZDESC = SDESC
  ENDIF
  @ L,8 SAY 'Zone '+XCURZ+' - '+XZDESC
  SELECT RR
  XCHKPNT = LOGDATA
  DO WHILE (LEN(TRIM(XCHKPNT))=2).AND.(RCNUM=XTOUR).AND.(TYPE='R').AND.(ZONE=XCURZ).AND.!EOF()
    IF TRIM(LTRIM(XCHKPNT)) = 'ZZ'
      SKIP
    ENDIF
    SKIP
    XCHKPNT = LOGDATA
  ENDDO
  DO WHILE (RCNUM = XTOUR) .AND. (TYPE = 'R') .AND. (ZONE = XCURZ) .AND. ! EOF()
    SELECT DC
    SEEK XCHKPNT
    IF EOF()
      XDESC = 'Undefined ear code'
    ELSE
      XDESC = DESC
    ENDIF
    L = L + 1
    IF L > LMAX
      XPG   = XPG + 1
      CHNGPAGE('NORMHEAD')
    ENDIF
    SELECT RR
    @ L,8 SAY XDESC
    @ L,29 SAY XCHKPNT
```

```
    @ L,41 SAY TIME
    SKIP
    XCHKPNT = LOGDATA
    ISEXCEPT = .F.
    DO WHILE (LEN(TRIM(XCHKPNT)) = 2) .AND. (RONUM = XTOUR) .AND.
       (TYPE = 'R') .AND. (ZONE = XCURZ) .AND. ! EOF()
       ISEXCEPT = .T.
       IF TRIM(LTRIM(XCHKPNT)) = 'ZZ'
          SKIP
          XCHKPNT = LOGDATA
          SELECT CM
          SEEK XCHKPNT
          IF EOF()
             @ L,65 SAY 'Undefined'
          ELSE
             @ L,65 SAY SUBSTR(COMMENT,1,15)
          ENDIF
       ELSE
          SELECT EC
          SEEK TRIM(XCHKPNT)
          IF EOF()
             @ L,65 SAY 'Undefined'
          ELSE
             @ L,65 SAY SUBSTR(EDESC,1,15)
          ENDIF
       ENDIF
       L = L + 1
       SELECT RR
       SKIP
       XCHKPNT = LOGDATA
    ENDDO
    IF ISEXCEPT
       L = L - 1
    ENDIF
  ENDDO
  L = L + 2
ENDDO
RETURN
PROCEDURE SUMRDAY
DO WHILE (RONUM = XTOUR) .AND. (TYPE = 'R') .AND. ! EOF()
   XCHKPNT = LOGDATA
   IF LEN(TRIM(XCHKPNT)) = 2
      IF TRIM(XCHKPNT) = 'ZZ'
         SKIP
      ENDIF
      SKIP
      LOOP
   ENDIF
   XCURZ    = ZONE
   PNTIZONE = 0
   PNTCHK   = 0
   XPER     = 0
   MISSCHK  = 0
   SELECT ZN
   SEEK XCURZ
   IF EOF()
      XZDESC = 'Undefined zone'
```

```
    ELSE
       XZDESC  = SDESC
       PNTIZONE = POINTS
    ENDIF
    IF ! EMPTY(PNTIZONE)
       SELECT RR
       ZNREC = RECNO()
       DO WHILE (RONUM = XTOUR) .AND. (TYPE = 'R') .AND. (ZONE = XCURZ) .AND. ! EOF()
          XCHKPNT = LOGDATA
          IF LEN(TRIM(XCHKPNT)) = 2
             IF TRIM(XCHKPNT) = '22'
                SKIP
             ENDIF
             SKIP
             LOOP
          ENDIF
          LZNREC = RECNO()
          GO ZNREC
          DO WHILE (LOGDATA <> XCHKPNT) .AND. (RECNO() <> LZNREC) .AND. ! EOF()
             SKIP
          ENDDO
          IF (RECNO() = LZNREC)
             PNTCHK = PNTCHK - 1
          ELSE
          ENDIF
          GO LZNREC
          SKIP
       ENDDO
       XPER = INT(PNTCHK/PNTIZONE*100)
       GO ZNREC
       DO WHILE (RONUM = XTOUR) .AND. (TYPE = 'R') .AND. (ZONE = XCURZ) .AND. ! EOF()
          SKIP
       ENDDO
       LZNREC = RECNO()
       SCANMISS(3,'RR')
    ENDIF
    SELECT RR
    DO WHILE (RONUM = XTOUR) .AND. (TYPE = 'R') .AND. (ZONE = XCURZ) .AND. ! EOF()
       SKIP
    ENDDO
    @ L,0 SAY XCURZ
    @ L,9 SAY XZDESC
    @ L,47 SAY PNTIZONE PICTURE '9999'
    @ L,56 SAY PNTCHK PICTURE '9999'
    @ L,63 SAY XPER PICTURE '9999'
    @ L,67 SAY '%'
    @ L,76 SAY MISSCHK PICTURE '9999'
    L = L + 1
    IF L > LMAX
       XPG  = XPG + 1
       CHNGPAGE('NORMHEAD')
    ENDIF
ENDDO
SELECT SC
SET ORDER TO 2
GO TOP
PNTCHK = 0
```

```
     XPER    = 0
     DO WHILE ! EOF()
       XCURZ   = ZNUM
       PNTIZONE = 0
       MISSCHK = 0
       SELECT RR
       SEEK XTOUR+'R'+XCURZ
       IF EOF()
         SELECT ZN
         SEEK XCURZ
         IF EOF()
           XZDESC = 'Undefined zone'
         ELSE
           XZDESC  = SDESC
           PNTIZONE = POINTS
         ENDIF
         SELECT PC
         DO WHILE (ZNUM = XCURZ) .AND. ! EOF()
           IF MUSTCHECK = 'Y'
             MISSCHK = MISSCHK + 1
           ENDIF
           SKIP
         ENDDO
         @ L,0 SAY XCURZ
         @ L,3 SAY XZDESC
         @ L,47 SAY PNTIZONE PICTURE '9999'
         @ L,56 SAY PNTCHK PICTURE '9999'
         @ L,63 SAY XPER PICTURE '9999'
         @ L,67 SAY '%'
         @ L,76 SAY MISSCHK PICTURE '9999'
         L = L + 1
         IF L > LMAX
           XPG  = XPG + 1
           CHNGPAGE('NORMHEAD')
         ENDIF
       ELSE
         SELECT PC
         DO WHILE (ZNUM = XCURZ) .AND. ! EOF()
           SKIP
         ENDDO
       ENDIF
     ENDDO
     SELECT PC
     SET ORDER TO 1
     SELECT RR
     RETURN

* PNTERR.PRG
* COPYRIGHT 1989, 1988 COMPUTER SYSTEMS DESIGN, INC.

FUNCTION print_error
PARAM name, line
SET DEVICE TO SCREEN
SAVE SCREEN TO _SAV1
SET MESSAGE TO 15 CENTER
_PNT_CHOICE = 1
```

```
SET COLOR TO &HILIT
@ 7,29 CLEAR TO 16,49
SET COLOR TO &RHILIT
@ 7,29 TO 12,49 DOUBLE
SET COLOR TO &HILIT
@ 7,34 SAY 'PARALLEL'
@ 8,33 SAY 'Printer Error'
@ 9,29 SAY CHR(199)+REPLICATE(CHR(196),20)+CHR(182)
@ 10,30 PROMPT 'A  Retry Printing ' MESSAGE 'Set printer correctly and try again.'
@ 11,30 PROMPT 'B  Cancel Printing' MESSAGE 'Cancel printing and return to program.'
SET INTENSITY ON
MENU TO _SPNT_CHOICE
SET INTENSITY OFF
IF _SPNT_CHOICE = 2
   RESTORE SCREEN FROM _SCR1
   SET COLOR TO &HILIT
   BREAK
ENDIF
SET DEVICE TO PRINT
RESTORE SCREEN FROM _SCR1
SET COLOR TO &HILIT
RETURN .T.

* FUNCLIB.PRG
* COPYRIGHT 1999, 1988 COMPUTER SYSTEMS DESIGN, INC.

FUNCTION CETIME
PARAMETER FTNT,FMAT,FT1,FD1,FT2,FD2
IF FTNT < 0
   FTNT = 60*(VAL(FT2)-VAL(FT1))+VAL(SUBSTR(FT2,4))-VAL(SUBSTR(FT1,4))
   FTNT = 1440*(FD2-FD1)+FTNT
ENDIF
IF FMAT = 0
   RETURN FTNT
ENDIF
SHH = INT(FTNT/60)
IF SHH > 99
   STORE '99' TO SHH,SMM
ELSE
   SHH = SUBSTR(STR(SHH+100,3),2)
   SMM = INT(FTNT%60)
   SMM = SUBSTR(STR(SMM+100,3),2)
ENDIF
IF FMAT = 1
   RETURN SHH+':'+SMM
ENDIF
RETURN SHH+' hr '+SMM+' min'
FUNCTION OKZONE
PARAMETERS F0,F1
IF INKEY()=355
   RETURN .T.
ENDIF
IF LASTKEY() = 8
   IF F1 = '1'
      X2NUM = SPACE(4)
      @ 12,36 SAY X2NUM
```

```
          RETURN .T.
        ELSE
          RETURN .F.
        ENDIF
      ENDIF
      IF F1='2'
        IF AT('',XZDESC)<>0 .OR. (AT('ALL ZONES',UPPER(XZDESC))<>0.AND.AT('',XZNUM)<>0)
          XZDESC='ALL ZONES'+SPACE(6)
          XZNUM='**'
          @ 11,36 SAY XZDESC
          KEYBOARD XZNUM+CHR(13)+CHR(255)
          RETURN .T.
        ENDIF
      ENDIF
      IF F1='1'
        IF AT('',XZDESC)<>0 .OR. (AT('ALL ZONES',UPPER(XZDESC))<>0.AND.AT('',XZNUM)<>0)
          XZDESC='ALL ZONES'+SPACE(6)
          XZNUM='**'
          @ 11,36 SAY XZDESC
          @ 12,36 SAY XZNUM
          RETURN .T.
        ENDIF
      ENDIF
    ENDIF
    IF EMPTY(F0)
      IF F1='2'
        XZDESC = SPACE(15)
        @ 11,36 SAY SPACE(15)
        RETURN .T.
      ELSE
        IF EMPTY(XZDESC)
          ERRMSG(19,'Missing zone number.')
          MESG(19,'F2 to display ZNos.  ESC to exit.')
          RETURN .F.
        ELSE
          SELECT ZN
          SET ORDER TO 1
          SEEK XZNUM
          XZDESC = SDESC
          @ 11,36 SAY SDESC
          RETURN .T.
        ENDIF
      ENDIF
    ENDIF
    IF F1 = '1'
      F0 = SUBSTR(LTRIM(F0)+SPACE(6),1,6)
      XZNUM = F0
      @ 12,36 SAY F0
    ELSE
      F0 = SUBSTR(LTRIM(F0)+SPACE(15),1,15)
      XZDESC = F0
      @ 11,36 SAY F0
    ENDIF
    SELECT ZN
    SET ORDER TO &F1
    IF XWINDREC = 0
      SEEK UPPER(F0)
```

```
    IF F1 = '2' .AND. ! EMPTY(XZNUM) .AND. ! EOF()
      DO WHILE UPPER(F0) = UPPER(SDESC) .AND. ZNUM <> XZNUM .AND. !EOF()
        SKIP
      ENDDO
      IF UPPER(F0)<>UPPER(SDESC) .OR. EOF()
        SEEK UPPER(F0)
      ENDIF
    ENDIF
  ELSE
    GO XWINDREC
    XWINDREC = 0
  ENDIF
  IF EOF()
    IF F1='1'
      ERRMESS(19,'Invalid zone number.')
    ELSE
      ERRMESS(19,'Invalid zone name.')
    ENDIF
    MESS(19,'F2 to display ZONES.  ESC to exit.')
    RETURN .F.
  ENDIF
  XZNUM =ZNUM
  XZDESC=SDESC
  @ 11,36 SAY SDESC
  @ 12,36 SAY ZNUM
  IF F1='2'
    KEYBOARD ZNUM+CHR(13)+CHR(255)
  ENDIF
RETURN .T.
FUNCTION OKGUARD
PARAMETERS F0,F1
IF INKEY() = 255
  RETURN .T.
ENDIF
IF LASTKEY() = 5
  IF F1 = '1'
    XGRDNUM = SPACE(6)
    @ 13,36 SAY XGRDNUM
    RETURN .T.
  ELSE
    RETURN .F.
  ENDIF
ENDIF
IF F1='2'
  IF AT('',XGRDNAME)<>0 .OR. (AT('ALL GUARDS',UPPER(XGRDNAME))<>0.AND.AT('',XGRDNUM)<>0)
    XGRDNUM='**'
    XGRDNAME='ALL GUARDS '+SPACE(14)
    @ 13,36 SAY '**'
    @ 12,36 SAY XGRDNAME
    KEYBOARD XGRDNUM+CHR(13)+CHR(255)
    RETURN .T.
  ENDIF
ENDIF
IF F1='1'
  IF AT('',XGRDNAME)<>0.OR. (AT('ALL GUARDS',UPPER(XGRDNAME))<>0.AND.AT('',XGRDNUM)<>0)
    XGRDNUM='**'
```

```
        XGRDNAME='ALL GUARDS'+SPACE(14)
        @ 13,36 SAY '**'
        @ 12,36 SAY XGRDNAME
        RETURN .T.
      ENDIF
    ENDIF
    IF EMPTY(F0)
      IF F1='2'
        XGRDNAME = SPACE(24)
        @ 12,36 SAY SPACE(24)
        RETURN .T.
      ELSE
        IF EMPTY(XGRDNAME)
          ERRMESG(19,'Missing Guard ID.  ESC to exit.')
          MESG(19,'F2 to display GUARDS.  ESC to exit.')
          RETURN .F.
        ELSE
          SELECT GN
          SET ORDER TO 2
          SEEK UPPER(XGRDNAME)
          XGRDNUM = GNUM
          RETURN .T.
        ENDIF
      ENDIF
    ENDIF
ENDIF
IF F1 = '1'
  F0 = SUBSTR(LTRIM(F0)+SPACE(6),1,6)
  XGRDNUM = F0
  @ 13,36 SAY F0
ELSE
  F0 = SUBSTR(LTRIM(F0)+SPACE(24),1,24)
  XGRDNAME = F0
  @ 12,36 SAY F0
ENDIF
SELECT GN
SET ORDER TO &F1
IF XWINDREC = 0
  SEEK UPPER(F0)
  IF F1 = '2' .AND. ! EMPTY(XGRDNUM) .AND. ! EOF()
    DO WHILE UPPER(F0) = UPPER(GNAME) .AND. GNUM <> XGRDNUM .AND. !EOF()
      SKIP
    ENDDO
    IF UPPER(F0)<>UPPER(GNAME) .OR. EOF()
      SEEK UPPER(F0)
    ENDIF
  ENDIF
ELSE
  GO XWINDREC
  XWINDREC = 0
ENDIF
IF EOF()
  IF F1='1'
    ERRMESG(19,'Invalid guard number.')
  ELSE
    ERRMESG(19,'Invalid guard name.')
  ENDIF
  MESG(19,'F2 to display GUARDS.  ESC to exit.')
```

```
      RETURN .F.
   ENDIF
   XGRDNUM = GNUM
   XGRDNAME = GNAME
   @ 12,36 SAY GNAME
   @ 13,36 SAY GNUM
   IF F1='2'
      KEYBOARD XGRDNUM+CHR(13)+CHR(255)
   ENDIF
   RETURN .T.
   FUNCTION OKRDESC
   PARAMETERS F0,F1
   IF F1 = '1' .AND. INKEY() = 255
      RETURN .T.
   ENDIF
   IF LASTKEY() = 5
      IF F1 = '1'
         XRNUM=SPACE(6)
         @ 12,36 SAY XRNUM
         RETURN .T.
      ELSE
         RETURN .F.
      ENDIF
   ENDIF
   IF EMPTY(F0)
      IF F1='2'
         XRDESC = SPACE(20)
         @ 11,36 SAY XRDESC
         RETURN .T.
      ELSE
         IF EMPTY(XRNUM)
            ERRMESS(19,'Missing route number.')
            MESS(19,'F2 to display ROUTES.  ESC to exit.')
            RETURN .F.
         ELSE
            SELECT RTS
            SET ORDER TO 1
            SEEK XRNUM
            XRDESC = DESC
            @ 11,36 SAY XRDESC
            RETURN .T.
         ENDIF
      ENDIF
   ENDIF
   IF (F1='2') .AND. ('**' $ F0)
      XRDESC='ALL ROUTES'+SPACE(10)
      XRNUM='**'
      @ 11,36 SAY XRDESC
      KEYBOARD XRNUM+CHR(13)+CHR(255)
      RETURN .T.
   ENDIF
   IF F1 = '1'
      F0 = SUBSTR(LTRIM(F0)+SPACE(6),1,6)
      XRNUM = F0
      @ 12,36 SAY F0
   ELSE
      F0 = SUBSTR(LTRIM(F0)+SPACE(20),1,20)
```

```
    XRDESC = F0
    @ 11,36 SAY F0
  ENDIF
  SELECT RTS
  SET ORDER TO RF1
  IF XWINDREC = 0
    SEEK UPPER(F0)
    IF F1 = '2' .AND. ! EMPTY(XRNUM) .AND. !EOF()
      DO WHILE UPPER(F0) = UPPER(DESC) .AND. RNUM <> XRNUM .AND. !EOF()
        SKIP
      ENDDO
      IF UPPER(F0)<>UPPER(DESC) .OR. EOF()
        SEEK UPPER(F0)
      ENDIF
    ENDIF
  ELSE
    GO XWINDREC
    XWINDREC = 0
  ENDIF
  IF EOF()
    IF F1='1'
      ERRMESS(19,'Invalid route number.')
    ELSE
      ERRMESS(19,'Invalid route name.')
    ENDIF
    MESG(19,'F2 to display ROUTES.  ESC to exit.')
    RETURN .F.
  ENDIF
  XRNUM = RNUM
  XRDESC=DESC
  IF F1='1'
    @ 11,36 SAY XRDESC
  ELSE
    @ 11,36 SAY XRDESC
    KEYBOARD XRNUM+CHR(13)+CHR(255)
  ENDIF
RETURN .T.
FUNCTION OKICODE
PARAMETER F0
IF EMPTY(XICODE)
  @ 12,55 SAY SPACE(25)
  MESG(19,'F2 to display INCIDENT CODES.  ESC to exit.')
  RETURN .F.
ENDIF
IF '**' $ XICODE
  @ 12,55 SAY SPACE(25)
  SET COLOR TO &LOLIT
  @ 12,55 SAY 'ALL INCIDENT CODES'
  SET COLOR TO &HILIT
  RETURN .T.
ENDIF
IF LEN(LTRIM(TRIM(XICODE)))=1
  XICODE='0'+LTRIM(TRIM(UPPER(XICODE)))
  @ 12,43 SAY XICODE
ENDIF
SELECT EX
```

```
SEEK XICODE
  IF EOF()
    CLR(19)
    ERRMESG(19,'Incident code not found.')
    @ 12,55 SAY SPACE(25)
    MESG(19,'F2 to display INCIDENT CODES.  ESC to exit.')
    RETURN .F.
  ENDIF
  SET COLOR TO &LOLIT
  IF LEN(TRIM(EDESC))>=26
    @ 12,55 SAY SUBSTR(EDESC,1,25)
  ELSE
    @ 12,55 SAY SPACE(25)
    @ 12,55 SAY EDESC
  ENDIF
  SET COLOR TO &HILIT
  RETURN .T.
FUNCTION OKROUT
PARAMETER R0
IF EMPTY(R0)
  RETURN .F.
ENDIF
IF LASTKEY() = 27
  RETURN .F.
ENDIF
IF ('ROAM' $ R0) .OR. ('**' $ R0)
  ?? CHR(7)
  MESG(24,'"ROAM" and "**" are reserved route names and may not be used.')
  INKEY(2)
  MESG(24,'F1 Help   F2 display ROUTES   ESC exit')
  RETURN .F.
ENDIF
R0 = SUBSTR(LTRIM(R0)+SPACE(6),1,6)
@ 1,11 SAY R0
SELECT RTE
SEEK R0
IF EOF()
  RETURN .T.
ENDIF
XNEW=.F.
RETURN .T.
FUNCTION OKZNUM
PARAMETER RPTBOOL
IF TYPE('RPTBOOL') = 'U'
  RPTBOOL = 0
ENDIF
IF LASTKEY() = 27
  RETURN .T.
ENDIF
IF EMPTY(XZNUM)
  IF RPTBOOL=1
    ERRMESG(24,'Invalid zone number.')
    XZNUM = ZONE(R0)
    YDESCR = DESCR(R0)
    MESG(24,'F1 Help   F2 display ZONES   ESC exit')
  ENDIF
  RETURN .F.
ENDIF
```

```
IF '**' $ XZNUM
   ERRMESS(24,'"**" is a reserved zone name and may not be used.')
   MESS(24,'F1 help   F2 display ZONES   ESC exit')
   IF RPTBOOL=1
      XZNUM = ZONE[F0]
      YDESCR = DESCR[F0]
   ENDIF
   RETURN .F.
ENDIF
XZNUM=SUBSTR(LTRIM(XZNUM)+SPACE(6),1,6)
IF RPTBOOL = 0
   @ 1,17 SAY XZNUM
ENDIF
SELECT ZN
SEEK XZNUM
IF EOF()
   DO CASE
   CASE RPTBOOL = 0
      RETURN .T.
   CASE RPTBOOL = 1
      ERRMESS(24,TRIM(XZNUM)+' is not a valid zone.')
      XZNUM = ZONE[F0]
      YDESCR = DESCR[F0]
      MESS(24,'F1 help   F2 display ZONES   ESC cancel entry')
      RETURN .F.
   ENDCASE
ENDIF
XNEW=.F.
IF RPTBOOL = 1
   YDESCR = ZDESC
ENDIF
RETURN .T.
FUNCTION ONLNUM
PARAMETER ALNUM,PGLEN
IF ALNUM = 0
   RETURN .T.
ENDIF
IF (ALNUM < 0) .OR. (ALNUM > XNE)
   ERRMESS(24,'Invalid line number.')
   RETURN .F.
ENDIF
IF (ALNUM < XPSTOP) .OR. (ALNUM > (XPSTOP+PGLEN))
   ERRMESS(24,'Line number is not on this page.')
   RETURN .F.
ENDIF
RETURN .T.
FUNCTION ONTIME
PARAMETER NTIME
IF LASTKEY()=27
   RETURN .T.
ENDIF
IF AT(' ',NTIME) <> 0
   ERRMESS(19,'Invalid time.')
   MESS(19,'ESC to exit.')
   RETURN .F.
ENDIF
```

```
RETURN .T.
FUNCTION OKHISTTIME
PARAMETER F0,F1,F2
IF LASTKEY()=27
  RETURN .T.
ENDIF
IF LASTKEY()=5
  RETURN .T.
ENDIF
IF AT(' ',F0)<>0 .OR. VAL(SUBSTR(F0,1,2))>=24 .OR. VAL(SUBSTR(F0,4,2))>=60
  ERRMESG(19,'Invalid time.')
  DO CASE
  CASE F1=1
    MESG(19,'F2 to display CHECKPOINTS.  ESC to exit.')
  CASE F1=2
    MESG(19,'F2 to display INCIDENT CODES.  ESC to exit.')
  CASE F1=3
    MESG(19,'F2 to display GUARDS.  ESC to exit.')
  ENDCASE
  RETURN .F.
ENDIF
RETURN .T.
FUNCTION OKDATE
PARAMETER ADATE,P2ARM
IF LASTKEY()=27 .OR. LASTKEY()=5
  RETURN .T.
ENDIF
IF EMPTY(ADATE)
  ERRMESG(P2ARM,'Date must not be empty.')
  MESG(P2ARM,'ESC to exit.')
  RETURN .F.
ENDIF
RETURN .T.
FUNCTION OKGNAME
IF EMPTY(VGRNAME)
  ERRMESG(24,'Invalid guard name.')
  YGRNAME = GRNAME(F0)
  MESG(24,'ESC to cancel entry.')
  RETURN .F.
ENDIF
IF '**' $ YGRNAME
  ERRMESG(24,'"**" is a reserved guard name and may not be used.')
  YGRNAME = GRNAME(F0)
  MESG(24,'ESC to cancel entry.')
  RETURN .F.
ENDIF
RETURN .T.
FUNCTION OKNEWGUARD
IF EMPTY(YGRD)
  CLR(24)
  ERRMESG(24,'Invalid guard number.')
  MESG(24,'ESC to cancel entry.')
  RETURN .F.
ENDIF
IF '**' $ YGRD
  ERRMESG(24,'"**" is a reserved guard name and may not be used.')
```

```
    YGRD = GRD[F0]
    YGRNAME = GRNAME[F0]
    MESS(24,'ESC to cancel entry.')
    RETURN .F.
ENDIF
XXI = 1
YGRD = SUBSTR(LTRIM(YGRD)+SPACE(6),1,6)
DO WHILE (XXI <= XNB)
  IF XXI = F0
    XXI = XXI + 1
    LOOP
  ENDIF
  IF YGRD = GRD[XXI] .AND. STAT[XXI]
    ERRMESS(24,'Duplicate guard number.')
    YGRD = GRD[F0]
    YGRNAME = GRNAME[F0]
    MESS(24,'ESC to cancel entry.')
    RETURN .F.
  ENDIF
  XXI = XXI + 1
ENDDO
RETURN .T.
FUNCTION PKDATE
PARAMETERS F0
XDD=CHR(DAY(F0)+32)
XMM=CHR(MONTH(F0)+32)
XYY=YEAR(F0)%100
XYY=CHR(XYY+IIF(XYY>=82,-50,50))
RETURN XYY+XMM+XDD
FUNCTION UPKDATE
PARAMETERS F0
XYY=SUBSTR(STR(ASC(F0)+150,3),2)
XMM=SUBSTR(STR(ASC(SUBSTR(F0,2))+68,3),2)
XDD=SUBSTR(STR(ASC(SUBSTR(F0,3))+68,3),2)
RETURN XMM+'/'+XDD+'/'+XYY
FUNCTION PKTIME
PARAMETERS F0
XHH=CHR(VAL(F0)+32)
XMM=CHR(VAL(SUBSTR(F0,4))+32)
RETURN XHH+XMM
FUNCTION UPKTIME
PARAMETERS F0
XHH=SUBSTR(STR(ASC(F0)+68,3),2)
XMM=SUBSTR(STR(ASC(SUBSTR(F0,2))+68,3),2)
IF XHH='25'
   RETURN ''
ENDIF
RETURN XHH+':'+XMM
FUNCTION UPKTITLE
PARAMETERS F0
XT=''
FOR N=35 TO 1 STEP -1
   XT=XT+CHR(122-ASC(SUBSTR(F0,N)))
NEXT
RETURN XT
FUNCTION MESSWAIT
```

```
    PARAMETERS F0,F1
    MESS(F0,F1)
    MESS(F0+1,'Press any key to continue...')
    DO WHILE INKEY() = 0
    ENDDO
    RETURN .T.
    FUNCTION SORP
    CLR(10)
    @ 12,23 SAY 'Record to (S)creen or (P)rinter' GET YPRINTIT PICTURE '!' VALID YPRINTIT $ 'SP'
    MESS(16,'ESC to exit.')
    READ
    IF LASTKEY() = 27
      RETURN .F.
    ENDIF
    IF YPRINTIT = 'S'
      YPRINTIT = .F.
      LMAX = 22
      CLEAR
    ELSE
      YPRINTIT = .T.
      LMAX =58
      CLR(12)
      MESS(12,'Please prepare printer for printing.')
      MESS(14,'ESC to exit.  Press any other key to begin printing.')
      DO WHILE INKEY()=0
      ENDDO
      IF LASTKEY()=27
         RETURN .F.
      ENDIF
      CLR(12)
      MESS(12,'Sending output to printer..')
      SET DEVICE TO PRINT
    ENDIF
RETURN .T.
FUNCTION CHNGPAGE
PARAMETER HEADPROG
IF YPRINTIT
   EJECT
ELSE
   @ 24, 0
   @ 24,18 SAY 'ESC to exit.  Press any other key to continue...'
   DO WHILE INKEY() = 0
   ENDDO
   IF LASTKEY() = 27
      RETURN .F.
   ENDIF
   MESS(24,'Please wait while processing files...')
ENDIF
IF !EMPTY(HEADPROG)
   DO &HEADPROG
   DO &HEADPROG
ENDIF
RETURN .T.
PROCEDURE GENWIND
PARAMETER DUM1,DUM2,I_VAR
IF TYPE(I_VAR) = 'C'
   INPVAR = UPPER(TRIM(LTRIM(&I_VAR)))
```

```
    ELSE
      RETURN
    ENDIF
    SET KEY -1
    SET CURSOR OFF
    SAVE SCREEN TO SCR1
    @ 24,0
    YREADVAR = READVAR()
    XWINDREC = 0
    XREC = 0

DO CASE
    CASE YREADVAR = 'XZNUM'
      IF TYPE('COLF') = 'U'
        COLF = 0
      ENDIF
      SELECT ZN
      SET ORDER TO 1
      DO DRAWINDOW WITH 6,2+COLF,14,'Zone window','ZNUM','Number','SDESC','Name'
    CASE YREADVAR = 'XZDESC'
      SELECT ZN
      SET ORDER TO 2
      DO DRAWINDOW WITH 5,2,14,'Zone window','SDESC','Name','ZNUM','Number'
    CASE YREADVAR = 'XRNUM'
      SELECT RTS
      DO DRAWINDOW WITH 5,2,14,'Route window','RNUM','Number','DESC','Name'
    CASE YREADVAR = 'XRDESC'
      SELECT RTS
      SET ORDER TO 2
      DO DRAWINDOW WITH 5,2,14,'Route window','DESC','Name','RNUM','Number'
    CASE YREADVAR = 'XGRDNUM'
      SELECT GN
      SET ORDER TO 1
      DO DRAWINDOW WITH 5,2,14,'Guard Window','GNUM','ID','GNAME','Name'
    CASE YREADVAR = 'XGRDNAME'
      SELECT GN
      SET ORDER TO 2
      DO DRAWINDOW WITH 5,2,14,'Guard Window','GNAME','Name','GNUM','ID'
    CASE YREADVAR = 'XBARCODE'
      SELECT BC
      SET ORDER TO 1
      DO DRAWINDOW WITH 5,2,14,'Checkpoint Window','BARCODE','Bar Code','DESC','Checkpoint','ZNUM','Zone'
    CASE YREADVAR = 'YB1'
      SELECT BC
      XBCORD=INDEXORD()
      SET ORDER TO 3
      DO DRAWINDOW WITH 5,2,14,'Checkpoint Window','BARCODE','Bar Code','DESC','Checkpoint','ZNUM','Zone'
      SET ORDER TO XBCORD
    CASE YREADVAR = 'XCHKDESC'
      SELECT BC
      SET ORDER TO 2
      DO DRAWINDOW WITH 5,2,14,'Checkpoint Window','DESC','Checkpoint','ZNUM','Zone','BARCODE','Bar Code'
    CASE YREADVAR = 'XICODE'
      SELECT EX
      DO DRAWINDOW WITH 5,2,14,'Incident Window','ECODE','Code','EDESC','Incident'
    ENDCASE
```

```
    IF LASTKEY() <> 27
      XWINDREC = RECNO()
    ENDIF
    GO XREC
    RESTORE SCREEN FROM SCR1
    SET CURSOR ON
    SET KEY -1 TO REWIND
    RETURN
    PROCEDURE DRAWINDOW
    PARAMETER LTR,LTC,RWTOT,HEDR0,FLD1,HEDR1,FLD2,HEDR2,FLD3,HEDR3
    XREC = RECNO()
    GO TOP
    IF EOF()
       RETURN
    ENDIF
    XTOPREC = RECNO()
    LTC = LTC + 2
    RWTOT = RWTOT - 1
    DUM_COUNT = LFT_SP(HEDR1,FLD1)
    IF LEN(HEDR1) > LEN(&FLD1)
       CL_FLD1 = LTC+DUM_COUNT
    ELSE
       CL_FLD1 = LTC
       IF INT(DUM_COUNT) <> DUM_COUNT
          DUM_COUNT = DUM_COUNT+1
       ENDIF
       HEDR1 = SPACE(DUM_COUNT)+HEDR1+SPACE(DUM_COUNT)
    ENDIF
    CLTOT = LEN(HEDR1)+2
    IF TYPE('FLD2') <> 'U'
       DUM_COUNT = LFT_SP(HEDR2,FLD2)
       IF LEN(HEDR2) > LEN(&FLD2)
          CL_FLD2 = LTC+CLTOT+DUM_COUNT
       ELSE
          CL_FLD2 = LTC+CLTOT
          IF INT(DUM_COUNT) <> DUM_COUNT
             DUM_COUNT = DUM_COUNT+1
          ENDIF
          HEDR2 = SPACE(DUM_COUNT)+HEDR2+SPACE(DUM_COUNT)
       ENDIF
       CLTOT = CLTOT + LEN(HEDR2) + 2
    ENDIF
    IF TYPE('FLD3') <> 'U'
       DUM_COUNT = LFT_SP(HEDR3,FLD3)
       IF LEN(HEDR3) > LEN(&FLD3)
          CL_FLD3 = LTC+CLTOT+DUM_COUNT
       ELSE
          CL_FLD3 = LTC+CLTOT
          IF INT(DUM_COUNT) <> DUM_COUNT
             DUM_COUNT = DUM_COUNT+1
          ENDIF
          HEDR3 = SPACE(DUM_COUNT)+HEDR3+SPACE(DUM_COUNT)
       ENDIF
       CLTOT = CLTOT + LEN(HEDR3) + 2
    ENDIF
    RBR = LTR+RWTOT+1
    RBC = CLTOT+LTC-1
```

```
LTR = LTR - 2
LTC = LTC - 2
SET COLOR TO &F2WIND
@ LTR,LTC CLEAR TO RBR,RBC
SET COLOR TO &BLNKWIND
@ LTR,LTC TO RBR,RBC DOUBLE
LTC = LTC + 2
IF ISCOLOR()
   SET COLOR TO &BLNKWIND
ELSE
   SET COLOR TO &F2INVRS
ENDIF
@ LTR,LTC+(CLTOT-LEN(HEDR0))/2-1 SAY ' '+HEDR0+' '
LTR = LTR + 1
SET COLOR TO &COORSLIT
@ LTR,LTC SAY HEDR1
IF TYPE('HEDR2') <> 'U'
   @ LTR,COL()+2 SAY HEDR2
ENDIF
IF TYPE('HEDR3') <> 'U'
   @ LTR,COL()+2 SAY HEDR3
ENDIF
@ 23,0
SET COLOR TO &INVRS
MESS(23,'PgUp, PgDn, '+CHR(24)+' and '+CHR(25)+' to move cursor, ENTER to select, ESC to cancel.')
SET COLOR TO &F2WIND
LTR = LTR + 1
RBR = RBR - 1
RBC = RBC - 1
SET SOFTSEEK ON
SEEK INPVAR
SET SOFTSEEK OFF
IF EOF()
   SKIP -1
ENDIF
XREC1 = RECNO()
XCURTOPREC = RECNO()
FILLWIND()
XREC1 = XTOPREC
IF ! EOF()
   XRL = LTR
   SET COLOR TO &F2INVRS
   DRAWLINE()
   SET COLOR TO &F2WIND
   XLST = 0
   DO WHILE XLST <> 27
      XLST = INKEY(0)
      DO CASE
      CASE XLST = 27
         EXIT
      CASE XLST = 13

KEYBOARD &FLD1+CHR(13)
         EXIT
      CASE XLST = 19
```

```
   IF RECNO() = XREC1
      LOOP
   ENDIF
   GO XCURTOPREC
   I = 1
   DO WHILE (I <= RWTOT) .AND. (RECNO() <> XREC1)
      SKIP -1
      I = I + 1
   ENDDO
   FILLWIND()
   SET COLOR TO &F2INVRS
   DRWLINE()
   SET COLOR TO &F2WIND
CASE XLST = 3

YOURREC = RECNO()
   GO XCURTOPREC
   I = 1
   DO WHILE (I <= RWTOT) .AND. ! EOF()
      SKIP
      I = I + 1
   ENDDO
   IF EOF()
      SKIP -1
   ENDIF
   FILLWIND()
   SET COLOR TO &F2INVRS
   DRWLINE()
   SET COLOR TO &F2WIND
CASE XLST = 5

IF EOF()
      SKIP -1
   ENDIF
   IF RECNO() = XREC1
      LOOP
   ENDIF
   SET COLOR TO &F2WIND
   DRWLINE()
   SKIP -1
   XPL = XPL - 1
   IF XPL < LTR
      FILLWIND()
   ENDIF
   SET COLOR TO &F2INVRS
   DRWLINE()
   SET COLOR TO &F2WIND
CASE XLST = 24

SKIP
   IF EOF()
      SKIP -1
      LOOP
   ENDIF
   SKIP -1
   SET COLOR TO &F2WIND
```

```
        DRWLINE()
        SKIP
        XPL = XPL + 1
        IF XPL > RBR
          FILLWIND()
        ENDIF
        SET COLOR TO &F2INVRS
        DRWLINE()
        SET COLOR TO &F2WIND
      ENDCASE
    ENDDO
  ENDIF
  SET COLOR TO &HILIT
  RETURN
  FUNCTION DRWLINE
  IF TYPE('FLD2') <> 'U'
    @ XPL,CL_FLD2 SAY &FLD2
  ENDIF
  IF TYPE('FLD3') <> 'U'
    @ XPL,CL_FLD3 SAY &FLD3
  ENDIF
  @ XPL,CL_FLD1 SAY &FLD1
  RETURN .T.
  FUNCTION FILLWIND
  XCURTOREC = RECNO()
  SET COLOR TO &F2WIND
  @ LTR,LTC CLEAR TO RBR,RBC
  XPL = LTR
  DO WHILE (XPL <= RBR) .AND. .NOT. EOF()

IF TYPE('FLD2') <> 'U'
      @ XPL,CL_FLD2 SAY &FLD2
    ENDIF
    IF TYPE('FLD3') <> 'U'
      @ XPL,CL_FLD3 SAY &FLD3
    ENDIF
    @ XPL,CL_FLD1 SAY &FLD1
    XPL = XPL + 1
    SKIP
  ENDDO
  GO XCURTOREC
  XPL = LTR
  RETURN .T.
  FUNCTION LFT_SP
  PARAMETER HEDR_STR,FLD_STR
  RETURN(ABS(LEN(HEDR_STR)-LEN(&FLD_STR))/2)

* CSDCOMM.PRG
* COPYRIGHT 1989, 1988 COMPUTER SYSTEMS DESIGN, INC.

FUNCTION SENDSTR
PARAMETERS PT,STRING
PRIVATE P,PORT,TYPER
P=PCOUNT()
DO CASE
```

```
CASE P=2
   PORT=PT
CASE P=1
   PORT=1
   STRING=PT
ENDCASE
STRING=STRING+CHR(13)
TXERR=TXSTRING(PORT,STRING)
RETURN TXERR
FUNCTION SENDCHR
PARAMETERS PORT,N
PRIVATE TXERR
IF PCOUNT()=1
   N=PORT
   PORT=1
ENDIF
IF (N>=0) .AND. (N<=255)
   TXERR=TXCHAR(PORT,CHR(N))
   RETURN TXERR
ELSE
   RETURN -93
ENDIF
FUNCTION GETSTR
PARAMETERS PORT,T
PRIVATE P,SSTR
P=PCOUNT()
DO CASE
CASE P=1
   T=PORT
   PORT=1
CASE P=0
   PORT=1
   T=1
ENDCASE
SSTR=RXSTRING(PORT,150,13,T,0,0,0)
IF RXSTRINGER()=-99
   SSTR='TIMEOUT'
ENDIF
RETURN SSTR
FUNCTION GETCHR
PARAMETERS PORT,T
PRIVATE P,ST,MT,G
P=PCOUNT()
DO CASE
CASE P=1
   T=PORT
   PORT=1
CASE P=0
   PORT=1
   T=1
ENDCASE
ST=SECONDS()
MT=ST
G=0
DO WHILE (G<=0) .AND. ((MT-ST)<=T)
   G=RXCHAR(PORT)
   MT=SECONDS()
```

```
     ENDIO
     IF G=-91
       G=0
     ENDIF
     RETURN G
     FUNCTION CONNECT
     PARAMETERS PORT,T
     PRIVATE P,ST,MT,N
     P=PCOUNT()
     DO CASE
     CASE P=1
       T=90000
     CASE P=0
       PORT=1
       T=90000
     ENDCASE
     MESS(22,'ESC to exit')
     RXFLUSH(PORT)
     ST=SECONDS()
     MT=ST
     DO WHILE (SENDCHR(PORT,01)>=0) .AND. (INKEY()<>27) .AND. ((MT-ST)<=T)
       N=GETCHR(PORT,1)
       IF N=02
         RETURN .T.
       ENDIF
       RXFLUSH(PORT)
       MT=SECONDS()
     ENDDO
     RETURN .F.
     FUNCTION CALCHECK
     PARAMETERS PACKET
     CHECKSUM=0
     PL=ASC(SUBSTR(PACKET,3,1))-32
     FOR I=1 TO PL
       CHECKSUM=CHECKSUM+ASC(SUBSTR(PACKET,3+I,1))
     NEXT
     CHECKSUM=CHECKSUM % 96
     CHECKSUM=CHECKSUM+32
     RETURN CHECKSUM
     FUNCTION BUILD_PACKET
     PARAMETERS PACKET,PN,PT
     PL=LEN(PACKET)+32
     PACKET=CHR(PN)+PT+CHR(PL)+PACKET
     PACKET=PACKET+CHR(CALCHECK(PACKET))
     RETURN PACKET
     FUNCTION ACK
     PARAMETER PORT,PACKNUM
     PRIVATE PT,XPNUM
     P=PCOUNT()
     DO CASE
     CASE P>=2
       PT=PORT
       XPNUM=PACKNUM
     CASE P=1
       XPNUM=PORT
       PT=1
```

```
   ENDCASE
   OUTSTR=CHR(XPNUM)+'A'
   SENDSTR(PT,OUTSTR)
   RETRY=0
   RETURN .T.
FUNCTION NAK
PARAMETER PORT,PACKNUM
PRIVATE PT,XPNUM
P=PCOUNT()
DO CASE
CASE P>=2
   PT=PORT
   XPNUM=PACKNUM
CASE P=1
   XPNUM=PORT
   PT=1
ENDCASE
OUTSTR=CHR(XPNUM)+'N'
SENDSTR(PT,OUTSTR)
RETRY=RETRY+1
RETURN .T.
FUNCTION INCPNUM
PARAMETER XPNUM
XPNUM=XPNUM+1
IF XPNUM=128
   XPNUM=32
ENDIF
RETURN XPNUM
FUNCTION SEND_PACKET
PARAMETERS PORT,XPACKET
PRIVATE PT,PACKET
P=PCOUNT()
DO CASE
CASE P>=2
   PT=PORT
   PACKET=XPACKET
CASE P=1
   PACKET=PORT
   PT=1
ENDCASE
MESS(1,1,'PACKET '+STR(ASC(SUBSTR(PACKET,1,1))-32,3))
ACKSTR=SUBSTR(PACKET,1,1)+'A'
INSTR='XX'
RETRY=0
DO WHILE (INSTR<>ACKSTR) .AND. (RETRY<=5)
   SENDSTR(PT,PACKET)
   INSTR=GETSTR(PT,3)
   RETRY=RETRY+1
ENDDO
IF INSTR=ACKSTR
   RETURN .T.
ELSE
   RETURN .F.
ENDIF
```

```
* CSD.PRG
* COPYRIGHT 1989, 1988 COMPUTER SYSTEMS DESIGN, INC.

FUNCTION HEADER
PARAMETERS MESG,SELECTION
XYDATE=CMONTH(DATE())+' '+STR(DAY(DATE()),2)+', '+STR(YEAR(DATE()),4)
SET COLOR TO &HILIT
CLR(0)
RES=' '
RPOS=80-LEN(XYDATE)
@ 1,1 SAY UPLEFT
@ 1,HEADPOS SAY HEAD
@ 1,RPOS-1 SAY XYDATE
SET COLOR TO &REDLIT
@ 2,0 SAY SLINE
SET COLOR TO &HILIT
DO CASE
CASE SELECTION>0
   XBOX=LEN(MS1)
   IF LEN(MS1)>50
      XBOX=LEN(MS1)+9
   ELSE
      XBOX=50
   ENDIF
   SET COLOR TO &HEADLIT
   @ 4,40-.5*XBOX,09+SELECTION,40+.5*XBOX BOX FRAME
   XBAR=CHR(198)+REPLICATE(CHR(205),XBOX-1)+CHR(181)
   @ 5,40-.5*XBOX SAY XBAR
   SET COLOR TO &HILIT
   @ 5,CENTERP(MESG) SAY MESG
   SET INTEN ON
   SET MESSAGE TO SELECTION+11
   JG=SELECTION+12
   LPOS=CENTERP(MS1)
   J=0
   DO WHILE J<SELECTION
      J=J+1
      G=LTRIM(STR(J,2))
      @ J+7,LPOS PROMPT MS&G MESSAGE CENTERB(MB&G)
   ENDDO
   MENU TO RES
   SET INTEN OFF
CASE SELECTION=0
   @ 10,CENTERP(MESG) SAY MESG
CASE SELECTION<0 .AND. !EMPTY(MESG)
   XHEAD=LBLOCK+MESG+RBLOCK
   @ 4,CENTERP(XHEAD) SAY XHEAD
ENDCASE
RETURN RES
FUNCTION CENTERB
PARAMETERS STRING
BACK=SPACE(40-.5*LEN(STRING))+STRING
RETURN BACK
FUNCTION CENTERP
PARAMETERS STRING
LPOS = 40 - .5*LEN(STRING)
```

```
RETURN LPOS
FUNCTION ZDIV
PARAMETERS F0,F1
IF F1=0
   F2=0
ELSE
   F2=F0/F1
ENDIF
RETURN F2
FUNCTION TIMER
PARAMETERS XT
XT2=TIME()
XV1=TIME()
XV1=VAL2(SUBSTR(XV1,1,2))*3600+VAL2(SUBSTR(XV1,4,2))*60+VAL2(SUBSTR(XV1,7,2))+XT
DO WHILE .T.
   XV2=TIME()
   XV2=VAL2(SUBSTR(XV2,1,2))*3600+VAL2(SUBSTR(XV2,4,2))*60+VAL2(SUBSTR(XV2,7,2))
   IF XV2>XV1
      EXIT
   ENDIF
ENDDO
RETURN XT
FUNCTION CONFIRM
PARAMETERS F0,F1
P=PCOUNT()
DO CASE
CASE P=1
   F1='Y'
ENDCASE
SET DELIM OFF
XCON=F1
@ F0,0
@ F0,30 SAY 'IF OK, ENTER Y > ' SET XCON PICTURE 'Y'
READ
IF LASTKEY()=27
   RETURN .F.
ENDIF
@ F0,0
IF XCON='Y'
   RETURN .T.
ENDIF
@ F0,0
RETURN .F.
FUNCTION PRINTCHECK
PARAMETERS F0
SET DELIM OFF
XCON='Y'
@ F0,0
@ F0,25 SAY 'Printer On-Line, ENTER Y > ' SET XCON PICTURE 'Y'
READ
@ F0,0
IF XCON='Y'
   RETURN .T.
ENDIF
@ F0,0
RETURN .F.
```

```
FUNCTION MESS
PARAMETERS F0,F1
SET COLOR TO &HILIT
DO CASE
  CASE F0<30
    @ F0,0
    @ F0,40-.5*LEN(F1) SAY F1
  CASE F0<300
    SET COLOR TO &LOLIT
    F0=F0/10
    @ F0,0
    @ F0,40-.5*LEN(F1) SAY F1
  CASE F0<3000
    SET COLOR TO *.&HILIT
    F0=F0/100
    @ F0,0
    @ F0,40-.5*LEN(F1) SAY F1
ENDCASE
SET COLOR TO &HILIT
RETURN .T.
FUNCTION ERRMES
PARAMETERS F0,F1
@ F0,0
@ F0,40-.5*LEN(F1) SAY F1
WAIT
@ F0,0
@ F0+1,0
RETURN .T.
FUNCTION CONFCONT
PARAMETERS LINE,MESS
ANS='Y'
X=HEADER(' ',0)
X=MESS(LINE,MESS)
@ LINE+2,21 SAY 'Do you want to continue (Y/N)? ' GET ANS PICTURE '!'
READ
IF ANS='N'
  RETURN (.F.)
ENDIF
RETURN (.T.)
FUNCTION LINE
PARAMETERS F0
F1=REPLICATE(CHR(196),F0)
RETURN F1
FUNCTION LOCKF
PARAMETERS F0
XFIRST=.T.
DO WHILE .NOT. FLOCK()
  IF XFIRST
    X=MESS(24,'PLEASE WAIT, FILE '+F0+' IS IN USE....')
    XFIRST=.F.
  ENDIF
ENDDO
RETURN .T.
FUNCTION VAL
PARAMETERS F0
PRIVATE LENUM,POINT,TENS,FLAGP,N,NUM,I
```

```
F0=LTRIM(TRIM(F0))
LSNUM=LEN(F0)
POINT=AT('.',F0)
IF POINT=0
   SET DECIMAL TO 0
   TENS=10^(LSNUM-1)
   FLAGP=.F.
ELSE
   SET DECIMAL TO LSNUM-POINT
   TENS=10^(POINT-2)
   FLAGP=.T.
ENDIF
N=0
NUM=0
DO WHILE N<LSNUM
   IF FLAGP
      IF N<>POINT-1
         N=N+1
      ELSE
         N=N+2
      ENDIF
   ELSE
      N=N+1
   ENDIF
   J=ASC(SUBSTR(F0,N,1))-48
   IF J>=0 .AND. J<=9
      NUM=NUM+(ASC(SUBSTR(F0,N,1))-48)*TENS
   ELSE
      NUM=0
      EXIT
   ENDIF
   TENS=TENS/10
ENDDO
RETURN NUM
FUNCTION GETIT
PARAMETERS F0,F1,F2
SET DELIM ON
F1=F2+' '
F2=SPACE(F1)
@ F0,40-.5*(LEN(F2)+2+F1) SAY F2 GET F0
READ
RETURN F0
FUNCTION CLR
PARAMETERS F0
@ F0,0 CLEAR
RETURN .T.
FUNCTION ERRMESS
PARAMETERS F0,F1
??CHR(7)
@ F0,0
@ F0,40-.5*LEN(F1) SAY F1
INKEY(0.5)
@ F0,0
RETURN .T.
PROCEDURE VGER
PARAMETER FX,FY,FL
```

```
IF FL>0
   )BOT=FY+FL-1
   IF )BOT>22
      )BOT=22
   ENDIF
   FOR FI=FY TO )BOT
      @ FI,FX SAY CHR(176)
   NEXT
ENDIF
RETURN
FUNCTION FUSE
PARAMETERS F0
NETMES=.F.
F4=AT('/',F0)
F1=SUBSTR(F0,1,F4-1)
F0=SUBSTR(F0,F4+1)
F4=AT('/',F0)
IF F4<>0
   F2=SUBSTR(F0,1,F4-1)
   F3=SUBSTR(F0,F4+1)
   F4=AT(',',F3)
   IF F4<>0
      N=10
      DO WHILE .T.
         N=N+1
         F='F'+STR(N,2)
         XF='F'+STR(N+10,2)
         &XF=AT(',',F3)
         &XF=AT(',',F3)
         IF &XF=0
            &F=F3
            &F=F3
            NI=N-10
            EXIT
         ELSE
            &F=SUBSTR(F3,1,&XF-1)
         ENDIF
         F3=SUBSTR(F3,&XF+1)
      ENDDO
   ELSE
      NI=1
   ENDIF
ELSE
   F2=SUBSTR(F0,1)
   F3='0'
   NI=0
ENDIF
DO WHILE .T.
   IF SUBSTR(F1,1,1)<>'X'
      USE &F1 ALIAS &F2
   ELSE
      F7=SUBSTR(F1,2)
      USE &F7 EXCLUSIVE ALIAS &F2
   ENDIF
   IF NETERR()
      IF .NOT. NETMES
```

```
            MESG(24,'FILE '+FO+' IS IN USE')
            NETMES=.T.
         ENDIF
         DUMMY1 = SECONDS()
         DO WHILE DUMMY1 + 5 > SECONDS()
            DUMMY2 = INKEY()
         ENDDO
      ELSE
         EXIT
      ENDIF
   ENDDO
   DO CASE
   CASE NI=1
      SET INDEX TO &F3
   CASE NI=2
      SET INDEX TO &F11,&F12
   CASE NI=3
      SET INDEX TO &F11,&F12,&F13
   CASE NI=4
      SET INDEX TO &F11,&F12,&F13,&F14
   CASE NI=5
      SET INDEX TO &F11,&F12,&F13,&F14,&F15
   CASE NI=6
      SET INDEX TO &F11,&F12,&F13,&F14,&F15,&F16
   CASE NI=7
      SET INDEX TO &F11,&F12,&F13,&F14,&F15,&F16,&F17
   CASE NI=8
      SET INDEX TO &F11,&F12,&F13,&F14,&F15,&F16,&F17,&F18
   ENDCASE
   @ 24,0
RETURN .T.
FUNCTION NULL_FUNC
RETURN .T.

* TMMAINT.PRG
* COPYRIGHT 1989, 1988 COMPUTER SYSTEMS DESIGN, INC.

SET SOFTSEEK OFF
SET CONFIRM ON
SET EXCLU OFF
SET BELL OFF
SET INTEN OFF
SET TALK OFF
SET DELET ON
SET SAFET OFF
SET DELIM TO '['
SET WRAP ON
SET EXACT ON
CLOSE DATABASES
SLINE=REPLICATE(CHR(196),80)
DLINE=REPLICATE(CHR(205),80)
LINE=SUBSTR(SLINE,1,80)
FRAME=CHR(213)+CHR(205)+CHR(184)+CHR(179)+CHR(217)+CHR(205)+CHR(192)+CHR(179)
LBLOK=REPLICATE(CHR(205),5)+' '
RBLOK=' '+REPLICATE(CHR(205),5)
```

```
XLEFT=CDOW(DATE())
UPLEFT='Tourwatch Manager'
SETCANCEL(.F.)
SET KEY 3
SET KEY 18 TO NULL_FUNC
L=0
DATE=CMONTH(DATE())+' '+STR(DAY(DATE()),2)+', '+STR(YEAR(DATE()),4)
XPIC='99,999,999.99'
_LPVAR = 0
IF ISCOLOR()
   INVRS    = '+GR+/B'
   LOLIT    = '+BG/B,+W/BG,,,+GR+/B'
   HILIT    = '+GR+/B,+W/BG,,,+GR+/B'
   SCORELIT = '+BG/N,+W/BG,,,+GR+/B'
   PASSWD   = '+GR+/B,B/B,,,B/B'
   PASSWND  = '+BG/B'
   REDLIT   = '+R/B'
   BLUELIT  = '+BG/B'
   HMENU    = '+GR+/B,+W/BG,,,+GR+/B'
   BLNKWIND = '+W/N'
   F2WIND   = 'W/N,'
   F2INVRS  = '+GR+/N'
   HEADLIT  = 'BG/B,+W/BG,,,+BG/B'
ELSE
   INVRS    = 'N/W'
   HILIT    = '+W/N'
   LOLIT    = 'W/N'
   SCORELIT = 'U'
   PASSWND  = '+W/N'
   PASSWD   = '+W/N,X,,,X'
   HMENU    = '+W/N'
   F2WIND   = '+W/N'
   F2INVRS  = 'N/W'
   REDLIT   = '+W/N'
   BLUELIT  = 'W/N'
   BLNKWIND = '+W/N'
   HEADLIT  = 'W/N'
ENDIF
SET COLOR TO &HILIT
SET CURSOR ON
STA='1'
SET MESSAGE TO 14
FUSE('CONFIG/CO')
HEAD=TRIM(UP(XTITLE(CBUFFER)))
KEYBOARD ''
XTMCHK1=SPACE(6)
IF TMCHK1<>SPACE(6)
  SET EXACT ON
  CLR(0)
  SET COLOR TO &PASSWND
  @ 9,21 TO 11,59
  SET COLOR TO &PASSWD
  SET DELIM ON
  SET INTEN ON
  @ 10,23 SAY 'Tourwatch Manager Password' GET XTMCHK1 PICTURE '@!'
  READ
  SET COLOR TO
```

```
   SET COLOR TO &HILIT
   IF LASTKEY()=27
     CLOSE DATABASES
     SET COLOR TO +W/N
     CLEAR
     QUIT
   ELSE
     IF RTRIM(XTMCHK1)=='1409' .AND. LASTKEY()=3
       ERRMESS(20,'*** Do You Want To Play A Game ? ***')
     ELSE
       IF (XTMCHK1<>TMCHK1)
         MESS(12,'Access to the TourWatch Manager is denied.')
         INKEY(5)
         CLOSE DATABASES
         SET COLOR TO +W/N
         CLEAR
         QUIT
       ENDIF
     ENDIF
   ENDIF
ENDIF
SET KEY 3 TO NULL_FUNC
CLEAR
SHEAD=HEAD
HEADPOS=CENTERP(TRIM(UFKTITLE(CBUFFER)))
CLEAR
USE
DO WHILE .T.
  SET DELIM ON
  CLOSE DATABASES
  MS1='A  SYSTEM CONFIGURATION'
  MS2='B  TourWatch Manager PASSWORD MAINTENANCE'
  MS3='C  Micro-Wand PASSWORD MAINTENANCE'
  MS4='D  PACK AND REINDEX FILES'
  MS5='E  RECOVER FROM PROCESSING ERROR'
  MS6='F  DELETE HISTORY'
  MS7='X  EXIT System Maintenance'
  MB1='Change Communications Port, Detail Report Printing switch'
  MB2='Change TourWatch Manager Password'
  MB3='Change Micro-Wand Password'
  MB4='Internal System File Maintenance'
  MB5='Re-build data files if there were errors in PROCESS COMPLETED TOURS'
  MB6='Delete History Records Prior to User Defined Date'
  MB7='Exit TourWatch Manager, System Maintenance Program and return to DOS'
  SET COLOR TO &HILIT
  RES1=HEADER('SYSTEM MAINTENANCE MENU',7)
  SET COLOR TO &HILIT
  CLEAR
  DO CASE
  CASE RES1=1
    DO SYSCON
  CASE RES1=2 .OR. RES1=3
    DO PASSWORD
  CASE RES1=4
    DO RNDXPROG
  CASE RES1=5
```

```
      DO DISASTER
    CASE PESI=6
      DO HISIDEL
    CASE PESI=7
      SET CURSOR ON
      CLOSE DATABASES
      SET COLOR TO +W/N
      XX=0
      FOR YY=12 TO 0 STEP -1
        @ YY,0 CLEAR TO YY+XX,80
        FOR LITTLEWT=1 TO 17
        NEXT LITTLEWT
        XX=XX+2
      NEXT YY
      QUIT
    ENDCASE
    CLEAR
    CLOSE DATABASES
  ENDDO
  RETURN

* SYSCON.PRG
* COPYRIGHT 1989, 1988 COMPUTER SYSTEMS DESIGN, INC.

SET COLOR TO WHILIT
CLOSE DATABASES
HEADER('SYSTEM CONFIGURATION',-1)
FUSE('CONFIG/CO')
XCOMPORT=COMPORT
XPDETAIL=PDETAIL
DO WHILE .T.
  CLR(10)
  MESG(15,'ESC to exit.')
  SET DELIM ON
  @ 10,14 SAY '           COMMUNICATIONS PORT (1/2)' GET XCOMPORT PICTURE '9' VALID XCOMPORT$'12'
  @ 11,14 SAY 'PRINT DETAIL/SUMMARY ROUTE REPORTS? (Y/N)' GET XPDETAIL PICTURE 'Y'
  READ
  IF LASTKEY()=27
    EXIT
  ENDIF
  IF CONFIRM(15)
    LOCKF('Configuration')
    REPLACE COMPORT WITH XCOMPORT
    REPLACE PDETAIL WITH XPDETAIL
    UNLOCK
    EXIT
  ENDIF
ENDDO
CLOSE DATABASES
RETURN

* PASSWORD.PRG
* COPYRIGHT 1989, 1988 COMPUTER SYSTEMS DESIGN, INC.

HEADER('PASSWORD MAINTENANCE',-1)
FUSE('CONFIG/CO')
DO CASE
```

```
  CASE RES1=2
    XCHK=TMCHK1
    XREP='TMCHK1'
    XPASSTYP='TourWatch Manager'
  CASE RES1=3
    XCHK=MWCHK1
    XREP='MWCHK1'
    XPASSTYP='     Micro-Wand '
ENDCASE
DO WHILE .T.
  SET DELIM ON
  CLR(8)
  MESG(13,'Enter New Password.  ESC to exit.')
  @ 10,19 SAY XPASSTYP+'Password' GET XCHK PICTURE '@K'
  READ
  IF LASTKEY()=27
    EXIT
  ENDIF
  IF CONFIRM(13)
    LOCKF('Configuration')
    REPLACE &XREP WITH LTRIM(XCHK)
    UNLOCK
    ERRMESG(13,'Password Has Been Updated.')
    EXIT
  ENDIF
ENDDO
CLOSE DATABASES
RETURN

* HISTDEL.PRG
* COPYRIGHT 1969, 1968 COMPUTER SYSTEMS DESIGN, INC.

HEADER('DELETE HISTORY DATA',-1)
MESG(10,'This selection allows you to delete information from the history')
MESG(11,'file based on a cut-off date')
IF ! CONFIRM(14,'N')
  RETURN
ENDIF
CLR(8)
XDATE=CTOD('  /  /  ')
SET DELIM ON
SET SCORE OFF
MESG(10,'Information prior to but not including')
MESG(11,'this date will be deleted.')
@ 13,28 SAY 'CUT-OFF DATE ' GET XDATE VALID CKDATE(XDATE,16)
MESG(16,'ESC to exit.')
READ
SET SCORE ON
IF EMPTY(DTOS(XDATE))
  RETURN
ENDIF
CLR(10)
MESG(10,'Delete information up to but not including '+DTOC(XDATE)+'.')
MESG(13,'ESC to exit. Press any other key to continue.')
DO WHILE INKEY()=0
ENDDO
IF LASTKEY()=27
```

```
                RETURN
             ENDIF
             CLR(10)
             MESG(5,'DELETING HISTORY RECORDS PRIOR TO '+DTOC(XDATE)+'....')
             SET COLOR TO &HILIT
             @ 7,10 CLEAR TO 21,70
             SET COLOR TO &BLUELIT
             @ 7,10 TO 21,70 DOUBLE
             SET COLOR TO &HILIT
             XXDATE=DTOS(XDATE)
             CLOSE DATABASES
             SET COLOR TO &HILIT
             @ 8,12 SAY 'Deleting Zone History prior to '+DTOC(XDATE)+'    -- working...'
             FUSE('XZHISTORY/ZH')
                PDATE=PKDATE(XDATE)
                DELETE FOR DATE<PDATE
                USE
                SET COLOR TO &BLUELIT
                @ 8,12 SAY 'Deleting Zone History prior to '+DTOC(XDATE)+'     Done.
                SET COLOR TO &HILIT
                @ 10,12 SAY 'Deleting Guard History prior to '+DTOC(XDATE)+'   working...'
             FUSE('XGHISTORY/ZH')
                DELETE FOR DATE<PDATE
                USE
                SET COLOR TO &BLUELIT
                @ 10,12 SAY 'Deleting Guard History prior to '+DTOC(XDATE)+'    Done.
                SET COLOR TO &HILIT
                @ 12,12 SAY 'Deleting Checkpoint History prior to '+DTOC(XDATE)+' working...'
             SELECT 2
             FUSE('XCHISTORY/CH/CHIST1X')
             SELECT 1
             FUSE('XCHISTORY/ZH')
             GO TOP
             DO WHILE !EOF()
                IF DATE<PDATE
                   IF TRIM(BARCODE) <> '22'
                      DELETE
                   ELSE
                      DELETE
                      SKIP
                      SELECT CH
                      SEEK ZH->BARCODE
                      IF !EOF()
                         DELETE
                      ENDIF
                      SELECT ZH
                      DELETE
                   ENDIF
                ENDIF
                SELECT ZH
                SKIP
             ENDDO
             USE
             SET COLOR TO &BLUELIT
             @ 12,12 SAY 'Deleting Checkpoint History prior to '+DTOC(XDATE)+' Done.
             FUSE('DATAFILE/DA')
```

```
SET FILTER TO DRECOVER
GO TOP
XLINE=14
XOLD=''
XCURFILE=NFILE
DO WHILE !EOF()
   IF XCURFILE<>NFILE
      SET COLOR TO &BLUELIT
      @ XLINE,12 SAY 'Reindexing '+XCURFILE+' Done.'
      SET COLOR TO &HILIT
      XLINE=XLINE+1
      XCURFILE=NFILE
      IF XLINE>20
         SET COLOR TO &HILIT
         @ 8,11 CLEAR TO 20,67
         XLINE=8
      ENDIF
   ENDIF
   NNFILE='X'+TRIM(NFILE)
   IIFILE=TRIM(IFILE)
   SELECT 2
   FUSE('&NNFILE/AA/&IIFILE')
      IF XOLD<>NNFILE
         PACK
         @ XLINE,12 SAY 'Reindexing '+XCURFILE+'
         XOLD=NNFILE
      ELSE
         @ XLINE,12 SAY 'Reindexing '+XCURFILE+'
         REINDEX
      ENDIF
      USE
      SELECT DA
      SKIP
ENDDO
SET COLOR TO &BLUELIT
@ XLINE,12 SAY 'Reindexing '+XCURFILE+' Done.'
SET COLOR TO &HILIT
CLOSE DATABASES
@ 20,12 SAY 'Updating the CONFIG file.
FUSE('CONFIG/CO')
LOCXF('Configuration')
SELECT 2
FUSE('ZHISTORY/ZH')
GO BOTT
XREC=RECNO()
SELECT CO
REPLACE ZHIST WITH XREC
SELECT 2
FUSE('GHISTORY/ZH')
GO BOTT
XREC=RECNO()
SELECT CO
REPLACE GHIST WITH XREC
SELECT 2
FUSE('CHISTORY/ZH')
GO BOTT
XREC=RECNO()
```

```
SELECT 03
REPLACE CHIST WITH XREC
UNLOCK
SET COLOR TO W+/B,B
@ 20,12 SAY 'Updating the CONFIG file.  Done.'
SET COLOR TO W+
MSG(23,'Delete History is Complete.')
XJUNK = INKEY(5)
CLOSE DATABASES
RETURN
```

Appendix 1-2

Creating TMMENU.EXE

A. To Create TMMENU.EXE, type OVLCOMP and press <enter>.

B. Listing of all files involved in creating TMMENU.EXE.

```
Listing of OVLCOMP.BAT:   ECHO OFF
                          CLIPPER @MAIN
                          CLIPPER @UTILITY
                          CLIPPER DOWNLOAD
                          CLIPPER UPLOAD
                          CLIPPER @DETREP
                          CLIPPER REPORTS
                          CLIPPER MAINT
                          ECHO Linking is Beginning
                          PLINK86 @OVLLINK
                          ECHO Linking and Compiling are now complete.

Listing of MAIN.CLP:      TMMENU

Listing of UTILITY.CLP:   CSD
                          FUNCLIB
                          PNTERR
                          CSDCOMM
                          HELP Listing of DETREP.CLP:    DETREP
                          DETREP2
                          DETREP3
                          POST Listing of OVLLINK.LNK:   OUTPUT TMMENU.EXE
                          FI MAIN, UTILITY
                          LIB CLIPPER, SWASYNC
                          OVERLAY CODE, $CONSTANTS
                          BEGINAREA
                          SECTION INTO TM_UPLD.OVL FILE UPLOAD, DETREP
                          SECTION INTO TM_DNLD.OVL FILE DOWNLOAD, MAINT
                          SECTION INTO TM_RPT.OVL  FILE REPORTS
                          ENDAREA
                          ;
```

Appendix 1-3

Creating TMMAINT.EXE

A. To Create TMMAINT.EXE, type the following:

1. CLIPPER CSD <return>
2. CLIPPER MAINTLIB <return>
3. M1 <return>

B. Listing of all files involved in creating TMMAINT.EXE.

Listing of M1.BAT:  CLIPPER TMMAINT
TLINK TMMAINT+CSD+MAINTLIB,TMMAINT,,CLIPPER

Appendix 1-4

File Structures

```
Structure for database:BARCODE.dbf           ZNUM3X    ZNUM+BARCODE
Number of data records :    1                BNUMX     BARCODE+ZNUM
Field  Field name  Type       Width    Dec   ZNUM2X    ZNUM+UPPER(DESC)
  1    SERNUM      Character    6             BC1X     UPPER(DESC)+ZNUM
  2    BARCODE     Character    6             BC2X     SERNUM
  3    ZNUM        Character    6
  4    DESC        Character   15
  5    MUSTCHECK   Character    1
** Total **                    34

Structure for database:CHISTORY.dbf           CHIST1X   BARCODE+DATE+TIME
Number of data records :    1                 CHIST2X   GNUM+DATE+TIME
Field  Field name  Type       Width    Dec    CHIST3X   DATE+TIME
  1    BARCODE     Character    6
  2    DATE        Character    3
  3    TIME        Character    2
  4    GNUM        Character    6
** Total **                    17

Structure for database:CONFIG.dbf
Number of data records :    1
Field  Field name  Type       Width    Dec
  1    RCNUM       Character    4
  2    ZHIST       Numeric      8
  3    GHIST       Numeric      8
  4    CHIST       Numeric      8
  5    THISMONTH   Character    2
  6    FIRSTTIME   Logical      1
  7    CBUFFER     Character   35
  8    COMPORT     Character    1
  9    TMCHK1      Character    6
 10    MWCHK1      Character    6
 11    PDETAIL     Logical      1
** Total **                    80

Structure for database:DATAFILE.dbf
Number of data records :   26
Field  Field name  Type       Width    Dec
  1    NFILE       Character    8
  2    SFILE       Character   41
  3    IFILE       Character    8
  4    MOPACK      Logical      1
  5    DRECOVER    Logical      1
** Total **                    60
```

```
Structure for database:EXCEPT.dbf           EXCX     ECODE
Number of data records :      16            EXCX1    EDESC
Field  Field name  Type       Width   Dec
    1  ECODE       Character      2
    2  EDESC       Character     15
** Total **                      17

Structure for database:GHISTORY.dbf         GHIST1X  GNUM+DATE
Number of data records :       1            GHIST2X  DATE+GNUM+RNUM+CHECKIN
Field  Field name  Type       Width   Dec   GHIST3X  GNUM+DATE+RNUM+CHECKIN
    1  GNUM        Character      6
    2  DATE        Character      3
    3  RNUM        Character      6
    4  CHECKIN     Character      2
    5  CHECKOUT    Character      2
    6  ZONES       Numeric        3
    7  POINTS      Numeric        4
    8  PCHECKED    Numeric        4
    9  INZPCHECK   Numeric        4
** Total **                      34

Structure for database:GUARD.dbf            GRDX     GNUM
Number of data records :       1            GRDX1    UPPER(GNAME)
Field  Field name  Type       Width   Dec
    1  GNUM        Character      6
    2  GNAME       Character     24
** Total **                      30

Structure for database:OHISTORY.dbf         OHIST1X  OCODE
Number of data records :       1
Field  Field name  Type       Width   Dec
    1  OCODE       Character      6
    2  COMMENT     Character     15
** Total **                      21

Structure for database:RDET.dbf             RNUM1X   RNUM
Number of data records :       1            RDETX    ZNUM
Field  Field name  Type       Width   Dec
    1  RNUM        Character      6
    2  ZNUM        Character      6
** Total **                      12

Structure for database:RECORD.dbf           RCNUMX   RCNUM+DTOS(DATE)+TIME
Number of data records :       1
Field  Field name  Type       Width   Dec
    1  RCNUM       Character      4
    2  TYPE        Character      1
    3  LOGDATA     Character      6
    4  DATE        Date           8
    5  TIME        Character      5
** Total **                      24

Structure for database:ROAMREC.dbf          ROAM1X   RCNUM+TYPE+ZONE+DTOS(DATE)+TIME
Number of data records :       1
Field  Field name  Type       Width   Dec
    1  RCNUM       Character      4
    2  TYPE        Character      1
    3  LOGDATA     Character      6
    4  DATE        Date           8
    5  TIME        Character      5
    6  ZONE        Character      6
** Total **                      30

Structure for database:RSUM.dbf             RNAMX    UPPER(DESC)
Number of data records :       1            RNUM2X   RNUM
Field  Field name  Type       Width   Dec
    1  RNUM        Character      6
    2  DESC        Character     20
** Total **                      26
```

```
Structure for database:ZHISTORY.dbf         ZHIST1X    ZNUM+DATE
Number of data records :     1
Field  Field name   Type         Width    Dec
    1  ZNUM         Character        6
    2  DATE         Character        3
    3  ENTER        Character        2
    4  LEAVE        Character        2
    5  GNUM         Character        6
    6  POINTS       Numeric          3
    7  INZPCHECK    Numeric          3
** Total **                         25

Structure for database:ZONE.dbf             ZNUM1X     ZNUM
Number of data records :     1              ZNAMX      UPPER(SDESC)
Field  Field name   Type         Width    Dec
    1  ZNUM         Character        6
    2  SDESC        Character       15
    3  POINTS       Numeric          4
** Total **                         25
```

```
^ Copyright 1989, 1992  Computer Systems Design, Inc.
^
^    FILE NAME : SMS2000.UDL
^ PROGRAM NAME : The TourWatch Manager, Version 3.1, Release 1
^

PROGRAM AUTOEXEC

USE (CODE3F,USERBAR)
! external code3F

:CONTROL_REC RECORD
   #ROUTE_NUMBER #6
   #GUARD_NUMBER #6
   #PASSWORD #6
   #ROUTE_POINTER INTEGER
   #LOG_POINTER INTEGER

:ROUTE_REC RECORD
   #ZNUM #6
   #ZDESC #15

:LOG_REC RECORD
   #TYPE #1
   #LOG_DATA #6
   #STAMP #12

:MUST_REC RECORD
   #MUST_ZONE #6
   #MUST_CODE #6
   #MUST_DESC #15
   #CHECKED INTEGER

:FILER FILE
:FILEL FILE
:FILEM FILE
:FILEB FILE
:FILEC FILE
:FILED FILE
:FILEE FILE
```

```
:RCODE INTEGER
:INSTR #125
:OUTSTR #125
:RETRY INTEGER
:PNUM INTEGER
:XPNUM INTEGER
:LPNUM INTEGER
:PCHR #1
:PTYPE #1
:PLEN INTEGER
:FPACK #40
:CHECKSUM INTEGER
:PHEAD #3
:C INTEGER
:J INTEGER
:L INTEGER
:RETRY_COUNT INTEGER

:TEMP_LOG_DATA #2
:TEMP_PASSWORD #2
:LINE_NUMBER #2
:NEXT_INUM #2
:OTHER_STR #16
:BARC_STR #12
:SEARCH_STR #40
:COMFUNC #8
:A INTEGER
:B BYTE
:X #1
:Y #1
:Z INTEGER
:I INTEGER
:LEN INTEGER
:BCODE INTEGER
:DUMMY #40
:DUMMY1 #16
:DUMMY2 #16
:VOLTAGE REAL
:DUM_NUM INTEGER
:INFO #40
:NEW_GUARD #2
:TEMP_PTR INTEGER
:T #8
:D #8
:HAND_OFF_FLAG INTEGER
CONST SPACES = '

DEFWIN(2,'YYYYYYYYYYYYYYYYY')
CLEARSCREEN
I = PEEK($FFA0)
IF I = 50 THEN
   CALL CODEPROM
   WIN(1) PUT(DISPLAY,'OS VERSION_')
   WIN(2) PUT(DISPLAY,'2.X')
   PAUSE 20
```

```
ELSE
  IF I = 49 THEN
    ! LDX   #code35
    ! STX   $84
    ! LDAB  #$$
    ! STAB  $86
    ! BCLR  @BARFLAG1,64
    WIN(1)  PUT(DISPLAY,'OS VERSION')
    WIN(2)  PUT(DISPLAY,'1.X')
    PAUSE 20
  ELSE
    WIN(1)  PUT(DISPLAY,'OS ERROR')
    WIN(2)  PUT(DISPLAY,I)
    WARNING
    REPEAT
    UNTIL KEY(MODE)
    END
    CLICK
  END
END CALL FST
CALL ACFF
CALL HORNAF
CALL MARKOFF
CALL PROMPTOFF
TIME FORMAT OFF
FIXPOINT 2

.INITIALIZE_STUFF
  DEFWIN(2,'!YYYYYYYYYYYYYYYA')
  DEFWIN(4,'!NNNNNNNNYYYYYN')
  FIVE_ON
  DEFWIN(6,'NNNNNNNNYNNNYN')
  DEFWIN(7,'!NNNNNNNNNNNNNNN')
  DEFWIN(5,'NNNNNYYYYYYYYYYN')
  SETINFO INFO

.OPEN_CONTROL_FILE
CLOSE(FILEC)
OPEN(RANDOM,FILEC,'CONTROL',50)
READLN(REC=1,FILEC,CONTROL_REC)
ROUTE_NUMBER = ROUTE_NUMBER + SPACES
GUARD_NUMBER = GUARD_NUMBER + SPACES
PASSWORD = PASSWORD + SPACES
WRITELN(REC=1,FILEC,CONTROL_REC)

.OPEN_ROUTE_FILE
  CLOSE(FILER)
  OPEN(RANDOM,FILER,'ROUTE',26)
  IF ROUTE_NUMBER = '       ' THEN
    ROUTE_POINTER = -1
    WRITELN(REC=1,FILEC,CONTROL_REC)
  END
```

```
.OPEN_MUST_SCAN_FILE
  CLOSE(FILEM)
  OPEN(RANDOM,FILEM,'MUSTSCAN',23)

.OPEN_BARC_FILE
  CLOSE(FILEB)
  OPEN(SEQUENTIAL,FILEB,'BARC')
  CLOSE(FILEB)

.OPEN_LOG_FILE
  CLOSE(FILEL)
  OPEN(RANDOM,FILEL,'LOG',23)
  IF LOG_POINTER = 0 THEN
    LOG_POINTER = 1
    WRITELN(REC=1,FILEL,CONTROL_REC)
  END

.OPEN_OTHER_FILE
  CLOSE(FILEO)
  OPEN(SEQUENTIAL,FILEO,'OTHER')
  CLOSE(FILEO)

.RESUME_ROUTE
  IF ROUTE_POINTER >= 1 THEN
    GOTO DISPLAY_ZONES
  ELSE
    IF ROUTE_POINTER = 0 THEN
      GOTO BEGIN_ROUTE
    END
  END

.TITLE
  CLEARSCREEN
  CLEARKEYS
  FIVE_ON
  WIN(1)  PUT(DISPLAY,' The Tourwatch  ')
  WIN(5)  PUT(DISPLAY,'Manager (c)1988 ')
  PAUSE 30
  CLEARSCREEN
  WIN(1)  PUT(DISPLAY,' Ver 3.1, R 3   ')
  WIN(5)  PUT(DISPLAY,'   SMS, Inc.    ')
  PAUSE 30

.MAINMENU
  CLEARSCREEN
  CLEARKEYS
  FIVE_ON
  WIN(1)  PUT(DISPLAY,'BEGIN  DATA MISC')
  WIN(5)  PUT(DISPLAY,'ROUTE  MENU MENU')
  TYPE = ''
  DEFKEY(1,F1,GOTO BEGIN_ROUTE)
  DEFKEY(3,F3,GOTO DATA_MENU)
  DEFKEY(4,F4,GOTO MISCELLANEOUS_MENU)
  DEFKEY(5,MODE,GOTO SLP)
  WAIT
```

```
.DATA_MENU
  CLEARSCREEN
  CLEARKEYS
  FIVE_ON
  COMFUNC =
  WIN(1)  PUT(DISPLAY,'LOAD       SEND')
  WIN(5)  PUT(DISPLAY,'ROUTE       LOG')
  DEFKEY(1,F1,GOTO LOAD_ROUTE)
  DEFKEY(2,F2,GOTO DUMP_SHIT)
  DEFKEY(4,F4,GOTO SEND_LOG)
  DEFKEY(5,MODE,GOTO MAINMENU)
  WAIT

.MISCELLANEOUS_MENU
  CLEARSCREEN
  CLEARKEYS
  FIVE_ON
  RCODE = 0
  WIN(1)  PUT(DISPLAY,'BAT       SCAN')
  WIN(5)  PUT(DISPLAY,'CHECK      CODES')
  DEFKEY(1,F1,GOTO BATCHECK)
  DEFKEY(4,F4,GOTO SCAN_CODES)
  DEFKEY(5,MODE,GOTO MAINMENU)
  WAIT

.SLP
  CLEARSCREEN
  CLEARKEYS
  BCODE = 0
  SLEEP
  IF KEY(ENT) THEN
    IF PASSWORD <> '    ' THEN
      CLEARSCREEN
      CLEARKEYS
      FIVE_OFF
      DEFKEY(5,MODE,GOTO SLP)
      TEMP_PASSWORD = ''
      WIN(1)  PUT(DISPLAY,'Enter Password')
      WIN(2)  GET(KEYBOARD,2,TEMP_PASSWORD)
      TEMP_PASSWORD = TEMP_PASSWORD + SPACES
      CLEARSCREEN
      CLEARKEYS
      IF TEMP_PASSWORD = '    ' THEN
        GOTO SLP
      END
      IF TEMP_PASSWORD <> PASSWORD THEN
        WIN(1)  PUT(DISPLAY,'Invalid Password')
        WIN(2)  PUT(DISPLAY,TEMP_PASSWORD)
        WARNING
        GOTO SLP
      END
    END
    GOTO MAINMENU
  END
```

```
     IF TYPE = 'G' THEN
       GOTO GET_GUARD_ID
     ELSE
       IF TYPE = 'F' THEN
         GOTO BEGIN_ROUTE
       ELSE
         IF TYPE = 'R' THEN
           GOTO DISPLAY_ZONES
         ELSE
           IF TYPE = 'O' THEN
             GOTO GET_OTHER
           ELSE
             IF TYPE = 'R' THEN
               GOTO OUT_OF_RAM
             ELSE
               GOTO TITLE
             END
           END
         END
       END
     END
   END

.BEGIN_ROUTE
  CLEARSCREEN
  CLEARKEYS
  IF ROUTE_POINTER < 0 THEN
    WIN(1) PUT(DISPLAY,'NO ROUTE LOADED')
    WIN(2) PUT(DISPLAY,' CANNOT BEGIN')
    WARNING
    GOTO MAINMENU
  END
  TEMP_LOG_DATA = ''
  HAND_OFF_FLAG = 0
  GOTO GET_GUARD_ID

.GET_GUARD_ID
  CLEARSCREEN
  CLEARKEYS
  FIVE_OFF
  TYPE = 'G'
  DEFKEY(4,F4,GOTO SHOW_ROUTE)
  DEFKEY(5,MODE,GOTO SLP)
  INFO = ''
  NEW_GUARD = ''
  BARCODEON
  IF HAND_OFF_FLAG = 1 THEN
    WIN(1) PUT(DISPLAY,'Enter Hand-off')
    WIN(2) PUT(DISPLAY,'Guard ID')
  ELSE
    WIN(1) PUT(DISPLAY,'Enter Guard ID')
    WIN(2) PUT(DISPLAY,'to begin')
  END
  WIN(4) GET(2,DUMMY)
  BARCODEOFF
  IF INFO <> '' THEN
    BEEPER
  END
```

```
NEW_GUARD = DUMMY + SPACES
DUMMY = ''
CLOSE(FILES)
OPEN(FILES,'GUARDS')
FIND(FILES,DUMMY,NEW_GUARD)
CLOSE(FILES)
IF DUMMY <> NEW_GUARD THEN
   CLEARSCREEN
   WIN(1)  PUT(DISPLAY,'INVALID GUARD ID')
   WARNING
   GOTO GET_GUARD_ID
END
GUARD_NUMBER = NEW_GUARD
WRITELN(REC=1,FILED,CONTROL_REC)
IF HAND_OFF_FLAG = 1 THEN
   GOTO ADVANCE
ELSE
   GOTO RESET_ROUTE_FILE
END

.SHOW_ROUTE
 CLEARSCREEN
 CLEARKEYS
 WIN(1)  PUT(DISPLAY,'ROUTE NUMBER:')
 WIN(2)  PUT(DISPLAY,ROUTE_NUMBER)
 DEBOUNCE
 GOTO GET_GUARD_ID

.RESET_ROUTE_FILE
 CLEARSCREEN
 CLEARKEYS
 ROUTE_POINTER = 0
 WRITELN(REC=1,FILED,CONTROL_REC)
 HAND_OFF_FLAG = 0
 TEMP_LOG_DATA = ''
 MUST_ZONE = 'X'
 TEMP_PTR = 1
 REPEAT
 UNTIL MUST_ZONE = ''
    READLN(REC=TEMP_PTR,FILEM,MUST_REC)
    CHECKED = 0
    WRITELN(REC=TEMP_PTR,FILEM,MUST_REC)
    TEMP_PTR = TEMP_PTR + 1
 END
 TYPE = 'S'
 LOG_DATA = ROUTE_NUMBER
 WRITE_LOG
 IF FILEL <> 0 THEN
    GOTO OUT_OF_RAM
 END
 TYPE = 'G'
 LOG_DATA = GUARD_NUMBER
 WRITE_LOG
```

```
    IF FILEL <> 0 THEN
      GOTO OUT_OF_RAM
    END
    GOTO ADVANCE

.ADVANCE
  CLEARSCREEN
  CLEARKEYS

IF ROUTE_POINTER > 0 THEN
    TYPE = 'L'
    LOG_DATA = ZNUM
    WRITE_LOG
    IF FILEL <> 0 THEN
      GOTO OUT_OF_RAM
    END
  END

ROUTE_POINTER = ROUTE_POINTER + 1
  WRITELN(REC=1,FILED,CONTROL_REC)
  READLN(REC=ROUTE_POINTER,FILER,ROUTE_REC)

IF (ZNUM = '*EOF*') OR (ZNUM = '') THEN
    IF ROUTE_NUMBER <> 'ROAM' THEN
      WIN(1) PUT(DISPLAY,' YOU HAVE LEFT')
      WIN(2) PUT(DISPLAY,' THE LAST ZONE')
      BEEPER
      PAUSE 10
    END
    CLEARSCREEN
    WIN(1) PUT(DISPLAY,' TOUR COMPLETE')
    BEEPER
    PAUSE 5
    BEEPER
    PAUSE 10
    TYPE = 'F'
    LOG_DATA = ROUTE_NUMBER
    WRITE_LOG
    IF FILEL <> 0 THEN
      GOTO OUT_OF_RAM
    END
    ROUTE_POINTER = 0
    WRITELN(REC=1,FILED,CONTROL_REC)
    GOTO SLP
  END

IF HAND_OFF_FLAG = 1 THEN
    TYPE = 'G'
    LOG_DATA = GUARD_NUMBER
    WRITE_LOG
    IF FILEL <> 0 THEN
      GOTO OUT_OF_RAM
    END
  END
```

```
    TYPE = 'E'
    LOG_DATA = ZNUM
    WRITE_LOG
    IF FILE1 <> 0 THEN
      GOTO OUT_OF_RAM
    END

MUST_ZONE = ''
    TEMP_PTR = 1
    REPEAT
    UNTIL MUST_ZONE = ''
      READLN(REC=TEMP_PTR,FILER,MUST_REC)
      IF MUST_ZONE = ZNUM THEN
        CHECKED = 0
        WRITELN(REC=TEMP_PTR,FILER,MUST_REC)
      END
      TEMP_PTR = TEMP_PTR + 1
    END
    GOTO DISPLAY_ZONES

.DISPLAY_ZONES
    IF TEMP_LOG_DATA <> '' THEN
      LOG_DATA = TEMP_LOG_DATA
      GOTO PROCESS_MUST_CHECK
    END
    CLEARSCREEN
    CLEARKEYS

HAND_OFF_FLAG = 0
    TEMP_LOG_DATA = ''

IF ROUTE_NUMBER = 'ROAM' THEN
      WIN(1) PUT(DISPLAY,'  Roam Mode  ')
    ELSE
      WIN(1) PUT(DISPLAY,ZDESC)
    END
    TEMP_PTR = ROUTE_POINTER + 1
    READLN(REC=TEMP_PTR,FILER,ROUTE_REC)
    NEXT_ZNUM = ZNUM + SPACES
    IF ROUTE_NUMBER = 'ROAM' THEN
    ELSE
      IF (NEXT_ZNUM = '*EOF*') OR (NEXT_ZNUM = '       ') THEN
        WIN(2) PUT(DISPLAY,' * Last Zone *')
      ELSE
        WIN(2) PUT(DISPLAY,ZDESC)
      END
    END
    READLN(REC=ROUTE_POINTER,FILER,ROUTE_REC)
    GOTO GET_BAR_CODES .GET_BAR_CODES
    TYPE = 'R'
    CLEARKEYS
    DEFKEY(1,F1,GOTO REQUEST_ADVANCE)
    DEFKEY(4,F4,GOTO REVIEW_MUST_SCANS)
    DEFKEY(5,MODE,GOTO SLP)
```

```
        INFO = ''
        BARCODEON
        WIN(7) GET(0,DUMMY)
        BARCODEOFF
        BEEPER
        PAUSE 5
        GOTO ANALYZE_BAR_CODE

.ANALYZE_BAR_CODE
    IF DUMMY = 'ZZ' THEN
        GOTO GET_OTHER
    END
    IF DUMMY = 'Y' THEN
        IF ROUTE_NUMBER = 'ROAM ' THEN
            CLEARSCREEN
            CLEARKEYS
            WIN(1) PUT(DISPLAY,'CANNOT HAND OFF')
            WIN(2) PUT(DISPLAY,' IN ROAM MODE')
            WARNING
            GOTO DISPLAY_ZONES
        ELSE
            GOTO REQUEST_HAND_OFF
        END
    END
    IF DUMMY = 'XX' THEN
        IF (NEXT_ZNUM = '#EOF# ') OR
           (NEXT_ZNUM = '      ') OR
           (ROUTE_NUMBER = 'ROAM ') THEN
            GOTO REQUEST_ADVANCE
        ELSE
            CLEARSCREEN
            CLEARKEYS
            WIN(1) PUT(DISPLAY,' END TOUR IN  ')
            WIN(2) PUT(DISPLAY,' LAST ZONE ONLY')
            WARNING
            GOTO DISPLAY_ZONES
        END
    END
    LEN = LENGTH(DUMMY)
    IF LEN = 2 THEN
        LOG_DATA = DUMMY + SPACES
        WRITE_LOG
        IF FILEL <> 0 THEN
            GOTO OUT_OF_RAM
        END
        GOTO DISPLAY_ZONES
    END
    LOG_DATA = DUMMY + SPACES
    IF ROUTE_NUMBER = 'ROAM ' THEN
        GOTO WRITE_CHECKPOINT
    END
    GOTO PROCESS_MUST_CHECK
```

```
.PROCESS_MUST_CHECK
  TEMP_PTR = 1
  MUST_ZONE = 'X'
  REPEAT
  UNTIL ((MUST_ZONE = ZN_M) AND (MUST_CODE = LOG_DATA)) OR (MUST_ZONE = '')
    READLN(REC=TEMP_PTR,FILEX,MUST_REC)
    TEMP_PTR = TEMP_PTR + 1
  END
  IF MUST_ZONE = ZN_M THEN
    TEMP_PTR = TEMP_PTR - 1
    CHECKED = 1
    WRITELN(REC=TEMP_PTR,FILEX,MUST_REC)
  END
  IF TEMP_LOG_DATA <> '' THEN
    TEMP_LOG_DATA = ''
    WRITE_CHECKPOINT
  END
  GOTO PROCESS_CHECKPOINT

.PROCESS_CHECKPOINT
  CLOSE(FILEB)
  OPEN(FILEB,'BARC')
  DUMMY = ''
  SEARCH_STR = ZN_M + LOG_DATA
  FIND(FILEB,DUMMY,SEARCH_STR)
  CLOSE(FILEB)
  IF DUMMY <> SEARCH_STR THEN
    OPEN(FILEB,'BARC')
    SEARCH_STR = NEXT_ZN_M + LOG_DATA
    FIND(FILEB,DUMMY,SEARCH_STR)
    CLOSE(FILEB)
    IF DUMMY <> SEARCH_STR THEN
      CLEARSCREEN
      CLEARKEYS
      WIN(1)  PUT(DISPLAY,'CHECKPOINT OUT  ')
      WIN(2)  PUT(DISPLAY,'    OF ZONE ')
      WARNING
      GOTO WRITE_CHECKPOINT
    ELSE
      TEMP_LOG_DATA = LOG_DATA
      GOTO REQUEST_ADVANCE
    END
  ELSE
    GOTO WRITE_CHECKPOINT
  END

.WRITE_CHECKPOINT
  TYPE = 'R'
  WRITE_LOG
  IF FILEL <> 0 THEN
    GOTO OUT_OF_RAM
  END
  GOTO DISPLAY_ZONES
```

```
.REQUEST_HAND_OFF
  CLEARSCREEN
  CLEARKEYS
  WIN(1)  PUT(DISPLAY,'OK')
  WIN(2)  PUT(DISPLAY,'TO HAND OFF?')
  WIN(5)  PUT(DISPLAY,'YN')
  DEFKEY(3,F3,GOTO HAND_OFF_OK)
  DEFKEY(4,F4,GOTO DISPLAY_ZONES)
  WAIT
  .HAND_OFF_OK
  HAND_OFF_FLAG = 1
  GOTO REQUEST_ADVANCE

.REQUEST_ADVANCE
  CLEARSCREEN
  CLEARKEYS
  TEMP_PTR = 1
  MUST_ZONE = 'X'
  REPEAT
    READLN(REC=TEMP_PTR,FILE=X,MUST_REC)
  UNTIL MUST_ZONE = ''
    IF (MUST_ZONE = ZNUM) AND (CHECKED = 0) THEN
      CLEARSCREEN
      WIN(1)  PUT(DISPLAY,'MISSED MUST-SCAN')
      IF HAND_OFF_FLAG = 1 THEN
        WIN(2)  PUT(DISPLAY,'CANNOT HAND OFF')
      ELSE
        IF DUMMY = 'XX' THEN
          WIN(2)  PUT(DISPLAY,'CANNOT END TOUR')
        ELSE
          WIN(2)  PUT(DISPLAY,'CANNOT ADVANCE')
        END
      END
      WARNING
      FIVE_IN
      WIN(4)  PUT(DISPLAY,'HIT F4 TO REVIEW')
      WIN(5)  PUT(DISPLAY,'MISSED MUST-SCAN')
      WARNING
      GOTO DISPLAY_ZONES
    END
    TEMP_PTR = TEMP_PTR + 1
  END

IF HAND_OFF_FLAG = 1 THEN
    GOTO GET_GUARD_ID
  ELSE
    IF TEMP_LOG_DATA = '' THEN
      CLEARSCREEN
      CLEARKEYS
      IF (ROUTE_NUMBER = 'ROAM') OR (DUMMY = 'XX') THEN
        WIN(2)  PUT(DISPLAY,'DONE WITH TOUR?')
      ELSE
        WIN(2)  PUT(DISPLAY,'OK TO ADVANCE?')
      END
```

```
        WIN(6) PUT(DISPLAY, YN )
        DEFKEY(3,F3,GOTO ADVANCE)
        DEFKEY(4,F4,GOTO DISPLAY_ZONES)
        WAIT
      ELSE
        GOTO ADVANCE
      END
    END

.GET_OTHER
  CLEARSCREEN
  CLEARKEYS
  FIVE_OFF
  TYPE = 'O'
  OTHER_STR = ''
  DEFKEY(5,MODE,GOTO SLP)
  WIN(1) PUT(DISPLAY,'Enter Incident:')
  WIN(2) GET(2,OTHER_STR)
  L = LENGTH(OTHER_STR)
  OTHER_STR = OTHER_STR + SPACES
  OTHER_STR = COPY(OTHER_STR,1,15)
  IF (L = 0) OR (OTHER_STR =            ') THEN
    CLEARSCREEN
    CLEARKEYS
    WIN(1) PUT(DISPLAY,'NO INCIDENT NAME')
    WIN(2) PUT(DISPLAY,'   RECORDED')
    WARNING
  ELSE
    IF L > 15 THEN
      CLEARSCREEN
      CLEARKEYS
      FIVE_ON
      WIN(1) PUT(DISPLAY,'INCIDENT LIMITED')
      WIN(5) PUT(DISPLAY,'TO 15 CHARACTERS')
      WARNING
      GOTO GET_OTHER
    ELSE
      TYPE = 'R'
      LOG_DATA = DUMMY + SPACES
      WRITE_LOG
      IF FILED <> 0 THEN
        GOTO OUT_OF_RAM
      END
      CLOSE(FILED)
      OPEN_APPEND(FILED,'OTHER')
      WRITELN FILED,OTHER_STR
      IF FILED <> 0 THEN
        CLOSE(FILED)
        GOTO OUT_OF_RAM
      END
      CLOSE(FILED)
    END
  END
  GOTO DISPLAY_ZONES
```

```
.REVIEW_MUST_SCANS
  CLEARSCREEN
  CLEARKEYS

MUST_ZONE = 'X'
  TEMP_PTR = 1
  REPEAT
    READLN(REC=TEMP_PTR,FILE*,MUST_REC)
  UNTIL (MUST_ZONE = ZNUM) OR (MUST_ZONE = '')
    TEMP_PTR = TEMP_PTR + 1
  END

IF MUST_ZONE = ZNUM THEN
    REPEAT
    UNTIL MUST_ZONE <> ZNUM
      IF CHECKED = 0 THEN
        CLEARSCREEN
        CLEARKEYS
        WIN(1)  PUT(DISPLAY,'SKIP?')
        WIN(2)  PUT(DISPLAY,MUST_DESC)
        WIN(3)  PUT(DISPLAY,'YN')
        DEFKEY(3,F3,GOTO SKIP_MUST_SCAN)
        DEFKEY(4,F4,GOTO NO_SKIP)
        DEFKEY(5,MODE,GOTO DISPLAY_ZONES)
        WAIT
      .SKIP_MUST_SCAN
        CLEARSCREEN
        CLEARKEYS
        WIN(1)  PUT(DISPLAY,'Skipping...')
        WIN(2)  PUT(DISPLAY,MUST_DESC)
        CHECKED = 1
        WRITELN(REC=TEMP_PTR,FILE*,MUST_REC)
        PAUSE 20
      .NO_SKIP
      END
      .MUST_CONTINUE
      TEMP_PTR = TEMP_PTR + 1
      READLN(REC=TEMP_PTR,FILE*,MUST_REC)
    END
  END
  CLEARSCREEN
  CLEARKEYS
  FIVE_ON
  WIN(1)  PUT(DISPLAY,'End of must-scan')
  WIN(5)  PUT(DISPLAY,'points this zone')
  BEEPER
  PAUSE 10
  GOTO DISPLAY_ZONES .WRITE_LOG
  TIME FORMAT OFF
  T = TIME
  DATE FORMAT OFF
  D = DATE
  STAMP = D + T + SP_LOG
```

```
        WRITELN(REC=LOG_POINTER,FILE1,LOG_REC)
        LOG_POINTER = LOG_POINTER - 1
        WRITELN(REC=1,FILE0,CONTROL_REC)
        RETURN

.OUT_OF_RAM
        CLEARSCREEN
        CLEARKEYS
        WIN(1) PUT(DISPLAY,' THE WAND IS   ')
        WIN(2) PUT(DISPLAY,' OUT OF MEMORY')
        WARNING
        CLEARSCREEN
        WIN(1) PUT(DISPLAY,'SUPERVISOR MUST ')
        WIN(2) PUT(DISPLAY,' UPLOAD TO PC ')
        WARNING
        TYPE = 'M'
        GOTO SLP

.LOAD_ROUTE
        J = 10
        COMMAND = 'DOWNLOAD'
        CLEARSCREEN
        CLEARKEYS
        WIN(1) PUT(DISPLAY,' <ENT>=RECEIVE ')
        WIN(2) PUT(DISPLAY,' <MODE>=QUIT')
        DEFKEY(5,MODE,GOTO DATA_MENU)
        DEFKEY(6,ENT,GOTO GET_PACKET)
        WAIT

.GET_PACKET
        CLEARSCREEN
        CLEARKEYS
        CONNECT
        IF PNUM = 0 THEN
           GOTO DATA_MENU
        END
        LPNUM = PNUM
        ZONE_NUMBER = SPACES
        CLEARSCREEN
        CLEARKEYS
        WIN(1) PUT(DISPLAY,'LOADING...')
        INSTR = ''
        PPACK = ''
        RETRY = 0
        REPEAT
           GETSTRING
        UNTIL (INSTR = '') OR (RETRY >= 5)
           XPNUM = ORD(INSTR,1)
           PTYPE = COPY(INSTR,2,1)
           IF PTYPE = 'F' THEN
              PLEN = ORD(INSTR,3)
              PLEN = PLEN - 32
              CALCHECK
```

```
            IF CHEDKSUM = 0 THEN
              IF LPNUM = XPNUM THEN
                ACK
              ELSE
                PNUM = LPNUM
                INCPNUM
                IF PNUM = XPNUM THEN
                  ACK
                  LPNUM = XPNUM
                  FPACK = COPY(INSTR,4,PLEN)

IF FPACK = 'GUARD' THEN
              CLOSE(FILES)
              PURGE('GUARDS')
              OPEN(SEQUENTIAL,FILES,'GUARDS')
              GUARD_NUMBER = 1
              WRITELN(REC=1,FILEC,CONTROL_REC)
            ELSE
              IF FPACK = 'MUSTSCAN' THEN
                CLOSE(FILER)
                PURGE('MUSTSCAN')
                OPEN(RANDOM,FILER,'MUSTSCAN',33)
                TEMP_PTR = 1
              ELSE
                IF FPACK = 'DATE' THEN
                ELSE
                  IF FPACK = 'PASSWORD' THEN
                  ELSE
                    IF FPACK = 'BARC' THEN
                      CLOSE(FILES)
                      PURGE('BARC')
                      OPEN(SEQUENTIAL,FILES,'BARC')
                      CLOSE(FILES)
                      OPEN(APPEND,FILES,'BARC')
                    ELSE
                      CLOSE(FILER)
                      PURGE('ROUTE')
                      OPEN(RANDOM,FILER,'ROUTE',26)
                      ROUTE_NUMBER = COPY(FPACK,1,6)
                      ROUTE_POINTER = 0
                      WRITELN(REC=1,FILEC,CONTROL_REC)
                      FPACK = 'ROUTE'
                      TEMP_PTR = 1
                    END
                  END
                END
              END
            END
          ELSE
            NAK
          END
        END
      ELSE
        NAK
      END
    ELSE
      IF PTYPE = 10 THEN
        PLEN = ORD(INSTR,3)
```

```
PLEN = PLEN - 32
  CALCHECK
   IF CHECKSUM = 0 THEN
    IF LPNUM = XPNUM THEN
      ACK
    ELSE
     PNUM = LPNUM
     INCPNUM
     IF PNUM = XPNUM THEN
       ACK
       LPNUM = XPNUM
       IF FPACK = 'ROUTE' THEN
         ZNUM = COPY(INSTR,4,6)
         ZDESC = COPY(INSTR,10,15)
         WRITELN(REC=TEMP_PTR,FILER,ROUTE_REC)
         TEMP_PTR = TEMP_PTR + 1
       ELSE
        IF FPACK = 'BUFFI' THEN
          DUMMY = COPY(INSTR,4,6)
          WRITELN(FILES,DUMMY)
        ELSE
         IF FPACK = 'MUSTSCAN' THEN
          MUST_ZONE = COPY(INSTR,4,6)
          MUST_CODE = COPY(INSTR,10,6)
          MUST_DESC = COPY(INSTR,16,15)
          CHECKED = 0
          WRITELN(REC=TEMP_PTR,FILER,MUST_REC)
          TEMP_PTR = TEMP_PTR + 1
         ELSE
          IF FPACK = 'DATE' THEN
            DUMMY1 = COPY(INSTR,4,6)
            DATE SET DUMMY1
            DUMMY2 = COPY(INSTR,10,6)
            TIME SET DUMMY2
            TIME FORMAT OFF
            DATE FORMAT OFF
          ELSE
           IF FPACK = 'PASSWORD' THEN
             PASSWORD = COPY(INSTR,4,6)
             WRITELN(REC=1,FILEC,CONTROL_REC)
           ELSE
            IF FPACK = 'BARC' THEN
              DUMMY1 = COPY(INSTR,4,1)
              DUMMY2 = COPY(INSTR,11,1)
              IF (DUMMY1 = '*') AND (DUMMY2 = '*') THEN
                ZONE_NUMBER = COPY(INSTR,5,6)
              ELSE
                DUMMY1 = COPY(INSTR,4,6)
                DUMMY = ZONE_NUMBER + DUMMY1
                WRITELN(FILES,DUMMY)
              END
            END
           END
          END
         END
        END
       END
      END
```

```
          ELSE
            NAK
          END
        END
      ELSE
        NAK
      END
    END
  ELSE
    IF PTYPE = 'E' THEN
      IF LPNUM = XPNUM THEN
        ACK
      ELSE
        PNUM = LPNUM
        INCPNUM
        IF PNUM = XPNUM THEN
          ACK
          LPNUM = XPNUM
          IF FPACK = 'ROUTE' THEN
            ZNUM = '*EOF*'
            ZDESC = SPACES
            WRITELN(RED=TEMP_PTR,FILER,ROUTE_REC)
            TEMP_PTR = TEMP_PTR + 1
            CLOSE(FILER)
          ELSE
            IF FPACK = 'GUARD' THEN
              CLOSE(FILER)
            ELSE
              IF FPACK = 'LIFTEDRY' THEN
                CLOSE(FILER)
              ELSE
                IF FPACK = 'BARC' THEN
                  CLOSE(FILER)
                END
              END
            END
          END
          FPACK = ''
        ELSE
          NAK
        END
      END
    ELSE
      IF PTYPE = 'X' THEN
        IF LPNUM = XPNUM THEN
          ACK
        ELSE
          PNUM = LPNUM
          INCPNUM
          IF PNUM = XPNUM THEN
            ACK
            LPNUM = XPNUM
          ELSE
            NAK
          END
        END
      ELSE
        NAK
```

```
            END
          END
        END
      END
    END
  END
  IF PTYPE <> "X" THEN
    CLOSE(FILER)   PURGE("ROUTE")
    CLOSE(FILEG)   PURGE("GUARDS")
    CLOSE(FILEM)   PURGE("MUSTSCAN")
    CLOSE(FILEB)   PURGE("BAD")
    ROUTE_NUMBER = "          ROUTE_POINTER = -1
    GUARD_NUMBER = "          PASSWORD = SPACES
    WRITELN(REC=1,FILED,CONTROL_REC)
    GOTO COM_FAILURE
  END
  WIN(2)  PUT(DISPLAY,"   ...COMPLETE")
  BEEPER
  PAUSE 20
  BEEPER
  CLEARSCREEN
  CLEARKEYS

DATE FORMAT ON
  DUMMY1 = DATE
  DUMMY1 = "Date: " + DUMMY1
  DATE FORMAT OFF

TIME FORMAT ON
  DUMMY2 = TIME
  DUMMY2 = "Time: " + DUMMY2
  TIME FORMAT OFF

WIN(1)  PUT(DISPLAY,DUMMY1)
  WIN(2)  PUT(DISPLAY,DUMMY2)
  PAUSE 70

ROUTE = 1
    GOTO BATCHECK

.CALCHECK
    CHECKSUM = 0
    LEN = PLEN + 3
    FOR I = 4 TO LEN
       Z = ORD(INSTR,I)
       CHECKSUM = CHECKSUM + Z
    END
    CHECKSUM = CHECKSUM MOD 96
    CHECKSUM = CHECKSUM + 32
    I = 4 + PLEN
    C = ORD(INSTR,I)
    RETURN

.SEND_LOG
    J = 6
    CLEARSCREEN
```

```
CLEARKEYS
WIN(1)  PUT(DISPLAY,' <ENT>=TRANSMIT ')
WIN(2)  PUT(DISPLAY,' <MODE>=QUIT')
DEFKEY(5,MODE,GOTO DATA_MENU)
DEFKEY(6,ENT,GOTO XMIT_HEADER)
WAIT

.XMIT_HEADER
  CLEARSCREEN
  CLEARKEYS
  CONNECT
  IF PN# = 0 THEN
    GOTO DATA_MENU
  END
  CLOSE(FILED)
  OPEN(FILED,'OTHER')
  CLEARSCREEN
  CLEARKEYS
  WIN(1)  PUT(DISPLAY,'SEND HEADER...')
  PTYPE = 'P'
  OUTSTR = 'LOGDATA '
  BUILD_PACKET
  RETRY = 0
  REPEAT
    PUTL(COM,OUTSTR)
    GETSTRING
  UNTIL (INSTR = DUMMY) OR (RETRY >= 5)
    RETRY = RETRY + 1
  END
  IF INSTR <> DUMMY THEN
    GOTO COM_FAILURE
  END

.XMIT_DATA
  CLEARSCREEN
  WIN(1)  PUT(DISPLAY,'SENDING DATA ')
  PTYPE = 'D'
  TEMP_PTR = 1
  REPEAT
    UNTIL (TEMP_PTR >= LOG_POINTER)
      READLN(REC=TEMP_PTR,FILE,LOG_REC)
      OUTSTR = TYPE + LOG_DATA + STAMP

IF LOG_DATA = 'ZZ    ' THEN
        READLN(FILED,OTHER_STR)
        OUTSTR = OUTSTR + OTHER_STR
      END

BUILD_PACKET
      RETRY = 0
      REPEAT
        PUTL(COM,OUTSTR)
        GETSTRING
      UNTIL (INSTR = DUMMY) OR (RETRY >= 5)
        RETRY = RETRY + 1
```

```
      END
    IF INSTR <> DUMMY THEN
      GOTO COM_FAILURE
    END
    TEMP_PTR = TEMP_PTR + 1
  END

.END_OF_DATA
  INCPNUM
  PTYPE = 'E'
  OUTSTR = PCHR + PTYPE
  DUMMY = PCHR + 'A'
  RETRY = 0
  CLEARSCREEN
  WIN(1) PUT(DISPLAY,'END OF DATA')
  CLICK
  REPEAT
  UNTIL (INSTR = DUMMY) OR (RETRY = 5)
    PUTL(COM,OUTSTR)
    GETSTRING
    RETRY = RETRY + 1
  END
  IF INSTR <> DUMMY THEN
    GOTO COM_FAILURE
  END

.END_OF_TRANSMISSION
  CLEARSCREEN
  WIN(1) PUT(DISPLAY,'END OF XMIT')
  CLICK
  INCPNUM
  PTYPE = 'X'
  OUTSTR = PCHR + PTYPE
  DUMMY = PCHR + 'A'
  RETRY = 0
  REPEAT
  UNTIL (INSTR = DUMMY) OR (RETRY = 5)
    PUTL(COM,OUTSTR)
    GETSTRING
    RETRY = RETRY + 1
  END
  IF INSTR = DUMMY THEN
    GOTO XMIT_DONE
  END

.COM_FAILURE
  CLEARSCREEN
  CLEARKEYS
  DISCONNECT
  IF COMFUNC = 'DOWNLOAD' THEN
    DEFKEY(5,MODE,GOTO INITIALIZE_STUFF)
  ELSE
```

```
    DEFKEY(5,MODE,GOTO DATA_MENU)
    CLOSE(FILED)
END
WIN(1)  PUT(DISPLAY,' COM Error!     ')
WARNING
CLEARSCREEN
WIN(1)  PUT(DISPLAY,' COM Error! Hit ')
WIN(2)  PUT(DISPLAY,' MODE to reset. ')
WAIT .XMIT_DONE
  CLEARSCREEN
  CLEARKEYS
  WIN(1)  PUT(DISPLAY,'TRANSMISSION ')
  WIN(2)  PUT(DISPLAY,'  COMPLETE')
  BEEPER
  PAUSE 20
  DISCONNECT
  GOTO PURGE_DATA .PURGE_DATA
  CLEARSCREEN
  CLEARKEYS
  WIN(1)  PUT(DISPLAY,'PURGING DATA...')
  PAUSE 15
  CLOSE(FILE1)
  PURGE('LOG')
  CLOSE(FILED)
  PURGE('OTHER')
  LOG_POINTER = 1
  ROUTE_POINTER = 0
  WRITELN(REC=1,FILED,CONTROL_REC)
  WIN(2)  PUT(DISPLAY,'    ...COMPLETE')
  BEEPER
  PAUSE 15
  GOTO OPEN_LOG_FILE .CONNECT
  PNUM = 0
  CALL NOECHO
  CLEARSCREEN
  FIVE_ON
  WIN(1)  PUT(DISPLAY,'Waiting...')
  WIN(5)  PUT(DISPLAY,'Hit MODE to quit')
  COM(BAUD=1200,PARITY=NONE,BITS=8,XON=OFF,ON)
  PAUSE 10
  REPEAT
    GETCHAR(COM,Z)
  UNTIL (Z = 1) OR (KEY(MODE) = 255)
  END
  IF Z <> 1 THEN
    CLICK
    GOTO ABORT_CONNECT
  END
```

```
WIN(2) PUT(DISPLAY, "...CONNECTED")
CLICK
PUT(COM,#12)
PNUM = 31
RETURN

.ABORT_CONNECT
  COM_CLEAR OFF

RETURN

.INCPNUM
    PNUM = PNUM + 1
    IF PNUM = 128 THEN
      PNUM = 32
    END
    ! LDAA PNUM + 1
    ! STAA PCHR
    RETURN

.GETSTRING
  RETRY_COUNT = 0
  INSTR = ""
  REPEAT
    Z = 0
    GETCHAR(COM,Z,A)
    ! LDAA Z+1
    ! STAA Y
  UNTIL ((A = 0) AND (RETRY_COUNT >= J)) OR (Z = 13)
    IF A = 0 THEN
      RETRY_COUNT = RETRY_COUNT + 1
      PAUSE 5
    ELSE
      RETRY_COUNT = 0
      IF Z >= 32 THEN
        INSTR = INSTR + Y
      END
    END
  END
  RETURN

.BUILD_PACKET
  INCPNUM
  LEN = LENGTH(OUTSTR)
  PLEN = LEN + 32
  ! LDAA PLEN + 1
  ! STAA Y
  PHEAD = PCHR + PTYPE + Y

CHECKSUM = 0
  FOR I = 1 TO LEN
    Z = ORD(OUTSTR,I)
    CHECKSUM = CHECKSUM - Z
  END
```

```
CHECKSUM = CHECKSUM MOD 96
CHECKSUM = CHECKSUM + 32

! LDAA CHECKSUM + 1
! STAA Y

OUTSTR = PHEAD + OUTSTR + Y
INSTR = ''
DUMMY = PCHR - A'
RETURN

.ACK
  ! LDAA XPNUM + 1
  ! STAA PCHR
  OUTSTR = PCHR + A'
  PUTL(COM,OUTSTR)
  RETRY = 0
  RETURN

.NAK
  ! LDAA XPNUM + 1
  ! STAA PCHR
  OUTSTR = PCHR + 'N'
  PUTL(COM,OUTSTR)
  RETRY = RETRY + 1
  BUZZER
  RETURN

.BARCODEON
  BCODE = 1
  BARCODE ON
  RETURN

.BARCODEOFF
  BCODE = 0
  BARCODE OFF
  RETURN

.CLICK
  SIGNAL(600,2,B)
  RETURN

.BEEPER
  SIGNAL(800,15,B)
  RETURN

.BUZZER
  SIGNAL(200,15,B)
  RETURN
```

```
.WARNING
  BUZZER PAUSE 5
  BUZZER PAUSE 10
  RETURN

.DEBOUNCE
  REPEAT
  UNTIL SCANCODE(0) = 255
  END
  RETURN

.FIVE_ON
  DEFWIN(5,'YYYYYYYYYYYYYYYYY')
  RETURN

.FIVE_OFF
  DEFWIN(5,'YYYYYYYYYYYYYYYYN')
  RETURN

.DISCONNECT
  A = 0
  REPEAT
  UNTIL A >= 10
    IF NOT KEY(CTS) THEN
      A = 10
    END
    PAUSE 10
    A = A + 1
  END
  COM(CLEAR) OFF
  RETURN

.DUMP_SHIT

COM(BAUD=2400,PARITY=NONE,XON=OFF) ON
  PAUSE 10
  IF KEY(F3) <> 255 THEN
    GOTO DUMP_DONE
  END
  CLEARSCREEN
  WIN(1) PUT(DISPLAY,'DUMPING...')
  BEEPER

PUTL(COM,'ROUTE FILE:')
  TEMP_PTR = 1
  REPEAT
    READLN(REC=TEMP_PTR,FILER,ROUTE_REC)
    PUTL(COM,ZNUM,ZDESC)
  UNTIL (FILER <> 0) OR (ZNUM = '')
    TEMP_PTR = TEMP_PTR + 1
  END
```

```
TEMP_PTR = TEMP_PTR - 1
DUMMY = STRING(TEMP_PTR)
PUTL(COM,'ROUTE FILE TOTAL: ',DUMMY,' RECORDS')
PUTL(COM,'')

PUTL(COM,'MUST-SCAN FILE:')
TEMP_PTR = 1
REPEAT
   READLN(REC=TEMP_PTR,FILEM,MUST_REC)
   DUMMY = STRING(CHECKED)
   PUTL(COM,MUST_ZONE,MUST_CODE,MUST_DESC,DUMMY)
UNTIL (FILEM <> 0) OR (MUST_ZONE = '')
   TEMP_PTR = TEMP_PTR + 1
END
TEMP_PTR = TEMP_PTR - 1
DUMMY = STRING(TEMP_PTR)
PUTL(COM,'MUST-SCAN FILE TOTAL: ',DUMMY,' RECORDS')
PUTL(COM,'')

PUTL(COM,'GUARD FILE: ')
CLOSE(FILES)
OPEN(SEQUENTIAL,FILES,'GUARDS')
TEMP_PTR = 0
REPEAT
   READLN(FILES,DUMMY)
UNTIL DUMMY = ''
   PUTL(COM,DUMMY)
   TEMP_PTR = TEMP_PTR + 1
END
CLOSE(FILES)
DUMMY = STRING(TEMP_PTR)
PUTL(COM,'GUARD FILE TOTAL: ',DUMMY,' RECORDS')
PUTL(COM,'')

CLOSE(FILES)
OPEN(FILES,'BARC')
PUTL(COM,'CHECKPOINT FILE: ')
TEMP_PTR = 0
REPEAT
   READLN(FILEB,BARC_STR)
UNTIL BARC_STR = ''
   PUTL(COM,BARC_STR)
   TEMP_PTR = TEMP_PTR + 1
END
CLOSE(FILEB)
DUMMY = STRING(TEMP_PTR)
PUTL(COM,'CHECKPOINT FILE TOTAL: ',DUMMY,' RECORDS')
PUTL(COM,'')

PUTL(COM,'LOG FILE:')
TEMP_PTR = 1
REPEAT
   READLN(REC=TEMP_PTR,FILEL,LOG_REC)
   PUTL(COM,TYPE,LOG_DATA,STAMP)
UNTIL (FILEL <> 0) OR (TYPE = '')
   TEMP_PTR = TEMP_PTR + 1
END
```

```
TEMP_PTR = TEMP_PTR - 1
DUMMY = STRING(TEMP_PTR)
PUTL(COM,'LOG FILE TOTAL:  ',DUMMY,' RECORDS')
PUTL(COM,'')

CLOSE(FILED)
OPEN(FILED,'OTHER')
PUTL(COM,'OTHER FILE:')
TEMP_PTR = 0
REPEAT
  READLN(FILED,OTHER_STR)
UNTIL OTHER_STR = ''
  PUTL(COM,OTHER_STR)
  TEMP_PTR = TEMP_PTR + 1
END
CLOSE(FILED)
DUMMY = STRING(TEMP_PTR)
PUTL(COM,'OTHER FILE TOTAL:  ',DUMMY,' RECORDS')
PUTL(COM,'')

PUTL(COM,'CONTROL FILE:')
READLN(REC=1,FILED,CONTROL_REC)
PUTL(COM,'ROUTE_NUMBER:',ROUTE_NUMBER)
PUTL(COM,'GUARD_NUMBER:',GUARD_NUMBER)
PUTL(COM,'PASSWORD:',PASSWORD)
PUTL(COM,'ROUTE_POINTER:',ROUTE_POINTER)
PUTL(COM,'LOG_POINTER:',LOG_POINTER)
PUTL(COM,'')
CLEARSCREEN

.DUMP_DONE
  COM(CLEAR) OFF
  BEEPER
  GOTO DATA_MENU

.BATCHED
  CLEARSCREEN
  CLEARKEYS

! BCLR @PORTA,$1E
  PAUSE 1
  VOLTAGE = BATTERY(0)
  ! BSET @PORTA,$1E

VOLTAGE = VOLTAGE/100
  DUMMY1 = STRING(VOLTAGE)
  DUMMY1 = 'Voltage = ' + DUMMY1
  WIN(1)  PUT(DISPLAY,DUMMY1)
  IF VOLTAGE < 7.8 THEN
    WIN(2)  PUT(DISPLAY,'Battery is low.')
  ELSE
    WIN(2)  PUT(DISPLAY,'Battery is ok.')
  END
  PAUSE 30
  IF RCODE = 1 THEN
    GOTO OPEN_ROUTE_FILE
```

```
    ELSE
      GOTO MISCELLANEOUS_MENU
    END

.DATE_TIME

.SCAN_CODES
  CLEARSCREEN
  CLEARKEYS
  DEFKEY(5,MODE,GOTO MISCELLANEOUS_MENU)
  DUMMY1 = ''
  .SCAN_CODES_LOOP
    WIN(1)  PUT(DISPLAY,'Scan Checkpoint>')
    DUMMY1 = DUMMY1 + SPACES
    DUMMY1 = COPY(DUMMY1,1,16)
    WIN(2)  PUT(DISPLAY,DUMMY1)
    BARCODEON
    INFO=''
    DUMMY2=''
    WIN(7)  GET(0,DUMMY2)
    BARCODEOFF
    IF INFO='' THEN
      GOTO SCAN_CODES_LOOP
    END
    BEEPER
    DUMMY1 = DUMMY2
    GOTO SCAN_CODES_LOOP

END.

PROGRAM WARMEXED repeat
until not key(on)
end

! LDAA $B7
! ANDA #1
! STAA @INPUT_DEV
! LDX #$0000
!FIND_LOOP:
! INX
! LDD 0,X
! SUBD #$code
! BNE FIND_LOOP
! LDY 3,X
! LDAA 0,Y
! CMPA #$0E
! BNE NOT_CURSOR
! JSR 0,X
! LDX @TIME_OUT_INTERVAL
! STX @TIME_OUT_VAL
```

```
!NOT_CURSOR:

IF BCODE = 1 THEN
  BARCODE ON
END
RETURN

END.
```

Appendix 3-1

1. Install the following software in an IBM PC/XT (Registered Trademark of International Business Machines):

a. SilverComm Library (SilverWare, Inc.);

b. Clipper Summer '87 (Nantucket Corporation);

c. dBASE III PLUS (Ashton-Tate, Inc.);

d. PLINK86plus (Phoenix Technologies Ltd.);

e. Universal Data Language (UDL) Version 3.1 (Hand Held Products, Inc.).

2. Enter the source code of Appendix 1-1.

3. Create OVLCOMP.BAT, MAIN.CLP, UTILITY.CLP, DETREP.CLP and OVLLINK.LNK files as shown in Appendix 1-2.

4. Create TMMENU.EXE following the instructions of Appendix 1-2, part A.

5. Create M1.BAT file as shown in Appendix 1-3.

6. Create TMMAINT.EXE following the instructions of Appendix 1-3, part A.

7. Generate database files of Appendix 1-4 using dBASE III.

8. Run TMMAINT and select the Reindex option.

9. Enter the source code of Appendix 2-1 (SMS 2000.UDL).

10. Install object files CODE39.OBJ and USERBAR.OBJ (available from Hand Held Products, Inc.).

11. In the linker configuration setup function, set the UDL linker code address to 8000-0000 to instruct the linker to create an Intel hex file; select the Compile option on the UDL main menu to compile the source code of Appendix 2-1 and link it with the object files CODE39.OBJ and USERBAR.OBJ to create SMS2000.HEX, the instruction code for the MICRO-WAND III (Registered Trademark of Hand Held Products, Inc.)

12. Load SMS2000.HEX into an EPROM programmer and burn into a 27C256 32K EPROM for the MICRO-WAND III.

13. Run TMMAINT or TMMENU as desired.

We claim:

1. A portable tour monitor comprising:
   a modular, portable device adapted to be carried through a tour, said tour comprising a plurality of checkpoints, each labeled with a respective checkpoint code;
   sensor means, included in the portable device, for reading the checkpoint codes during the tour and for generating time stamped sensor signals in response thereto;
   memory means for storing the time stamped sensor signals;
   means for storing a plurality of messages, each associated with a respective one of a plurality of successive zones included in the tour, each of the zones associated with a set of the checkpoints of the tour, at least some of the sets comprising a plurality of checkpoints; and
   means, included in the portable device, for indicating when the sensor means has read at least selected ones of the checkpoint codes associated with a selected zone; and
   means, responsive to the indicating means, for displaying the message associated with the next successive zone.

2. The invention of claim 1 wherein at least some of the checkpoints are each associated with a plurality of the zones.

3. The invention of claim 2 wherein each of the checkpoint codes comprises a respective bar code.

4. The invention of claim 1 further comprising means for tranmitting the stored time stamped sensor signals from the portable device to a report generating computer.

5. The invention of claim 1 wherein each of the checkpoints comprises a security checkpoint, and wherein the tour is a guard tour.

6. The invention of claim 1 wherein each of the checkpoints comprises a janitorial checkpoint, and wherein the tour is a janitorial tour.

7. The invention of claim 1 wherein each of the messages names the associated zone.

* * * * *